United States Patent [19]

Al-Ofi

[11] Patent Number: 5,181,186

[45] Date of Patent: Jan. 19, 1993

[54] TPC COMPUTERS

[76] Inventor: Moatad S. Al-Ofi, 4035 Walnut St., Philadelphia, Pa. 19104

[21] Appl. No.: 789,410

[22] Filed: Nov. 1, 1991

Related U.S. Application Data

[63] Continuation of Ser. No. 476,301, Feb. 7, 1990, abandoned, which is a continuation-in-part of Ser. No. 181,034, Apr. 13, 1988, abandoned.

[51] Int. Cl.[5] .......................... G06F 7/49; G06F 7/50; G06F 7/52
[52] U.S. Cl. .................... 364/287; 364/716; 364/736; 364/748; 364/752; 364/737; 364/764; 364/759; 364/768; 364/786; 307/465
[58] Field of Search .............. 364/736, 746, 746.2, 364/748, 752, 754, 757, 759, 761, 764, 766, 786, 787, 716, 755, 762, 778, 780; 307/465

[56] References Cited

U.S. PATENT DOCUMENTS

| | | | |
|---|---|---|---|
| 3,155,822 | 11/1964 | Chiang | 364/780 |
| 3,192,369 | 6/1965 | Schmitt | 364/780 |
| 3,513,303 | 5/1970 | Kitz et al. | 364/762 |
| 3,594,561 | 7/1971 | Whitwell | 364/780 |
| 3,906,481 | 9/1975 | Luger | 364/755 |
| 4,901,267 | 2/1990 | Birman et al. | 364/736 |
| 4,916,651 | 4/1990 | Gill et al. | 364/736 |

OTHER PUBLICATIONS

Anderson et al, The IBM System/360 Model 91; Floating-Point Execution Unit, IBM Journal, vol. 11, Jan. 1967, pp. 193-218.

Boole, G., The Laws of Thought, Cambridge, 1854, pp. 40-41.

Hwang, K., Comuter Arithemtic Principles, Architecure and Design, New York, Wiley, 1979, pp. 84-90.

Al-Kashi, J. M., Miftah Al-Hisab, Eds. Dimirdash & Al-Shaykh, The Arabian Book House for Typing & Pub., Cario, 1969, pp. 56-66.

Mano, M. M., Digital Logic and Computer Design, Englewood CLiffs, N. J., Prentice Hall, 1979, pp. 10-14, 323-334, 416-420.

Mano, M. M., Computer System Architecture, Englewood Cliffs, N. J., Prentice Hall, 1976, pp. 375-380.

Shannon, C. E., A Symbolic Analysis of Relay and Switching Circuits, Trans. of the AIEE, vol. 57, 1938, pp. 713-723.

*Primary Examiner*—David H. Malzahn

[57] ABSTRACT

A tri-property code has been adopted and accordingly combinational and sequential circuits for implementing some arithmetic and logical operations are designed individually then combined into a unit for such operations. Most of the circuits are drawn for the decimal system with general procedures applicable to the other radices.

18 Claims, 132 Drawing Sheets

(10,01), (100,010,001), (1000,0100,0010,0001)  corresponding TPC systems

| | | | | | | | | ...

(1, 0 ), ( 2 , 1 , 0 ), ( 3 , 2 , 1 , 0 )  digital systems binary  ,   ternary   ,    quaternary        etc.

Fig. 1.

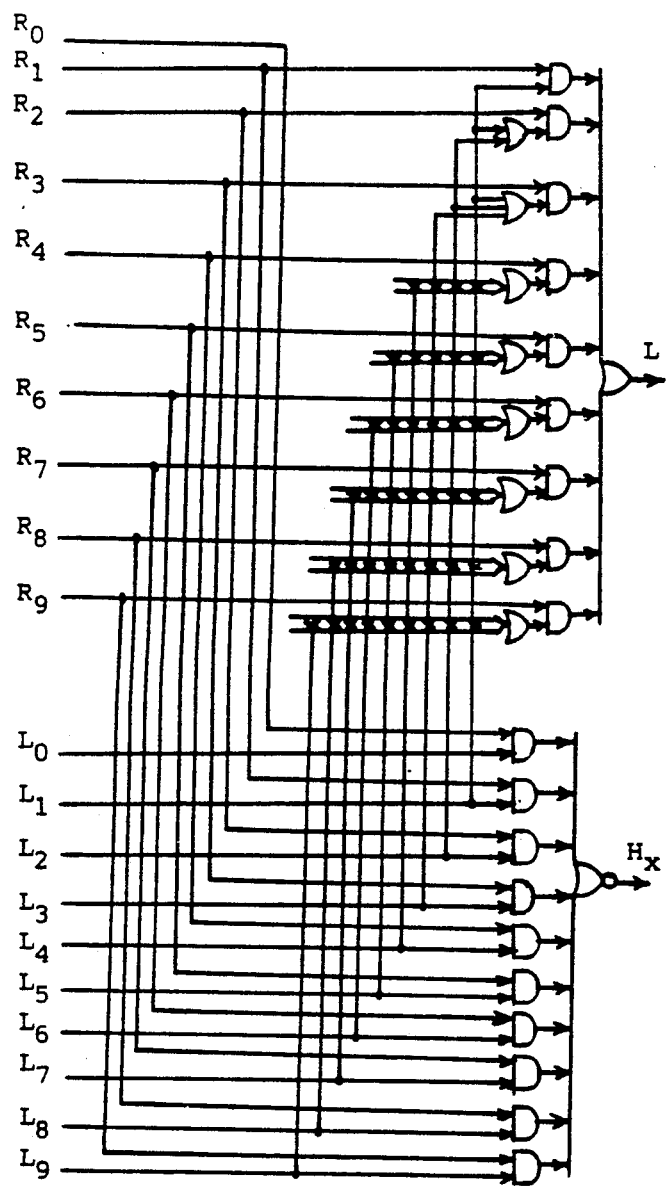
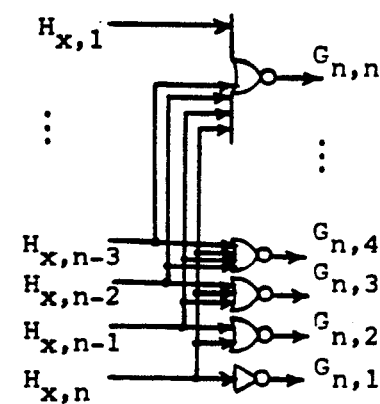
Fig. 22A-1.
Fig. 21-4.
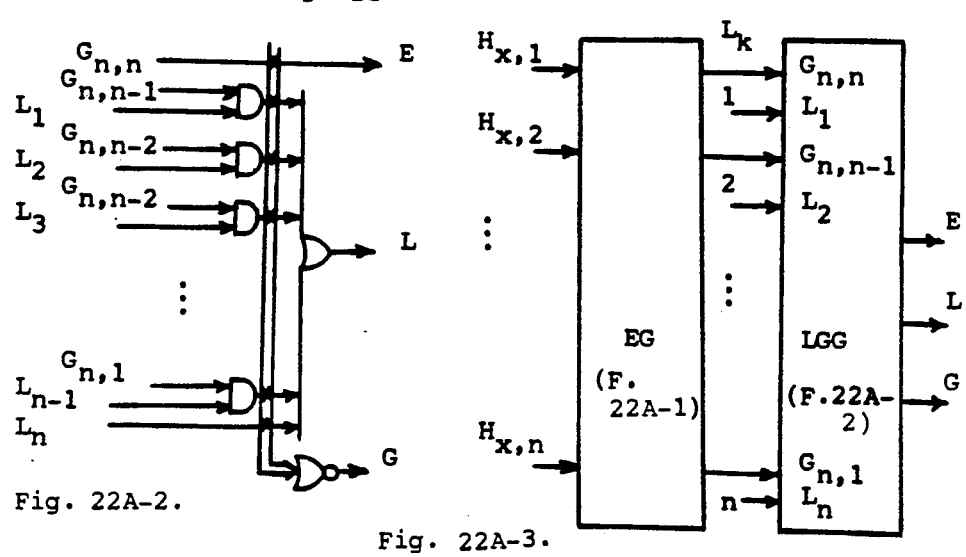
Fig. 22A-2.
Fig. 22A-3.

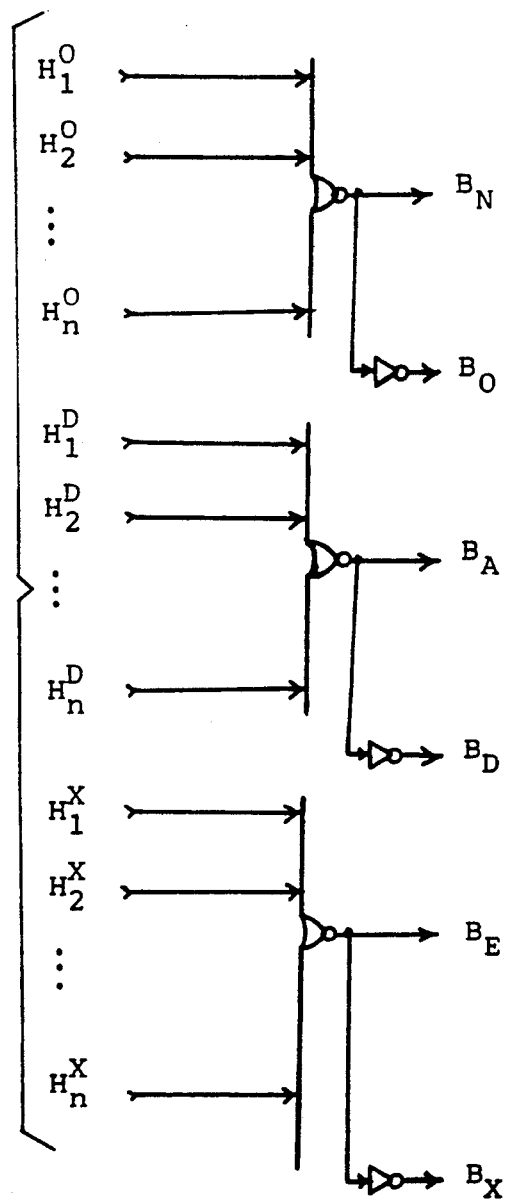
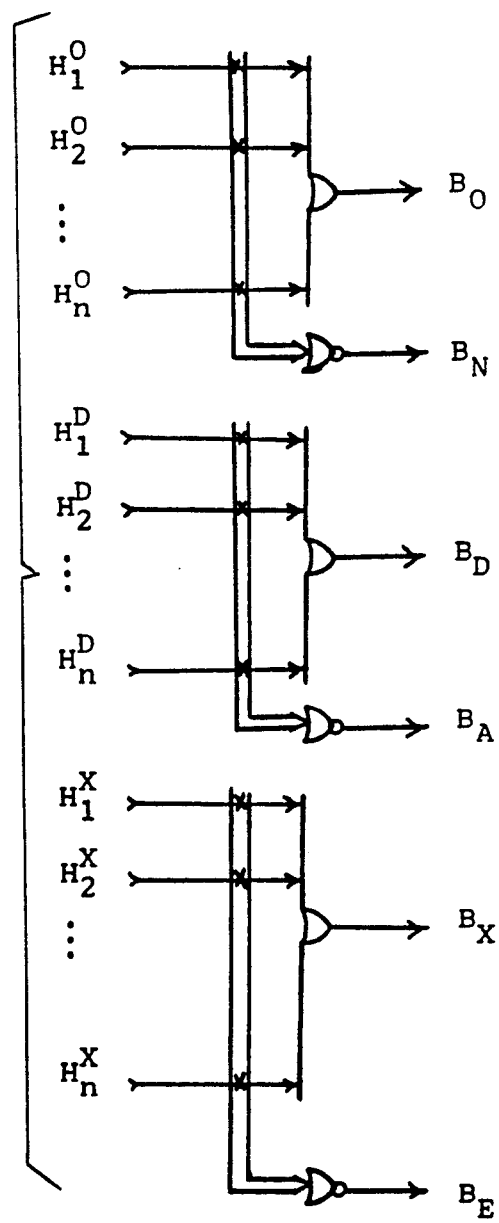
Fig. 24-1.  Fig. 24-2.

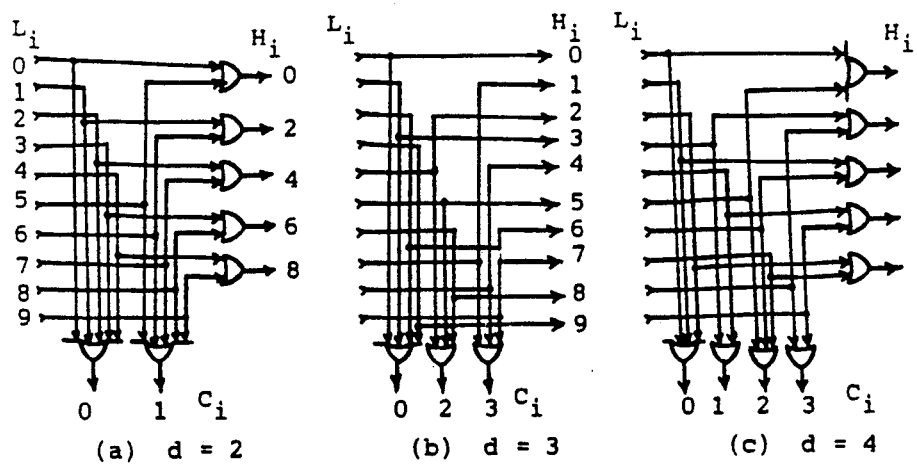
(a) d = 2  Fig. 30-a.
(b) d = 3  Fig. 30-b.
(c) d = 4  Fig. 30-c.
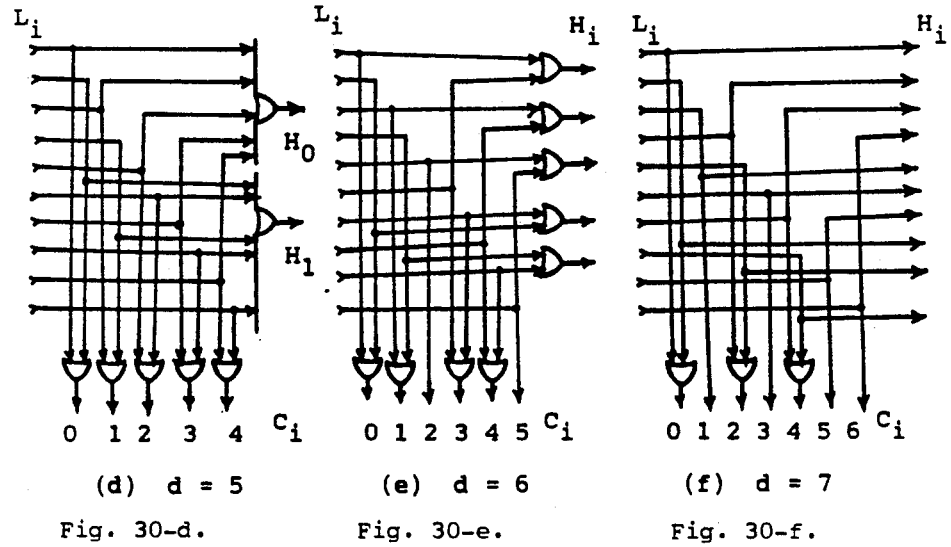
(d) d = 5  Fig. 30-d.
(e) d = 6  Fig. 30-e.
(f) d = 7  Fig. 30-f.
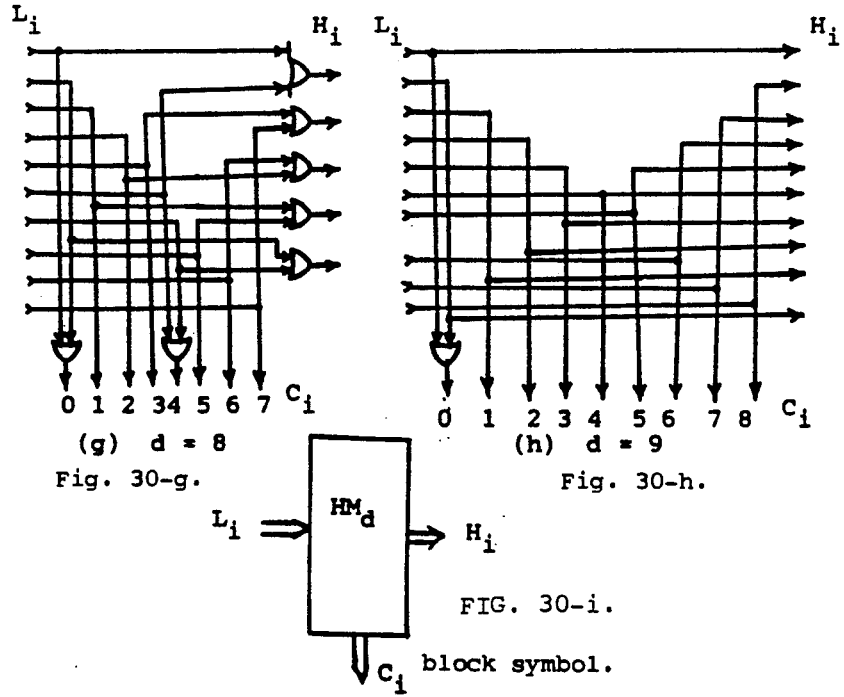
(g) d = 8  Fig. 30-g.
(h) d = 9  Fig. 30-h.
FIG. 30-i. block symbol.

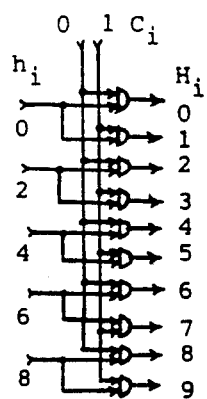
(a) d = 2
Fig. 31-a.
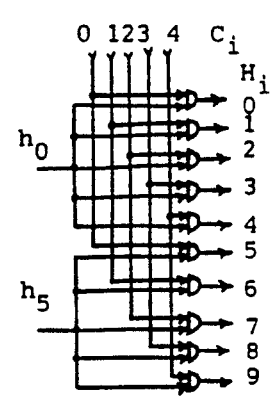
(d) d = 5
Fig. 31-d.
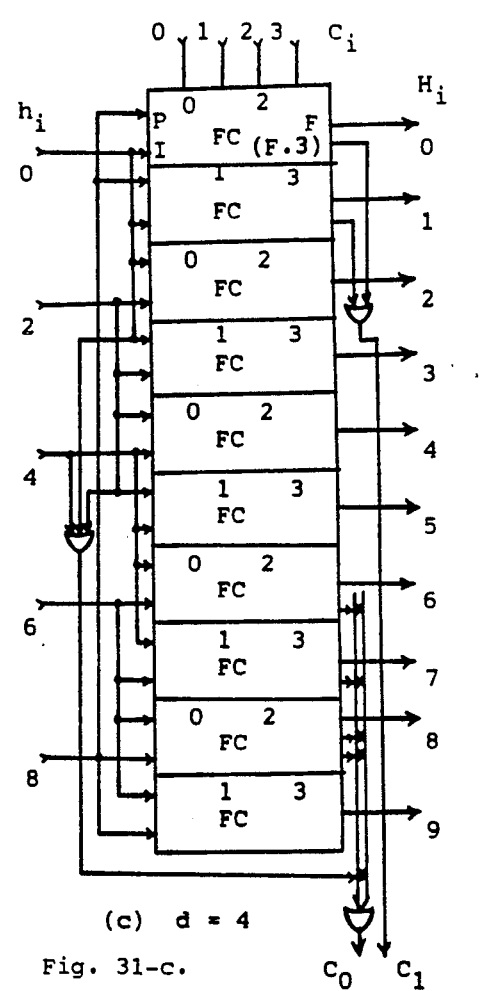
(c) d = 4
Fig. 31-c.
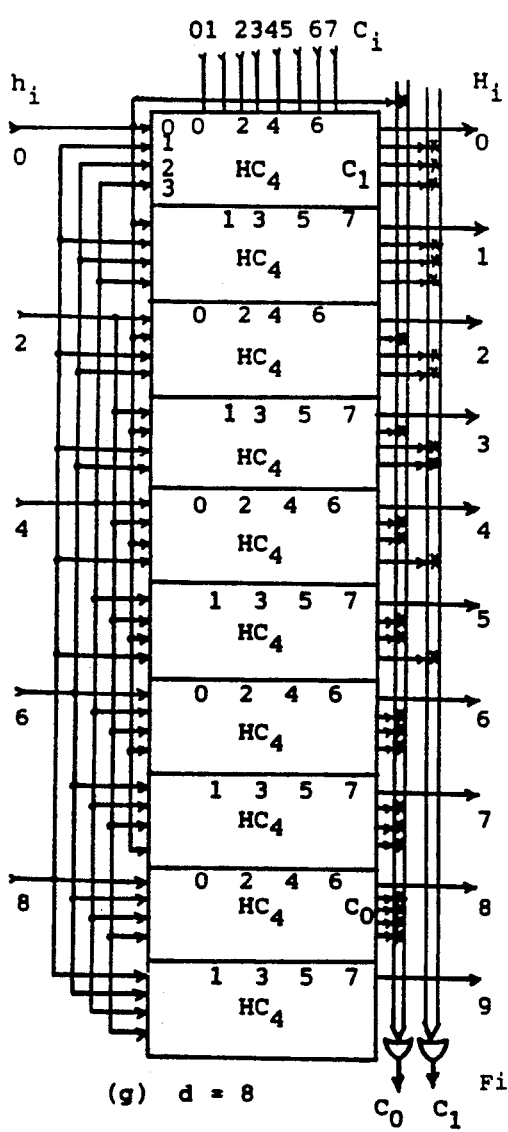
(g) d = 8
Fig. 31-g.
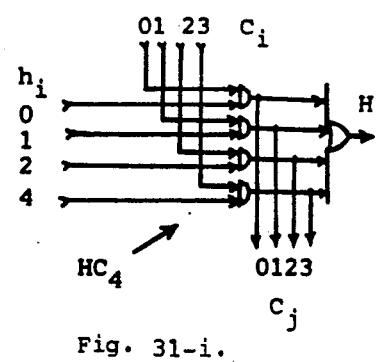
Fig. 31-i.

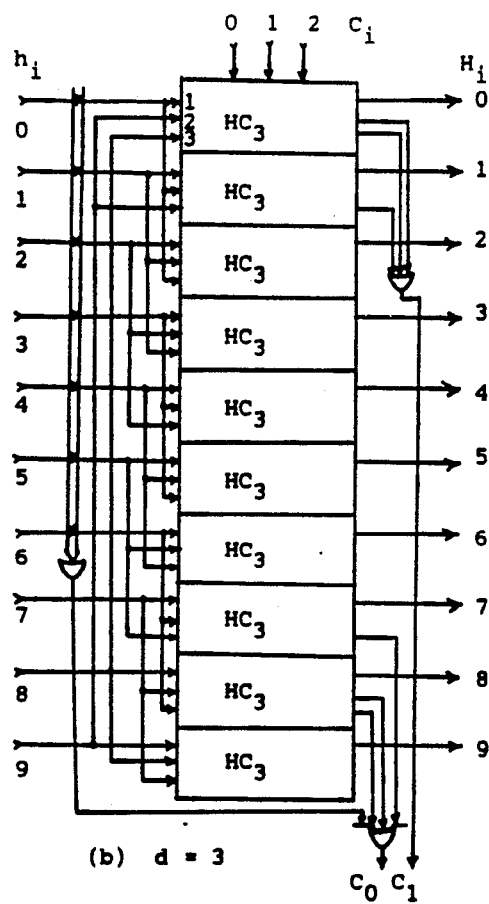
(b) d = 3
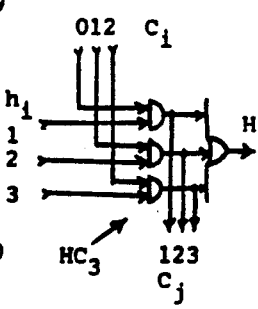
Fig. 31-j.
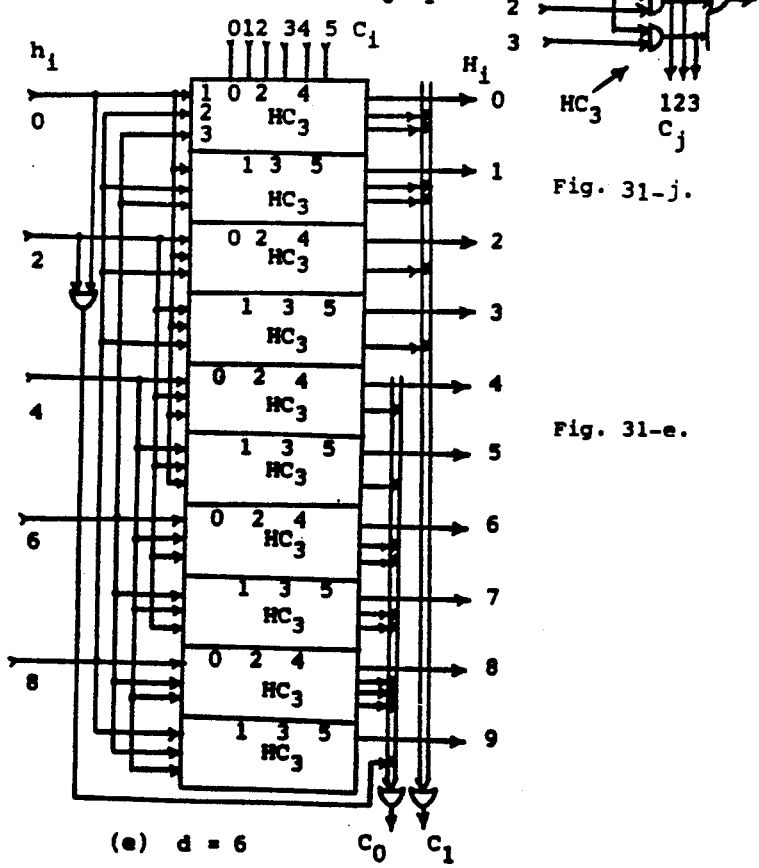
Fig. 31-b
Fig. 31-e.
(e) d = 6

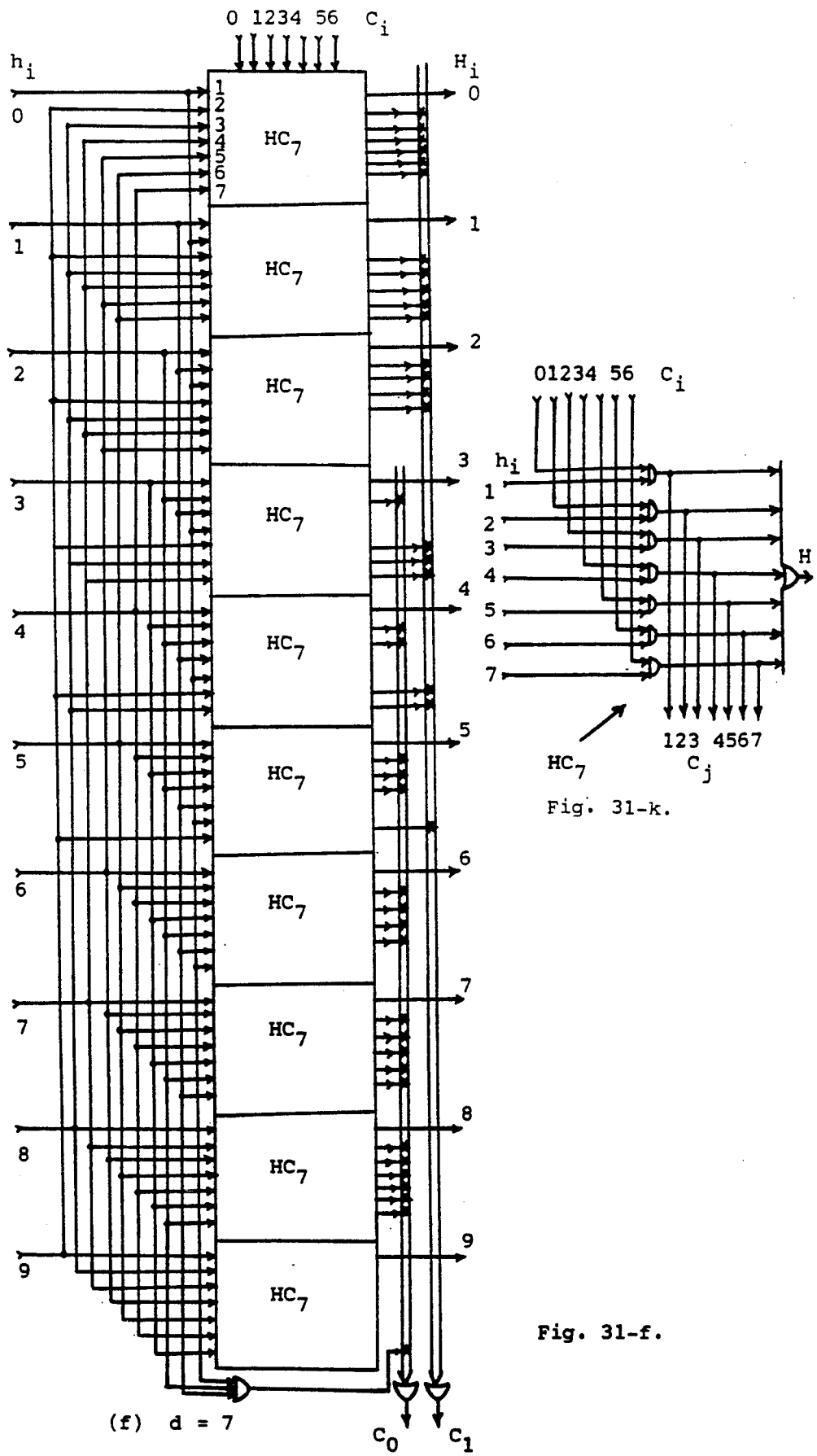
Fig. 31-f.
Fig. 31-k.

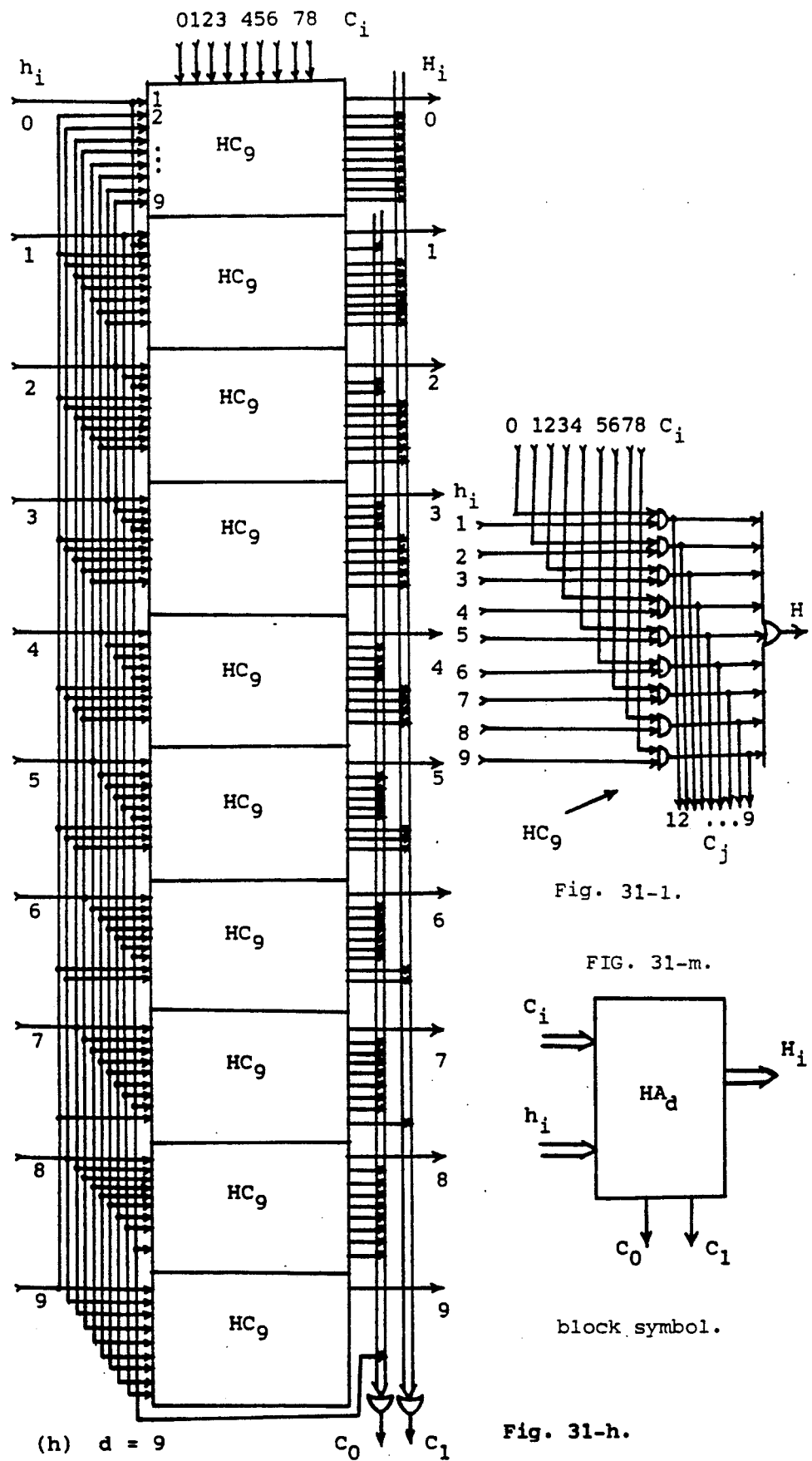

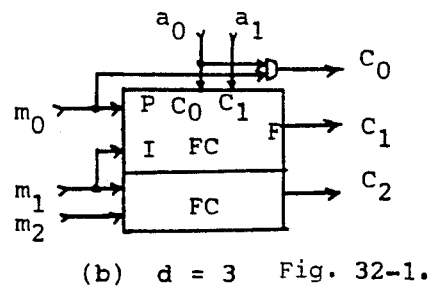
(b) d = 3  Fig. 32-1.
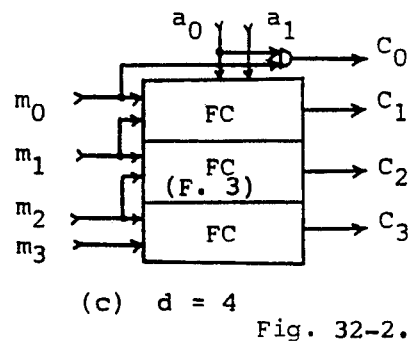
(c) d = 4  Fig. 32-2.
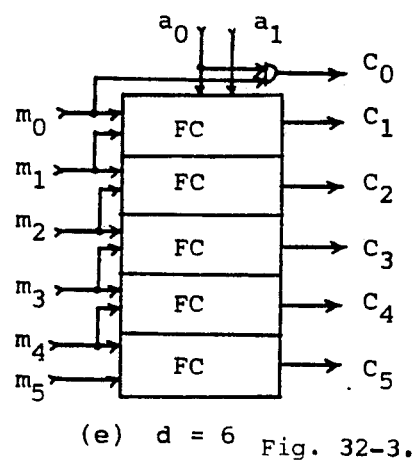
(e) d = 6  Fig. 32-3.
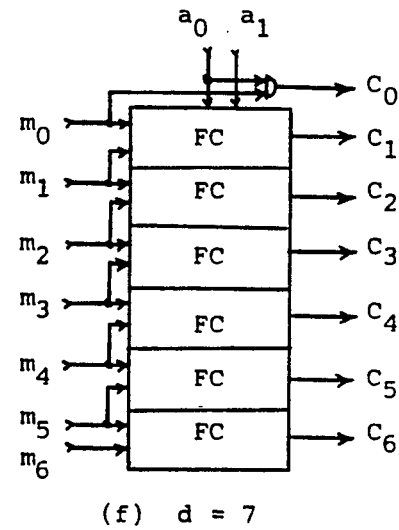
(f) d = 7  Fig. 32-4.
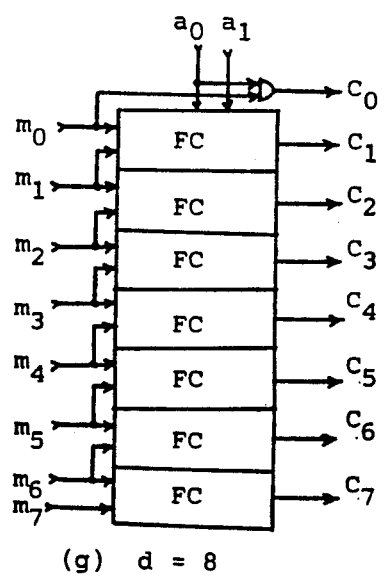
(g) d = 8  Fig. 32-5.
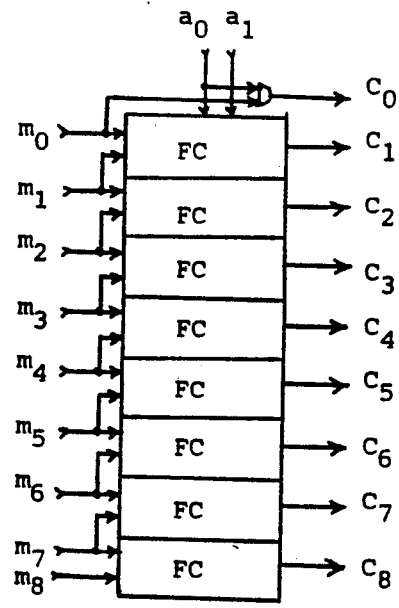
(h) d = 9  Fig. 32-6.
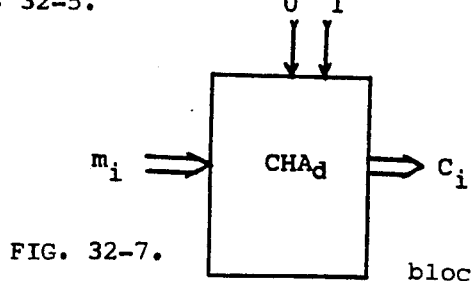
FIG. 32-7.  block symbol.

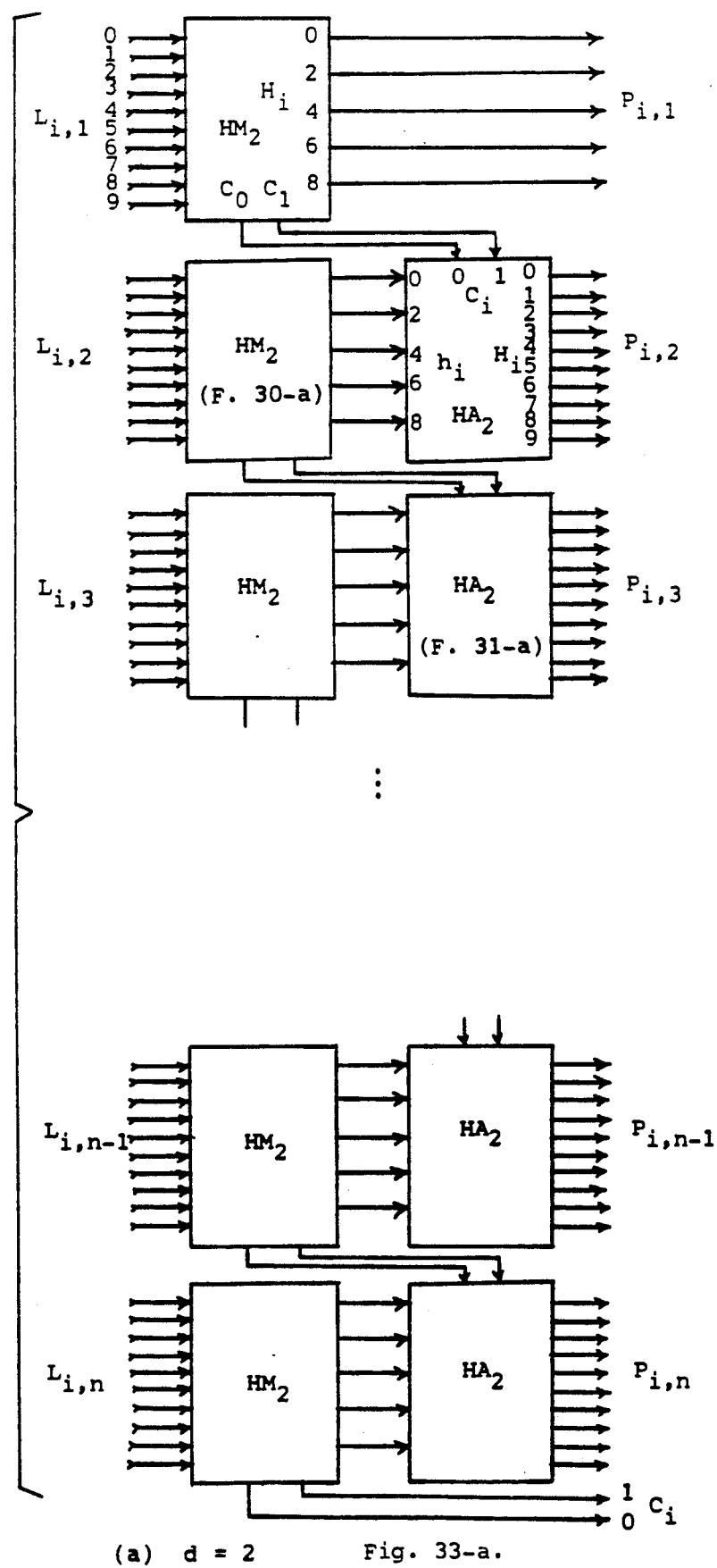
(a) d = 2    Fig. 33-a.

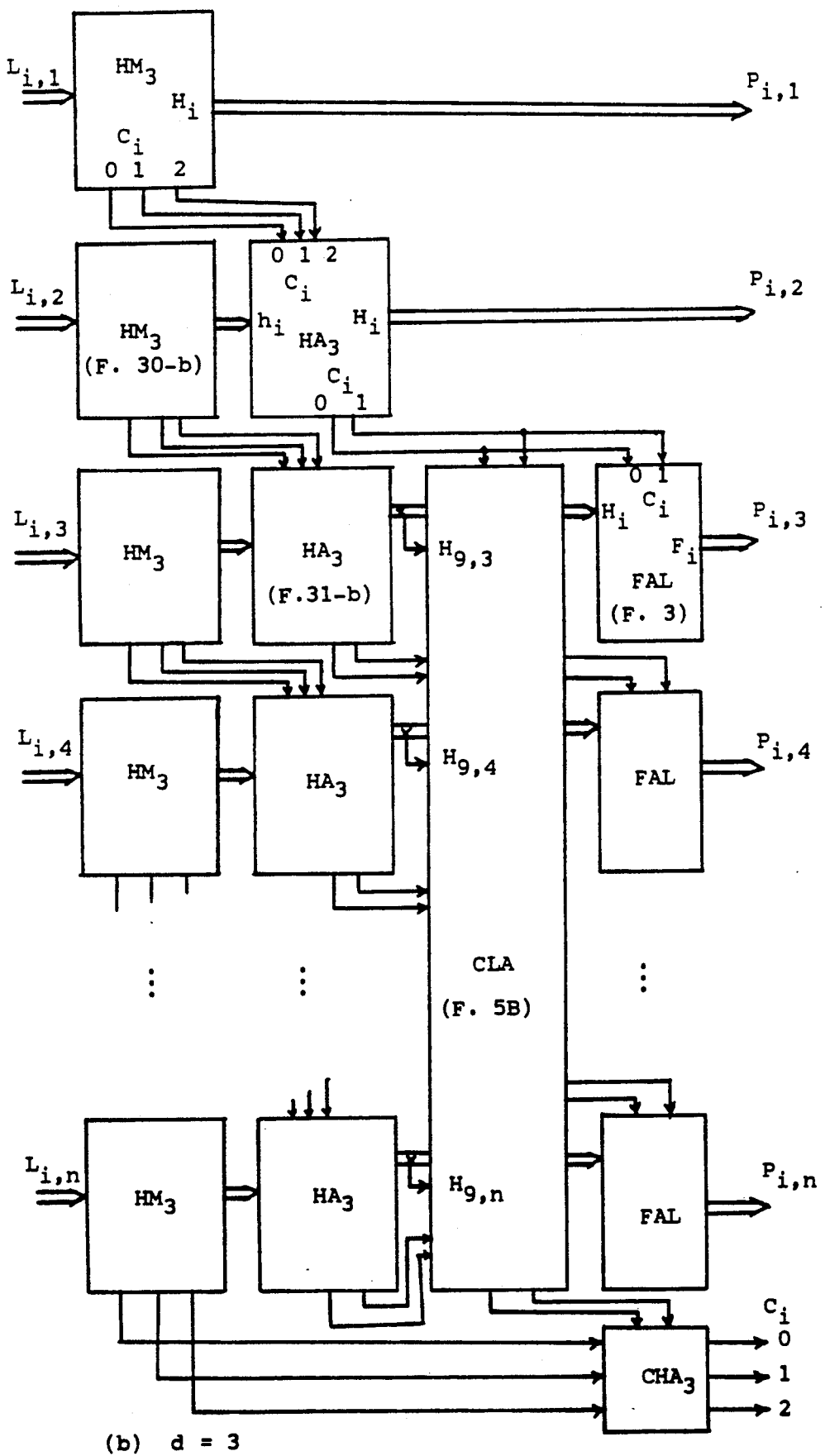
(b) d = 3
Fig. 33-b.

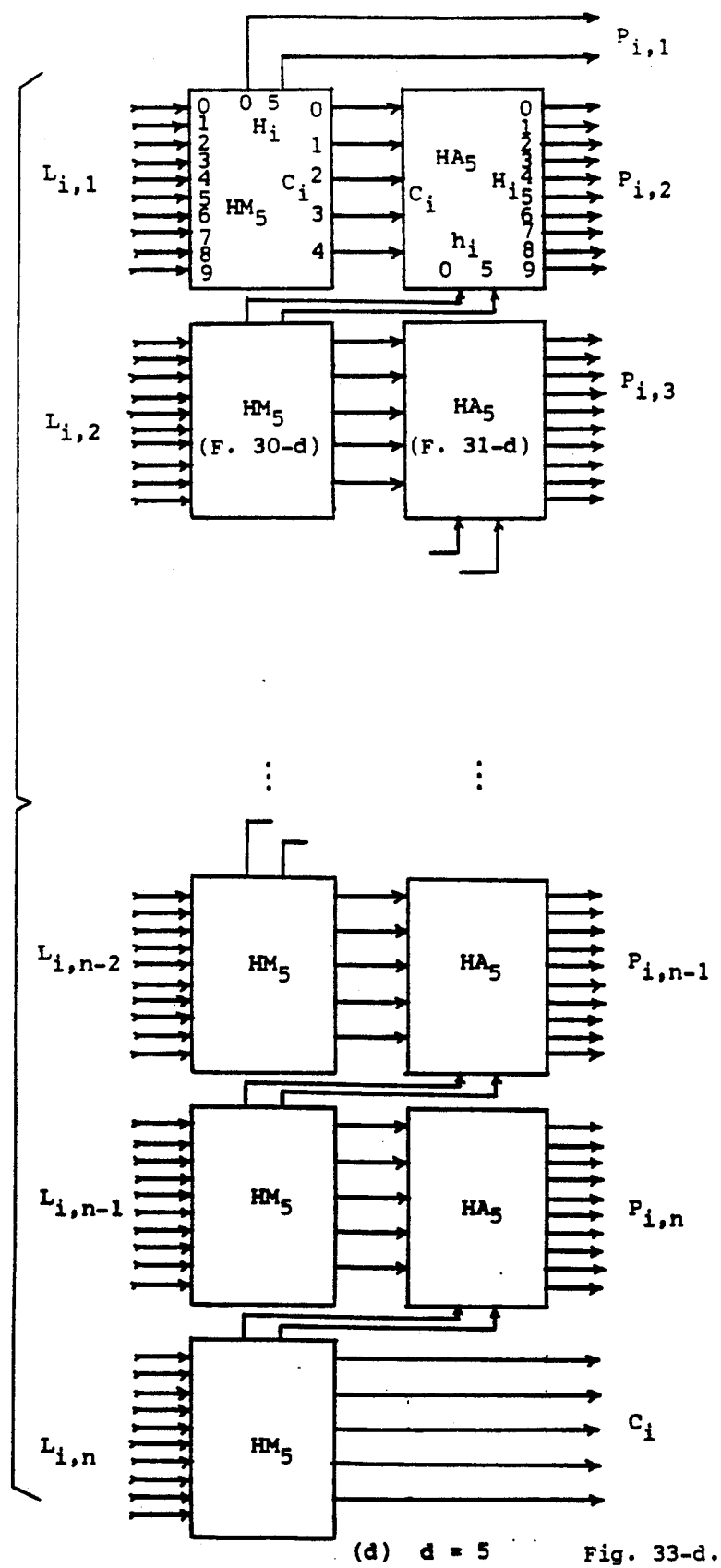
(d) d = 5    Fig. 33-d.

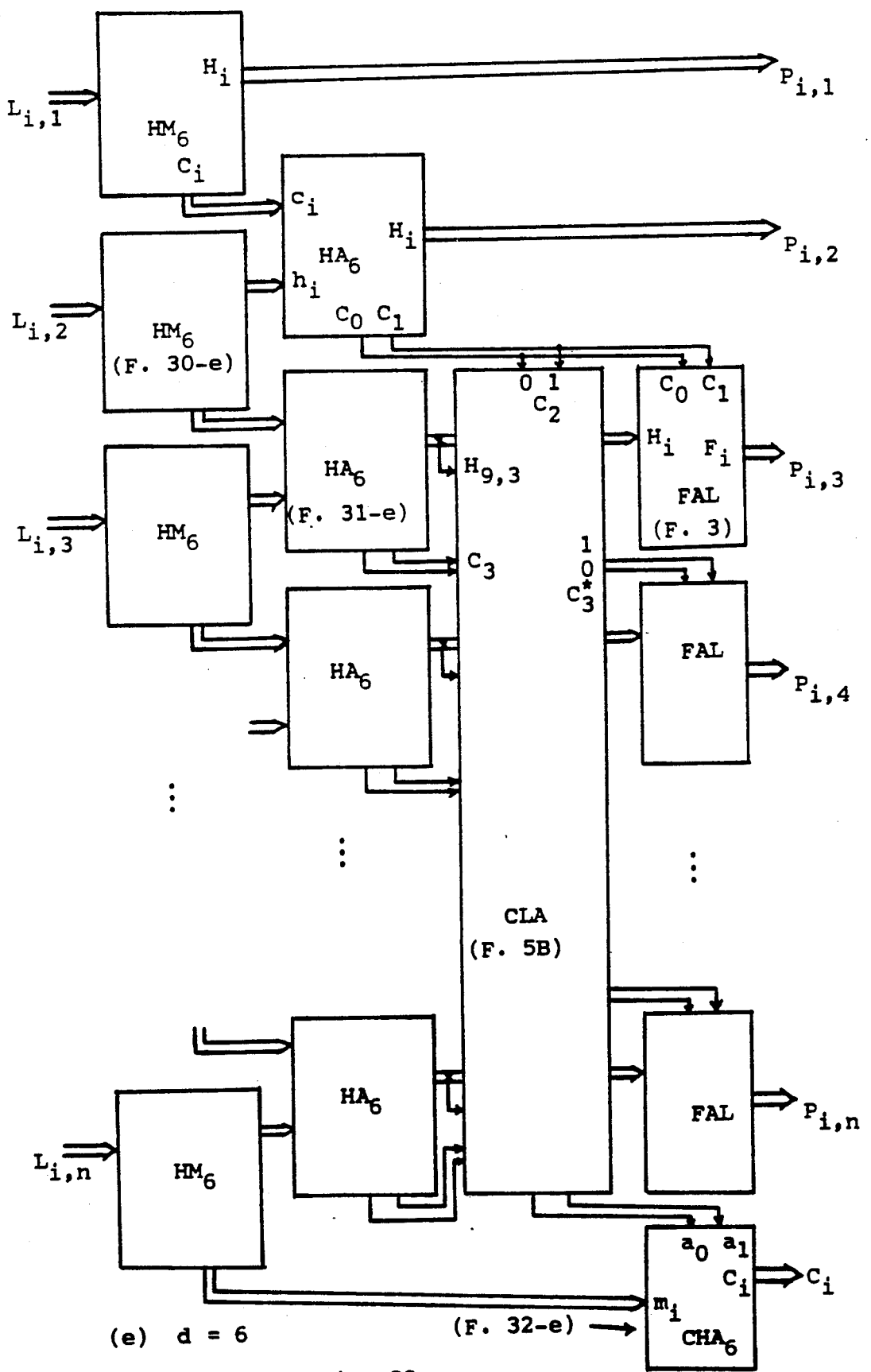
Fig. 33-e.

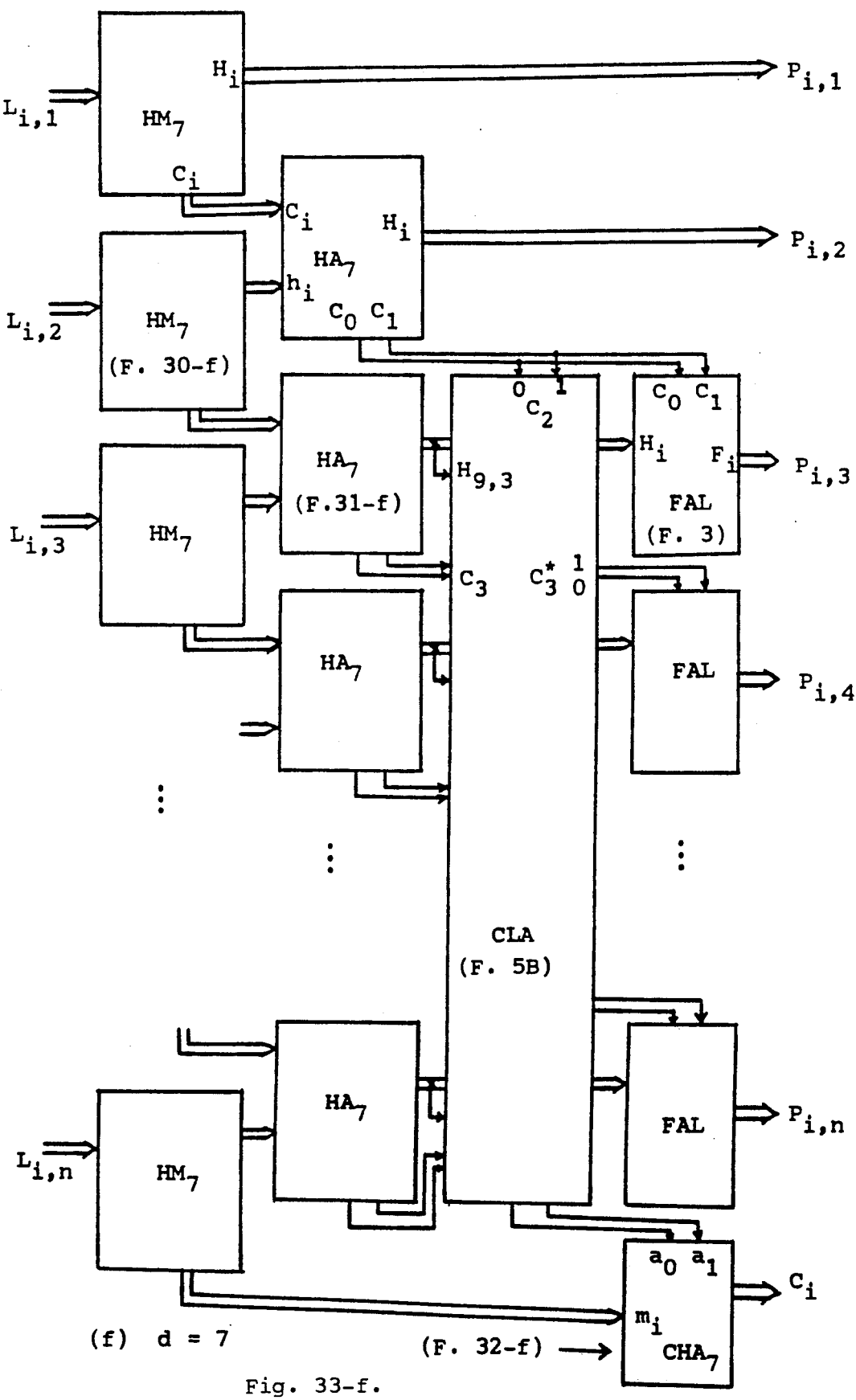
Fig. 33-f.

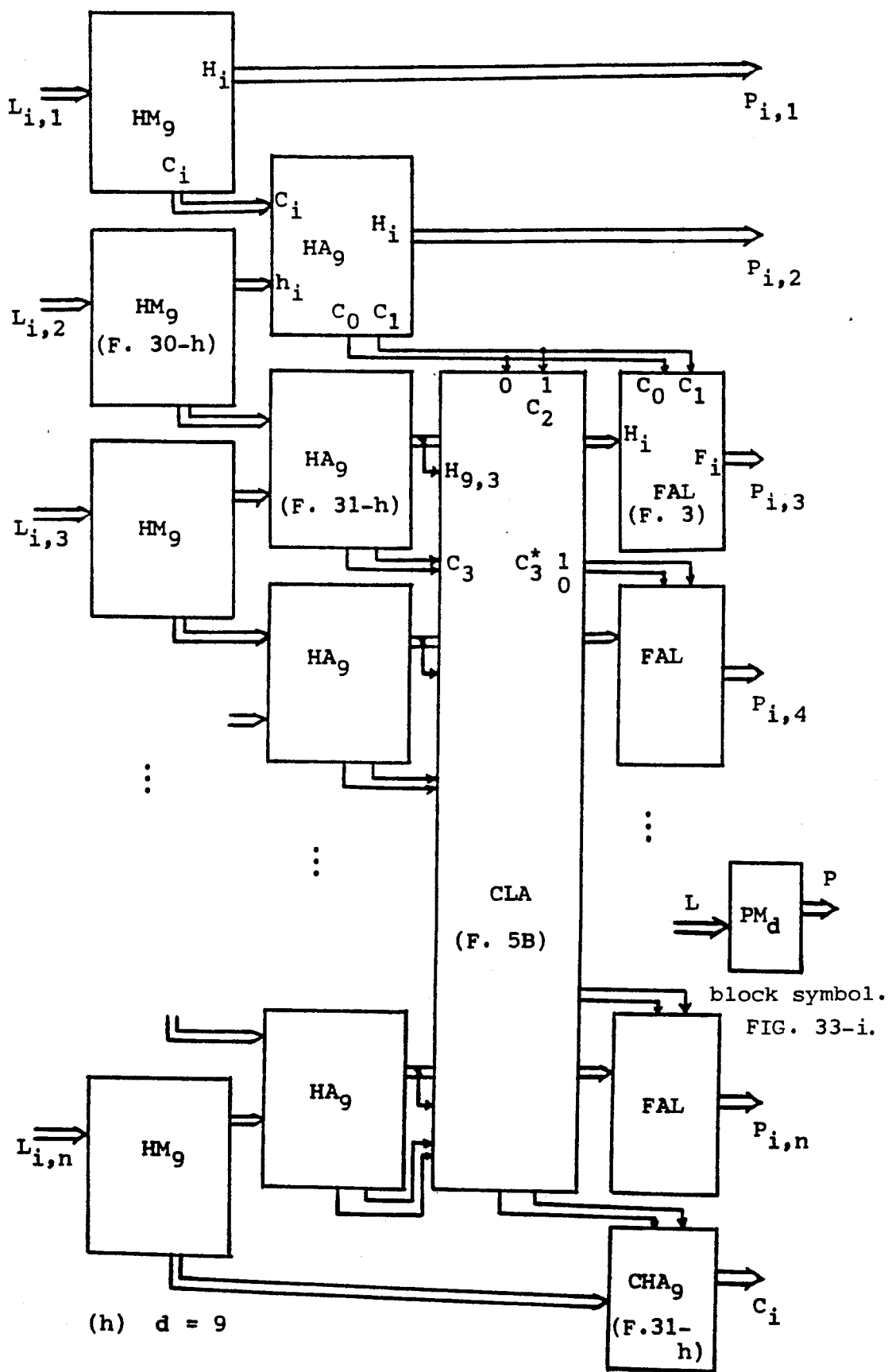
Fig. 33-h.

TPC COMPUTERS

This application is a continuation of application Ser. No. 07/476,301, filed Feb. 7, 1970 now abandoned, which in turn is a continuation-in-part of application Ser. No. 07/181,034 filed Apr. 13, 1988 now abandoned.

BACKGROUND OF THE INVENTION

In 1854, the English mathematician George Boole introduced two-valued system known as Boolean algebra. In such a system, a mathematical formula can be transformed into a symbolic form, known as Boolean expression, which can be evaluated into a combination of 0's and 1's. In 1938, the American mathematician Claude Shannon showed that a Boolean expression can be implemented in terms of Relays and Switching Circuits. Thus, the connection among mathematics (formulea can be transformed into equivalent Boolean expressions), numbers (can be converted into binary numbers or encoded into equivalent forms in terms of 0's and 1's), and hardware means (Relays and Switching Circuits which evolved later into transistors, gates, integrated circuits, etc.) is made possible. Such connection opened the door for many inventions specially in the computer science field. Just adapt a particular code, transform the formula of the operation due to be implemented into equivalent Boolean expression (i.e., obtain the input-output relations for that operation) according to the chosen code, and draw the logic diagram for the required hardware accordingly. More complicated operations, as multiply operation, are implemented in terms of simpler operations, as repeated addition, which means that-in additional to Boolean algebra, codes, and hardware tools-there is another factor, namely the algorithmic factor that must be considered at the design of a multi-functional computer system. Indeed, Boole-Shannon bridge between mathematics and electronics is a gigantic step in the history of digital computer but it is not trouble-free. Specifically, it led to the domination of the binary property (characteristic) over the properties of the digital systems according to numbers are usually represented. In addition, in spite of that there are many codes and many algorithms known in the art, there is no code-algorithm combination that is good for all arithmetic operations. For example, the r's complement representation is good for the add and subtract operations but is not as good for the multiply or divide operation.

Concerning the general methodology mentioned above, this invention is no exception, i.e., a particular code is adapted and many computer tools are accordingly designed. However, the objective of the invention is to avoid the problems mentioned above by introducing a digital computer based not only on the binary property but also on two general properties of the digital systems (binary, ternary, etc.) so that arithmetic operations can be implemented according to a particular procedure that is good for all such operations with at least the same simplicity of the pure binary computer and with no need for radix conversions.

SUMMARY OF THE INVENTION

The above objectives are achieved by starting from the code choosing level and going on til the design of a whole unit in a bottom-up fashional procedure. Combinational circuits for implementing the operations add, subtract, compare, and six Boolean functions according to the adapted code are introduced individually then merged into a positive integers combinational unit for such operations. Likewise, sequential circuits for implementing the more difficult operations multiply, divide, and extract square root are introduced individually according to al-Kashi's algorithms then combined into a positive integers sequential unit for such operations. The two units are merged into a sign magnitude fixed-point arithmetic unit for said operations then such fixed-point unit is modified into a sign magnitude floating-point arithmetic unit along the lines with Anderson et al's design scheme. In addition, the invention includes generalization for the add operation devices for more than two operands, decoders, encoders, radix converters, counters, incrementers, decrementers, and special shifters according to the newly adapted code. The main novelty of the invention lies in the idea according to the code of the invention is adapted and consequently in the way by which a mathematic formula is transformed into equivalent input-output relations. The remaining basic methods as Anderson et al's design scheme and al-Kashi's algorithms are well known.

REMARKABLE POINTS IN THIS INVENTION

1. Input-output relation(IOR) are basically transformations for corresponding mathematical formulae.
2. The CLA's are the same for all radices and for both addition and subtraction operations.
3. The possibility of implementing more than one operation instantaneously.
4. The pair (AND, OR) of logical operators is functionally complete, i.e., a universal gate [Mano].
5. The design procedure is independent from the radix, i.e., the design procedure is the same for all radices.
6. The design procedure is extendible for multi-operand adders and for instantaneous multi-operation devices.
7. Radix conversion process is simply a decoding-encoding procedures, i.e., the conversion process of an integer from radix $r_1$ to another radix $r_2$ is simply a decoding process in $r_1$ followed by an encoding process in $r_2$.
8. Divide and extract square root operations are deterministic operations, i.e., can be implemented according to deterministic procedures.
9. The unit incrementer-decrementers can be modified into $d \times r^{n-1}$ incrementer-decrementers, where d is a digit, r is the radix, and n is a natural number.
10. The devices of multiplying a number by a digit are uni-operand devices.

BRIEF DESCRIPTION OF THE DRAWINGS

FIG. 2A, 2A-1, 2B and 2B-1(2-5) comprise together a TPC half adder (HA);

FIGS. 2C and 2C-1 are another organization for the HA of FIG. 2B;

FIGS. 3-1(2-4) are logic diagrams for a TPC full adder logic (FAL) and full adder carry logic(CL), respectively;

FIGS 5A-1(2), 5B, and 5C-1(6) are five organizations for the TPC carry look-ahead (CLA) generator;

FIGS. 5C-4(5) are logic diagrams for a TPC carries generator (CG);

FIGS. 7A and 7A-1(2) are a combination of the CLA and FAL at the $k^{th}$ decade (CFD$_k$);

FIGS. 8A-1(2) and 8B are three organizations for the logic diagram of a TPC block carrying look-ahead(B-CLA) generator;

FIGS. 9A, 9A-1(3) and 9B, 9B(3) are two organizations for the logic diagram of a TPC final-level block CLA(FCLA);

FIGS. 11 and 11-1 are a logic diagram for a TPC half subtractor(HS);

FIG. 18A-1(2) are logic diagrams of a TPC r's complement logic(rCL) for the least significant digit(LSD) and a non-LSD, respectively;

FIGS. 18B-1(2, and 3) are three organizations for a TPC decrement oriented zeros detector(DZD);

FIG. 19A-1(2-4) are logic diagrams for a TPC r's conditional complement logic(CCL) of an LSD and a non-LSD, respectively;

FIGS. 21-1(2, 3 and 4) are logic diagrams for a TPC two-digit comparator(TC);

FIGS. 22A-1 (2 and 3) are logic diagrams for a TPC equal generator (EG), less than-greater than generator (LGG) and a block diagram for a compare oriented CLA(C$_{CLA}$), respectively;

FIGS. 22B and 22B-1 are a block diagram for a TPC parallel comparator(PC);

FIGS. 23-1(2) are two organizations for the logic diagram of a TPC two-digit Booleaner(TB);

FIGS. 24-1(2) are two organizations for the logic diagram of a TPC parallel Booleaner oriented CLA(B-CLA);

FIGS. 26 and 26-1(2) are a block diagram for a TPC three-level output Booleaner(TOB);

FIGS. 30-a thru 30-i are logic diagrams for a TPC uni-operated half multiplier(HM$_d$) for d=2, 3, ..., 9;

FIGS. 31-a thru 31-m are logic diagrams for a TPC restricted-operand half adder(HA$_d$) for d=2, 3, ..., 9;

FIG. 32-1(2-7) are logic diagrams for a TPC carry half adder (CHA$_d$) for d=3, 4, 6, 7, 8 and 9;

FIGS. 33-a, 33-b, 33-c-1(2), 33-d, 33-e, 33-f, 33-g-1(2), 33-h and 33-i are block diagrams for a TPC uni-operand parallel multiplier (PM$_d$) for d=2, 3, ..., 9;

FIGS. 44 and 44-1(2) are a logic diagram for a TPC multi-operand half adder(MHA) for the case n=3;

FIGS. 58 and 51-1(2) are a logic diagram for a TPC full adder-subtractor logic(FASL);

FIGS. 62A and 62A-1(2) are a combination of the CLA and FASL at the $k^{th}$ decade($CFSD_k$);

FIGS. 67A and 67A-1(2) are a logic diagram for a TPC conditional increment logic(CIL);

FIGS. 67B-1(2,3) are three organizations for the logic diagram of a TPC increment oriented nines detector-(IND);

FIGS. 80A-1(2-4) are logic diagrams for a TPC increment-decrement logic(IDL) for an LSD and non-LSD, respectively;

FIGS. 80B-1(2 and 3) are three organizations for the logic diagram of a TPC increment-decrement nines-zeros detector (NZD);

FIGS. 81A-1(2) are logic diagrams for a TPC increment-decrement logic with pass and set to zero capabilities(IDLZ) for an LSD and non-LSD, respectively, shown for the case r=3;

FIG. 82A-1(2) are logic diagrams for a TPC up-/down counter logic(UCL) for an LSD and a non-LSD, respectively;

FIGS. 86 and 86-1 are a logic diagram for a TPC by two divider(BR);

Figure 2A:
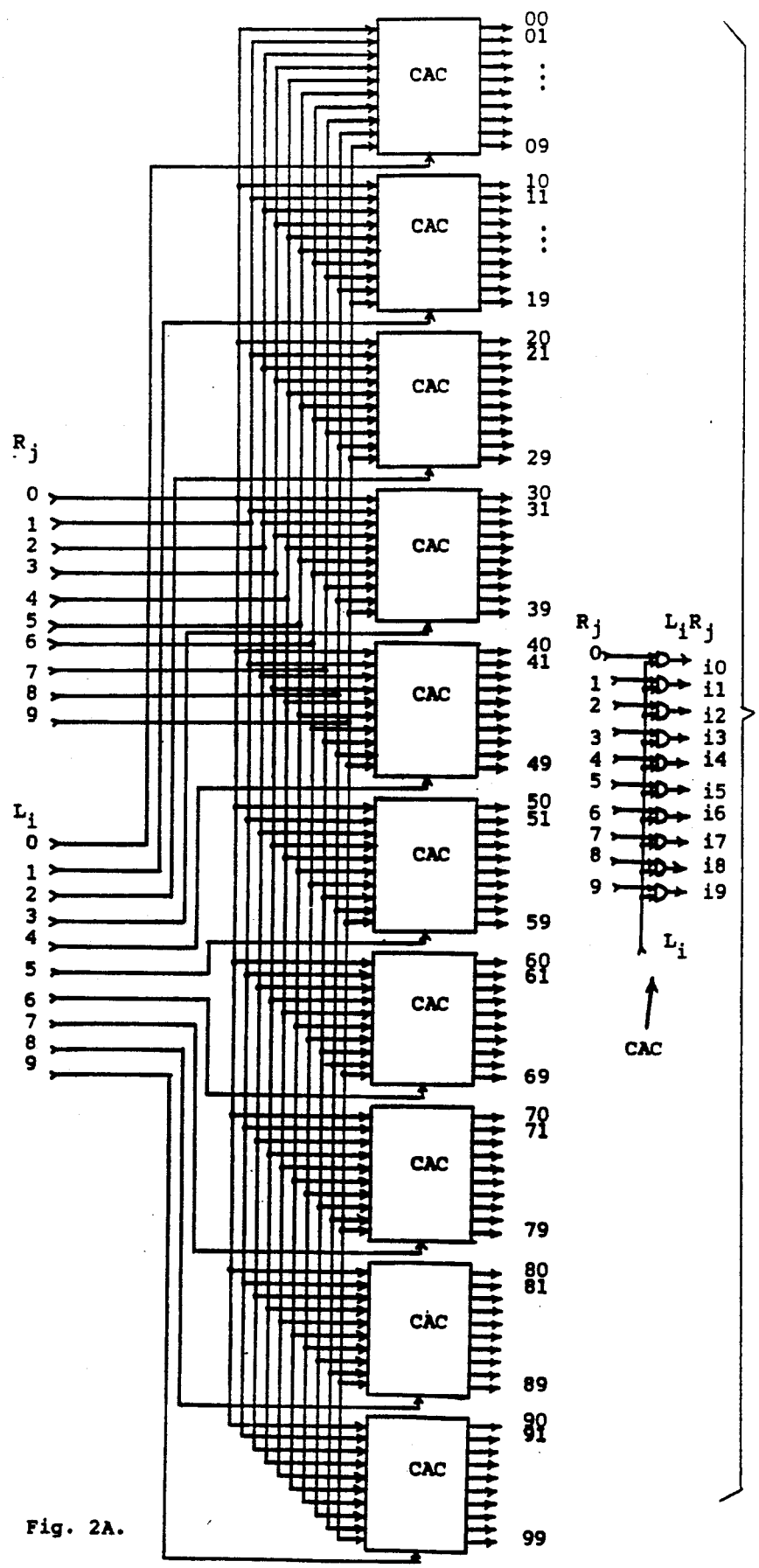

The drawing figures are summarized further according to their functions as follows:

2A-10 are TPC adders;
11-20 are TPC subtractors;
21-22B are TPC comparators;
23-26 are TPC Booleaners;
27-36 are TPC multipliers;
37-39 are TPC dividers;
40 is a squareroot extractor;
41-46 are TPC generalized adders;
47-63 are TPC combinational unit devices;
64-65 are TPC sequential unit devices;
66-69 are TPC signed integers devices;
70-86 are TPC uni-operand devices; and
87-91 are TPC arithmetic unit devices.

As it well known in the art, block symbols are used to represent their figures in minimum forms and accordingly they are neither counter nor described in their invention.

DESCRIPTION OF THE INVENTION

INTRODUCTION

Figures 1, 5A:
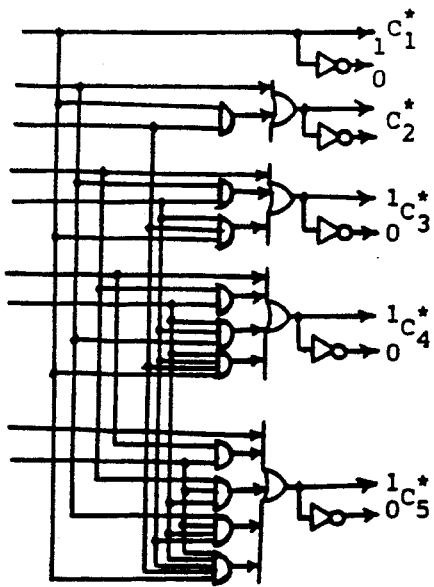

As mentioned in the background, the objective of this invention is to introduce a digital computer based not only on the binary property which is indispensable because the hosting electronic devices are two-valued devices but also on two general properties of the digital systems(binary, ternary, quaternary, etc.), namely, the radix relevant property and the mutually exclusive property. The reason for the radix relevant property is that there will be no need for radix conversion process once the computer is designed for a specific radix and the reason for the mutually exclusive property is that the arithmetic operations will be implemented according to the same rules for all radices. A statement from the political science field recommends that the world should be dealt with as it is in case it can not be changed one way or another. Neither the decimal numerals nor the transistor means can be eliminated from today world which means that the solution, in order not to face the conversion process back and forth between binary and decimal systems or tedious arithmetics, may lie in a third system that can be described as a binary system on the one hand and, at the same time, can be described as a decimal system on the other hand so that it can be dealt with as a binary system when a binary characteristic is needed and as a decimal system when a decimal characteristic is needed. The question is how? Symbols or forms of symbols (codes, formulae, models, maps, flags, etc.) are shaped (formed for the first time) or chosen (from existing domain) to convey specific meaning in the intellectual world. Furthermore, one symbol or form of symbols may be chosen to convey more than one meaning at the same time. This is the way by which the code of FIG. 1 is chosen to represent or to model the three properties binary, radix relevant and mutually exclusive. Binary means having only two states: 0-1, on-off, etc. Radix relevant means that the set of the code depends on the given radix r: there are r members(code words) in that set, every member consists of r bits and that such members are prepared not only to represent the digits $0, 1, 2, \ldots, r-1$ but also the relationships among them. The mutually exclusive property is a well known concept in the probability theory. It means that if two events are mutually exclusive, then their appearance together is impossible. It is certainly the case that the appearances of the characters in a given position in space are mutually exclusive events since the appearance of one character in such given position excludes all the other characters from the appearance in that position. For example, character 1 excludes all the other characters from the appearance in the first position(from the left) of the figure 1989. What is relevant to this invention from all that is that the mutually exclusive characteristic must be represented in the code of the numerals $0, 1, 2, \ldots, r-1$. The reason is that such representation will simplify the arithmetic operations as will be seen later. In the code of FIG. 1, the mutually exclusive property is represented by: if the $i^{th}$ position of a given code word is occupied by a 1, then that position can not be occupied by a 1 again anywhere else in the given set. Thus, the code of FIG. 1 is binary, radix relevant and mutually exclusive code and accordingly termed tri-property code(TPC) or TP-code. The binary property makes such a TP-code applicable in the two-valued systems and the other two properties makes it a model for the numeral set $(0, 1, 2, \ldots, r-1)$ which is exactly what is wanted from the proposed third system.

It should be clear here that the TPC of FIG. 1 is not totally part of the this invention. It is oftenly associated with ring-counters and accordingly known in the prior art as the ring-counter code. It is also under the generality of n-out-of-m code, for the case n=1 and m=r, which is another well known title in the prior art. Means that such a TP-code will be claimed in this invention only as a model for the three properties mentioned above and the related applications not for any other purpose whether already known in the prior art or may be invented in the future.

NUMBERS IN A TP-CODE

Numbers are represented in a TP-code exactly as in the BCD(binary coded-decimal) which in a formal way as follows: let $w_\phi = 0 \ldots 000$, $w_0 = 0 \ldots 001$, $w_1 = 0 \ldots 010$, $w_2 = 0 \ldots 100, \ldots, w_{r-1} = 1 \ldots 000$, where r is an integer greater than 1 denotes the radix(base); $D = (0, 1, 2, \ldots, r-1)$; $W = (w_0, w_1, w_2, \ldots, w_{r-1})$; R denotes the conventional real space associated with D; and let $R_W$ denote the corresponding real space associated with W, where the correspondence between D's and TPC's is as shown in FIG. 1. A representation $d_n \ldots d_2 d_1$ of a number in R is mapped to the corresponding representation $w_{d_n} \ldots w_{d_1}$ in $R_W$ according to a one-to-one mapping m defined by $$m(d_n \ldots d_2 d_1) = \begin{cases} w_\phi & \text{if } n = 0 \\ w_{d_n} \ldots w_{d_2} w_{d_1} & \text{otherwise} \end{cases}$$

wherein $d_i$ is a digit in D and $w_{d_i}$ is the corresponding representation of that digit in W. For example,

| in a D-system | in the corresponding TPC-system |
|---|---|
| $(1001101)_2$ | $(10010110100110)_2 = (w_1 w_0 w_0 w_1 w_1 w_0 w_1)_2$ |
| $(22120)_3$ | $(1001000010100001)_3 = (w_2 w_2 w_1 w_2 w_0)_3$ |
| $(30202)_4$ | $(10000001010000010100)_4 = (w_3 w_0 w_2 w_0 w_2)_4$ |
| $-(4002)_5$ | $-(10000000010000100100)_5 = -(w_4 w_0 w_0 w_2)_5$ |
| $(2.523)_6$ | $(000100.100000001000010000)_6 = (w_2 . w_5 w_2 w_3)_6$. |
| where the subscript out the parentheses denotes the radix. | |

MAPPING ARITHMETIC FORMULAE INTO INPUT-OUTPUT RELATIONS

Choosing a particular code is just a first step in the computer design process. The next step is to shown how arithmetic operations are implemented accordingly. What concern here is not paper-pencil arithmetic but rather the corresponding electronic implementations.

It is a fact that a binary operator(or function), like the plus operator, defined on the real space R takes two arguments(operands) and produces a value in the same space. How much is the value depends on how much are the operands, the type of the operator and its definition. When it comes to the electronic hardware implementations, how much the operands are and what type is the operator are irrelevant questions since the arguments are represented by specified levels or amount of energy and the output is represented by specified levels of energy also regardless to how much are the operands and to what type is the function on R-space. What is relevant, when it comes to the electronic hardware implementations, is the satisfaction that the given arguments are both present, on, or high. (At least according to the TP-codes.) The unique known operator that produces high output only when all its arguments are high is the logical operator AND. Thus, all non-unary operators definable on R are mapped to the logical operator AND on $R_W$. Means that there is a homomorphic mapping g from (R, *) to ($R_W$, &) defined by $$g(c) = g(a * b) = g(a) \& g(b) = \begin{cases} w_\phi & \text{if } a = \phi \text{ or } b = \phi \\ w_a \& w_b = w_a w_b & \text{otherwise} \end{cases} \quad (1)$$

where * is a binary operator defined on R, a and b are two elements in R, c is their value under * in R, $w_a$, $w_b$, and $w_c$ are the corresponding elements in $R_W$, and & denotes the logical operator AND on $R_W$. Also, it is a fact that most of the functions defined on R are many-to-one. In other words, many pairs of arguments are mapped to the same value. For example, all the pairs (0,1), (1,0), (2,9), (9,2), (3,8), (8,3), (4,7), (7,4), (5,6), and (6,5) of arguments are mapped to 1 for the least significant digit of the value in case of plus operator is defined on the set of one-digit operand of non-negative integers. In case of the hardware implementations, the equivalent values of a given operator (function) are ORed together, i.e., $$w_c = \sum_{a,b} w_a w_b \text{ such that } a * b = c \quad (2)$$

where the sum sign denotes OR's. Relations (1) and (2) mean primarily that a non-unary operation on R is transformable into AND-operation followed by OR-operation on $R_W$. In other words, a mathematical formula on R is transformable into input-output relations on $R_W$ involving AND and OR operators only. The following basic procedure is written accordingly.

ALG. 1: Basic Design Procedure

1. Obtain the arithmetic(or logical) operation table for the given operator * and the given radix r.
2. Replace * by & (for AND) and $d(d=0, 1,\ldots,r-1)$ by $w_d$ in the table of step 1.
3. Obtain the input-output relations by ORing the equivalent $w_d$'s (i.e., those which are in the same position and have the same index) in the entries of the table of step 2.
4. Draw the required logic diagram according to the obtained input-output relations, (this step is from Mano). Further specifically, steps 1, 2, and 3 or ALG 1 are illustrated in tables 1, 2, and in relations(3), below for the add operation, respectively.

TABLE 1

| + | 0 | 1 | 2 | 3 | 4 | 5 | 6 | 7 | 8 | 9 |
|---|----|----|----|----|----|----|----|----|----|----|
| 0 | 00 | 01 | 02 | 03 | 04 | 05 | 06 | 07 | 08 | 09 |
| 1 | 01 | 02 | 03 | 04 | 05 | 06 | 07 | 08 | 09 | 10 |
| 2 | 02 | 03 | 04 | 05 | 06 | 07 | 08 | 09 | 10 | 11 |
| 3 | 03 | 04 | 05 | 06 | 07 | 08 | 09 | 10 | 11 | 12 |
| 4 | 04 | 05 | 06 | 07 | 08 | 09 | 10 | 11 | 12 | 13 |
| 5 | 05 | 06 | 07 | 08 | 09 | 10 | 11 | 12 | 13 | 14 |
| 6 | 06 | 07 | 08 | 09 | 10 | 11 | 12 | 13 | 14 | 15 |
| 7 | 07 | 08 | 09 | 10 | 11 | 12 | 13 | 14 | 15 | 16 |
| 8 | 08 | 09 | 10 | 11 | 12 | 13 | 14 | 15 | 16 | 17 |
| 9 | 09 | 10 | 11 | 12 | 13 | 14 | 15 | 16 | 17 | 18 |

TABLE 2

| & | $R_0$ | $R_1$ | $R_2$ | $R_3$ | $R_4$ | $R_5$ | $R_6$ | $R_7$ | $R_8$ | $R_9$ |
|---|---|---|---|---|---|---|---|---|---|---|
| $L_0$ | $C_0H_0$ | $C_0H_1$ | $C_0H_2$ | $C_0H_3$ | $C_0H_4$ | $C_0H_5$ | $C_0H_6$ | $C_0H_7$ | $C_0H_8$ | $C_0H_9$ |
| $L_1$ | $C_0H_1$ | $C_0H_2$ | $C_0H_3$ | $C_0H_4$ | $C_0H_5$ | $C_0H_6$ | $C_0H_7$ | $C_0H_8$ | $C_0H_9$ | $C_1H_0$ |
| $L_2$ | $C_0H_2$ | $C_0H_3$ | $C_0H_4$ | $C_0H_5$ | $C_0H_6$ | $C_0H_7$ | $C_0H_8$ | $C_0H_9$ | $C_1H_0$ | $C_1H_1$ |
| $L_3$ | $C_0H_3$ | $C_0H_4$ | $C_0H_5$ | $C_0H_6$ | $C_0H_7$ | $C_0H_8$ | $C_0H_9$ | $C_1H_0$ | $C_1H_1$ | $C_1H_2$ |
| $L_4$ | $C_0H_4$ | $C_0H_5$ | $C_0H_6$ | $C_0H_7$ | $C_0H_8$ | $C_0H_9$ | $C_1H_0$ | $C_1H_1$ | $C_1H_2$ | $C_1H_3$ |
| $L_5$ | $C_0H_5$ | $C_0H_6$ | $C_0H_7$ | $C_0H_8$ | $C_0H_9$ | $C_1H_0$ | $C_1H_1$ | $C_1H_2$ | $C_1H_3$ | $C_1H_4$ |
| $L_6$ | $C_0H_6$ | $C_0H_7$ | $C_0H_8$ | $C_0H_9$ | $C_1H_0$ | $C_1H_1$ | $C_1H_2$ | $C_1H_3$ | $C_1H_4$ | $C_1H_5$ |
| $L_7$ | $C_0H_7$ | $C_0H_8$ | $C_0H_9$ | $C_1H_0$ | $C_1H_1$ | $C_1H_2$ | $C_1H_3$ | $C_1H_4$ | $C_1H_5$ | $C_1H_6$ |
| $L_8$ | $C_0H_8$ | $C_0H_9$ | $C_1H_0$ | $C_1H_1$ | $C_1H_2$ | $C_1H_3$ | $C_1H_4$ | $C_1H_5$ | $C_1H_6$ | $C_1H_7$ |
| $L_9$ | $C_0H_9$ | $C_1H_0$ | $C_1H_1$ | $C_1H_2$ | $C_1H_3$ | $C_1H_4$ | $C_1H_5$ | $C_1H_6$ | $C_1H_7$ | $C_1H_8$ |

$$H_i = \sum_{0 \leq j,k \leq 9} L_j R_k \text{ such that } j + k = i \pmod{10} \quad (3)$$

$$C_i = \sum_{0 \leq j,k \leq 9} L_j R_k \text{ such that } \lfloor (j + k)/10 \rfloor = i$$

$$C_0^* = C_0 + H_9 = \sum_{j+k \leq 9} L_j R_k;$$

$$H_N = (H_g)' = \sum_{i=0}^{8} H_i = C_0 + C_1$$

where $L_j$ and $R_k$ (for left and right operands, respectively) denote the inputs, $H_i$ and $C_i$ (for the sum and the carries) denote the outputs of the half adder. In general, the inputs will be denoted by $L_{i,k}$ and $R_{i,k}$ while the outputs will be denoted by $P_{i,k}$ and $C_i$ for $i=0, 1, \ldots, r-1$ and $k=1, 2, \ldots, n$. The names of the inputs and outputs may be changed, however, according to the devices being used.

As explained in [Mano], a combinational circuit is fully specified by input-output relations. The circuits introduced in this invention are either combinational or sequential circuits. The combinational circuits are specified by their input-output relations while the sequential circuits are designed according to special sequential algorithms written in English or in an RTL(register transfer language)-like language. The ideas of relations (1) and (2) of transforming mathematical formulae defined on R-space into equivalent input-output relations on the corresponding $R_W$-space are the main theoretical bases for the derivations of the given input-output relations. The multiply operation, in the general case, together with the divide and extract squareroot operations are implemented according to al-Kashi's algorithms for such operations and most of the sequential circuits introduced in this invention are related to such three operations. Special additional procedures required for some circuits will be provided at the right places in the description. The purpose(or function) of a given circuit is evident from its name(full and acro) given in the brief description of the drawings. All given input-output relations, algorithms, descriptions, and logic diagrams are obtain for the TP-codes and may not work for others coding systems. LSD and MSD stand for least and most significant digits, respectively. The description continued next on the adder devices FIGS. 2A throught 10.

Figure 2B:
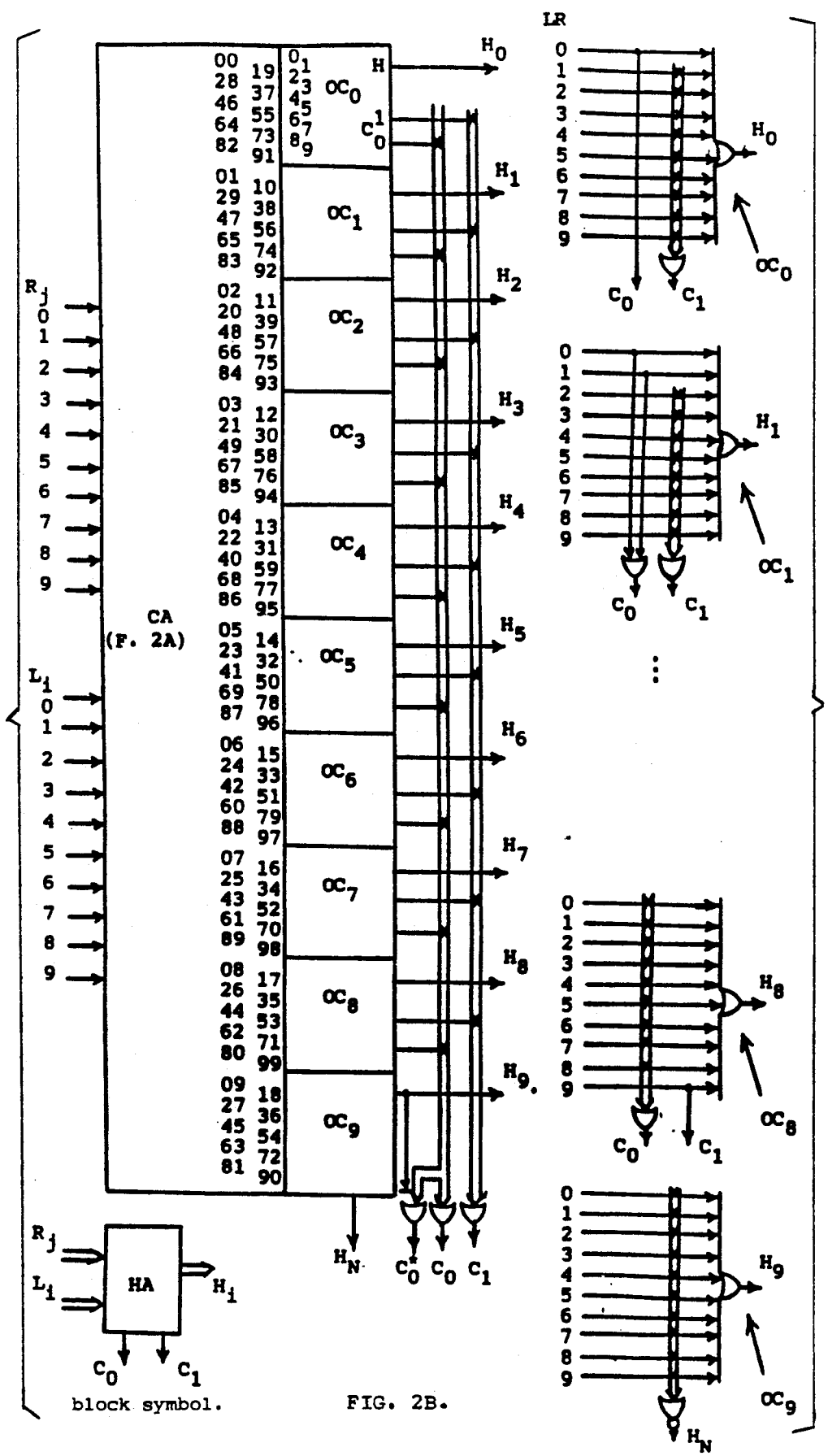

FIG. 2B us a HA constructed, according to relations(3), from two blocks of logical gates: a one level of AND gates (representing the implementation of AND-operation) followed by one level of OR gates for the sum and two levels of OR gates for the carries(representing, together, the implementation of OR-operation). The AND gates level is drawn separately in FIG. 2A and termed common ANDs(CA) because it is needed elsewhere in the invention. Furthermore, the AND gates level is divided into ten identical common AND cells (CAC) of ten two-input gates each. The OR-block is divided also into ten OR cells($OC_k$) of ten inputs each. The $OC_k$'s are identical also except that the input number of the OR gates of the carries varies from one $OC_k$ to another. The two OR levels of the carries could be replaced by only one level of OR gates but the number of inputs in such a case is 45 for $C_1$ and $C_0$ each and 55 for $C_0^*$. Either $C_0^*$ or $C_0$ is enough in a half adder. A LSD half adder with $C_0^*$ is needed in case of inverter-free CLA is used. The reason is that the carry propagations in such case require that only one of the outputs, $C_0$, $C_1$, and $H_9$ be on at a time since otherwise the case may lead to $C_1$ and $C_0$ to be both on at the same time which is incorrect case. There is no carry propagation with respect to the LSD half adder and accordingly $C_0$ and $H_9$ are ORed together forming the $C_0^*$. The purpose from the non-nines function $H_N$ will be apparent later in connection with the CLA's. Relations (3) are rewritten in matrix forms as follows:

$$\begin{bmatrix} 0 & 1 & 1 & 1 & 1 & 1 & 1 & 1 & 1 & 1 \\ 0 & 0 & 1 & 1 & 1 & 1 & 1 & 1 & 1 & 1 \\ 0 & 0 & 0 & 1 & 1 & 1 & 1 & 1 & 1 & 1 \\ 0 & 0 & 0 & 0 & 1 & 1 & 1 & 1 & 1 & 1 \\ 0 & 0 & 0 & 0 & 0 & 1 & 1 & 1 & 1 & 1 \\ 0 & 0 & 0 & 0 & 0 & 0 & 1 & 1 & 1 & 1 \\ 0 & 0 & 0 & 0 & 0 & 0 & 0 & 1 & 1 & 1 \\ 0 & 0 & 0 & 0 & 0 & 0 & 0 & 0 & 1 & 1 \\ 0 & 0 & 0 & 0 & 0 & 0 & 0 & 0 & 0 & 1 \\ N & N & N & N & N & N & N & N & N & N \end{bmatrix} \quad C_{0/1} \tag{4}$$

$$\begin{bmatrix} H_i \\ 0 \\ 1 \\ 2 \\ 3 \\ 4 \\ 5 \\ 6 \\ 7 \\ 8 \\ 9 \end{bmatrix} = \begin{bmatrix} L_j \\ 0\,9\,8\,7\,6\,5\,4\,3\,2\,1 \\ 1\,0\,9\,8\,7\,6\,5\,4\,3\,2 \\ 2\,1\,0\,9\,8\,7\,6\,5\,4\,3 \\ 3\,2\,1\,0\,9\,8\,7\,6\,5\,4 \\ 4\,3\,2\,1\,0\,9\,8\,7\,6\,5 \\ 5\,4\,3\,2\,1\,0\,9\,8\,7\,6 \\ 6\,5\,4\,3\,2\,1\,0\,9\,8\,7 \\ 7\,6\,5\,4\,3\,2\,1\,0\,9\,8 \\ 8\,7\,6\,5\,4\,3\,2\,1\,0\,9 \\ 9\,8\,7\,6\,5\,4\,3\,2\,1\,0 \end{bmatrix} \times \begin{bmatrix} R_k \\ 0 \\ 1 \\ 2 \\ 3 \\ 4 \\ 5 \\ 6 \\ 7 \\ 8 \\ 9 \end{bmatrix}$$

where N's in $C_i$ matrix denote nine entries which should be treated, concerning the ORing with $C_0$, as described above.

Figure 2C:
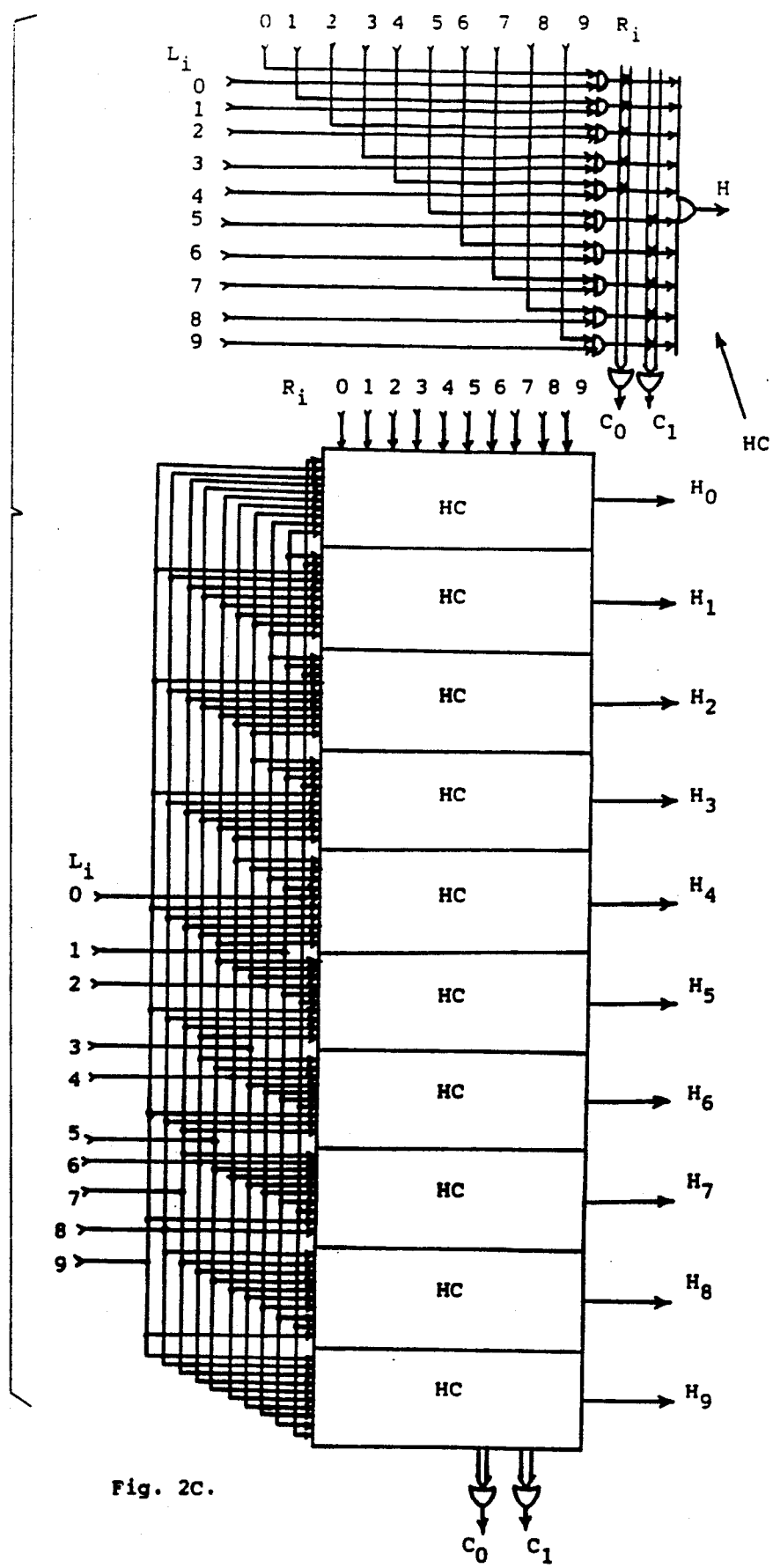

FIG. 2C is another organization for the HA of FIG. 2B comprised from ten half adder cells(HC) according to relations (4), where the R's inputs are the same for all the HC's and the L's inputs vary from one HC to another as indicated by the rows of the $L_j$ matrix. Also, the inputs of the OR gates of the carries change from one HC to another as it clear from the $C_i$ matrix. The one shown in the diagram is for HC no. 4. Again, it is optional, however, whether to have two levels, as in FIG. 2B, or only one level of OR gates for the carries.

Figure 3:
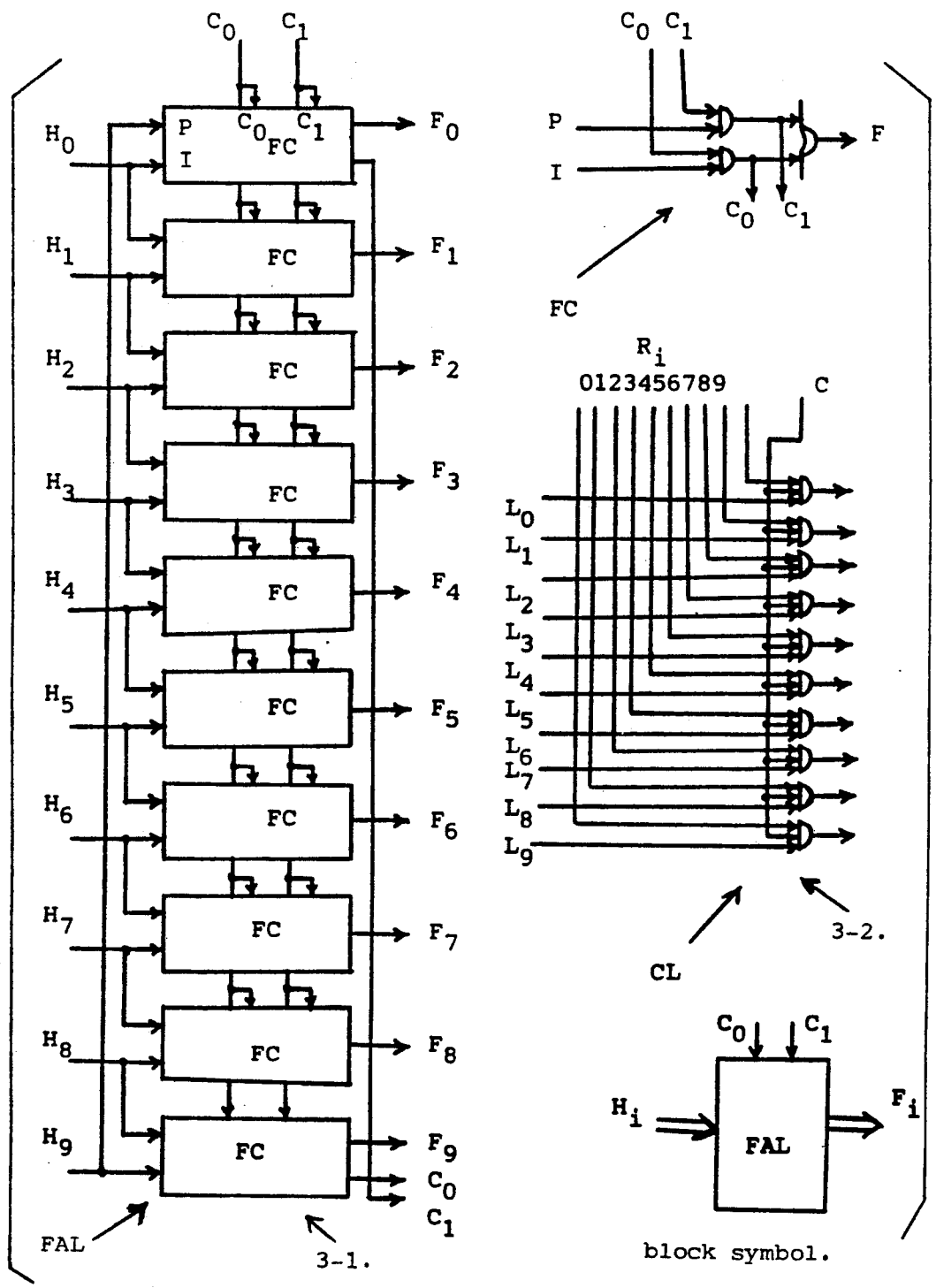

FIG. 3-1 is a FAL constructed from ten full adder cells (FC) according to the following IOR:

$$F_{i,k} = H_{i,k}C_{0,k-1} + H_{i-1,k}C_{1,k-1} \tag{5}$$
$$C_{j,k} = H_{9,k}C_{j,k-1}$$

where $H_{-1,k}=H_{9,k}$, $H_{i,k}$ and $C_{j,k}$ (for $j=0, 1$; $i=0, 1, \ldots, 9$; and $k=1, 2, \ldots, n$) are as defined for relations(3). A FC has two carry inputs $C_0$ and $C_1$ and two data inputs I (for the self or the I of the cells) and P(for the predecessor of the cell). The carry inputs are the same for all the FC's while data input i is connected to the I of cell no. i and to the P of the predecessor of cell no. i, where $i=0, 1, \ldots, 9$ and the nine is the predecessor of the zero. The carries $C_0$ and $C_1$ of the output of the FAL are the corresponding carries of cells no. 9 and 0, respectively, which means that all the other carry outputs are not needed.

Figure 4B:
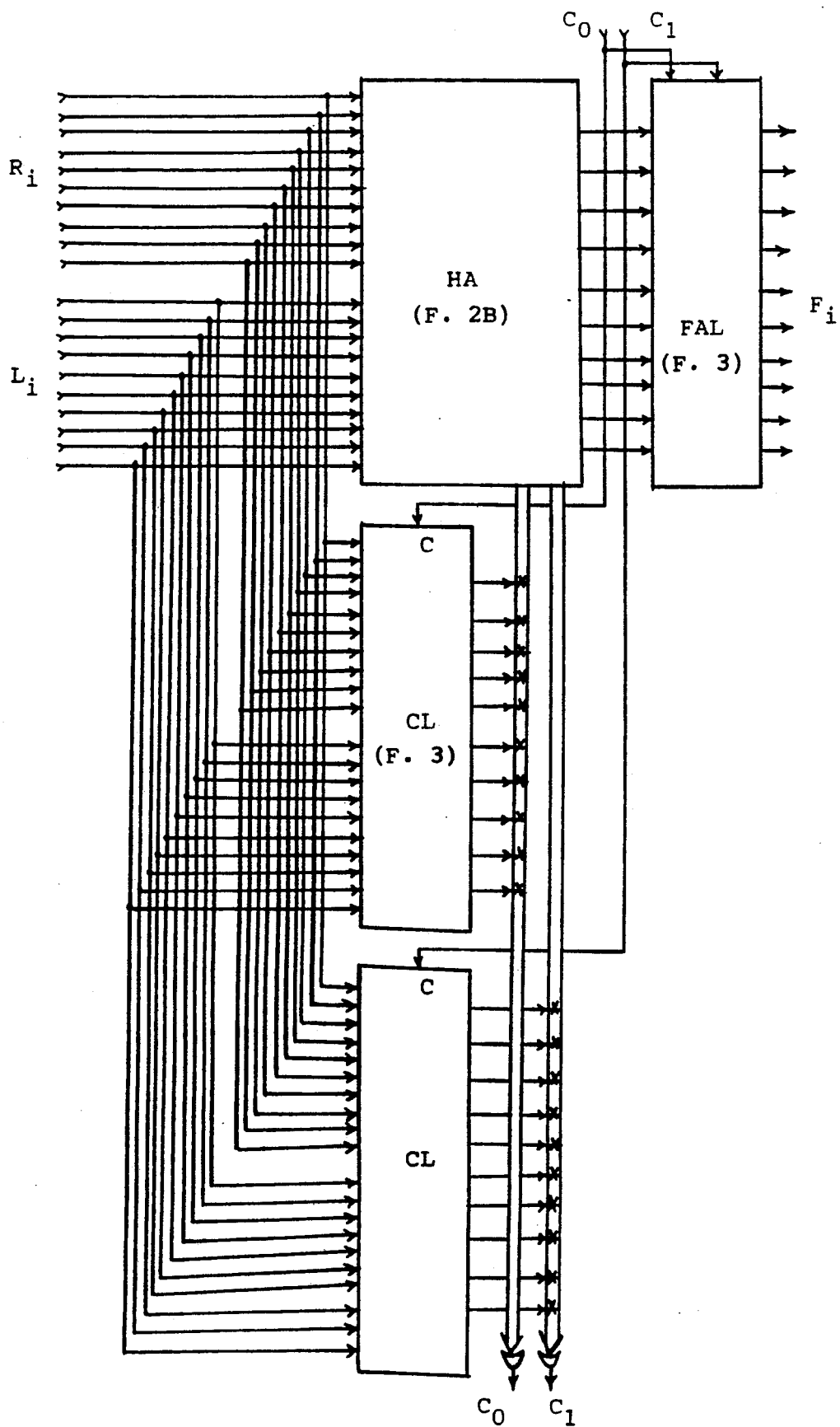
FIG. 4B is another organization for the FA of FIG. 4A.
Figures 2, 5A:
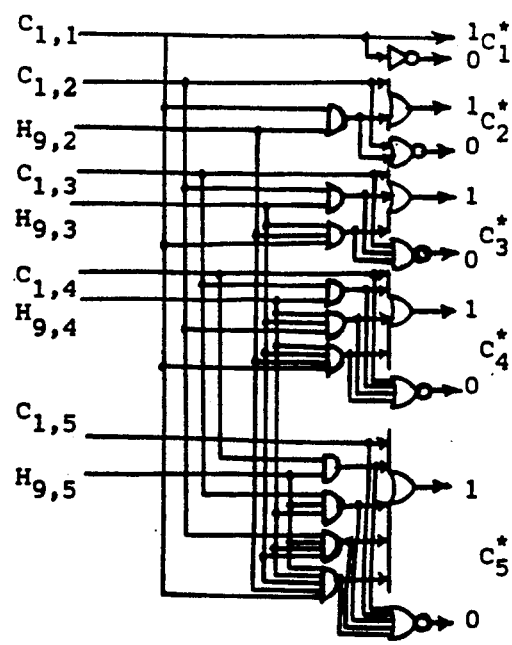

FIG. 3-2 is a full adder carry logic(CL) drawn according to the relations $O=L_jR_kC$ such that $j+k=9$, where C denotes a carry input, $L_j$ and $R_k$ are as defined for relations (3). The purpose from such CL is to have a full adder with only two levels of logical gates for the carries of the output, as will be shown in connection with the FA of FIG. 4B.

Figure 4A:
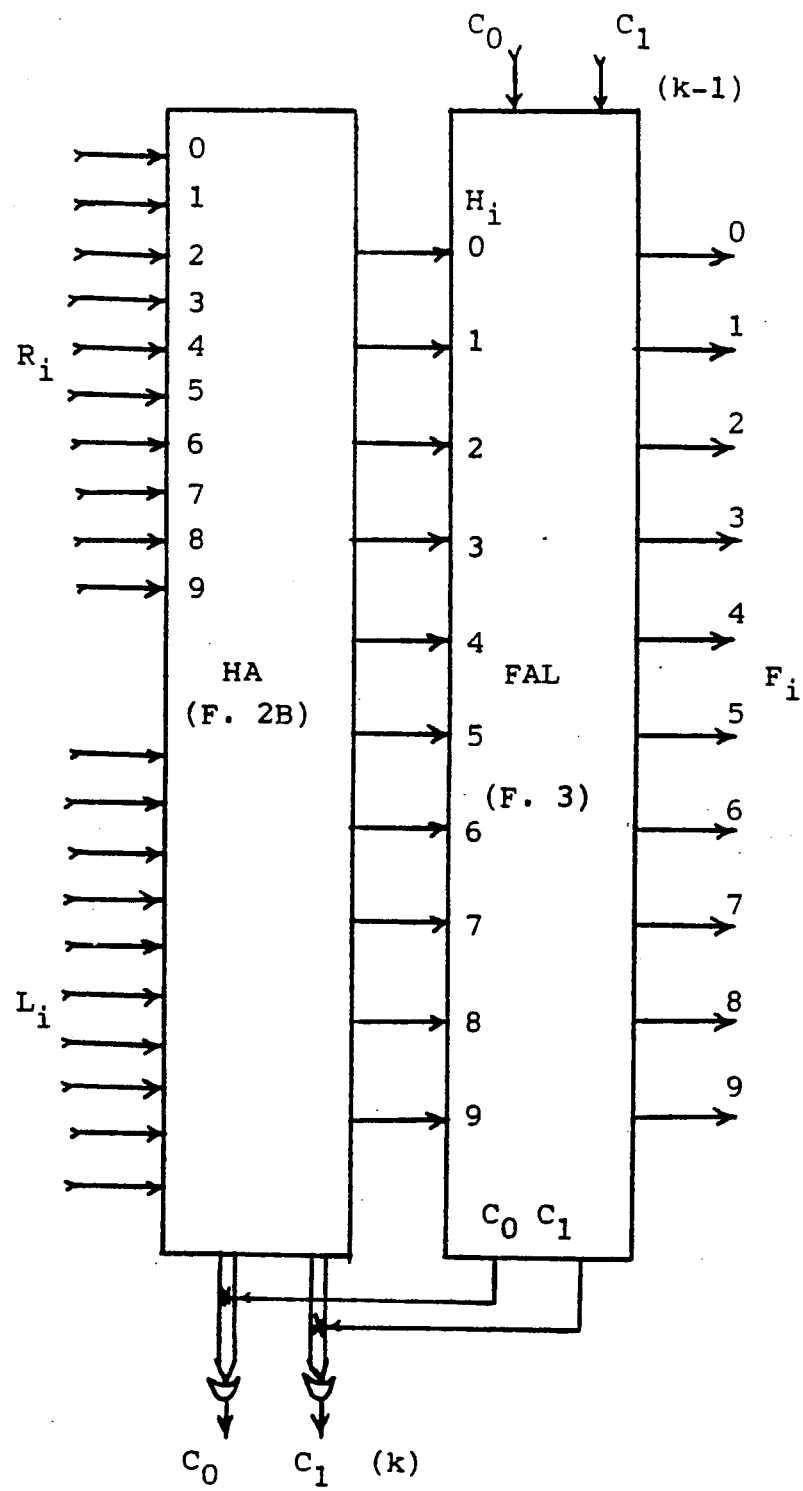
FIG. 4A is a block diagram for a TPC full adder(FA)

FIG. 4A is a FA constructed from a HA of FIG. 2B and a FAL of FIG. 3-1 according to the following IOR:

$$F_{i,k} = H_{i,k}C_{0,k-1} + H_{i-1,k}C_{1,k-1} \tag{6}$$
$$C_{j,k} = C_{j,k}^d + H_{9,k}C_{j,k-1}$$

where $H_i$'s are as defined for relations (5), $C_{j,k}^d$ and $C_{j,k-1}$ denote the direct carry(carry of the $k^{th}$ half adder) and the propagated carry from the k'LSD half adders, respectively.

FIG. 4B is another organization for the FA constructed from a HA of FIG. 2B, a FAL of FIG. 3-1, two CL's of FIG. 3-2, and combinational logic according to the following IOR:

$$F_{i,k} = H_{i,k}C_{0,k-1} + H_{i-1,k}C_{1,k-1} \tag{7}$$

$$C_{i,k} = C_{j,k}^d + \sum_{i+t=9} L_i R_t C_{j,k-1}$$

where $H_i$ is as defined for relations (5), $L_i$ and $R_t$ are as defined for relations (3), $C_{j,k}^d$ and $C_{j,k-1}$ are as defined for relations (6). The main difference between the FA's of FIGS. 4A and 4B is that the carry outputs are ready after only two-gate levels in FIG. 4B while four-gate levels are needed in case of FIG. 4A.

FIGS. 5A-1(2), 5B, 5C-1(2, 3, 4, 5 and 6) are CLA devices drawn according to the following IOR:

$$C_{1,k}^* = C_{1,k}^d + \sum_{t=1}^{k-1} \prod_{s=0}^{t-1} H_{9,k-s} C_{1,k-t}^d; \quad C_{0,k}^* = (C_{1,k}^*)' \tag{8}$$

$$C_{j,k}^* = C_{j,k}^d + \sum_{t=1}^{k-1} \prod_{s=0}^{t-1} H_{9,k-s} C_{j,k-t}^d \tag{9}$$

$$C_{j,k}^* = C_{j,k}^d + \sum_{t=1}^{k-1} G_{k,t} C_{j,k-t}^d \tag{10}$$

where the multiplication sign "$\pi$" denotes AND, $C_{j,0}^d = \emptyset$, $$G_{k,t} = \prod_{s=0}^{t-1} H_{9,k-s} = \left(\sum_{s=0}^{t-1} H_{N,k-s}\right)',$$

Figure 5B:
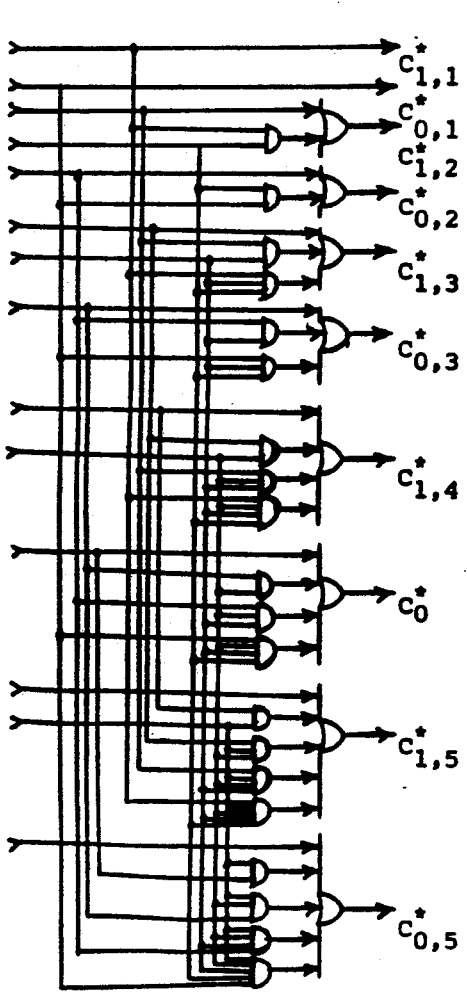
Figures 1, 5C:
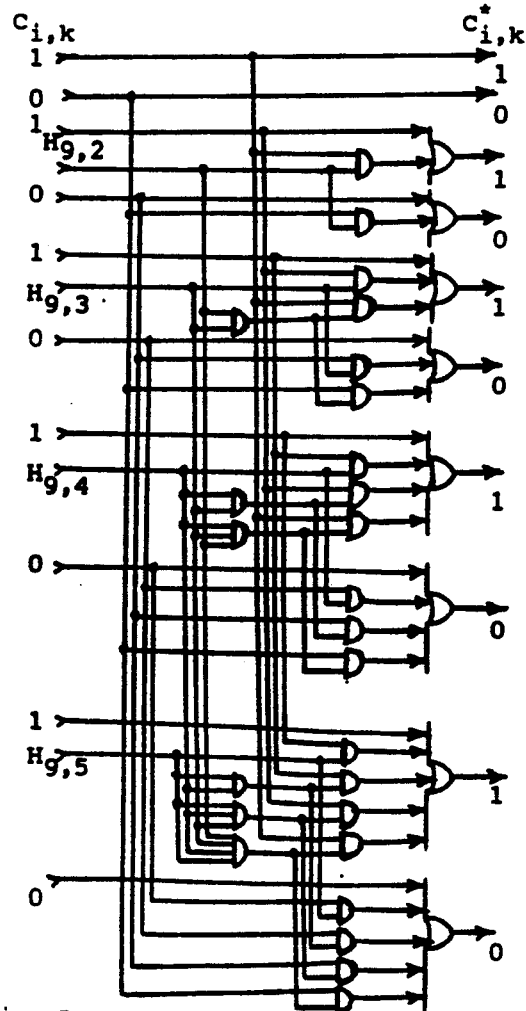
FIG. 1 is a diagram showing the TP-codes and the corresponding digital systems.
FIGS. 5C-2(3) are logic diagrams for a TPC nines generator(NG)
Figures 2, 5C:
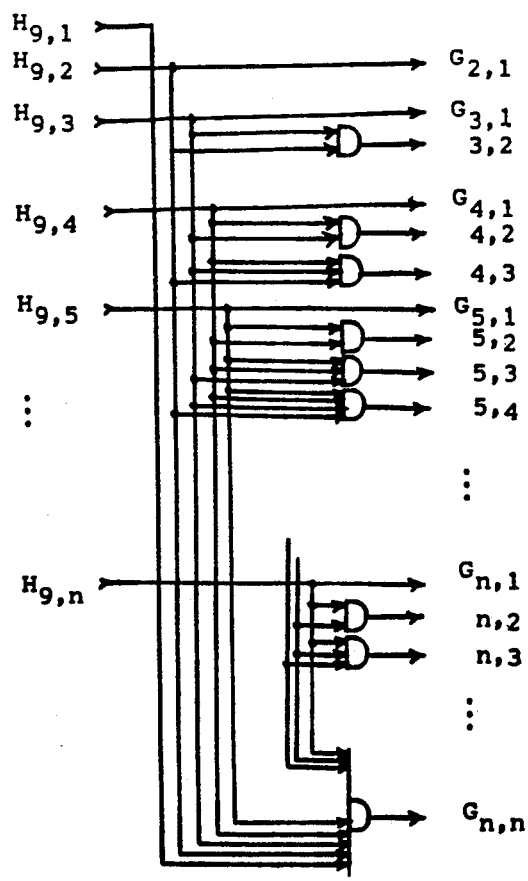
Figures 3, 5C:
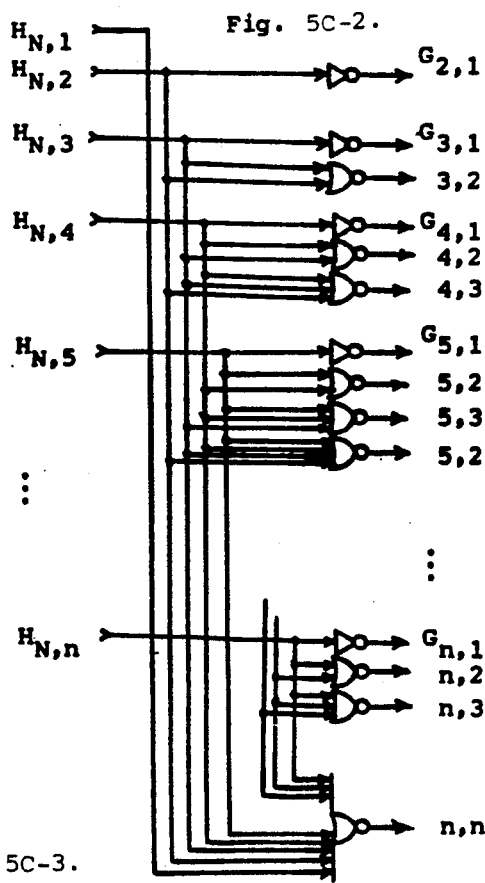

$H_9$ and $H_N$ are as given in relations (3) and $C_{j,k}^d$ (for $j=0, 1$ and $k=1, 2, \ldots, n$) is as given in relations (7). The NG's of FIGS. 5C-2 and 3 are drawn according to the relations of $G_{k,t}$, FIGS. 5A-1(2) and 5C-4(5) are drawn according to relations (8), FIG. 5B is drawn according to relations (9), FIG. 5C is drawn according to relations (10) and FIG. 5C-6 is constructed from the NG of FIG. 5C-3 and the CG of FIG. 5C-5 according to relations (10). Relations (8) and (9) are both direct expansion to the recursive relation $C_{j,k} = C_{j,k}{}^d + H_{9,k}C_{j,k-1}$ of the FA of relations (6). Relations (10) are obtained from relations (9) by forming the nine(non-nine) generate function $G_{k,t}$ then ANDing such $G_{k,t}$ with the corresponding carries. The above recursive relation is similar to the conventional relation $C_i = G_i + P_i C_{i-1}$ given in [Hwang]. Such similarity, making it the closest point at which this invention comes in contact with the conventional systems, is related to the fact that the recursive relation $C_{j,k} = C_{j,k}{}^d + H_{r-1,k}C_{j,k-1}$ from which the IOR of the CLA's are obtained is independent from the radix r since the participants in such relation are the carries $C_{j,k}$ and the nines $H_{r-1,k}$ which are formally (or formulaically) the same for all r's. Eventhough, the CLA's of this invention require two types of the carry outputs and at least accordingly are not identical to those of the conventional systems.

FIG. 6 is a n-digit input PA constructed from HA's of FIG. 2B, a CLA of FIG. 5C-6, FAL's of FIG. 3-1 and combinational logic according to the following IOR:

$$P_{i,k} = \begin{cases} H_{i,k} & \text{if } k = 1 \\ H_{i,k}C^*_{0,k-1} + H_{i-1,k}C^*_{1,k-1} & \text{if } 1 < k \leq n \end{cases} \quad (11)$$

$$C_j = C^d_{j,n} + H_{9,n}C^*_{j,n-1}$$

where $H_{i,k}$ and $C_{j,n}{}^d$ are as defined for relations (5) and (6), and $C_{j,n}{}^*$ is as given in relations (10), (9) and (8).

Figure 7A:
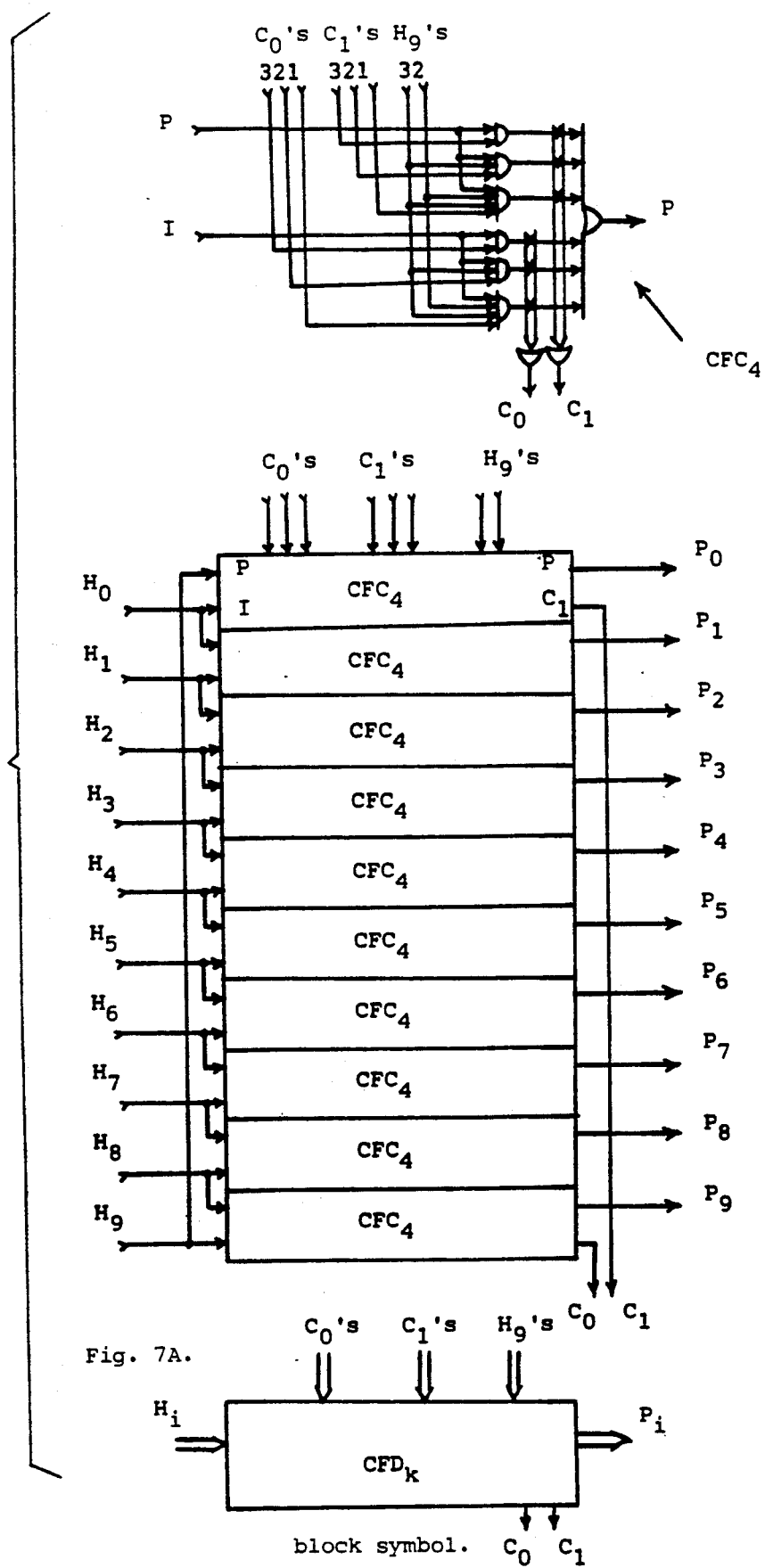

FIG. 7A is a $CFD_k$ constructed from ten CLA and FAL cells of the $k^{th}$ decade($CFC_k$) according to the following IOR:

$$P_{i,k} = \begin{cases} H_{i,k}C^d_{0,k-1} + H_{i-1,k}C^d_{1,k-1} + \\ \sum_{t=1}^{k-2} \prod_{s=1}^{t} H_{9,k-s}(H_{i,k}C^d_{0,k-1} + \\ H_{i-1,k}C^d_{1,k-t-1}) \end{cases} \quad (12)$$

$$C_{j,k} = \sum_{t=1}^{k-1} \prod_{s=0}^{t-1} H_{9,k-s}C^d_{j,k-t}$$

where $C_{j,k}{}^d$ and $H_{i,k}$ are as defined for relations (6); j=0, 1; i=0, 1, ..., 9 and k=2, 3, ..., n. The design of a $CFC_k$ is similar to the design of a combination of a FC of FIG. 3 and the $k^{th}$ $C_{j,k}{}^*$ of FIG. 5B. The data inputs are connected to the $CFD_k$ in the same way of the FAL of FIG. 3-1. The $CFC_k$ of the diagram is drawn for the case k=4. The carry outputs of the $CFD_k$ are taken from cells no. 9 and 0 as in the FAL of FIG. 3-1. The carries of the other cells are not needed. Furthermore, only the carry outputs of the $CFD_n$ are needed as it will be apparent from relations (13).

Figure 7B:
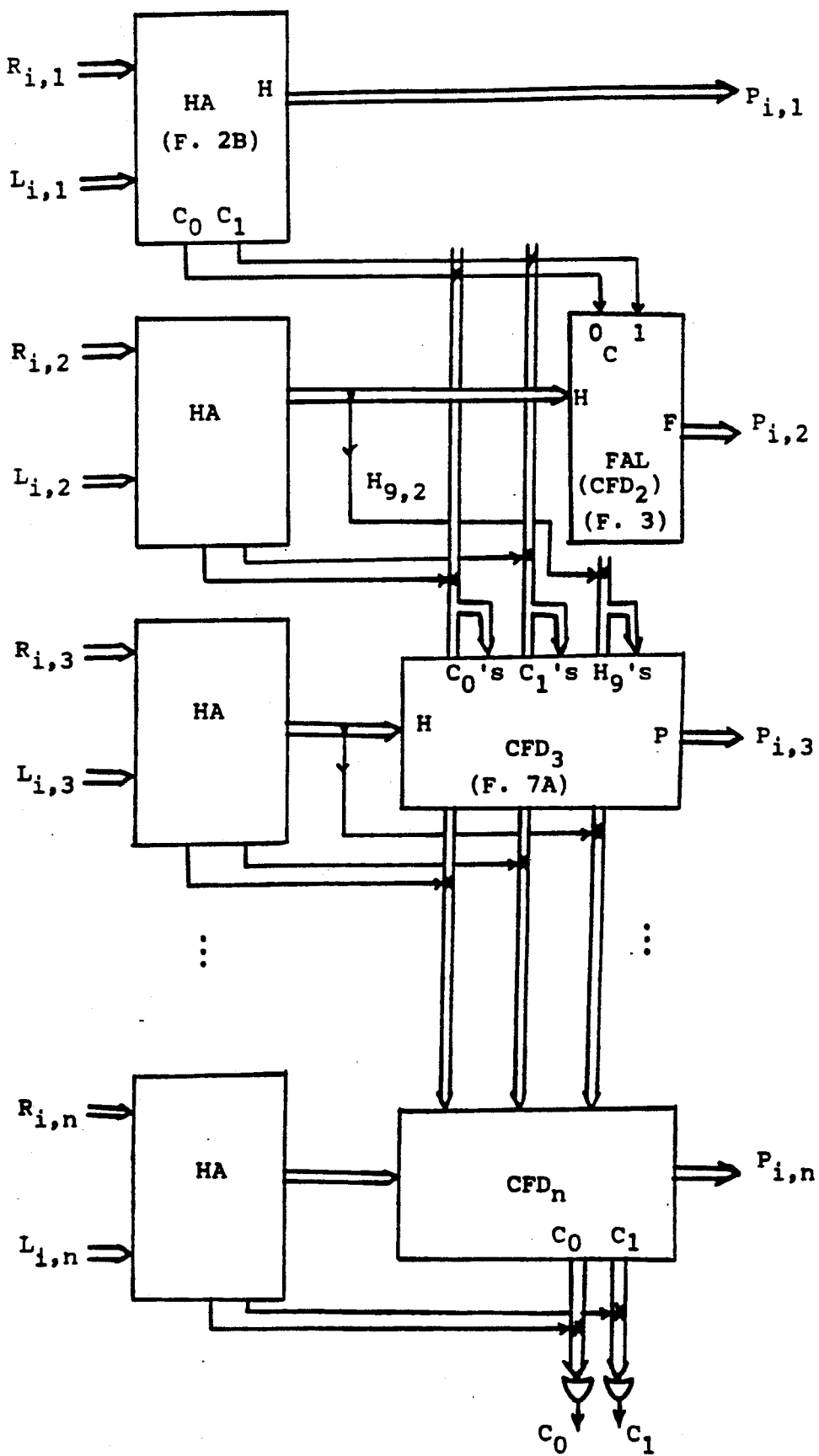
FIG. 7B is another organization for the PA.

FIG. 7B is another organization for the PA constructed from HA's of FIG. 2B and $CFD_k3$ s of FIG. 7A according to the following IOR:

$$P^*_{i,k} = \begin{cases} H_{i,k} & \text{if } k = 1 \\ P_{i,k} & \text{if } 1 < k \leq n \end{cases} \quad (13)$$

$$C^*_j = C^d_{j,n} + C_{j,n}$$

where $H_{i,k}$ and $C_{j,n}{}^d$ are as defined for relations(6), $P_{i,k}$ and $C_{j,n}$ are as defined by relation(12). The main purpose from the circuit of FIG. 7B is to have a four-gate level PA. The design of a $CFC_k$ can be simplified by using the nines generate function $G_{k,t}$ of relations(10) but such a technique requires, however, one more level of logical gates.

Figures 1, 8A:
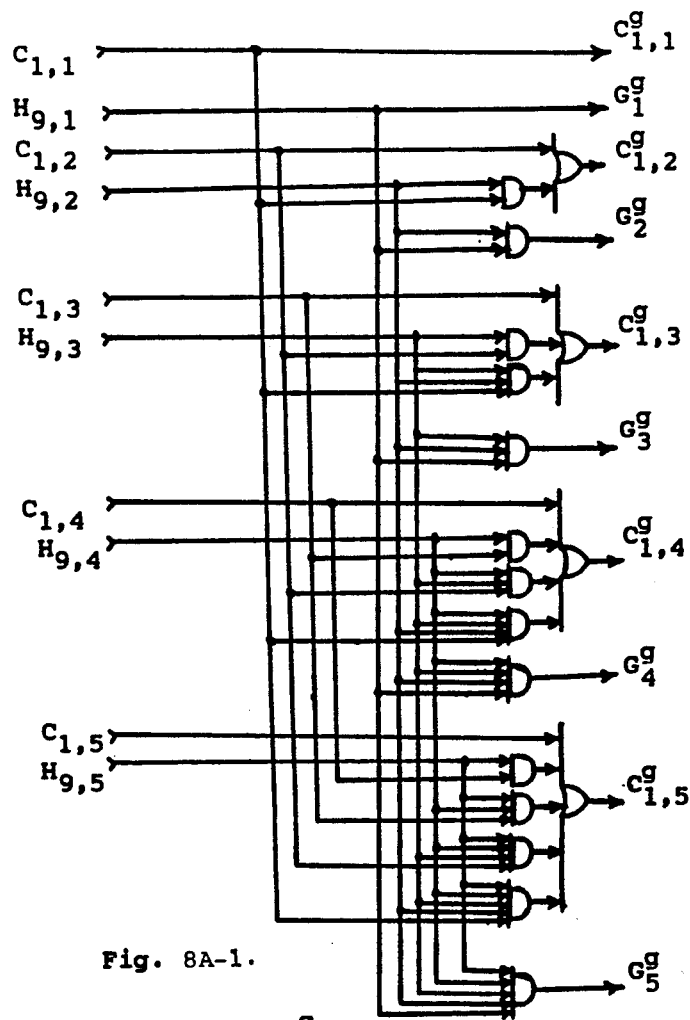
Figures 2, 8A:
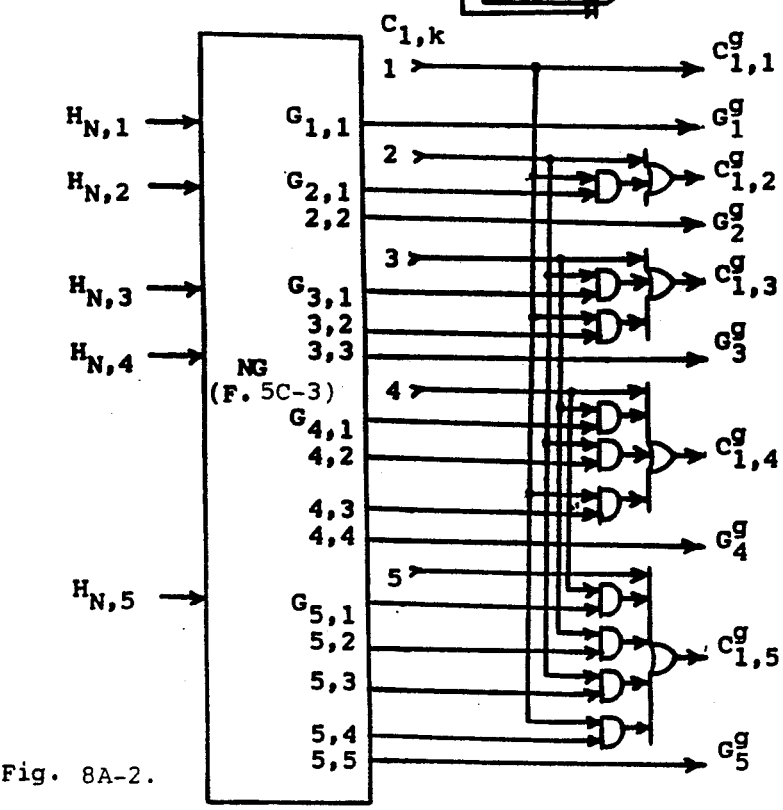

FIGS. 8A-1(2) and 8B are three organizations for a BCLA drawn according to the following IOR, respectively:

$$C^g_{1,k} = C^d_{1,k} + \sum_{t=1}^{k-1} \prod_{s=0}^{t-1} H_{9,k-s}C^d_{1,k-t}; \quad (14\text{-i})$$

$$G^g_k = \prod_{s=1}^{k} H_{9,s}$$

$$C^g_{1,k} = C^d_{1,k} + \sum_{t=1}^{k-1} G_{k,t}C^d_{1,k-t}; \quad G^g_k = G_{k,k} \quad (14\text{-ii})$$

$$G_{k,t} = \prod_{s=0}^{t-1} H_{9,k-s} = \left( \sum_{s=0}^{t-1} H_{N,k-s} \right)'$$

$$C^g_{j,k} = C^d_{j,k} + \sum_{t=1}^{k-1} \prod_{s=0}^{t-1} H_{9,k-s}C^d_{j,k-t}; \quad (15)$$

$$G^g_k = \prod_{s=1}^{k} H_{9,s}$$

where $C_{j,k}{}^d$ is as defined for relations (6); $H_{9,k}$ and $H_{N,k}$ are as given in relations (3); f denotes the maximum AND gate fan-in allowed in the circuit; k=1, 2, ..., f; and g=1, 2, ... $\lceil n/f \rceil$. As explained in [Hwang], the purpose from the BCLA's is to break the CLA circuit into two or more levels of the BCLA's so that the fan-in limitation can be met. The CLA of FIG. 5C-6 introduces a third alternate design besides the n-bit CLA and the BCLA techniques, given in [Hwang], provided that there is no limitation on a NOR gate fan-in. Again, the BCLA's of this invention are different from those of the conventional system [Hwang] simply because no feedback connection required here while there is there.

Figure 9A:
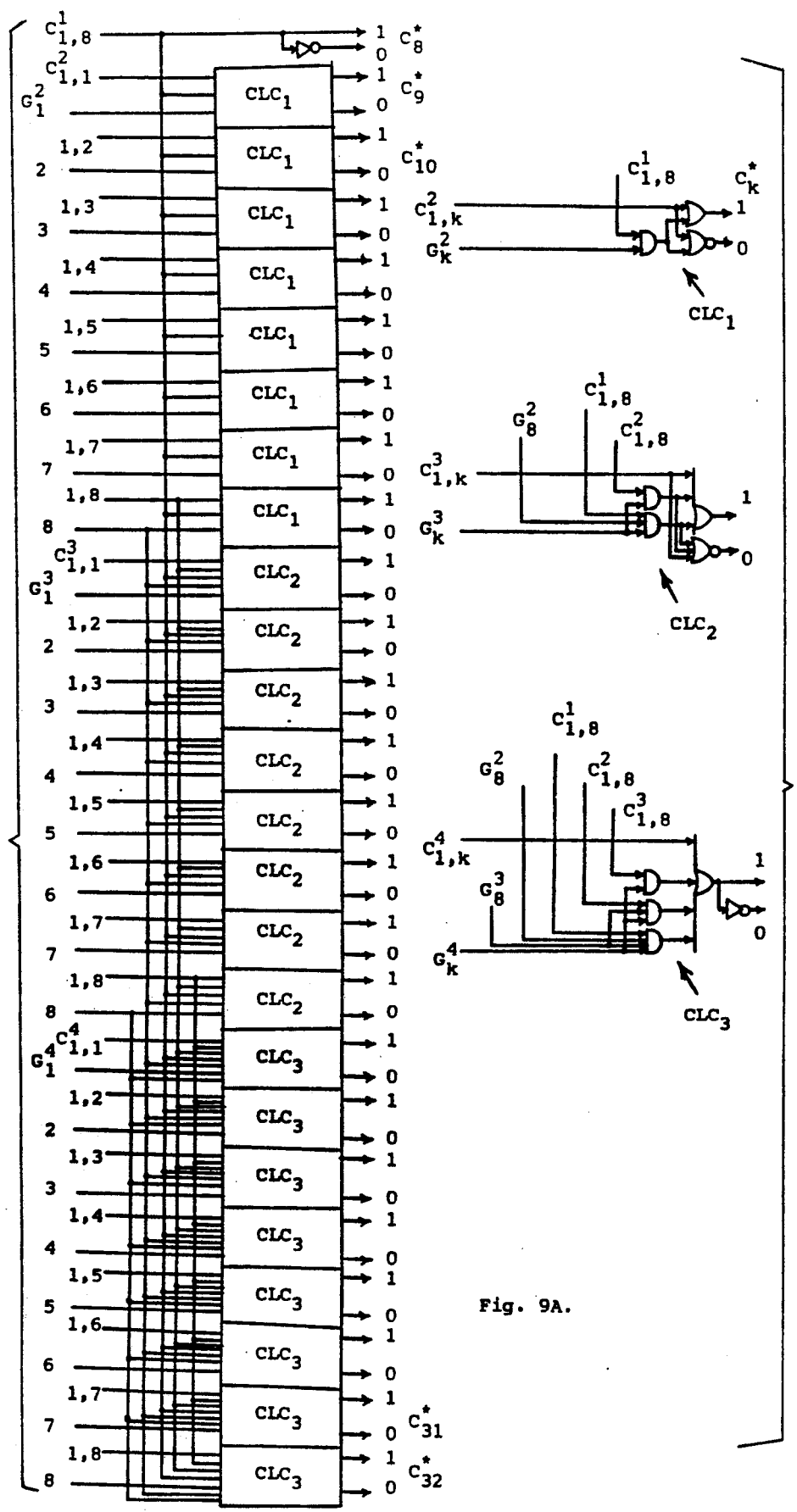
Figure 9B:
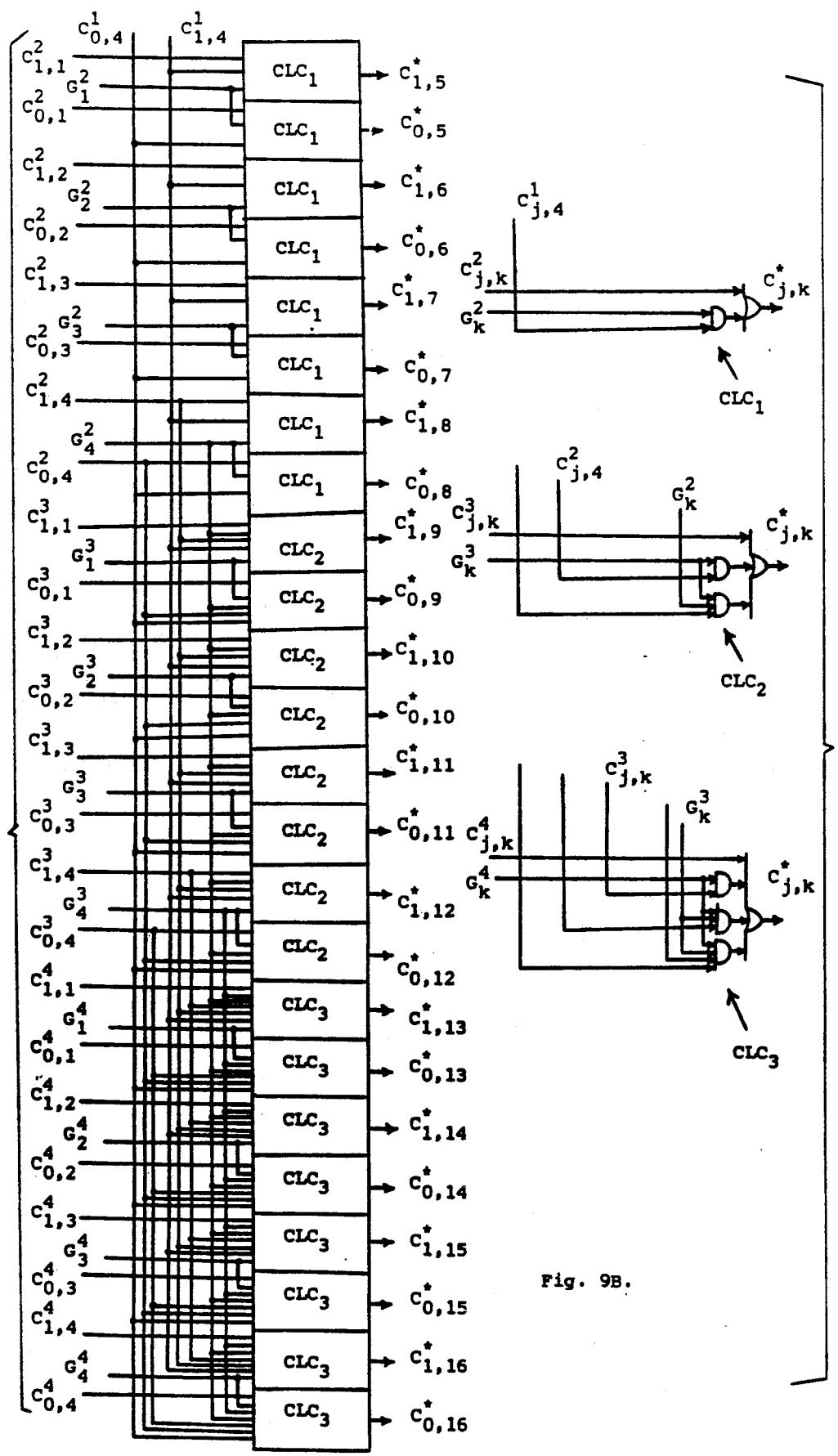

FIGS. 9A and 9B are FCLA's comprised from carry look-ahead cells ($CLC_k$) according to the following IOR, respectively:

$$C^{*g}_{1,k} = C^g_{1,k} + G^g_k \left( C^{g-1}_{1,f} + \sum_{t=1}^{g-2} \prod_{s=1}^{t} G^{g-s}_f C^{g-t-1}_{1,f} \right); \quad (16)$$

$$C^{*g}_{0,k} = (C^{*g}_{1,k})'$$

$$C^{*g}_{j,k} = C^g_{j,k} + G^g_k \left( C^{g-1}_{j,f} + \sum_{t=1}^{g-2} \prod_{s=1}^{t} G^{g-s}_f C^{g-t-1}_{j,f} \right) \quad (17)$$

where f, k, g, $C_{j,k}{}^g$ and $G_k{}^g$ are as given for relations (14) and (15). In a multi-level CLA adder, a BCLA of FIGS. 8A goes with the FCLA of FIG. 9A while the BCLA of FIG. 8B goes with the FCLA of FIG. 9B. The design of the BCLA of FIG. 8A-2 can be followed for all levels of BCLA's.

Figure 8B:
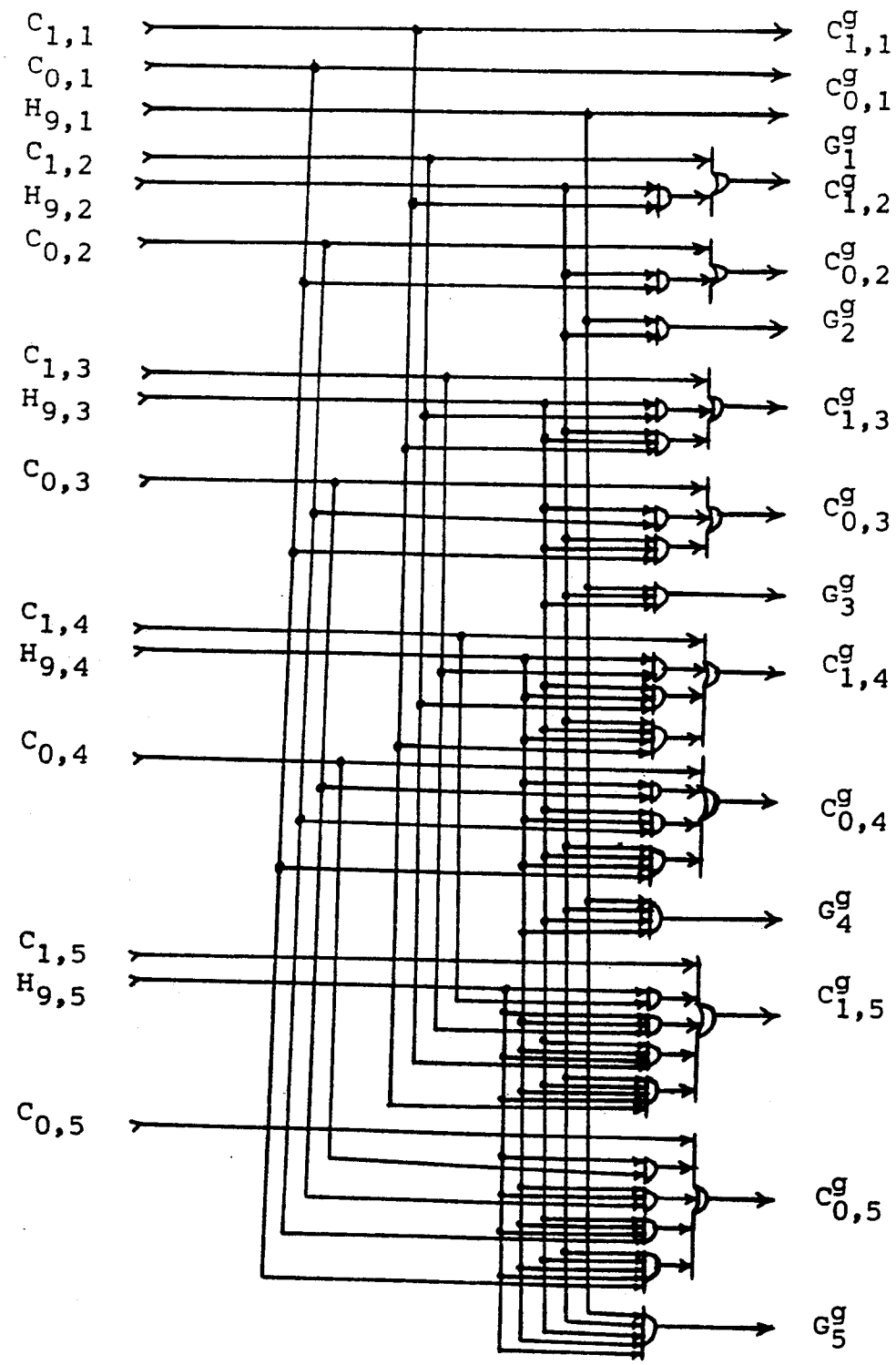
Figure 10:
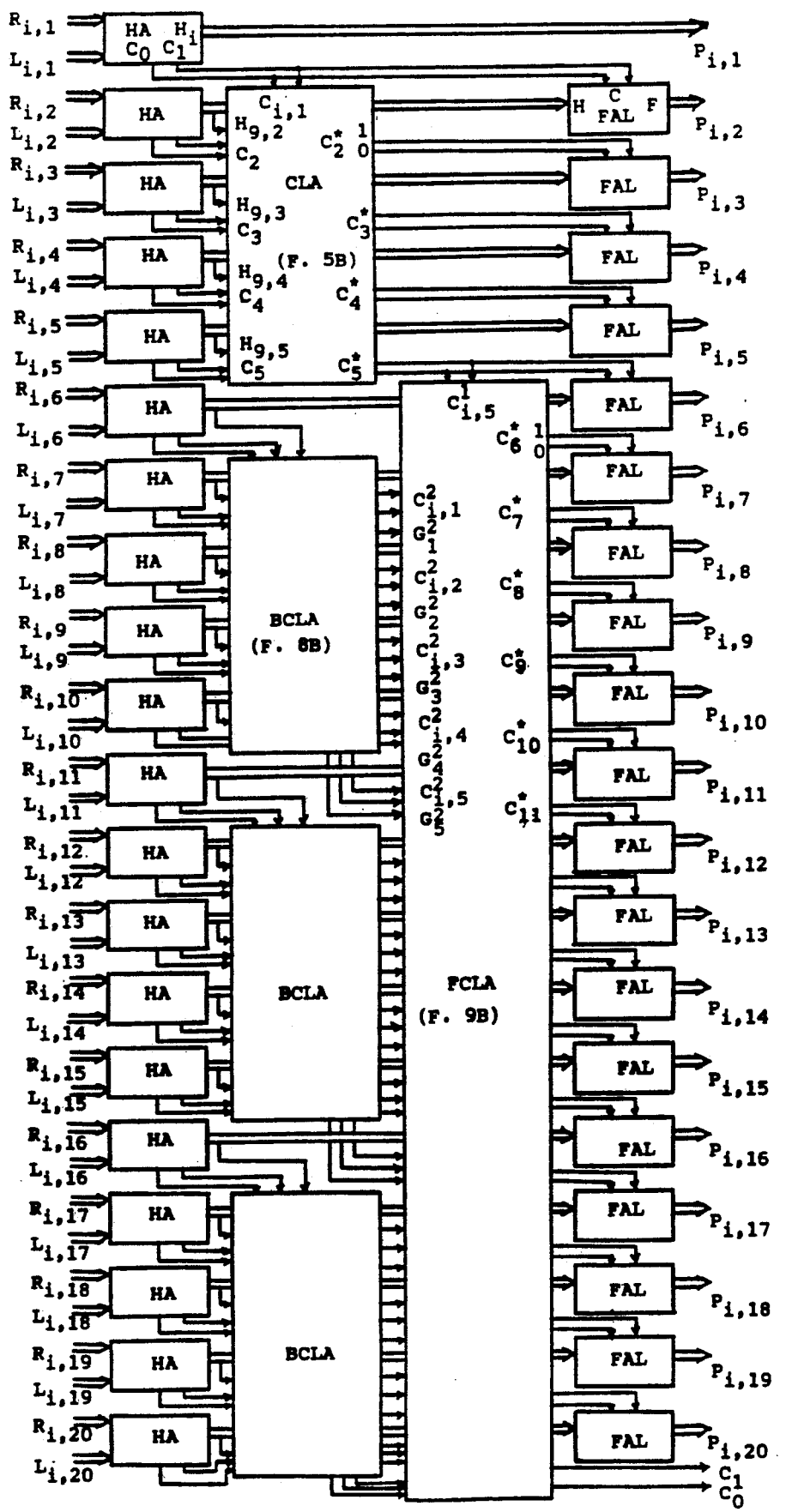
FIG. 10 is a block diagram for a TPC two-level CLA adder (TLCA)

FIG. 10 is a 20-digit input TLCA comprised from 20 HA's of FIG. 2B, a CLA of FIG. 5B, three BCLA's of FIG. 8B, a FCLA of FIG. 9B and 19 FAL's of FIG. 3-1 according to the following input-output relations:

$$P_{i,k} = \begin{cases} H_{1,k} & \text{if } k = 1 \\ H_{i,k}C^*_{0,k-1} + H_{i-1,k}C^*_{1,k-1} & \text{if } 1 < k \leq f+1 \\ H_{i,k}C^{*,g}_{0,k-1} + H_{i-1,k}C^{*,g}_{1,k-1} & \text{if } f+1 < k \leq n \end{cases} \quad (18)$$

$$C_j = C^{*,g}_{j,n}$$

where $H_{i,k}$'s are as defined for relations (3) and (6), $C_{j,k}^*$'s are as given in relations (9) and $C_{j,k}^{*,g}$'s are as given in relation (17). As it clear from the referred to figures, the PA of FIG. 7B and the TLCA of FIG. 10 are both complicated. The PA of FIG. 6 is the best solution introduced so far because it has relatively simple hardware complexity and constant time delay independent from the length of the operand(input) assuming that there is no limitation on a NOR gate fan-in. To be continued next on subtraction devices FIGS. 11 through 20.

The subtract operation is more difficult to implement than the add operation because it is neither commutitive nor limited to the set of positive numbers and accordingly it will be implemented in this invention according to the following algorithm:

ALG 2: Subtract straight and correct later algorithm

1. Subtract the subtrahend R from the minuend L regardless to whether L≧R or not by borrowing from the next higher significant place if necessary.

2. Take the r's complement of the result of step 1 in case of an end borrower occurs and consider the final result negative.

Step 1 of ALG 2 is implement according to ALG 1 while step 2 is implemented much easier as will be seen later on. Furthermore, FIG. 6 of three block levels: HA-level, CLA-level, and FAL-level. The subtract operation according to step 1 of ALG 2 is very similar to the add operation at the HA-level, identical to the add operation at the CLA-level, and almost identical to the add operation at the FAL-level as it will be apparent shortly.

Figure 11:
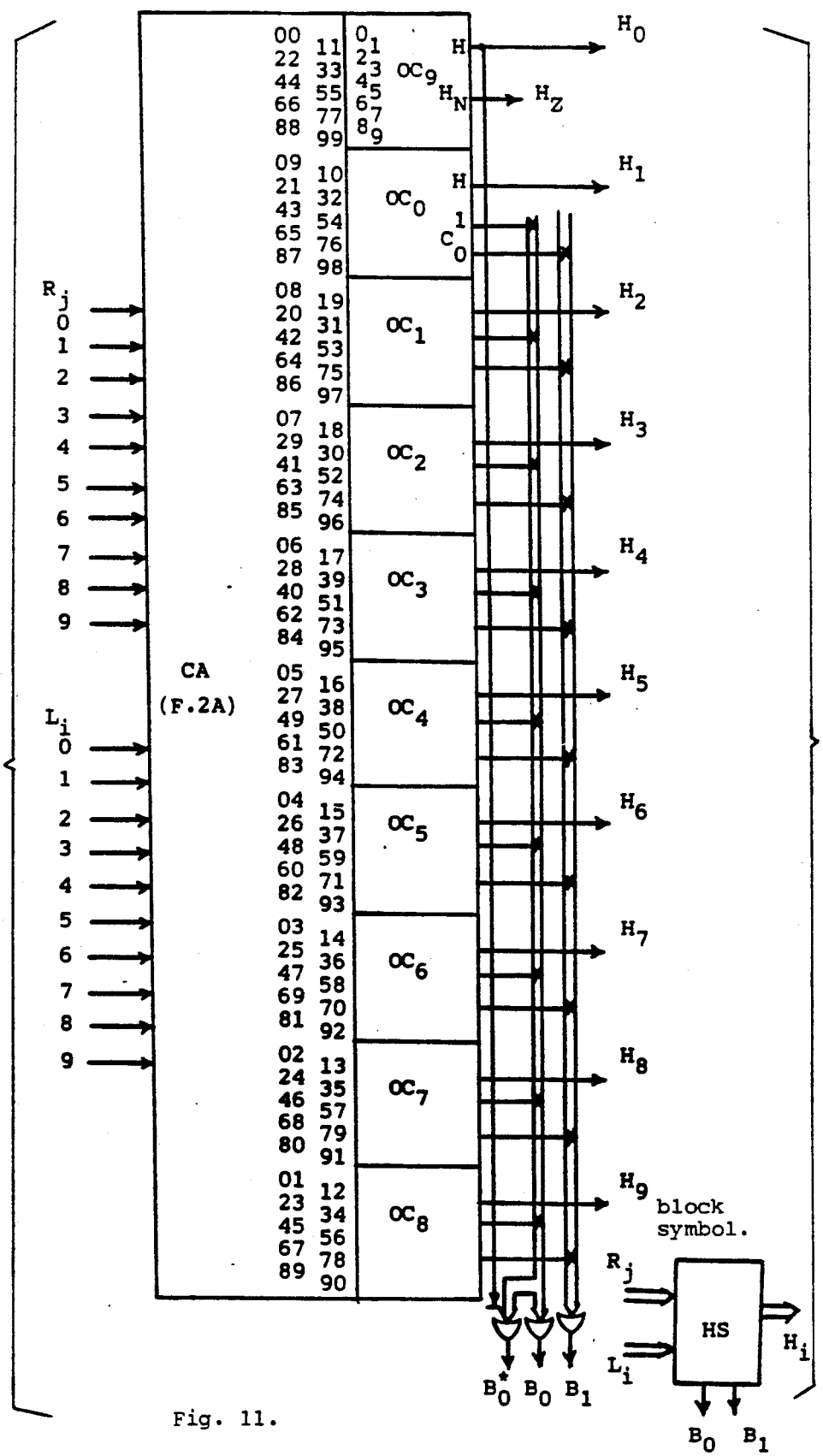

FIG. 11 is a HS constructed from a CA of FIG. 2A, ten $OC_k$'s of FIG. 2B, and three OR gates for the borrowers according to the following IOR:

$$H_i = \sum_{0 \leq j, k \leq 9} L_j R_k \text{ such that } i = \begin{cases} j-k & \text{if } j \geq k \\ (10+j)-k & \text{if } j < k \end{cases} \quad (19)$$

$$B_i = \sum_{0 \leq j, k \leq 9} L_j R_k \text{ such that } i = \begin{cases} 0 & \text{if } j > k \\ 1 & \text{if } j < k \end{cases}$$

$$B_0^* = B_0 + H_0; \quad H_Z = (H_0)' = \sum_{i=1}^{9} H_i = B_0 + B_1$$

where $L_j$ denotes the minuend, $R_k$ denotes the subtrahend, $H_i$ denotes the difference, $H_Z$ denotes non-zero function (needed for the CLA's), $B_1$, $B_0$, and $B_0^*$ denote the borrowers with the same remark made about $C_0$ and $C_0^*$ in connection with FIG. 2B is also correct here with respect to $B_0$ and $B_0^*$ with $H_0$ here replacing $H_9$ there. As in relations (4), relations (19) are rewritten in matrix forms as follows:

$$B_{0/1} \quad (19a)$$
$$\begin{bmatrix} Z & Z & Z & Z & Z & Z & Z & Z & Z & Z \\ 0 & 0 & 0 & 0 & 0 & 0 & 0 & 0 & 0 & 1 \\ 0 & 0 & 0 & 0 & 0 & 0 & 0 & 0 & 1 & 1 \\ 0 & 0 & 0 & 0 & 0 & 0 & 0 & 1 & 1 & 1 \\ 0 & 0 & 0 & 0 & 0 & 0 & 1 & 1 & 1 & 1 \\ 0 & 0 & 0 & 0 & 0 & 1 & 1 & 1 & 1 & 1 \\ 0 & 0 & 0 & 0 & 1 & 1 & 1 & 1 & 1 & 1 \\ 0 & 0 & 0 & 1 & 1 & 1 & 1 & 1 & 1 & 1 \\ 0 & 0 & 1 & 1 & 1 & 1 & 1 & 1 & 1 & 1 \\ 0 & 1 & 1 & 1 & 1 & 1 & 1 & 1 & 1 & 1 \end{bmatrix}$$

$$\begin{array}{ccc} H_i & L_j & R_k \\ \begin{bmatrix} 0 \\ 1 \\ 2 \\ 3 \\ 4 \\ 5 \\ 6 \\ 7 \\ 8 \\ 9 \end{bmatrix} = \begin{bmatrix} 0\,1\,2\,3\,4\,5\,6\,7\,8\,9 \\ 1\,2\,3\,4\,5\,6\,7\,8\,9\,0 \\ 2\,3\,4\,5\,6\,7\,8\,9\,0\,1 \\ 3\,4\,5\,6\,7\,8\,9\,0\,1\,2 \\ 4\,5\,6\,7\,8\,9\,0\,1\,2\,3 \\ 5\,6\,7\,8\,9\,0\,1\,2\,3\,4 \\ 6\,7\,8\,9\,0\,1\,2\,3\,4\,5 \\ 7\,8\,9\,0\,1\,2\,3\,4\,5\,6 \\ 8\,9\,0\,1\,2\,3\,4\,5\,6\,7 \\ 9\,0\,1\,2\,3\,4\,5\,6\,7\,8 \end{bmatrix} \times \begin{bmatrix} 0 \\ 1 \\ 2 \\ 3 \\ 4 \\ 5 \\ 6 \\ 7 \\ 8 \\ 9 \end{bmatrix} \end{array}$$

where Z in the $B_i$ matrix denotes zeros which should be ORed with $B_0$ for the LSD-half subtractor only as remarked above. As is clear from the comparison, the hardware tools of FIGS. 2B and 11 are the same. Their difference is only in the connections to the OR gates. IN case of repeating FIG. 2C with respect to the subtract operation, the difference will be only in the connections of $L_j$ inputs to the HC's and in the connections to the OR gates of the borrowers.

Figure 12:
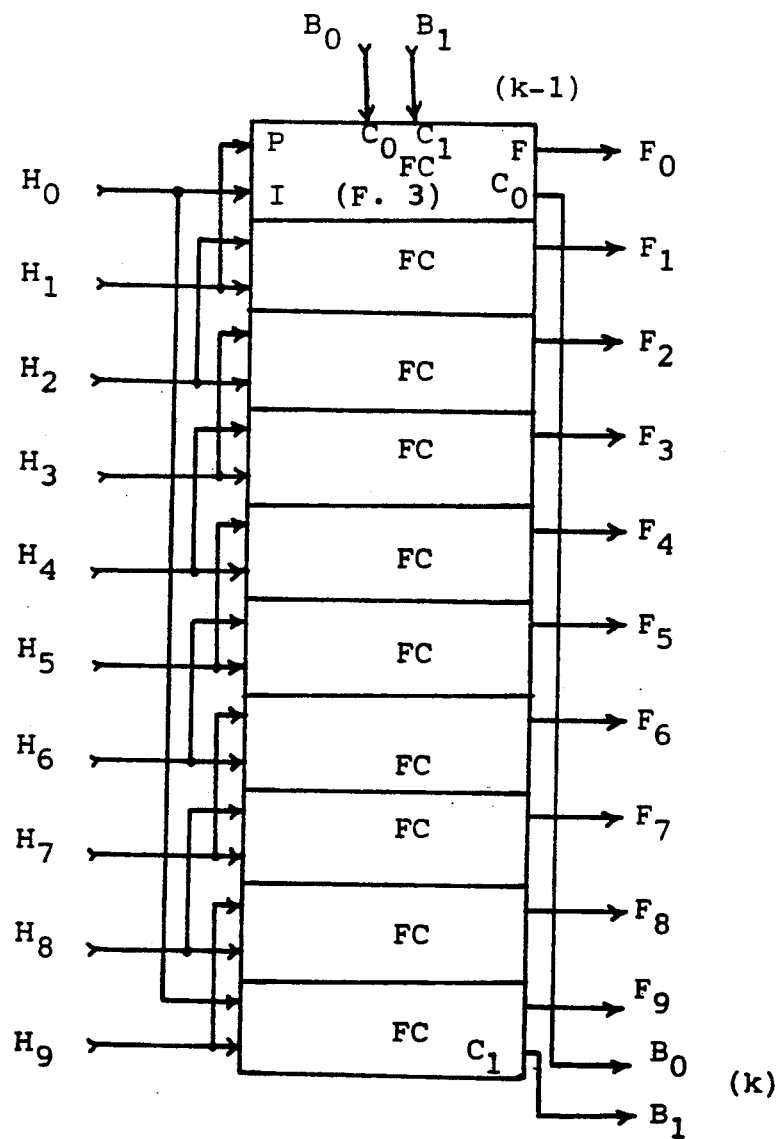
FIG. 12 is a block diagram for a TPC full subtractor logic(FSL)

FIG. 12 is a FSL constructed from ten FC's of FIG. 3 according to the following IOR:

$$F_{i,k} = H_{i,k}B_{0,k-1} + H_{i+1,k}B_{1,k-1} \quad (20)$$
$$B_{j,k} = H_{0,k}B_{j,k-1}$$

where $H_i$'s (i=0, 1, ..., 9) and $B_j$'s (J=0, 1) are as given in relations (19) and $H_{10} = H_0$. As said before, the FAL of FIG. 3-1 and the FSL of FIG. 12 are identical except that the input of an I goes also to the P of the predecessor of cell I in the FAL while such input goes also to the P of the successor of cell I in the FSL and that the borrowers $B_0$ and $B_1$ are taken from cells no. 0 and 9, respectively, in the FSL while the corresponding carries are taken from cells no. 9 and 0, respectively, in case of the FAL.

Figure 13:
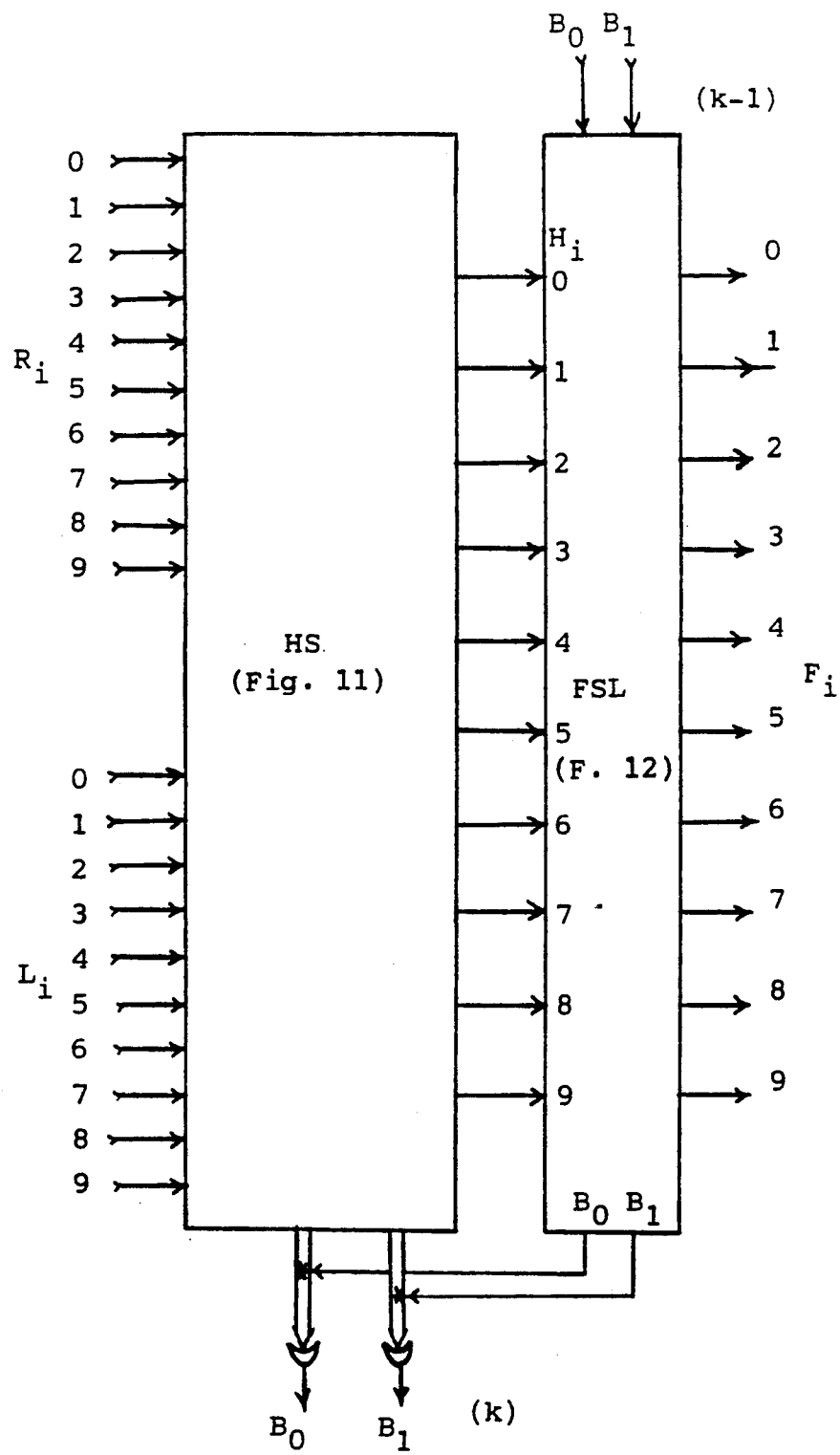
FIG. 13 is a block diagram for a TPC full subtractor(FS)

FIG. 13 is a FS constructed from a HS of FIG. 11 and a FSL of FIG. 12 according to the following IOR:

$$F_{i,k} = H_{i,k}B_{0,k-1} + H_{i+1,k}B_{1,k-1} \quad (21)$$
$$B_{j,k} = B^d_{j,k} + H_{0,k}B_{j,k-1}$$

where $H_{i,k}$'s are as defined for relations (20), $B_{j,k}^d$ denotes the direct borrowers of the $k^{th}$ half subtractor and $B_{j,k-1}$ (k=2, 3, ..., n) denotes the propagated borrowers from the k-1 LSD-half subtractor. The FA of FIG. 4A and the FS of FIG. 13 are diagramatically identical due to the similarities between relations (6) and (21). A FS diagramatically identical to the FA of FIG. 4B can be obtained by a parallel design process.

Figure 14:
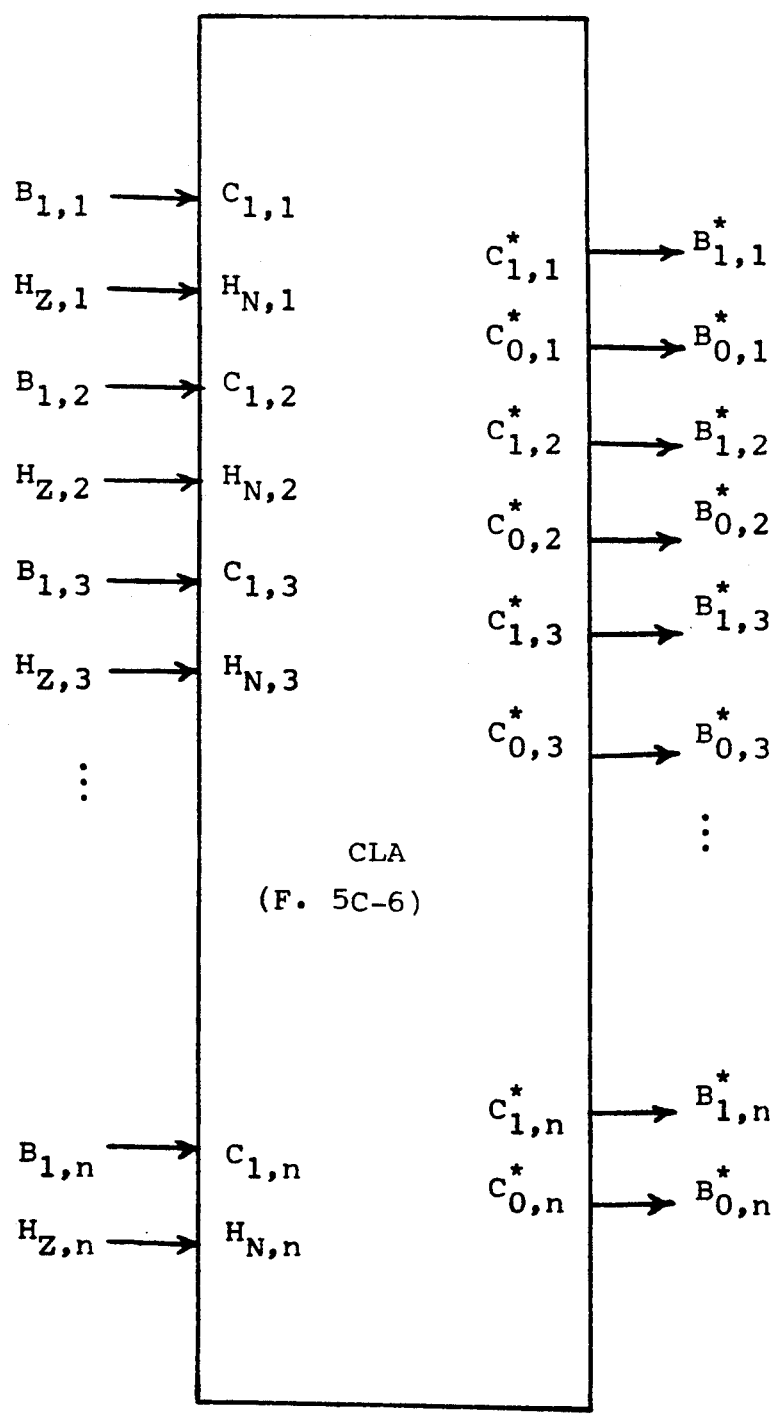
FIG. 14 is a block diagram for a PS oriented CLA.

FIG. 14 is a PS oriented CLA drawn according to the following IOR:

$$B^*_{j,k} = B^d_{j,k} + \sum_{i=1}^{k-1} G_{k,i}B^d_{j,k-i} \quad (22)$$

-continued $$G_{k,t} = \left( \sum_{s=0}^{t-1} H_{Z,k-s} \right)'$$

where $H_{Z,k}$'s are as given in relations (19) and $B_{j,k}{}^d$'s are as defined for relations (21). Relations (22) can be obtained by two independent methods: 1) as an expansion to the recursive equation of relations (21) and 2) by replacing $C_{j,k}{}^*$'s, $C_{j,k}{}^d$ and $H_{N,k}$ in relations (10) by $B_{j,k}{}^*$, $B_{j,k}{}^d$ and $H_{Z,k}$, respectively. Relations (8) and (9) are rewritten for the subtractors by the same way, i.e., by replacing $C_{j,k}{}^*$, $C_{j,k}{}^d$ and $H_{9,k}$ in such relations by $B_{j,k}{}^*$, $B_{j,k}{}^d$ and $H_{0,k}$, respectively. Means that the CLA's are not only the same for all radices but also the same for both addition and subtraction operations.

Figure 15:
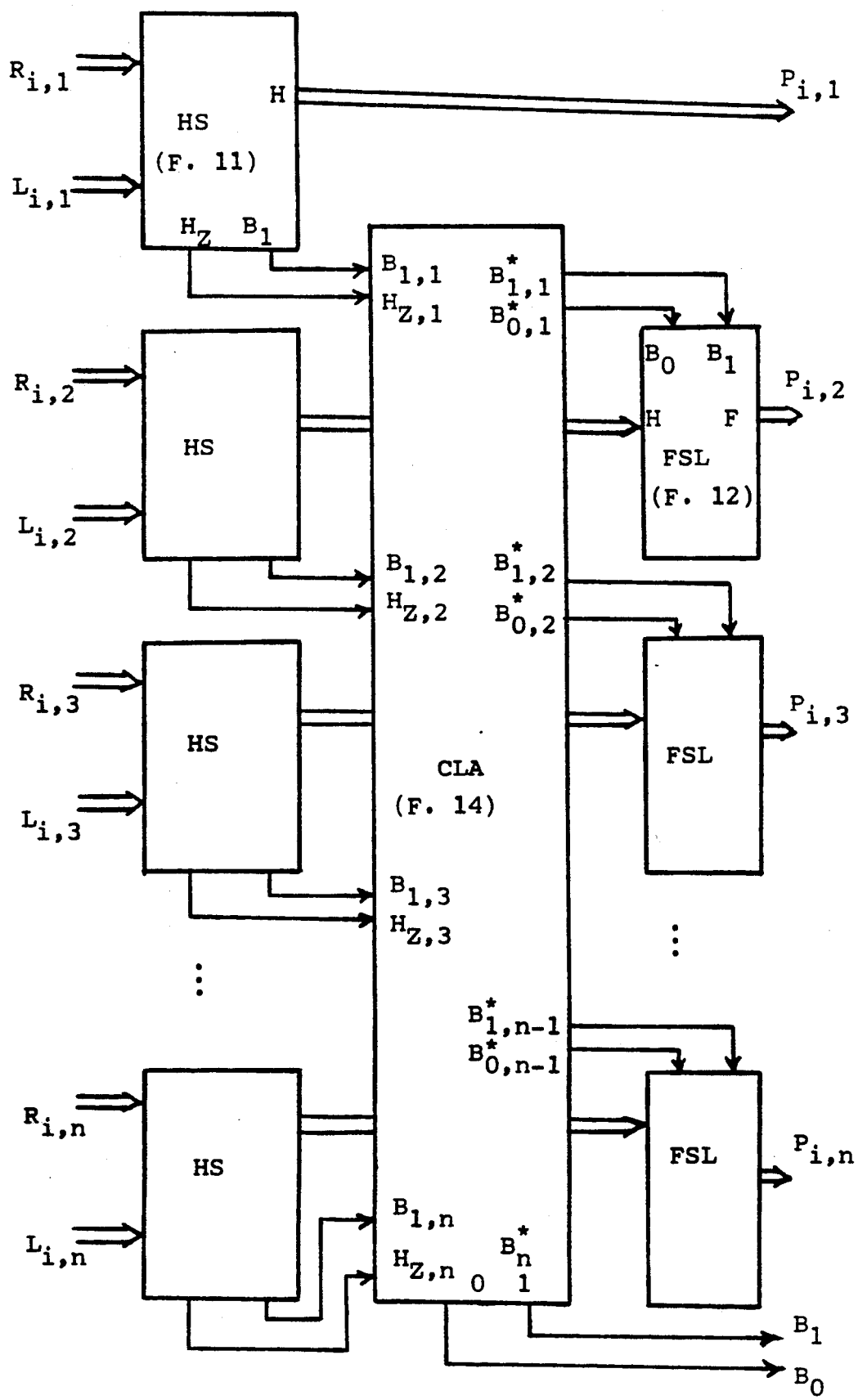
FIG. 15 is a block diagram for a TPC parallel subtractor (PS)

FIG. 15 is a n-digit input PS constructed from n HS's of FIG. 11, a CLA of FIG. 14 and n-1 FSL's of FIG. 12 according to the following IOR:

$$P_{i,k} = \begin{cases} H_{i,k} & \text{if } k = 1 \\ H_{i,k}B^*_{0,k-1} + H_{i+1,k}B^*_{1,k-1} & \text{if } 1 < k \leq n \end{cases} \quad (23)$$

$$B_j = B^*_{j,n}$$

where $H_{i,k}$'s are as defined for relations (19) and (20) and $B_{j,k}{}^*$'s are as given in relations (22). Again, the PA of FIG. 6 and the PS of FIG. 15 are diagramatically identical except that the participants to the CLA-level are the non-zeros $H_{Z,k}$'s and the borrowers $B_{j,k}{}^d$ in FIG. 15 instead of the non-nines $H_{N,k}$'s and the carries $C_{j,k}{}^d$'s in FIG. 6, and that the CLA of FIG. 15 is extended to n stages instead of only n-1 stages for the PA of FIG. 6 so that the borrowers $B_0$ and $B_1$ of the PS of FIG. 15 are produced directly from the CLA-level.

Figure 16A:
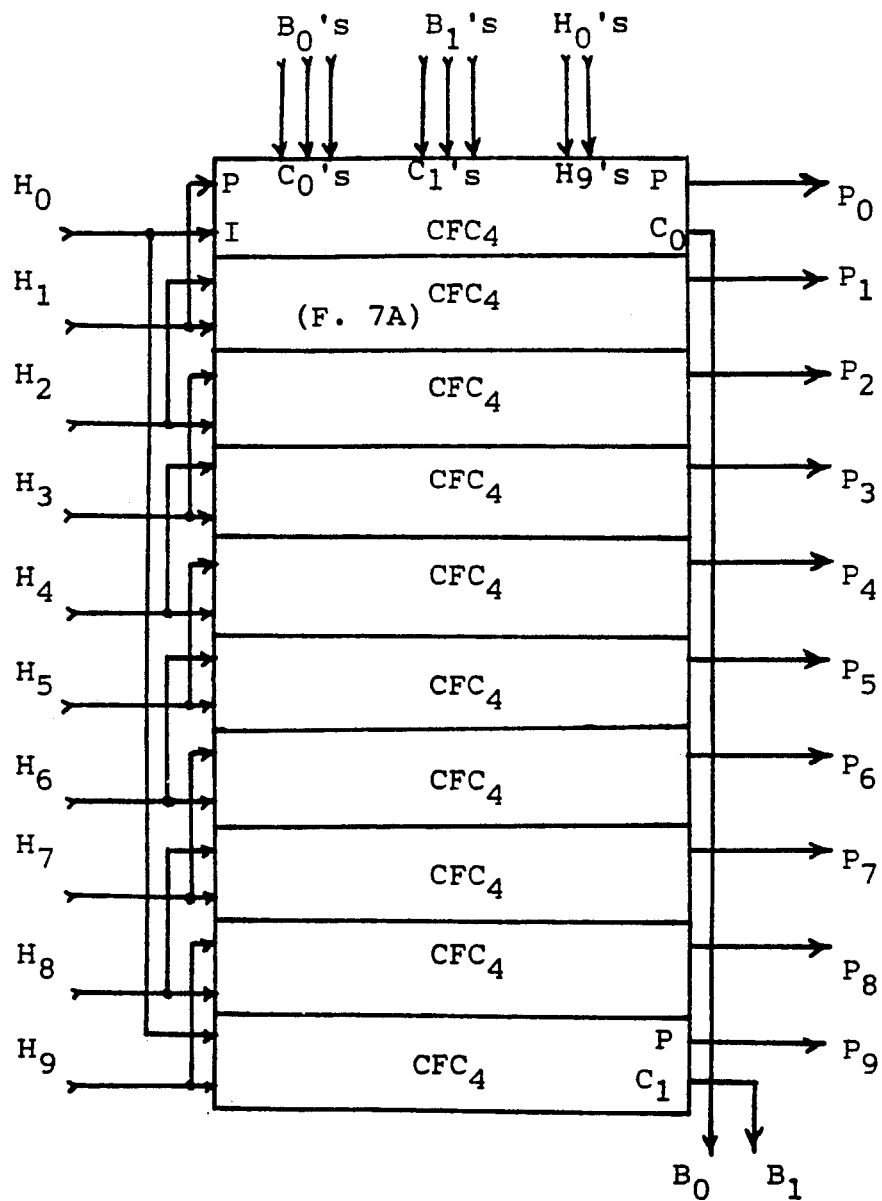
FIG. 16A is a block diagram for the combination of the CLA and the FSL at the $k^{th}$ decade (CFD$_k$)

FIG. 16A is a $CFD_k$ constructed from ten $CFC_k$'s of FIG. 7A according to the following IOR:

$$P_{i,k} = \begin{cases} H_{i,k}B^d_{0,k-1} + H_{i+1,k}B^d_{1,k-1} + \\ \sum_{t=1}^{k-2} \prod_{s=1}^{t} H_{0,k-s}(H_{i,k}B^d_{0,k-t-1} + \\ H_{i+1,k}B^d_{1,k-t-1}) \end{cases} \quad (24)$$

$$B_{j,k} = \sum_{t=1}^{k-1} \prod_{s=0}^{t-1} H_{0,k-s}B^d_{j,k-t}$$

where $H_{i,k}$'s are as defined for relations (19) and (20) and $B_{j,k}{}^d$'s are as defined for relations (21). The $CFD_k$ of FIG. 16A is identical to the $CFD_k$ of FIG. 7A except that the data inputs $J_{i,k}$'s are connected as in the $CFD_k$ of FIG. 16A as in the FSL of FIG. 12 and that the borrowers $B_0$ and $B_1$ of FIG. 16A are produced as in the FSL of FIG. 12 also.

Figure 16B:
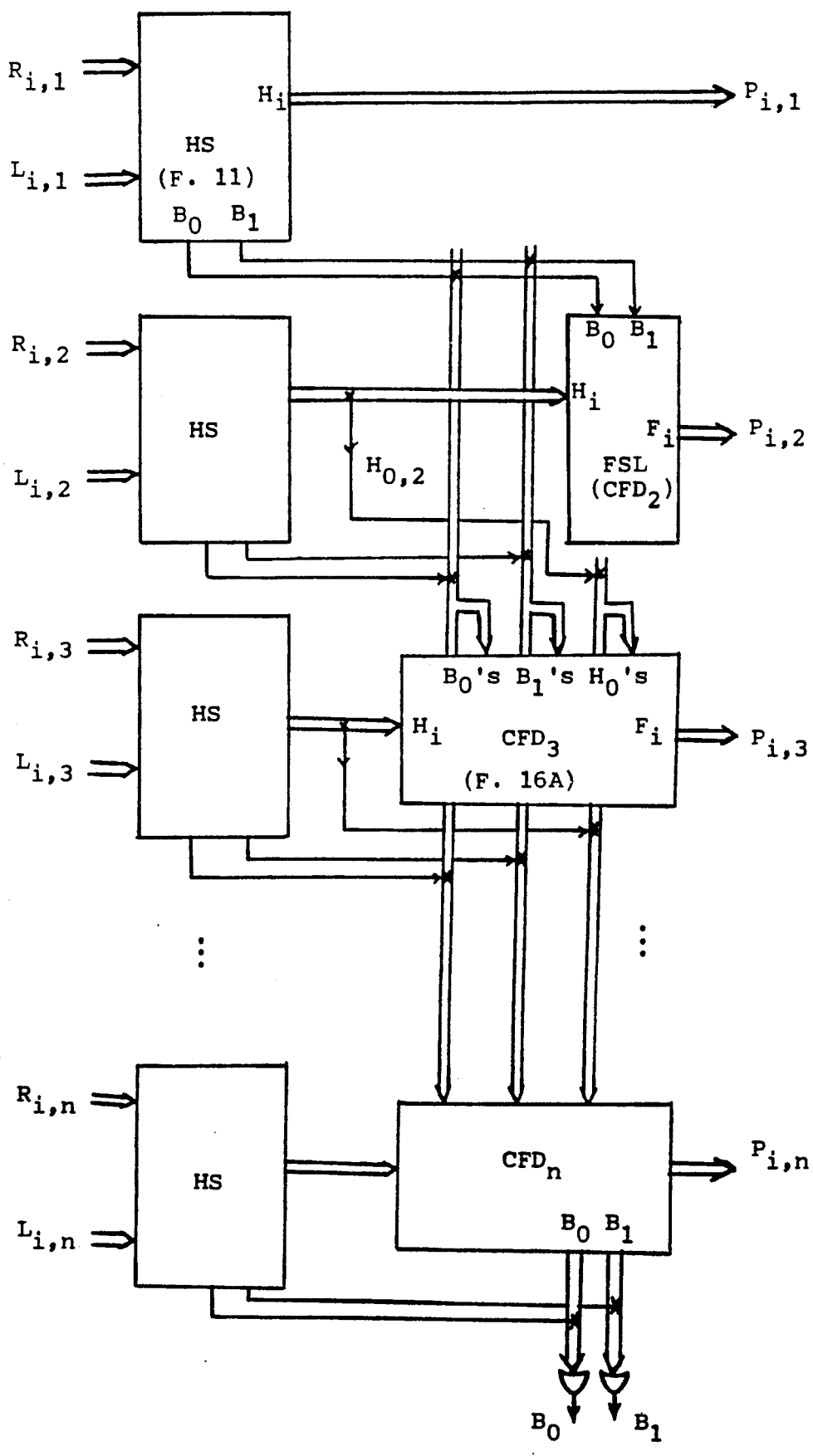
FIG. 16B is another block diagram for the PS.

FIG. 16B is another organization for the n-digit input PS constructed from n HS's of FIG. 11, a FSL of FIG. 12 and n-2 $CFD_k$'s of FIG. 16A according to the following IOR:

$$P^*_{i,k} = \begin{cases} H_{i,k} & \text{if } k = 1 \\ P_{i,k} & \text{if } 1 < k \leq n \end{cases} \quad (25)$$

$$B_j = B^d_{j,n} + B_{j,n}$$

where $H_{i,k}$ is as given in relations (19). $P_{i,k}$ and $B_{j,n}$ are as given in relations (24), and $B_{j,n}{}^d$ is as defined for relations (21). The PS of FIG. 16B and the PA of FIG. 7B are diagramatically identical and the purpose from the PS of FIG. 16B is also the same, namely, to have a four-gate levels PS. The similarities between the adders and the corresponding subtractors are very clear by now. The multi-level CLA adder of FIG. 10 can be modified into a multi-level CLA subtractor simply by replacing the HA's, the CLA's and the FAL's by their counterpart subtractor devices, respectively. This is the end of the implementation of step 1 of ALG 2. Next, the implementation of step 2 of the same algorithm.

Figure 17:
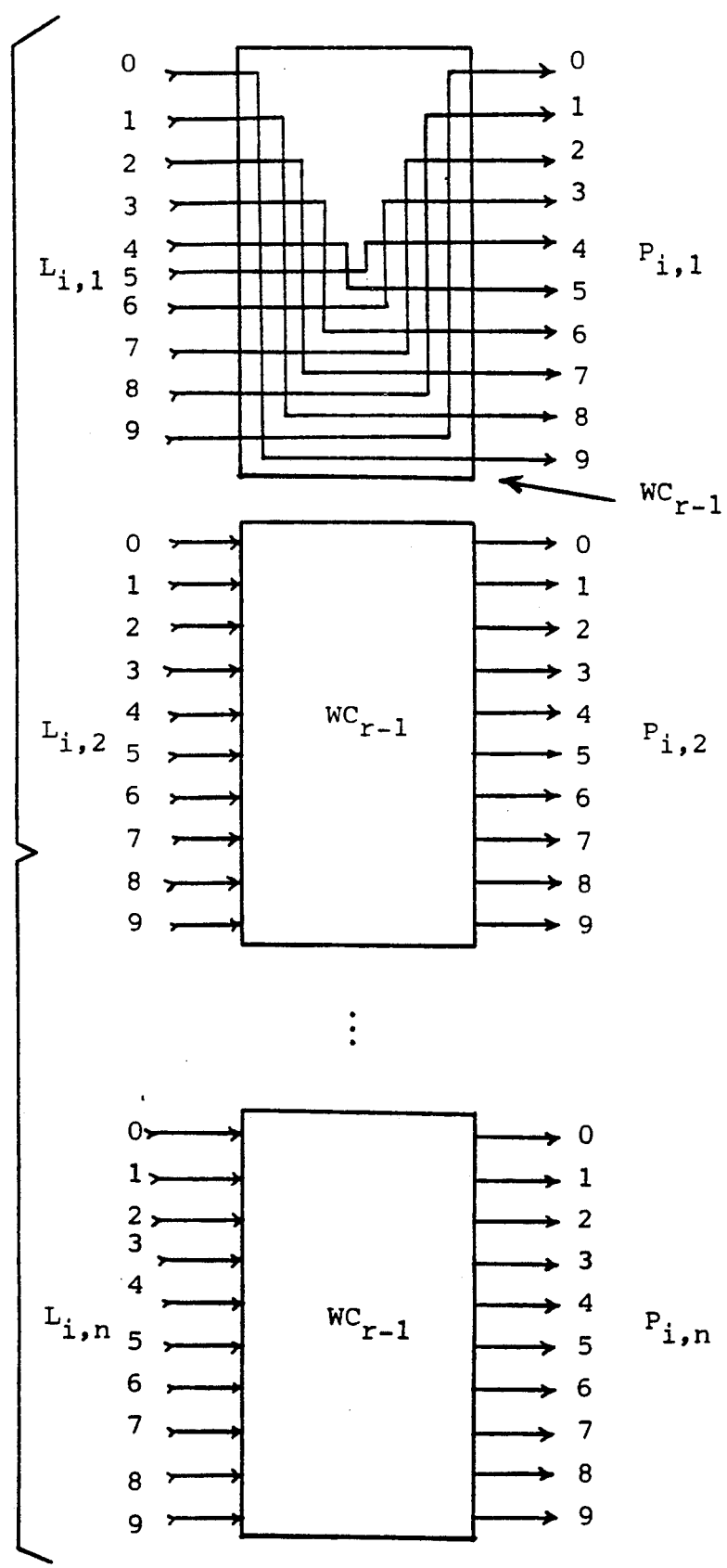
FIG. 17 is an organization for a TPC r-1's wire complementor (WC$_{r-1}$)

FIG. 17 is a $WC_{r-1}$ constructed from n identical wire cells (WC) according to the following IOR:

$$C_9(L_{i,k}) = L_{9-i,k} \quad (26)$$

where $L_{i,k}$ (for i=0, 1, ..., r-1 and k=1, 2, ..., n) denotes the inputs and $C_9(L_{i,k})$ denotes the outputs. FIG. 17 together with relation (26) show the simplicity of performing some arithmetic operations as taking the r−1's complement according to the TP-code, where the IOR is obtained directly from the definition of the operation without going through the steps of ALG 1 and the hardware implementation has negligible cost and negligible time delay. In general, however, it is known that the implementations of unary operations, as taking the r−1's complement, are much simpler than those of non-unary operations.

Figure 18A:
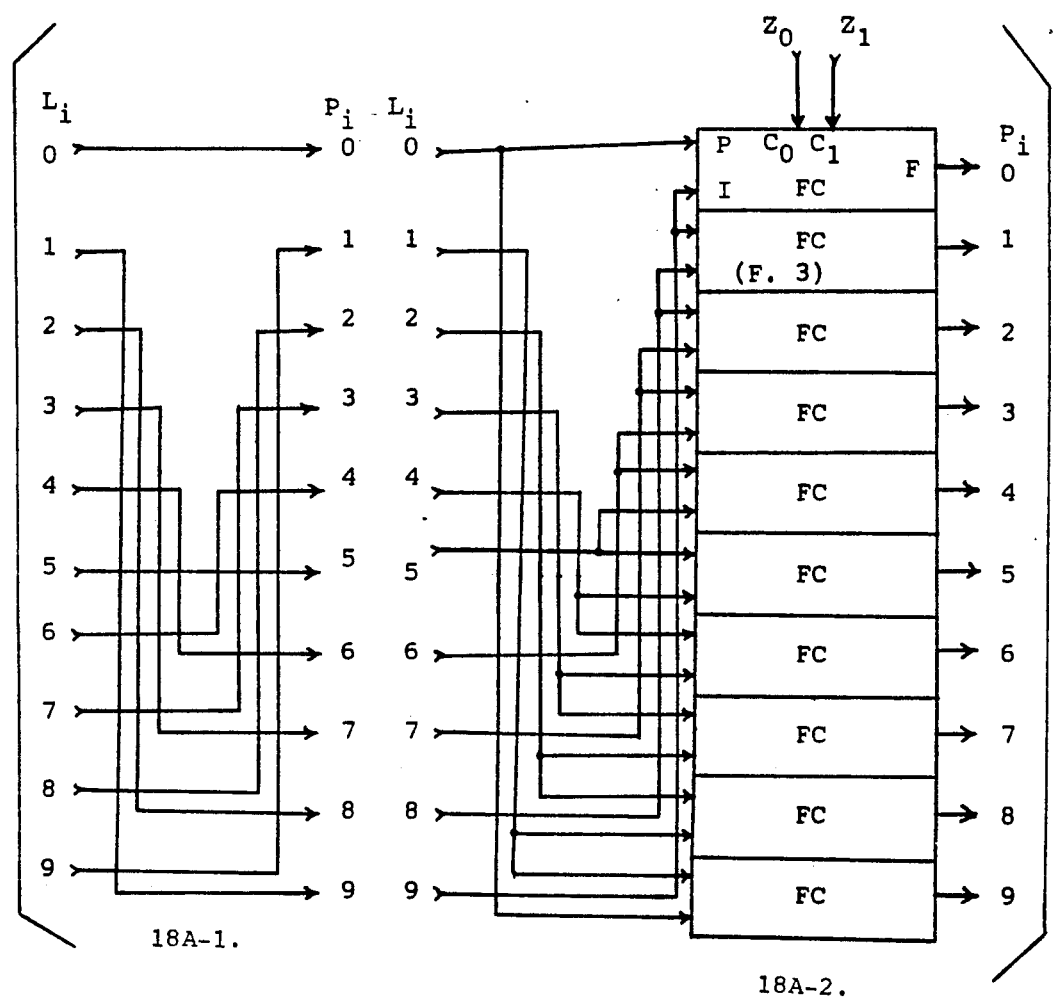

FIGS. 18A-1(2) are rCL's for a LSD and a non-LSD, respectively, drawn according to the following IOR:

$$P_i = \begin{cases} L_{10-i} & \text{for LSD} \\ L_{9-i}Z_0 + L_{10-i}Z_1 & \text{for non-LSD} \end{cases} \quad (27)$$

where $L_{10}=L_0$, $Z_0$ and $Z_1$ are control variables, and $L_i$ is as defined for relation (26). The first equation of relations (27) is similar to relation (26) and accordingly FIG. 18A-1 is formed from a wire cell similar to the WC of FIG. 17, while the second equation is similar to the first equation of relations (5) and accordingly FIG. 18A-2 is constructed from ten FC's of FIG. 3 so that the carries $C_0$ and $C_1$ are replaced by the variables $Z_0$ and $Z_1$, respectively, the P's and the I's of the FC's are supplied by the 10's and 9's complements of the inputs $L_i$, respectively, as indicated in the second equation of relations (27). Again, relations (27) are obtained directly from the definition of the 10's complement.

Figures 1, 2, 3, 18B:
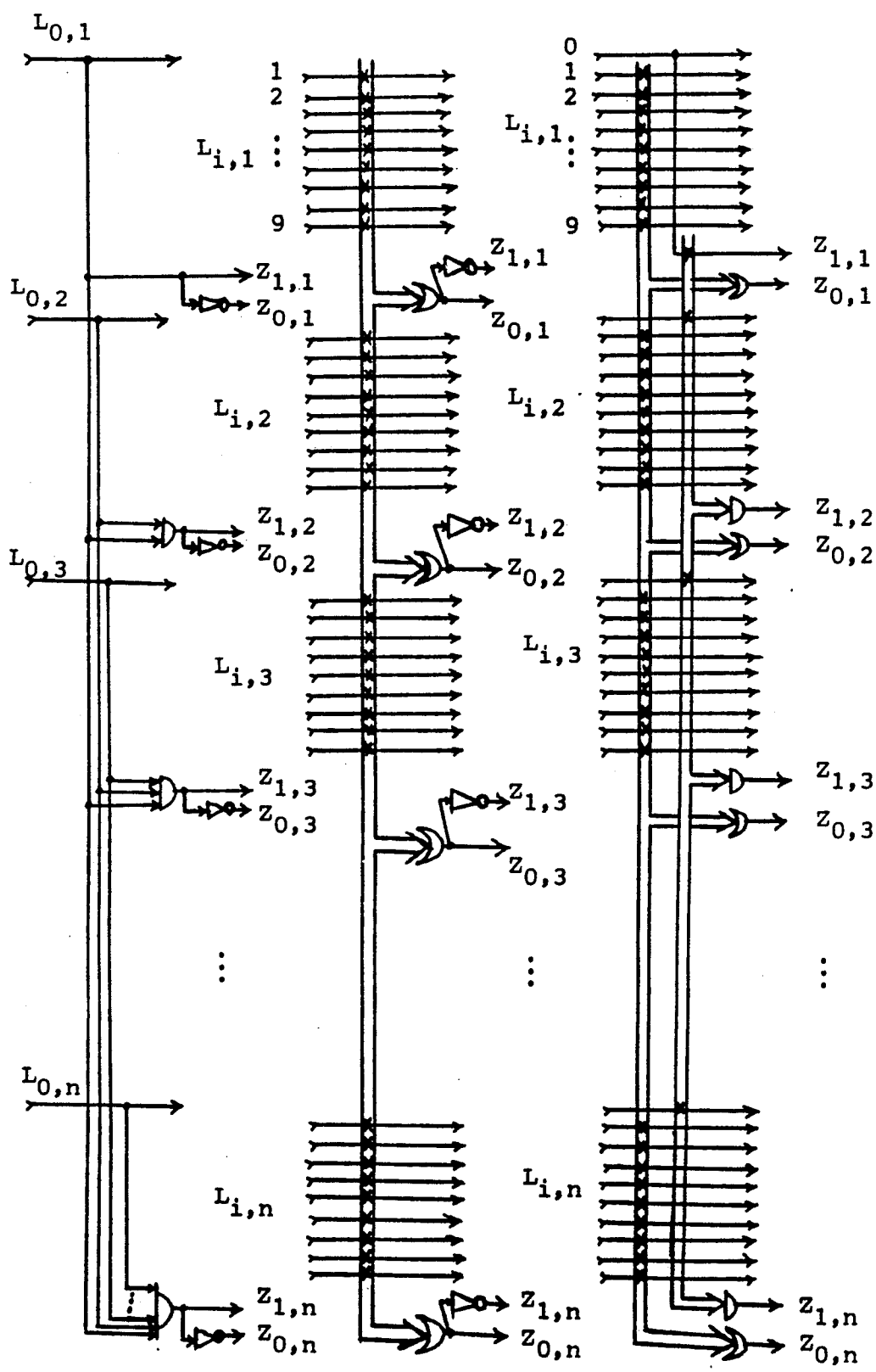

FIGS. 18B-1 (2 and 3) are three organizations for the DZD drawn according to the following IOR:

$$Z_{1,k} = \prod_{t=1}^{k} L_{0,t} = \left( \sum_{t=1}^{k} \sum_{i=1}^{9} L_{i,t} \right)' \quad (28)$$

$$Z_{0,k} = \sum_{t=1}^{k} \sum_{i=1}^{9} L_{i,t} = (Z_{1,k})'$$

where $L_{i,k}$'s are as defined for relation (26). The reason for calling such devices DZD's is because they are needed for the decrement operation as will be seen later on. The decrement operation effects all the digits up to and including the first non-zero LSD. Means that it must be determined whether the k LSD's are zeros or not which precisely what the variables $Z_{1,k}$ and $Z_{0,k}$ of relations (28) tell, respectively, assuming that the first non-zero LSD is in the $k+1^{th}$ position. The 10's complement operation is similar to some extend to the decrement operation since the actual 10's complement operation (i.e., 10-i for i=1, 2, ..., 9) is performed only on the first non-zero LSD, because the 10's complement of a zero in a position less than that of the first non-zero LSD is zero and the 10'complement of a digit in a position greater than that of the first non-zero LSD is the 9's complement of that digit. Means that it must be determined also for the 10's complement operation whether the k LSD's are zeros or not.

Figure 18C:
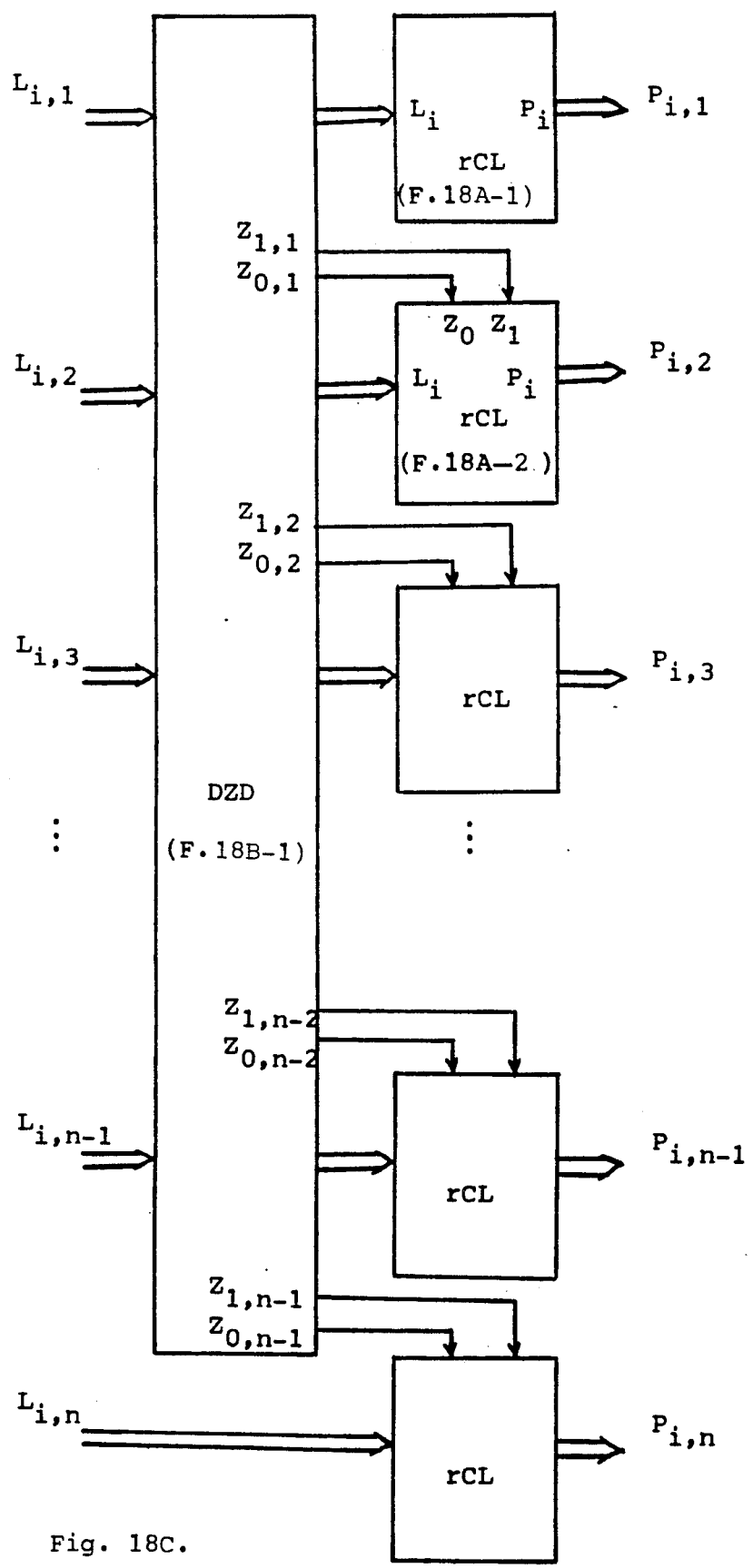
FIG. 18C is a block diagram for a TPC r's complementor (rC)

FIG. 18C is a rC constructed from a DZD of FIG. 18B, n rCL's of FIG. 18A according to the following IOR:

$$P_{i,k} = \begin{cases} L_{10-i,k} & \text{if } k = 1 \\ L_{9-i,k}Z_{0,k-1} + H_{10-i,k}Z_{1,k-1} & \text{if } 1 < k \leq n \end{cases} \quad (29)$$

where $L_{i,k}$'s are as defined for relation (26) and $Z_{j,k}$'s are as given in relations (28).

Figure 19A:
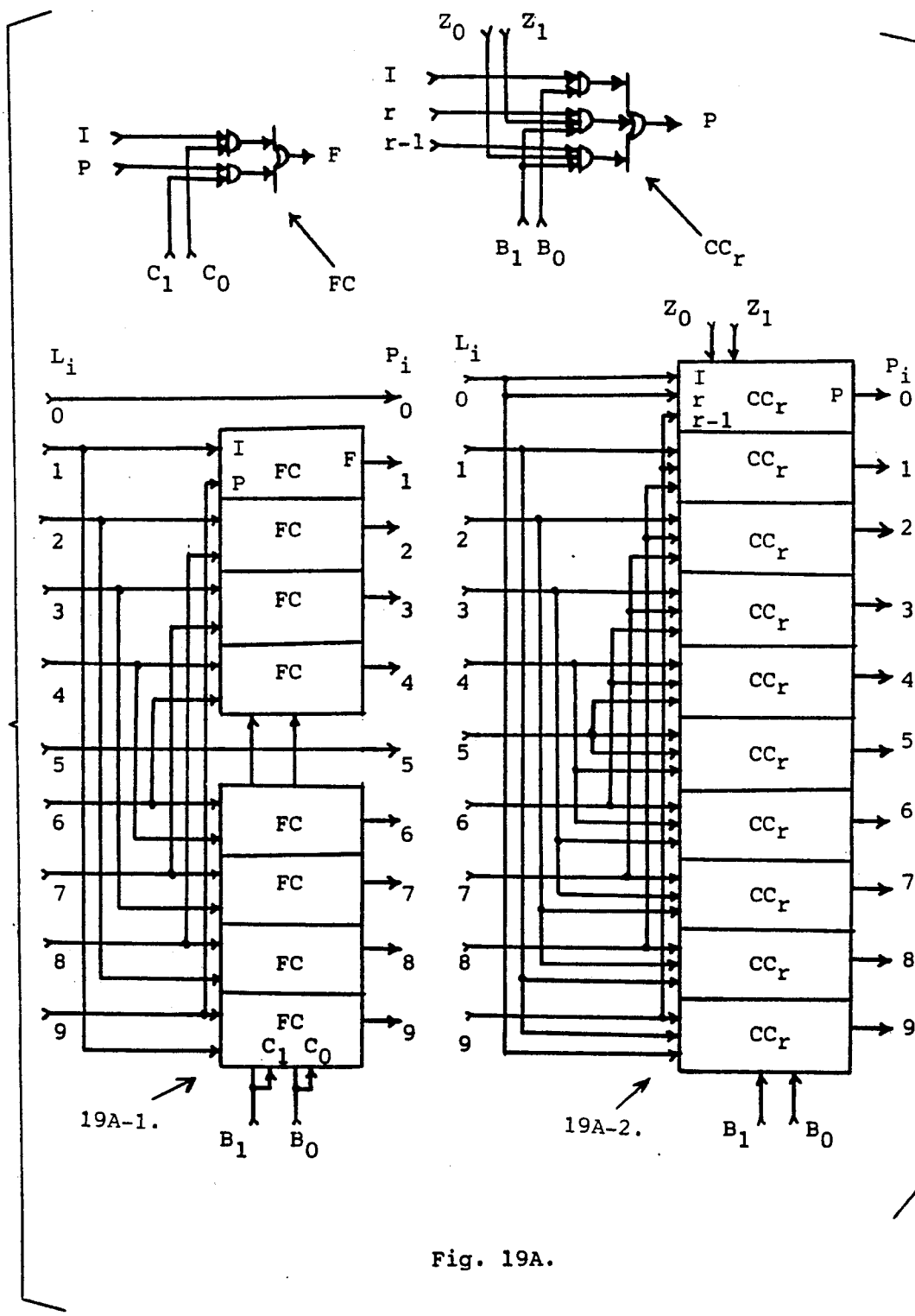
Figure 19B:
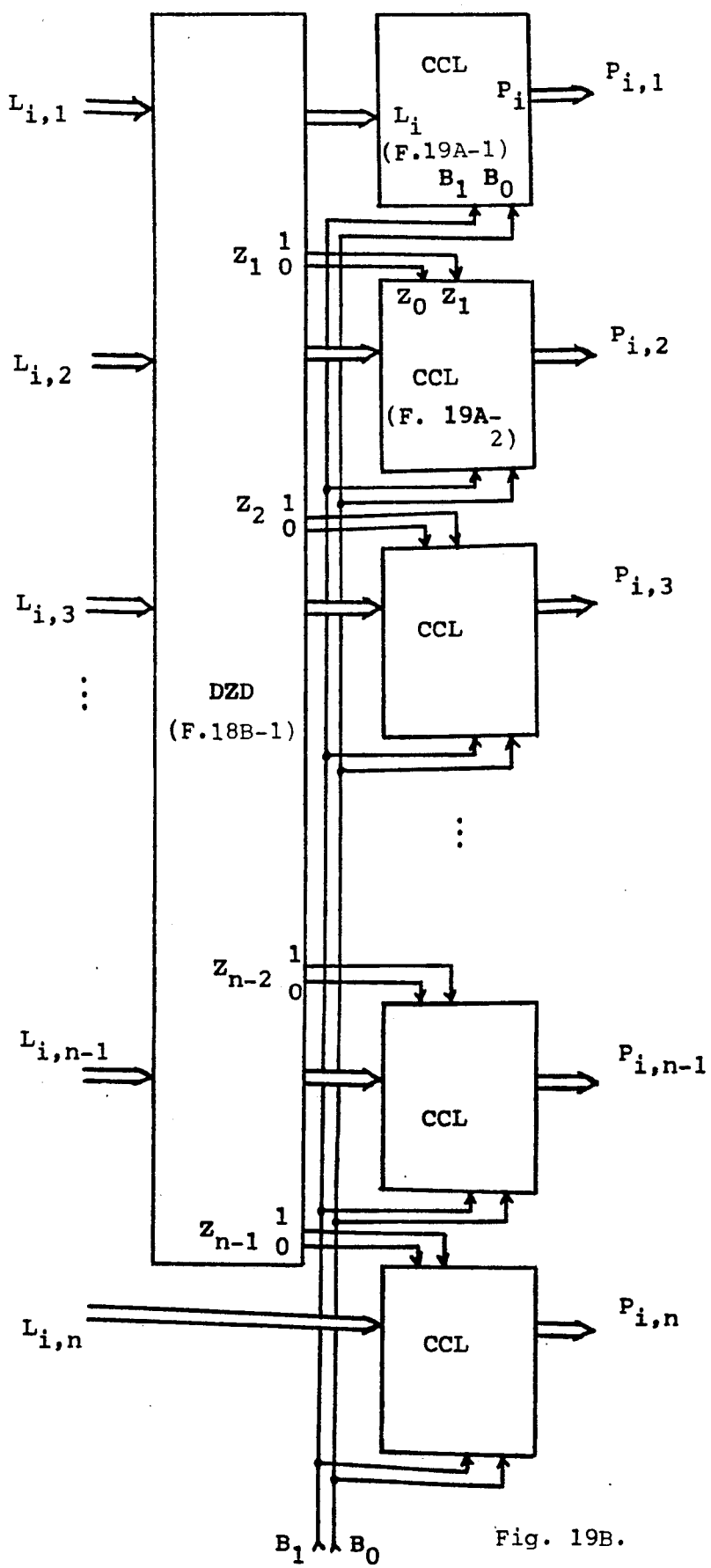
FIG. 19B is a block diagram for a TPC r's conditional complementor(rCC)

FIGS. 19B-1(2) are CCL's for a LSD and a non-LSD, resp., drawn according to the following IOR:

$$P_i = \begin{cases} L_{10-i} & \text{if } LSD \text{ and } i = 0 \text{ or } 5 \\ L_iB_0 + L_{10-i}B_1 & \text{if } LSD \text{ and } i \text{ is neither 0 nor 5} \\ L_iB_0 + L_{9-i}B_1Z_0 + L_{10-i}B_1Z_1 & \text{if } non\text{-}LSD \end{cases} \quad (30)$$

where $B_0$, $B_1$, $Z_0$, and $Z_1$ are control variables, and $L_i$ is as defined for relation (26). The 10's complement of bits zero and five of the LSD are zero and five themselves and accordingly these two bits are passed unchanged in FIG 19A-1. The 10's conditional complements for the remaining eight bits are implement by eight FS's of FIG. 3 wherein: the carries $C_0$ and $C_1$ are replaced by the conditional control variables $B_0$ and $B_1$, respectively, the I's inputs are fed by the corresponding data inputs, respectively, and the P's inputs are fed by the 10's complements of their I's inputs, respectively, as indicated by the second equation of relations (30). FIG. 19A-2 is constructed from ten r's conditional complement cells($CC_r$). Every $CC_r$ has three data inputs, I, r, and r−1 denote, respectively, pass the corresponding input, pass the r's complement of the input of the I, and pass the r−1's complement of the input of the I; and four control variables, common to all such cells, $Z_0$ and $Z_1$ with the same meaning of relation (28), $B_0$ and $B_1$ denote pass the input unchanged and take the r's complement of the input, respectively.

FIG. 19B is a rCC constructed from a DZD of FIG. 18B and n CCL's of FIGS. 19A according to the following IOR:

$$P_{i,k} = \begin{cases} L_{10-i,k} & \text{if } k = 1 \text{ and } i = 0 \text{ or } 5 \\ L_{i,k}B_0 + L_{10-i,k}B_1 & \text{if } k = 1 \text{ and } i \text{ neither 0 nor 5} \\ L_{ik}B_0 + L_{9-i,k}B_1Z_{0,k-1} + L_{10-i,k}B_1Z_{1,k-1} & \text{if } 1 < k \end{cases} \quad (31)$$

where $L_{i,k}$'s are as defined for relation (26), $B_j$ and $Z_{j,k}$ are as given above. The rCC of FIG. 19B passes its input unchanged if $B_0=1$ while takes the 10's complement of such input if $B_1=1$ which is exactly the implementation of step 2 of ALG 2.

Figure 20:
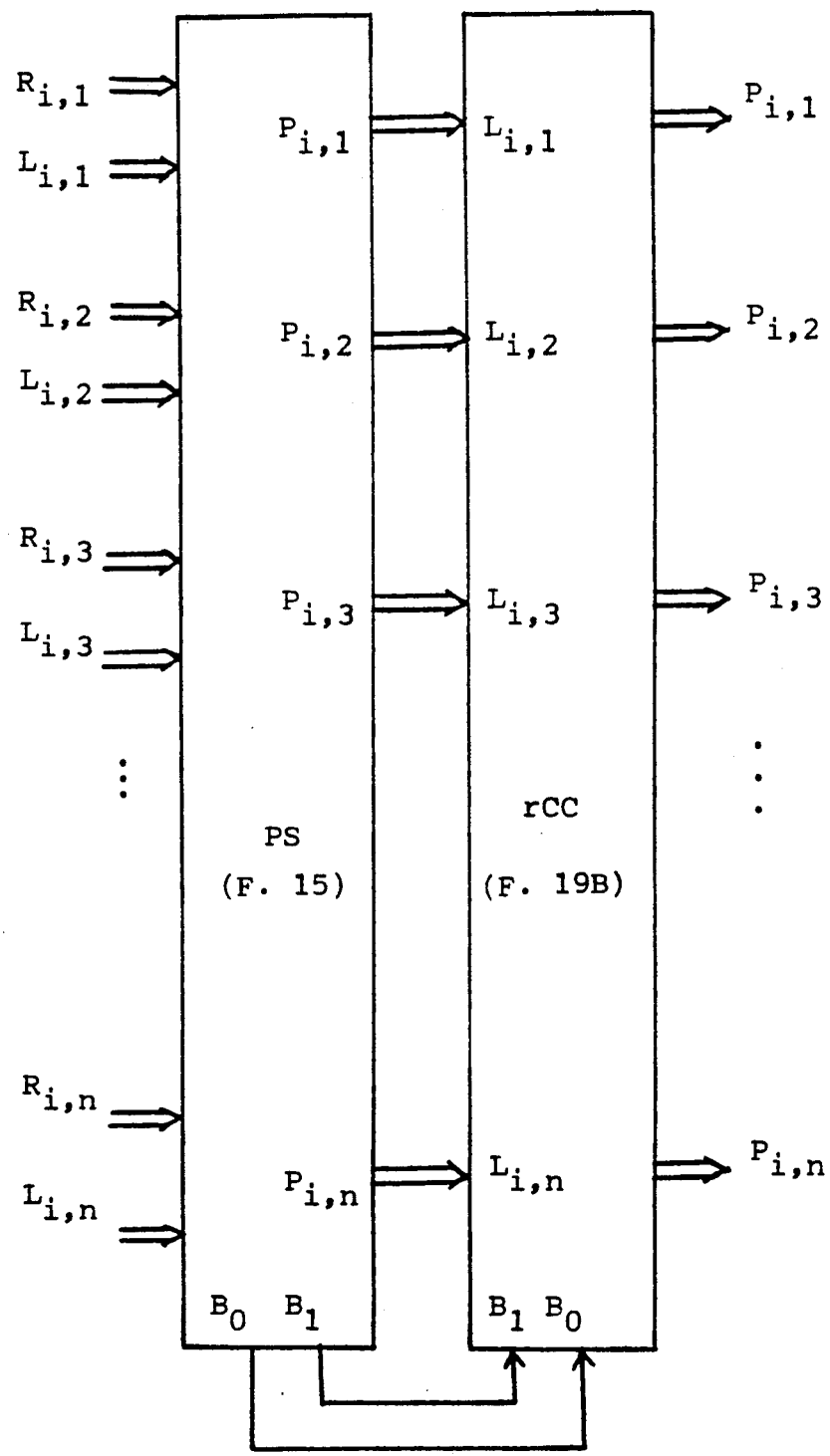
FIG. 20 is a block diagram for a TPC corrected parallel subtractor(CPS)

FIG. 20 is a CPS constructed from a PS of FIG. 15 and a rCC of FIG. 19B according to the following IOR:

$$P^c_{i,k} = \begin{cases} P_{10-i,k} & \text{if } k = 1 \text{ and } i = 0 \text{ or } 5 \\ P_{i,k}B_0 + P_{10-i,k}B_1 & \text{if } k = 1 \text{ and } i \text{ neither 0 nor 5} \\ P_{ik}B_0 + P_{10-i,k}B_1Z_{1,k-1} + P_{9-i,k}B_1Z_{0,k-1} & \text{if } 1 < k \end{cases} \quad (32)$$

where $P_{i,k}$'s and $B_j$'s are as given in relations (23) and $Z_{j,k}$'s are as given in relations (28). FIG. 20 shows the complete implementation of ALG. 2. The output of such CPS is negative if $B_1=1$. To be continued next on the comparison devices FIGS. 21-1 through 22B.

Figures 1, 21:
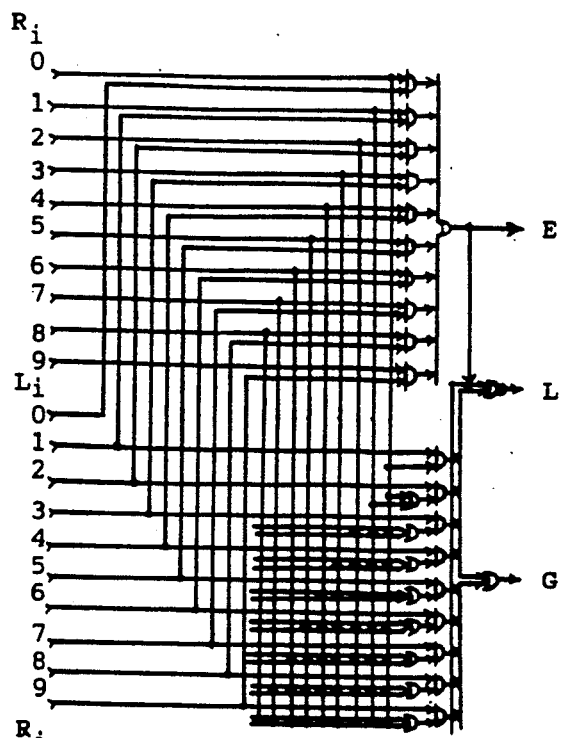
Figures 2, 21:
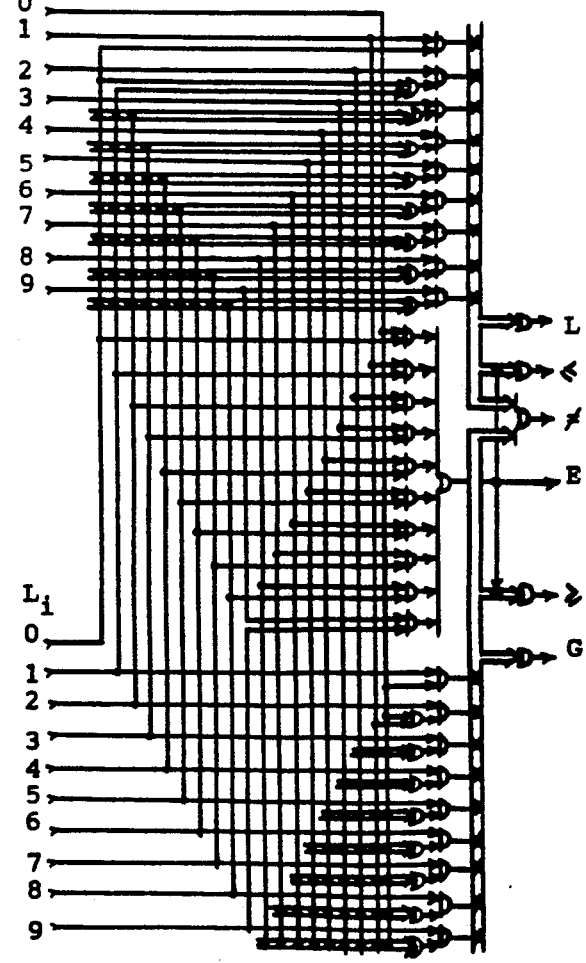
Figures 3, 21:
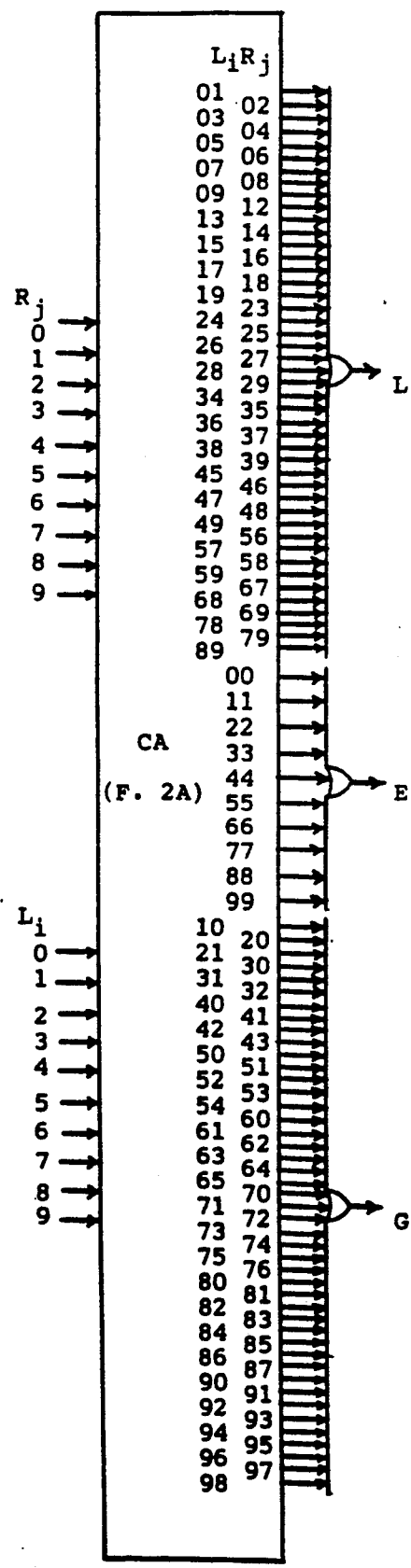

FIGS. 21-1(2 3 and 4) are TC's drawn according to the following IOR:

$$E = \sum_{j=0}^{9} L_jR_j; \quad S_i = \sum_{j=0}^{i} R_j; \quad T_i = \sum_{j=0}^{i} L_j \quad (33)$$

$$L = \sum_{j<i} L_jR_i = \sum_{i=1}^{9} R_iT_{i-1} = (G + E)'; \text{"}\leq\text{"} = L + E$$

$$G = \sum_{j>i} L_jR_i = \sum_{i=1}^{9} L_iS_{i-1} = (L + E)'; \text{"}\geq\text{"} = G + E$$

$$H_X = (E)' = \left(\sum_{j=0}^{9} L_jR_j\right)' = L + G = \text{"}\neq\text{"}$$

where $L_i$ and $R_j$ (for i, j=0, 1, ..., 9) are as defined for relations (3). Relations (33) are obtained by applying ALG 1 directly for the compare operations where the entries of the operation table here are either G, E, or L depends on whether i of $L_i$ is greater than, equal to, or less than j of $R_j$, respectively. FIGS. 21-1, 21-2 and 21-4 are special organizations for TC while the TC of FIG. 21-3 is combined from a CA of FIG. 2A and three OR gates showing that the compare operation agrees with the add and the subtract operations with respect to the AND-implementation, but differs with them regarding the OR-implementation in case of the formulae of such operations are transformed into corresponding input-output relations.

FIGS. 22A-1(2 and 3) are EG, LGG, and $C_{CLA}$, respectively, drawn according to the following IOR:

$$G_k = G_k^d + \sum_{t=1}^{k-1}\prod_{s=0}^{t-1}E_{k-s}^d \ G_{k-t}^d = G_k^d + \quad (34)$$

$$\sum_{t=1}^{k-1} G_{k,t}G_{k-t}^d = (L_k + E_k)'$$

$$L_k = L_k^d + \sum_{t=1}^{k-1}\prod_{s=0}^{t-1}E_{k-s}^d L_{k-t}^d = L_k^d +$$

$$\sum_{t=1}^{k-1} G_{k,t}L_{k-t}^d = (G_k + E_k)'$$

$$E_k = \prod_{s=1}^{k} E_s^d = \left(\sum_{s=1}^{k} H_{x,s}\right)' = G_{k,k}$$

$$G_{k,t} = \prod_{s=0}^{t-1} E_{k-s}^d = \left(\sum_{s=1}^{t} H_{x,s}\right)'$$

where $G_k^d$, $L_k^d$, and $E_k^d$ denote the direct compare functions greater than, less than, and equal to, respectively, of the $k^{th}$ TC, and $H_{x,k}$ (for $k = 1, 2, \ldots, n$) is as given in relations (33). The EG and the LGG are both drawn directly according to relations (34) while the $C_{CLA}$ is combined from the modules EG and LGG according to relations (34).

Figures 4, 5C:
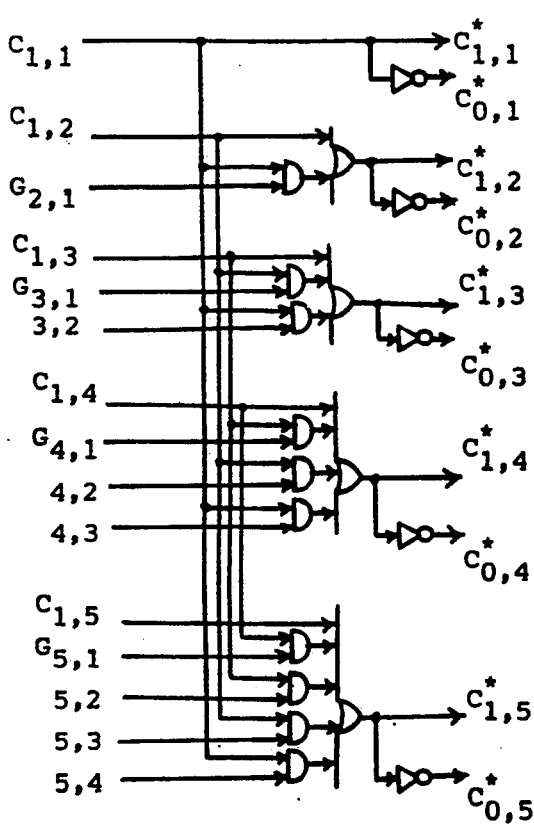
Figures 5, 5C:
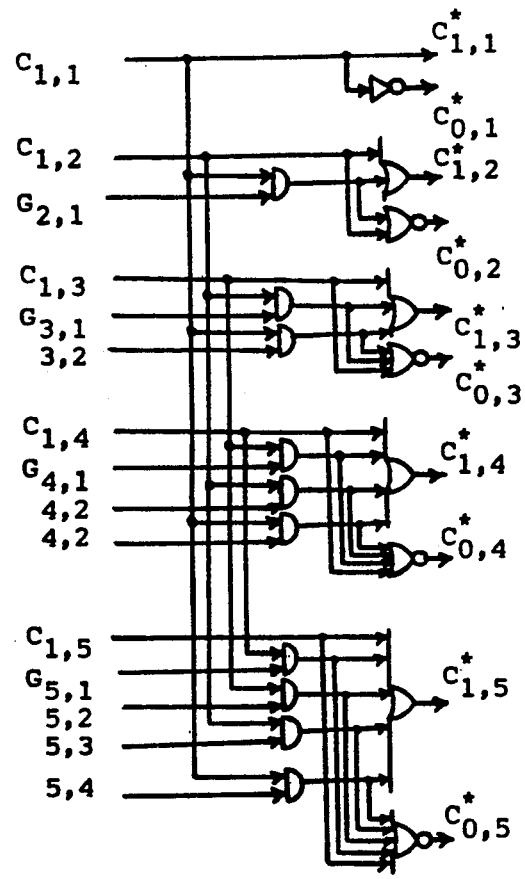
Figures 5, 5C, 6:
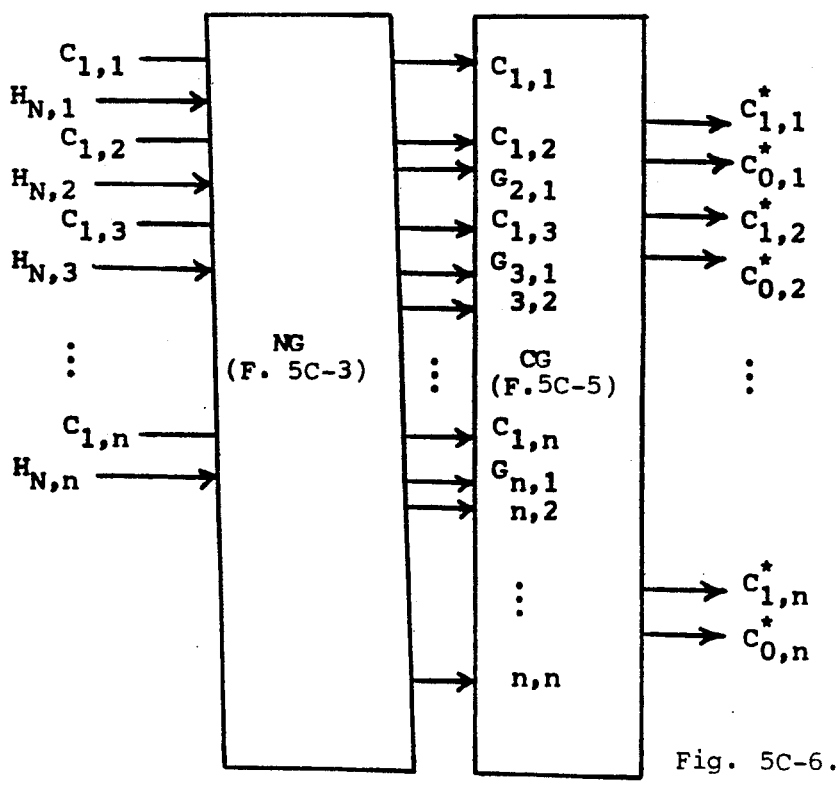
FIG. 6 is a block diagram for a TPC parallel adder(PA)
Figure 6:
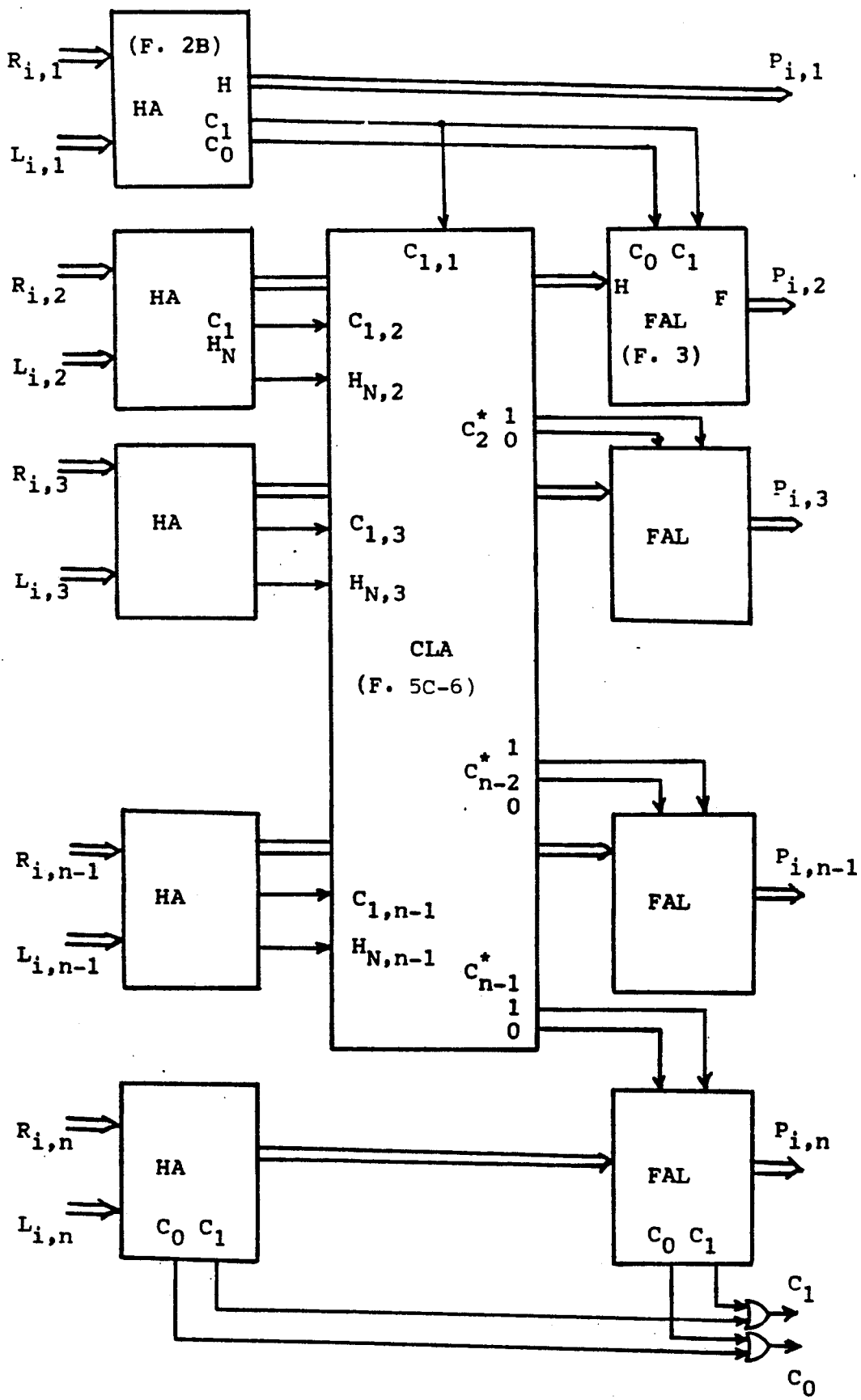
Figure 22B:
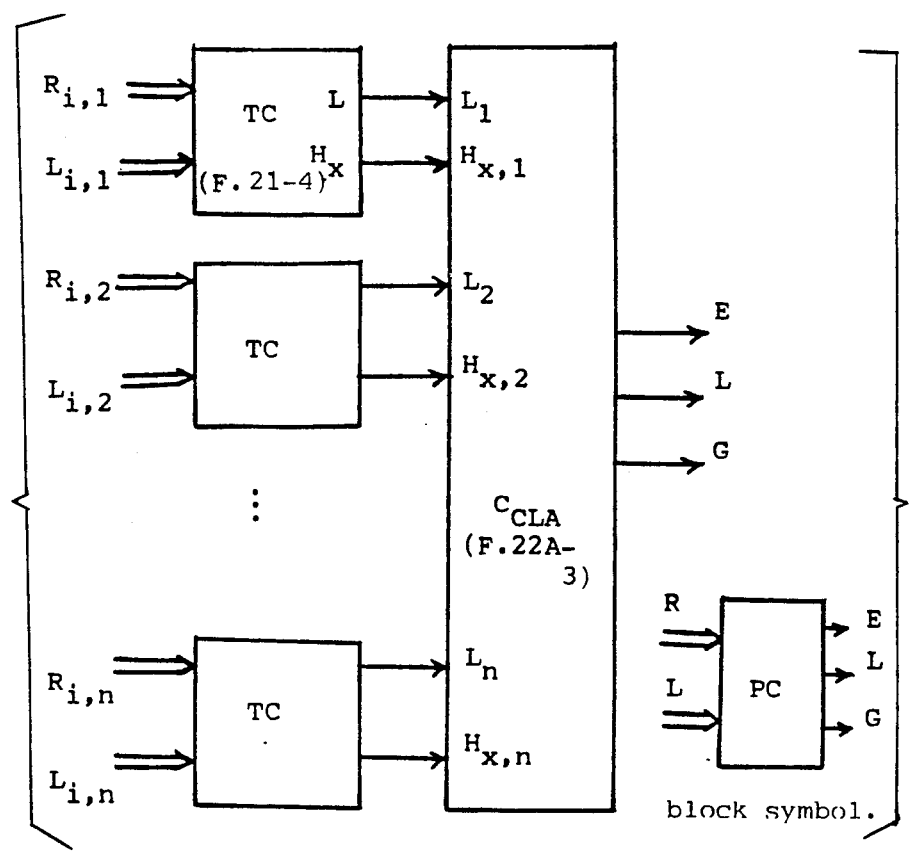

FIG. 22B is a PC comprised from n TC's of FIG. 21-4 coupled to a n-input $C_{CLA}$ of FIG. 22A-3 according to relations (34). The absence of the FAL-level from the PC of FIG. 22B means that such PC is cheaper(costs less) and has less time delay than the PA or the PS of FIGS. 6 and 15, respectively. Also, the compare and the subtract operations are very related; the compare output functions $L_k$, $E_k$, and $H_{x,k}$ and the subtract output functions $B_{l,k}$, $H_{0,k}$, and $H_{Z,k}$ are respectively, the same. Furthermore, FIGS 22A-1 and 22A-2 correspond to the last segments of FIGS. 5C-3 and 5C-5, respectively, showing that the CLA of the compare operation is basically proper part of the CLA of the subtract operation and consequently showing that the CLA's are not only the same for all radices but also the same for the add, subtract, and compare operations. The description continued next on Boolean devices FIGS. 23-26.

Figures 1, 23:
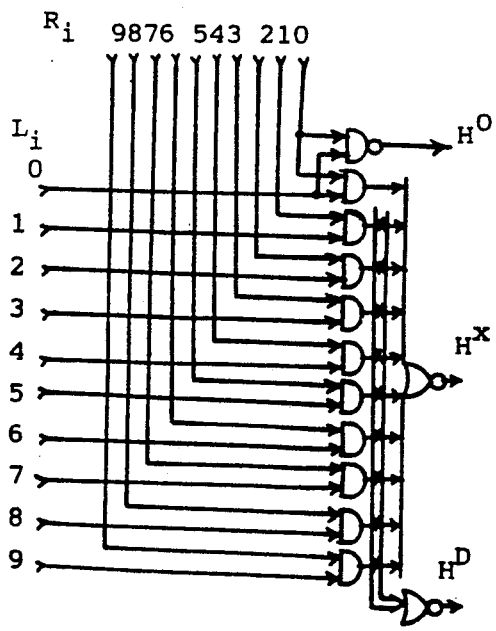
Figures 2, 23:
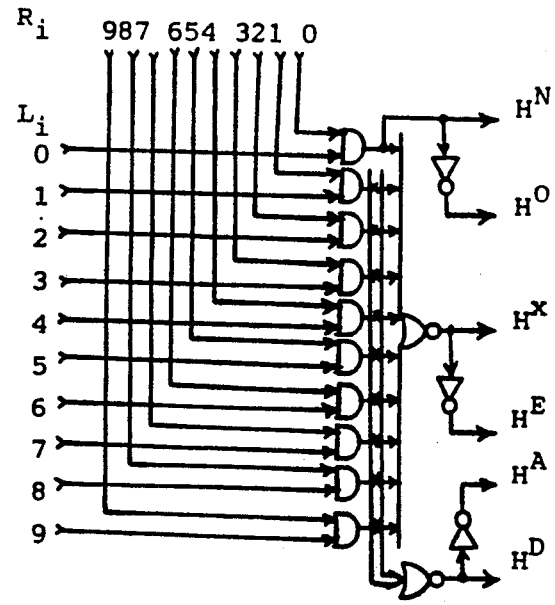

FIGS. 23-1(2) are two organizations for a TB drawn according to the following IOR:

$$H_i^T = L_i; \ H_i^c = L_{9-i} \quad (35)$$

$$H^A = \sum_{i=1}^{9} L_i R_i; \ H^N = L_0 R_0$$

$$H^O = (H^N)' = H^A + H^x = \sum_{\substack{0 \le i,j \le 9 \\ i+j \ne 0}} L_i R_j$$

$$H^x = (H^E)' = \sum_{\substack{0 \le i,j \le 9 \\ i \ne j}} L_i R_j$$

where $H_i^T$, $H_i^c$, $H^A$, $H^O$, $H^x$, $H^D$, $H^N$, and $H^E$ denote the Boolean functions transfer, complement, AND, OR, XOR, NAND, NOR, and equivalence, respectively, $L_i$ and $R_j$ (for $i,j = 0, 1, \ldots, 9$) are as defined for relations (3).

FIGS. 24-1(2) are two organizations for a n-stage $B_{CLA}$ drawn according to the following IOR:

$$B_A = (B_D)' = \prod_{k=1}^{n} H_k^A; \ B_D = (B_A)' = \sum_{k=1}^{n} H_k^D \quad (36)$$

$$B_N = (B_O)' = \prod_{k=1}^{n} H_k^N; \ B_O = (B_N)' = \sum_{k=1}^{n} H_k^O$$

$$B_E = (B_x)' = \prod_{k=1}^{n} H_k^E; \ B_x = (B_E)' = \sum_{k=1}^{n} H_k^x$$

where $H^A$, $H^D$, $H^O$, $H^N$, $H^x$, and $H^E$ are as given in relations (35), $B_A$, $B_D$, $B_O$, $B_N$, $B_x$, and $B_E$ denote, respectively, the same functions at the n-digit input level.

Figure 25:
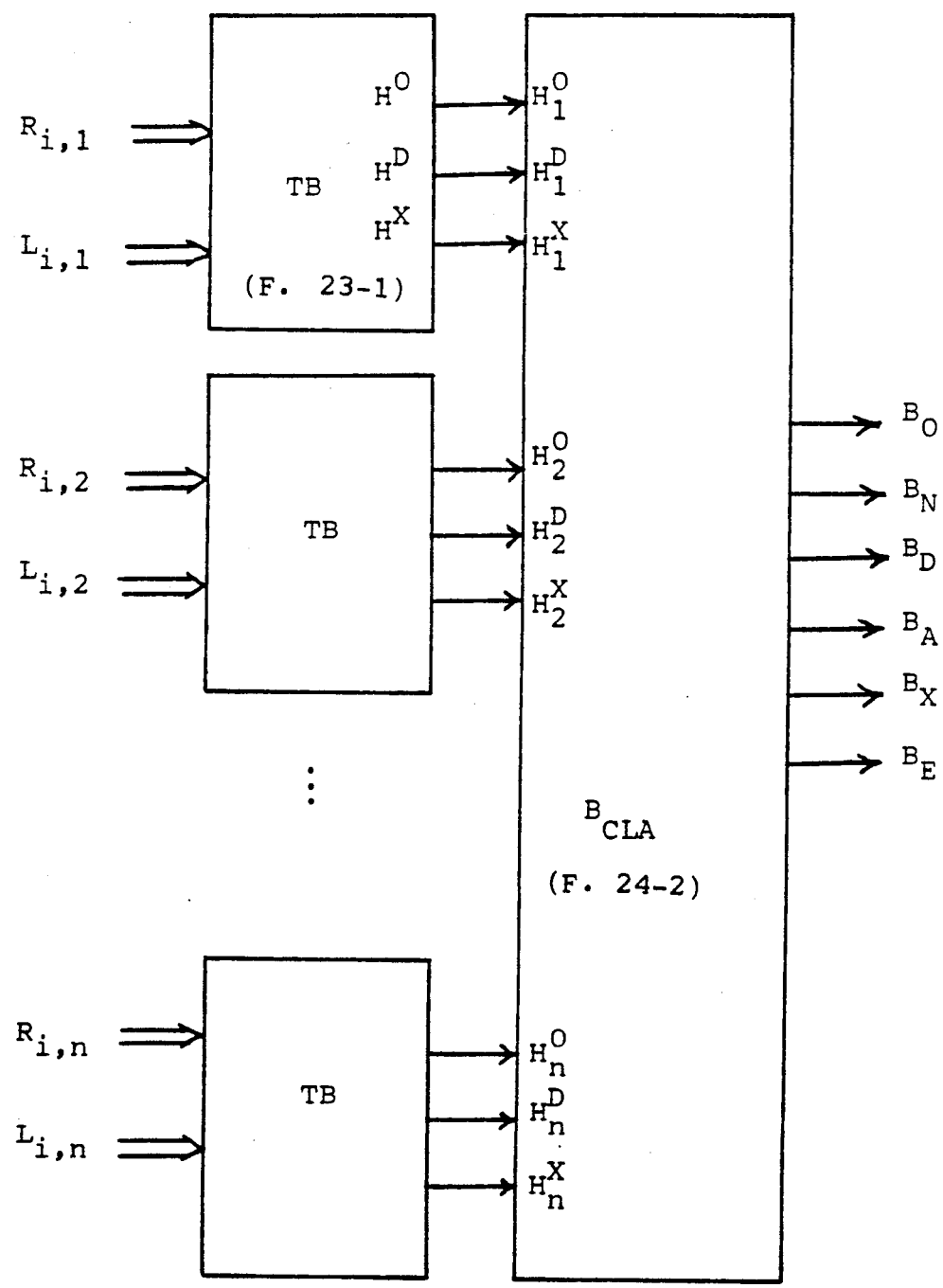
FIG. 25 is a block diagram for a TPC parallel Booleaner(BP)

FIG. 25 is a n-digit input PB constructed from n TB's of FIGS. 23 coupled to a n-stage $B_{CLA}$ of FIGS. 24 according to relations (36). The $B_{CLA}$ of FIG. 24-2 is a one-gate level circuit making the PB of FIG. 25 a three-gate levels circuit with no AND gate fan-in limitation which means that such PB is cheaper and faster(has less time delay) than the PC of FIG. 22B.

Figure 26:
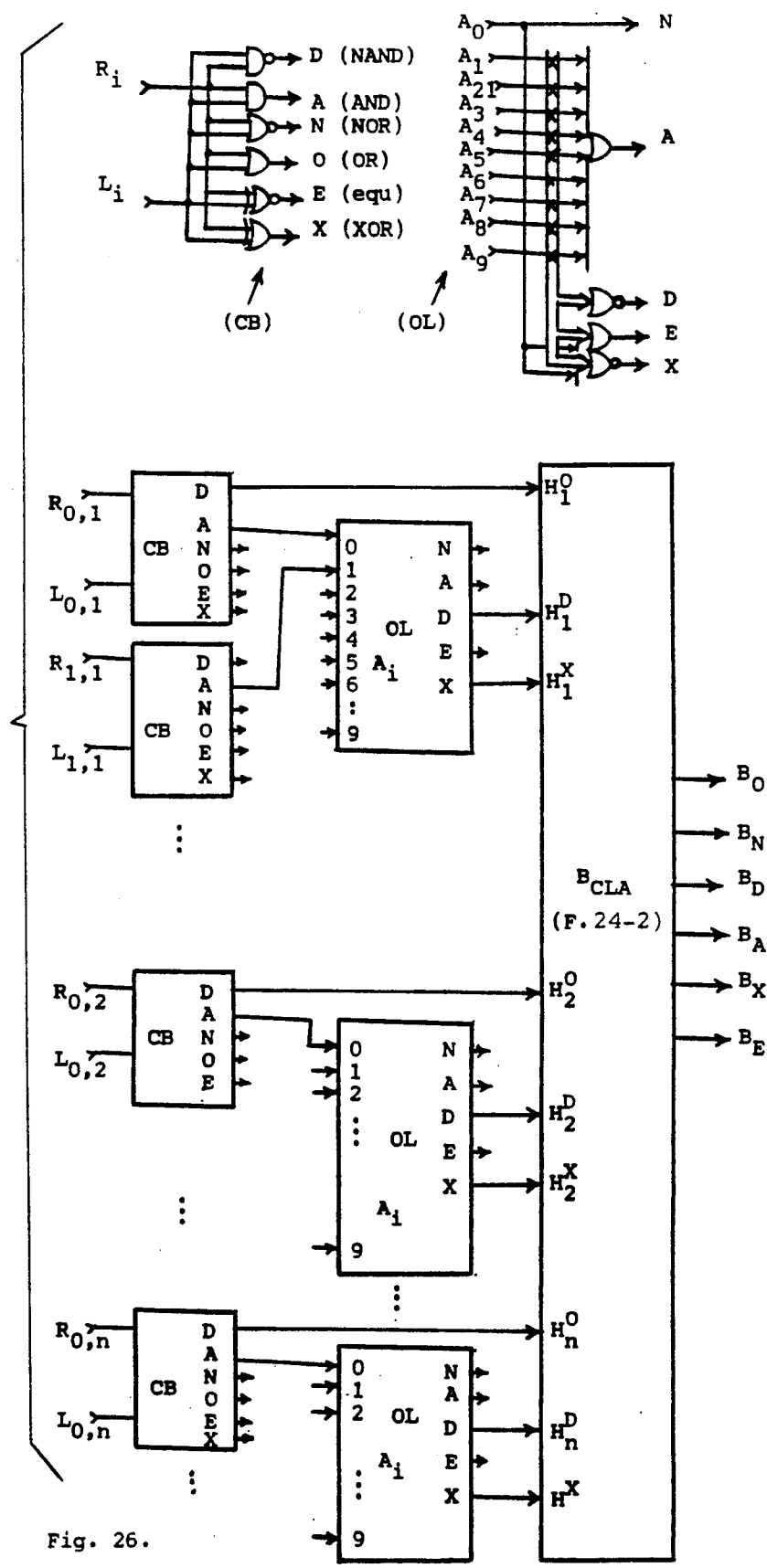

FIG. 26 is a TOB constructed from rn conventional Booleaners(CB) at the bit level(B-level), n TB's of FIG. 23-1 at the digital level(D-level), and a one $B_{CLA}$ of FIG. 24-2 at the word level(W-level) according to the following input-output relations:

| function | B-level | D-level | W-level | (37) |
|---|---|---|---|---|
| A | $A = L_i R_i$; | $H^A = \sum_{i=1}^{9} L_i R_i$; | $B_A = \left(\sum_{k=1}^{n} H_k^D\right)'$ | |
| D | $D = (L_i R_i)'$; | $H^D = \left(\sum_{i=1}^{9} L_i R_i\right)'$; | $B_D = \sum_{k=1}^{n} H_k^D$ | |
| O | $O = L_i + R_i$; | $H^O = (L_0 R_0)'$; | $B_O = \sum_{k=1}^{n} H_k^O$ | |
| N | $N = (L_i + R_i)'$; | $H^N = L_0 R_0$; | $B_N = \left(\sum_{k=1}^{n} H_k^O\right)'$ | |
| X | $X = L_i \oplus R_i$; | $H^x = \left(\sum_{i=0}^{9} L_i R_i\right)'$; | $B_X = \sum_{k=1}^{n} H_k^X$ | |
| E | $E = L_i \ R_i$; | $H^E = \sum_{i=0}^{9} L_i R_i$; | $B_E = \left(\sum_{k=1}^{n} H_k^X\right)'$ | |

$$H^D = (H^A)' = H^N + H^x$$

$$H^E = H^A + H^N = \sum_{i=0}^{9} L_i R_i$$

where A, D, O, N, X, and E denote AND, NAND, OR, NOR, XOR, and equivalence, respectively, H's and B's are as given in relations (35) and (36), respectively. Relations (35) are obtained by applying ALG 1 or the definition of the given Boolean operations. The output of the transfer operation is, be definition, the given input itself, i.e., $T(L_i)=L_i$. The complement of a given number is, by definition, the 9's complement of that number, i.e., $K=C_9(L)$. Drawing the operation table step is applied to the remaining six operations, where an entry in such a table is either 0 or 1 depends on the definition of the given operation. The entries of table AND are all zeros except the entries of the principal diagonal when the indices of $L_i$ and $R_j$ are both greater than zero. The entries of table NOR are all zeros except entry $L_0R_0$. The entries of table equivalence are all zeros except the entries of the principal diagonal. The entries of tables NAND, OR, and XOR are the complements of the corresponding entries of tables AND, NOR, and equivalence, respectively, where the reference is to Table 1 of ALG 1. The input-output relations at the n-digit input level are obtained by applying the related definitions. Only the implementations of the six binary operations are given in FIGS. 23, because the implementation of the transfer operation is as in the conventional system and the implementation of the complement operation is given in FIG. 17. The implementations of the given six binary Booleaner operations are instantaneous and involve the equivalent inputs only (i.e., only the cases $i=j$ among the values of i and j). Only the OR level (OL) of the TB of FIG. 23-1 is redrawn for the D-level in FIG. 26 because the functions of the first level (i.e., the AND level) of such TB is obtained from the B-level. The inputs of the W-level are $H^{O'}$s coming from the B-level, $H^{D'}$s and $H^{X'}$s coming from the D-level; the inputs of the D-level are A's coming from the B-level; and the inputs of the B-level are $L_{i,k}$ and $R_{i,k}$ for $i=0, 1, 2, \ldots, 9$ and $k=1, 2, \ldots, n$. The numbers of outputs are 6rn for the B-level, 6n for the D-level, and only 6 for the W-level. Control variables or multiplexers could be used for reducing the number of outputs at any level. The description continued next on multiplication devices FIGS. 27 through 36.

Figure 27:
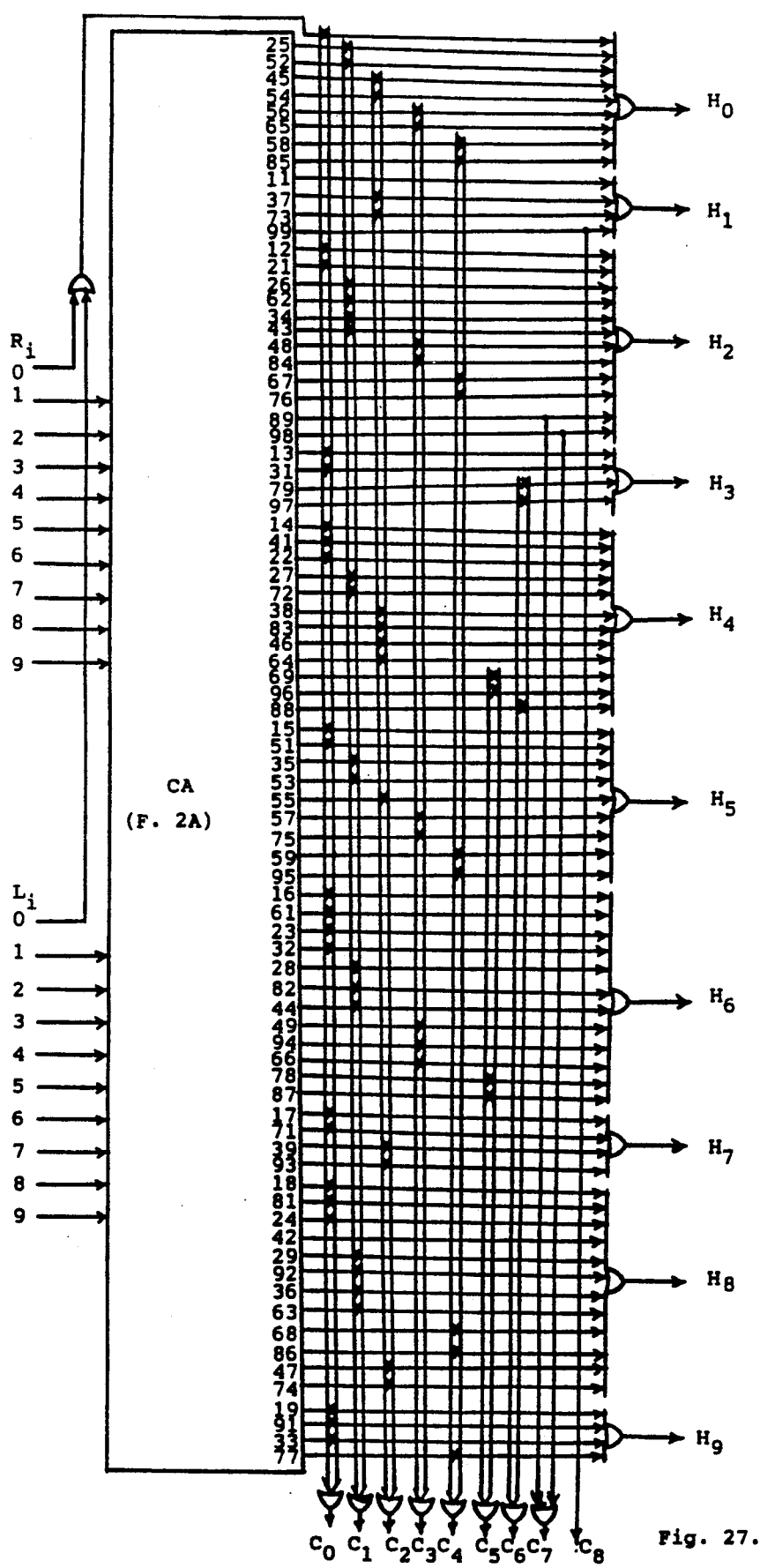
FIG. 27 is a logic diagram for a TPC half multiplier(HM)

FIG. 27 is a HM drawn according to the following IOR:

$$H_i = \sum_{0 \leq j, k \leq 9} L_j R_k \text{ such that } (j \cdot k) = i(\text{mod } 10) \quad (38)$$

$$C_i = \sum_{0 \leq j, k \leq 9} L_j R_k \text{ such that } \lfloor (j \cdot k)/10 \rfloor = i$$

where $L_j$ and $R_k$ are as defined for relations (3).

Figure 28A:
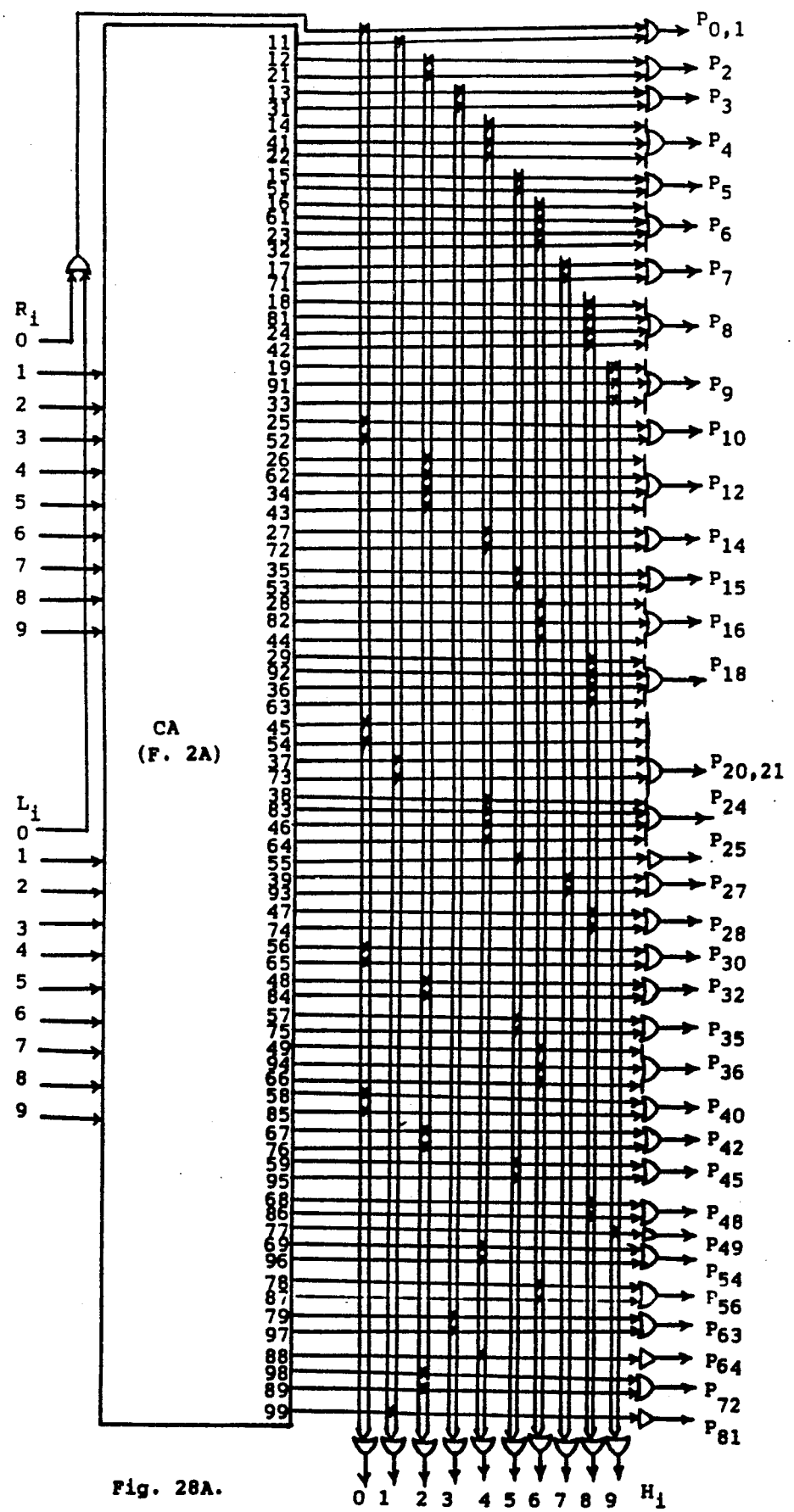
FIG. 28A is a logic diagram for a TPC full multiplier oriented HM(FHM)

FIG. 28A is a FHM drawn according to the following IOR:

$H_i$'s are as given in relations (38)

$$P_k = \begin{cases} L_j R_j \text{ if } k \text{ is neither 0, 1, 20, nor 21} \\ L_0 + R_0 + L_1 R_1 \text{ if } k \text{ is either 0 or 1} \\ L_4 R_5 + L_5 R_4 + L_3 R_7 + L_7 R_3 \text{ if } k \text{ is either 20 or 21} \end{cases} \quad (39\text{-a})$$

where $L_i$ and $R_j$ are as defined for relations (3).

Figure 28B:
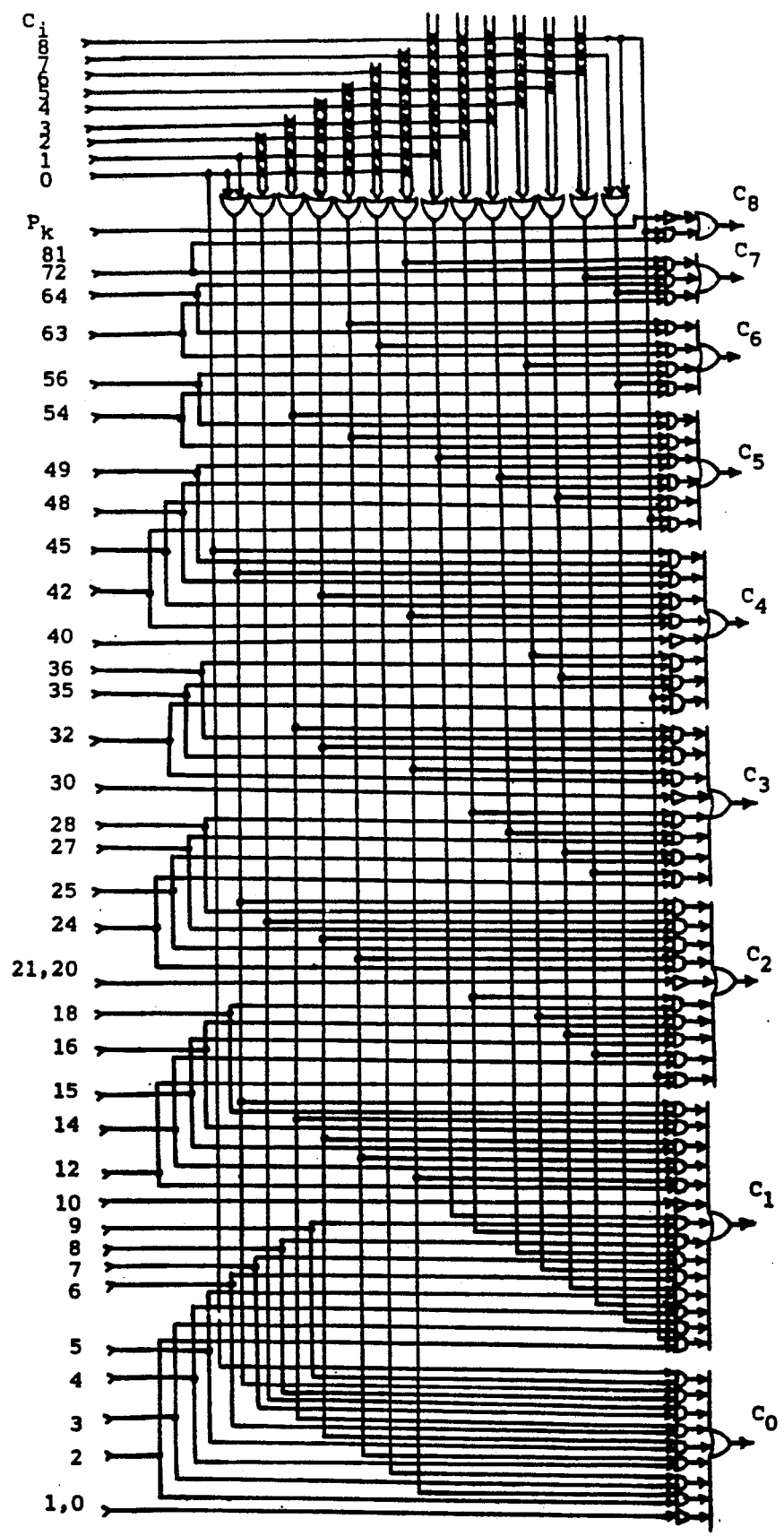
FIG. 28B is a logic diagram for a TPC full multiplier oriented carry logic(FMCL)

FIG. 28B is a FMCL drawn according to the following IOR:

$$C_i^* = \begin{cases} P_k \text{ if } \lfloor k/10 \rfloor = i \\ + \sum_{k,j} P_k S_j \text{ if } \lfloor (k+j)/10 \rfloor = i \\ + \sum_{k,s} P_k T_s \text{ if } \lfloor (k+s)/10 \rfloor = i \end{cases} \quad (39\text{-b})$$

where $$S_j = \sum_{t=0}^{j} C_t, \quad T_s = \sum_{t=s}^{8} C_t.$$

$C_t$'s (for $t=0, 1, \ldots, 8$) denote the carry inputs, and $P_k$'s are as given in relations (39-a).

Figure 28C:
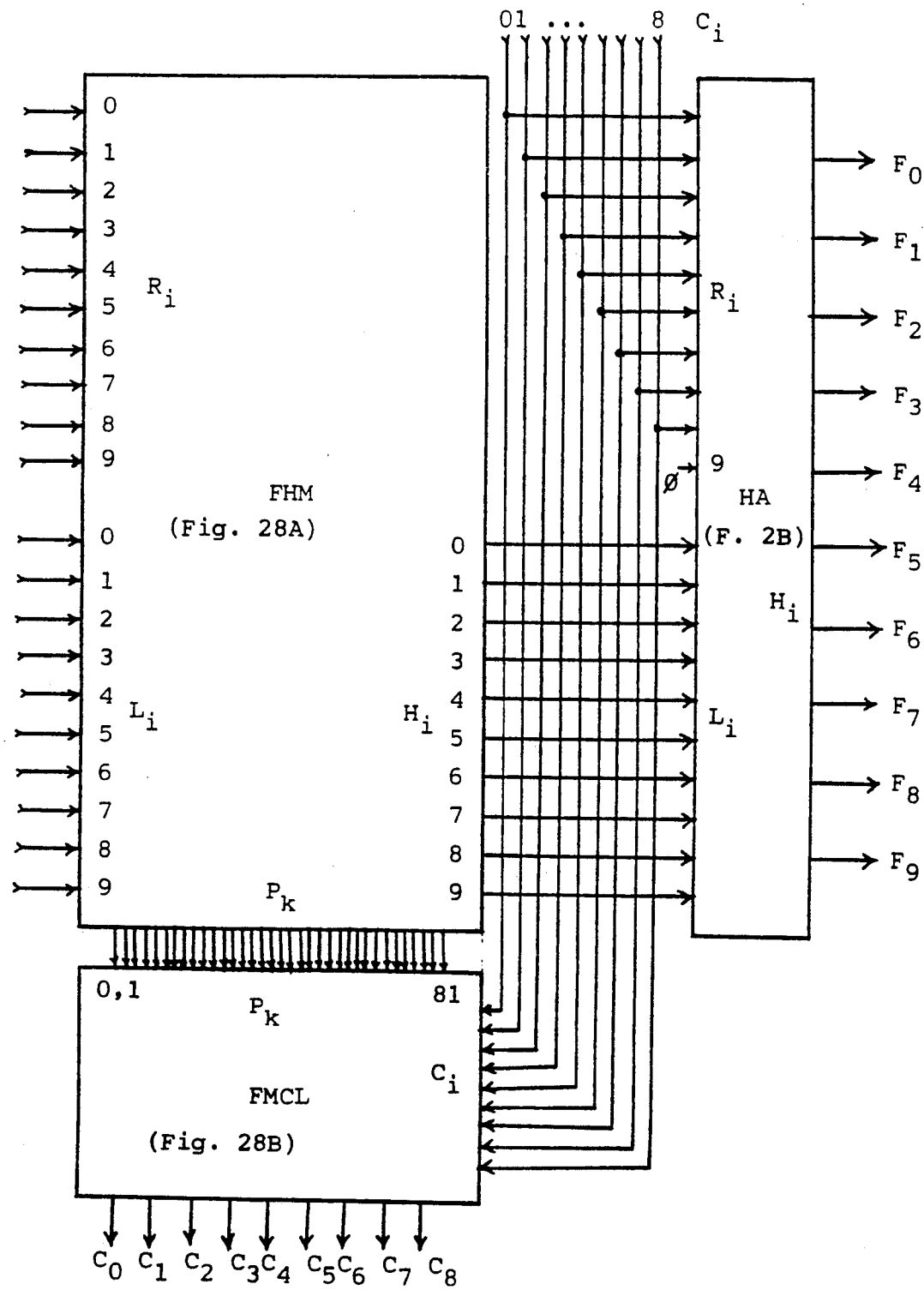
FIG. 28C is a block diagram for a TPC full multiplier(FM)

FIG. 28C is a FM constructed from a FHM of FIG. 28A, a HA of FIG. 2B, and a FMCL of FIG. 28B according to the following IOR:

$$F_i = \sum_{j,t} H_j C_t \text{ such that } (j+t) = i(\text{mod } 10) \quad (39\text{-c})$$

$$C_i = C_i^*$$

where $H_j$'s are as given in relations (38), $C_t$'s and $C_i^*$'s are as given in relations (39-b). The HM of FIG. 27 and the FM of FIG. 28C are designed according to direct application to ALG. 1.

Figure 29:
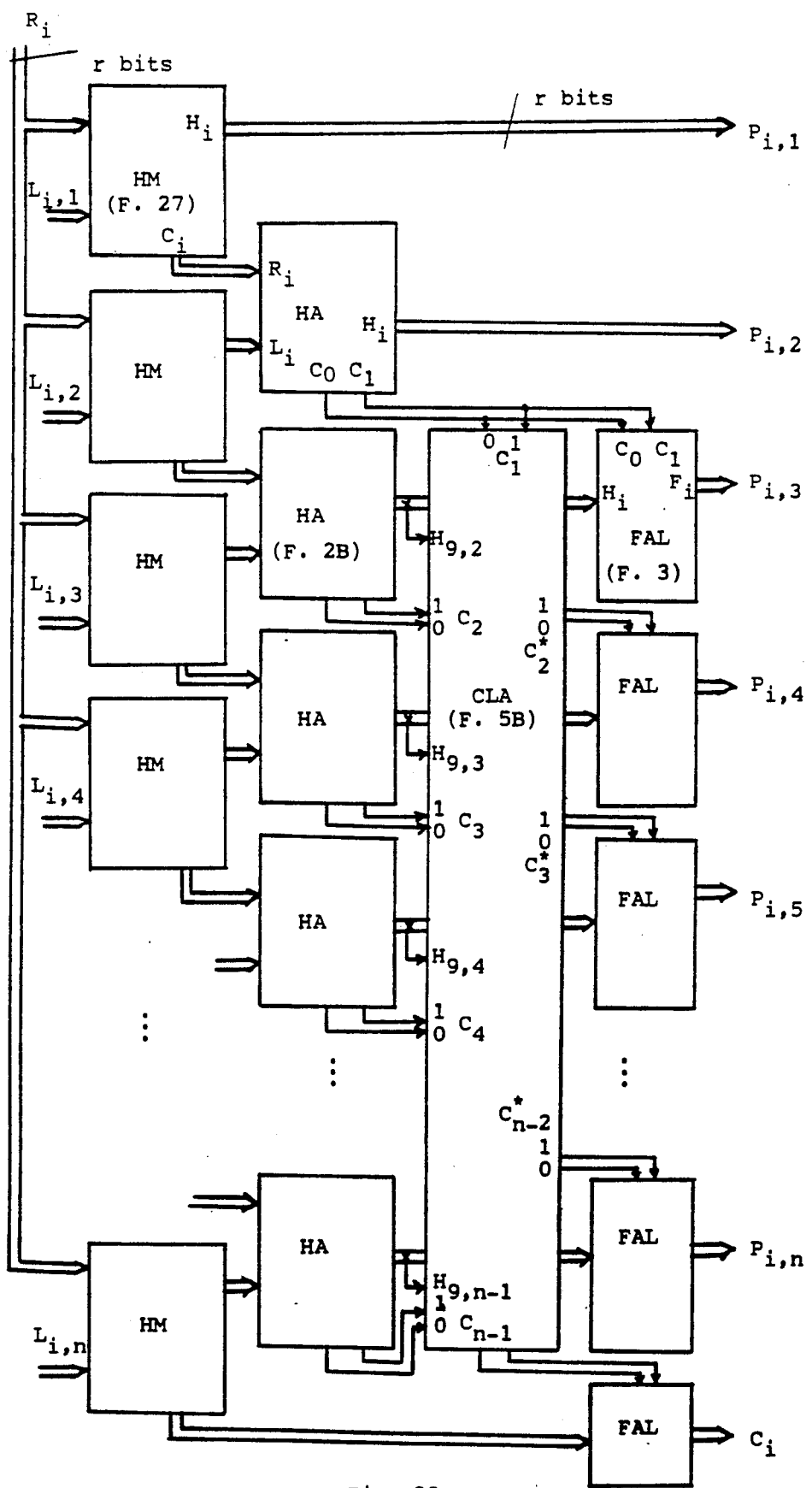
FIG. 29 is a block diagram for a TPC 1×n array parallel multiplier(1×n−PM)

FIG. 29 is a $1 \times n-$PM constructed from n HM's of FIG. 27, $n-1$ HA's of FIG. 2B, a CLA of FIG. 5B, and $n-2$ FAL's of FIG. 3 according to the following IOR:

$$P_{i,k} = \begin{cases} H_{i,k}^m \text{ if } k = 1 \\ H_{i,k}^a \text{ if } k = 2 \\ H_{i,k}^a C_{0,k-1}^* + H_{i-1,k}^a C_{1,k-1}^* \text{ if } 2 < k \leq n \end{cases} \quad (40)$$

$$C_t = C_{t,n} C_{0,n}^* + C_{t-1,n} C_{1,n}^*$$

where $H_i^m$ and $H_i^a$ denote $H_i$'s of relations (38) and (11), respectively, $C_t$ is as given in relations (38), and $C_{j,k}^*$ is as given in relations (9). FIG. 29 is merely a PA of FIG. 6 interfaced by n HM's of FIG. 27 where the C's and H's outputs of the HM's are connected to the R's and to the L's inputs of the PA, respectively, according to relations (40). The L's inputs of the HM's are fed by the external inputs $L_{i,k}$'s respectively, while the R's inputs commonly coupled to the external inputs $R_j$, where $L_i$ and $R_j$ are as defined for relations (3).

FIGS. 27, 28C, and 29 show that the multiply operation is a a combinational operation (i.e., an operation that can be implemented by a combinational circuit, by the same token a sequential operation is an operation that needs a sequential circuit for the same purpose) at the half multiplier level, at the full multiplier level, and at the $1 \times n-$parallel multiplier level. The question is whether or not the multiply operation can be implemented combinationally in the general case. It will be shown later on that the multiply operation can be implemented combinationally in a way different from the methods of the array, the carry-save, and the tree-like multipliers well known in the art. The sequential methods (as add-shift and table look-up multipliers) are cheaper, but slower, than the combinational methods. In this invention it is not only important to compromise between the costly combinational methods and the slow sequential methods but also to chose a method that fits with other methods of implementing the other operations so that accordingly an overall unit can be designed. Al-Kashi's algorithms for multiplication, division, and squareroot extraction satisfy such a goal. The multiply operation will be implemented according to al-Kashi's algorithm, next, and later on the divide and the extract squareroot operations.

ALG. 3: Al-Kashi's algorithm for multiplication

1. Obtain the multiples of the multiplicand D by adding D to itself eight or nine times and keep the obtained multiples $M_1, M_2, \ldots, M_9$ in a table corresponding to the digits $1, 2, 3, \ldots, 9$, respectively.

2. Choose the multiple corresponding to the LSD of the multiplier and write it down.

3. Choose the multiple corresponding to the next LSD of the multiplier and write it under its predecessor shifted one position to the left.

4. Repeat step 3 for the remaining digits of the multiplier, respectively.

5. Add up the numbers formed by steps 2 through 4.

It should be mentioned that: 1) ALG 3 is one of several methods given in al-Kashi's text; 2) the conventional add-shift algorithm [Mano] is a similar procedure except that there is no need to produce the multiples for radix 2, the shift operation is performed on the accumulated partial product instead of on the multiples, the shift is to the right instead of to the left, and there is an add operation after every shift operation; and 3) al-Kashi's algorithm is important because the idea of storing the multiples for performing the multiply operation. The following algorithm, which is a modification for the above al-Kashi's algorithm, is based also on the conventional add-shift algorithm and the TP-code.

ALB. 4: A modification for al-Kashi's multiply algorithm

1. Obtain the multiples as in ALG 3 and store them in registers $R_1, R_2, \ldots, R_9$, respectively.

2. Shift the multiplier to the right and use the outgoing digit for choosing the multiple of that digit.

3. Add the chosen multiple to the partial product.

4. Shift the accumulated partial product one position to the right.

5. Repeat steps 2 through 4 until the register of the multiplier becomes empty.

FIGS. 30 are $HM_d$'s drawn according to the following IOR:

$$H_i^d = \sum_{0 \leq j \leq 9} L_j \text{ such that } j \cdot d = i \pmod{10} \tag{41}$$

$$C_u^d = \sum_{0 \leq j \leq 9} L_j \text{ such that } \lfloor (j \cdot d)/10 \rfloor = u$$

for $d = 2, 3, \ldots, 9$; where $L_j$ is as defined for relations (3). Relations (41) are summarized in a matrix form as follows:

$$\begin{matrix} C_i^d & H_i^d & L_j \\ \begin{bmatrix} 0\,0\,0\,0\,0\,0\,0\,0 \\ 0\,0\,0\,0\,0\,0\,0\,0 \\ 1\,1\,1\,1\,1\,0\,0\,0 \\ 2\,2\,2\,1\,1\,1\,0\,0 \\ 3\,3\,2\,2\,2\,1\,1\,0 \\ 4\,4\,3\,3\,2\,2\,1\,1 \\ 5\,4\,4\,3\,3\,2\,1\,1 \\ 6\,5\,4\,4\,3\,2\,2\,1 \\ 7\,6\,5\,4\,4\,3\,2\,1 \\ 8\,7\,6\,5\,4\,3\,2\,1 \end{bmatrix} = \begin{bmatrix} 0\,0\,0\,0\,0\,0\,0\,0 \\ 9\,8\,7\,6\,5\,4\,3\,2 \\ 8\,6\,4\,2\,0\,8\,6\,4 \\ 7\,4\,1\,8\,5\,2\,9\,6 \\ 6\,2\,8\,4\,0\,6\,2\,8 \\ 5\,0\,5\,0\,5\,0\,5\,0 \\ 4\,8\,2\,6\,0\,4\,8\,2 \\ 3\,6\,9\,2\,5\,8\,1\,4 \\ 2\,4\,6\,8\,0\,2\,4\,6 \\ 1\,2\,3\,4\,5\,6\,7\,8 \end{bmatrix} \times \begin{bmatrix} 0 \\ 1 \\ 2 \\ 3 \\ 4 \\ 5 \\ 6 \\ 7 \\ 8 \\ 9 \end{bmatrix} \\ d = 9\,8\,7\,6\,5\,4\,3\,2 & 9\,8\,7\,6\,5\,4\,3\,2 \end{matrix}$$

where the sum is over j for equal i's in the same column and the same matrix only. For example, $$H_0^5 = L_0 + L_2 + L_4 + L_6 + L_8;$$
$$H_5^5 = L_1 + L_3 + L_5 + L_7 + L_9$$
$$C_0^5 = L_0 + L_1;$$
$$C_1^5 = L_2 + L_3;$$
$$C_2^5 = L_4 + L_5;$$
$$C_3^5 = L_6 + L_7;$$
$$C_4^5 = L_8 + L_9.$$

particular cases of relations (38) and accordingly FIGS. 30 are particular cases of FIG. 27.

FIGS. 31 are $HA_d$'s drawn according to the following IOR:

$$H_s^a = \sum_{i,u} H_i^d C_u^d \text{ such that } i + u = s \pmod{10} \tag{42}$$

$$C_t^a = \sum_{i,u} H_i^d C_u^d \text{ such that } \lfloor (i + u)/10 \rfloor = t$$

where $H_i^d$ and $C_u^d$ are as given in relations (41). Relations (42) are summarized in matrix forms as follows:

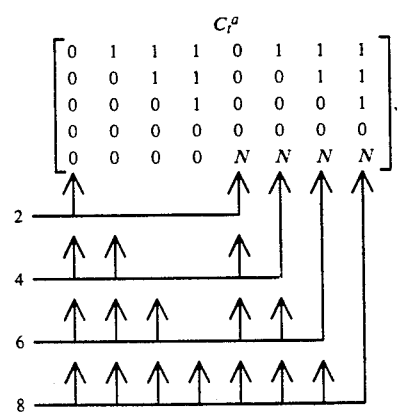

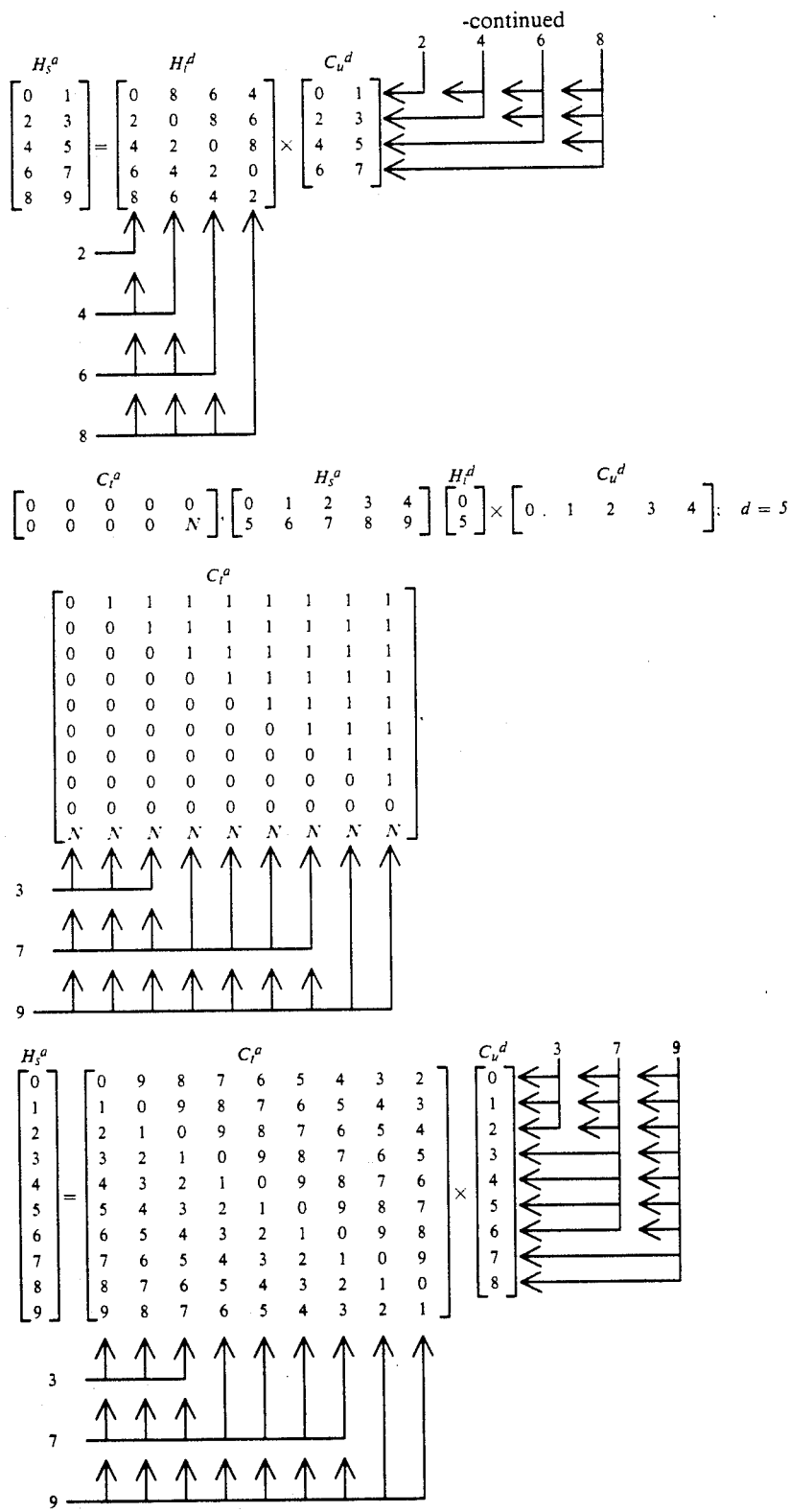

where the arrows denote that only the referred to columns and rows of the referred to matrix are considered for the given value of d. The nine entries N's in matrix $C_l^a$ should not be ORed with $C_0^a$ for a non-LSD half adder $HA_d$ for the same reason mentioned about $C_0^8$ and $C_0$ of the HA of FIG. 2B. FIGS. 31-a and 31-d are constructed from ten AND gates each. FIG. 31-c is formed from ten FC's of FIG. 3 wherein: inputs $C_0^d$ and $C_2^d$ are connected to the carry inputs $C_0$ and $C_1$, respectively, of the even cells and inputs $C_1^d$ and $C_3^d$ are connected to the carry inputs, respectively, of the odd cells; and input $H_i^d$ (for i=0, 2, 4, 6, 8) is connected to the I's of cell no. i and the first successor of cell no. i and to the P's of the second and third successors of cell no. i, where $C_u{}^d$ and $H_i{}^d$ are as defined for relations (42). The HA$_d$'s of FIGS. 31-b(e, f, g and h) are formed from ten half adder cells (HC$_d$) each. Each cell has d carry inputs C$_i$ and d data inputs H$_i$. FIG. 31-c is constructed from ten HC$_3$'s wherein: the C$_i$ inputs are the same for all such HC$_3$'s, and data input H$_i{}^d$ (for i=0, 1, 2, ..., 9) is connected to the first data input of cell i and to the second and third data inputs of the first and second successors, respectively. FIGS. 31-f and 31-h are constructed from ten HC$_7$'s and ten HC$_9$'s, respectively, by the same method. FIG. 31-e is formed from ten HC$_3$'s also wherein: Inputs C$_0$, C$_2$, and C$_4$ of the C$_i{}^d$'s inputs are connected to the carry inputs, respectively, of the even cells and inputs C$_1$, C$_3$, and C$_5$ of the C$_i{}^d$'s inputs are connected to the corresponding carry inputs, respectively, of the odd cells, and data input H$_i{}^d$ (for i=0, 2, 4, 6, 8) is connected to the first data inputs of cell i and the first successor, to the second data inputs of the second and third successors, and to the third data inputs of the fourth and fifth successors. FIG. 31-g is constructed from ten HC$_4$'s wherein: C$_0$, C$_2$, C$_4$, and C$_6$ of the C$_i{}^d$'s inputs are connected to the carry inputs, respectively, of the even cells and inputs C$_1$, C$_3$, C$_5$, and C$_7$ of the C$_i{}^d$'s inputs are connected to the carry inputs of the odd cells; and data H$_i{}^d$'s (for i=0, 2, 4, 6, 8) are connected to the cells' data inputs as in FIG. 31-f. This technique about the HA$_d$'s of FIGS. 31, together with the way by which the carry outputs C$_0$ and C$_1$ of such HA$_d$'s, is done according to relations (42). Furthermore, relations (42) are particular cases of relations (3) which means that FIGS. 31 are particular cases of FIG. 2B.

FIGS. 32 are CHA$_d$'s drawn according to the following IOR:

$$C_j = \begin{cases} m_j a_0 & \text{if } j = 0 \\ m_j a_0 + m_{j-1} a_1 & \text{if } 0 < j < d \end{cases} \quad (43)$$

where m$_j$'s are the carry outputs of a HM$_d$, a$_0$ and a$_1$ are the carry outputs of a HA$_d$ for d=3, 4, 6, 7, 8, and 9. Relations (43) are special cases of relations (5) and accordingly FIGS. 32 are special cases of FIG. 3-1. The purpose from a CHA$_d$ is to reduce the amount of hardware required in case of an FAL being used instead as it will be clear from FIGS. 33 next.

FIGS. 33-a and 33-d are a PM$_2$ and a PM$_5$ constructed from corresponding HM$_2$'s, HM$_5$'s, HA$_2$'s, and HA$_5$'s of FIGS. 30 and 31, respectively, according to the following IOR:

$$P_{s,k} = \begin{cases} H_{i,k}^d & \text{if } k = 1 \\ \sum_{i,u} H_{i,k}^d C_{u,k-1}^d \text{ such that } i + u = s (\text{mod } 10) & \text{if } 1 < k \leq n \end{cases} \quad (44\text{-a})$$

$$C_{u,n} = C_{u,n}^d$$

where H$_{i,k}{}^d$ and C$_{u,k}{}^d$ are as given in relations (41) for d=2 and 5, respectively.

FIGS. 33-b, 33-e, 33-f, and 33-h are PM$_d$'s constructed from HM$_d$'s of FIGS. 30, HA$_d$'s of FIGS. 31, CLA's of FIG. 5B, FAL's of FIG. 3-1, and CHA$_d$'s of FIGS. 32 according to the following input-output relations (IOR):

$$P_{s,k} = \begin{cases} H_{s,k}^d & \text{if } k = 1 \\ H_{s,k}^a & \text{if } k = 2 \\ H_{s,k}^a C_{0,k-1}^* + H_{s-1,k}^a C_{1,k-1}^* & \text{if } 2 < k \leq n \end{cases} \quad (44\text{-b})$$

$$C_{s,n} = \begin{cases} C_{s,n}^d C_{0,n}^* & \text{if } s = 0 \\ C_{s,n}^d C_{0,n}^* + C_{s-1,n}^d C_{1,n}^* & \text{if } 0 < s < d \end{cases}$$

for d=3, 6, 7, and 9; where H$_s{}^d$'s and C$_s{}^d$'s are H$_i{}^d$'s and C$_u{}^d$'s, respectively, of relations (41), H$_s{}^a$'s are as given in relations (42), and C$_{j,k}{}^*$'s are as given in relations (9).

Figures 1, 33C:
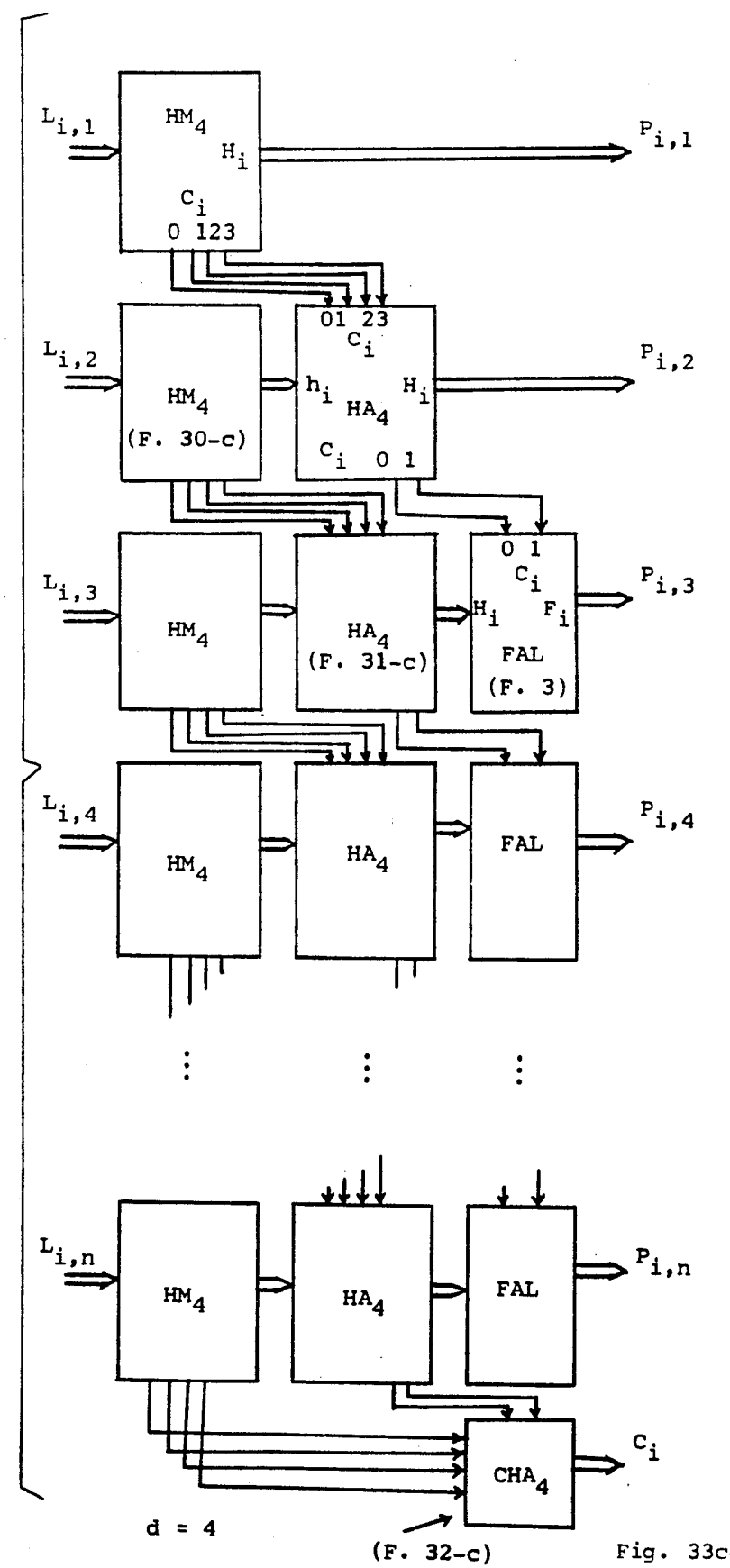
Figures 2, 33C:
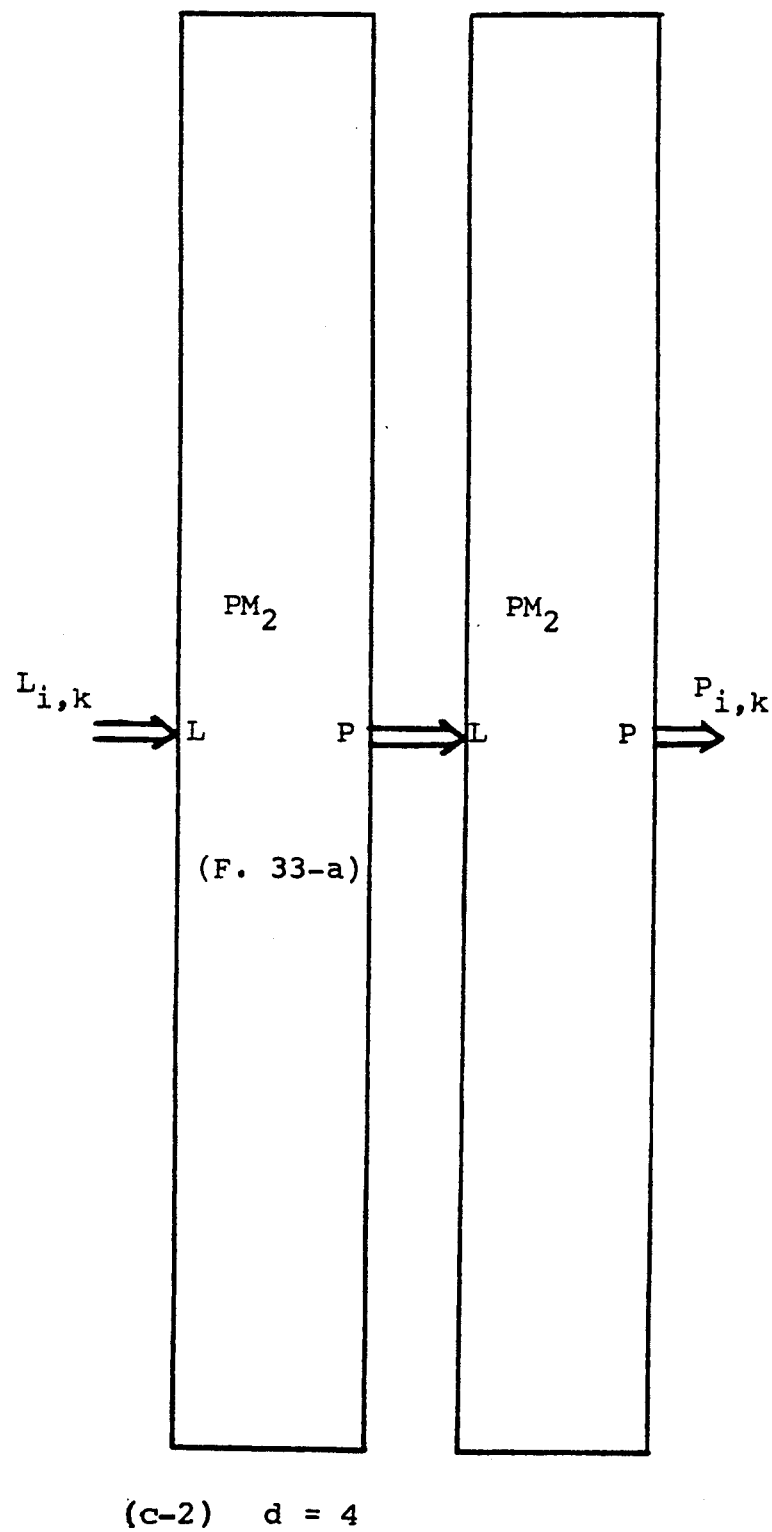

FIG. 33c-1 is a PM$_4$ constructed from HM$_4$'s, HA$_4$'s, and a CHA$_4$ of FIGS. 30, 31, and 32, respectively, according to the following IOR:

$$P_{i,k} = \begin{cases} H_{i,k}^d & \text{if } k = 1 \\ H_{i,k}^a & \text{if } k = 2 \\ H_{i,k}^a C_{0,k-1}^a + H_{i-1,k}^a C_{1,k-1}^a & \text{if } 2 < k \leq n \end{cases} \quad (44\text{-c})$$

$$C_{i,n} = \begin{cases} C_{i,n}^d C_{0,n}^a & \text{if } i = 0 \\ C_{i,n}^d C_{0,n}^a + C_{i-1,n}^d C_{1,n}^a & \text{if } 0 < i < 4 \end{cases}$$

where H$_{i,k}{}^d$ and C$_{i,n}{}^d$ are as given in relations (41), H$_{i,k}{}^a$ and C$_{j,k}{}^a$ are as given in relations (42).

Figures 1, 33G:
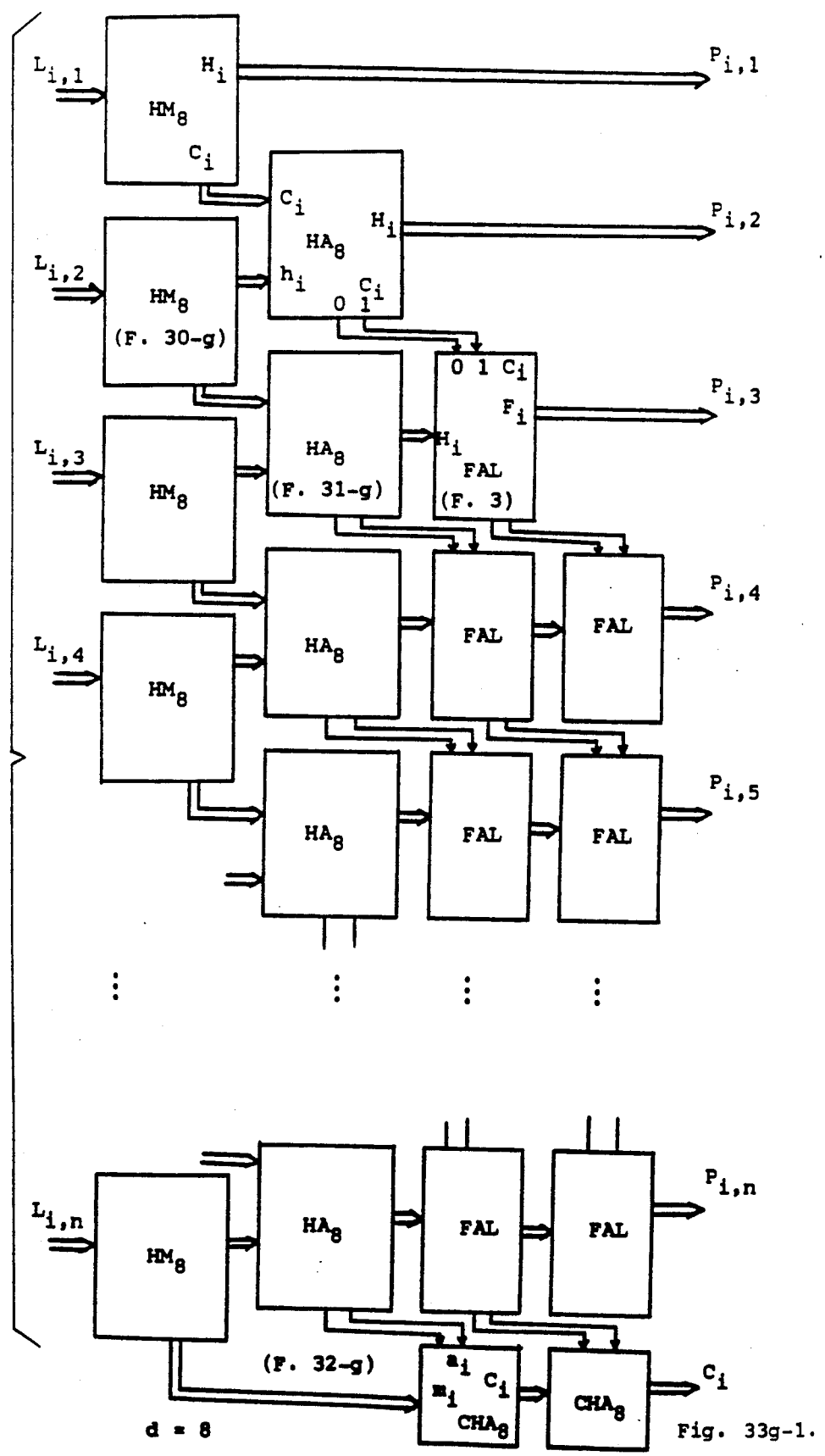
Figures 2, 33G:
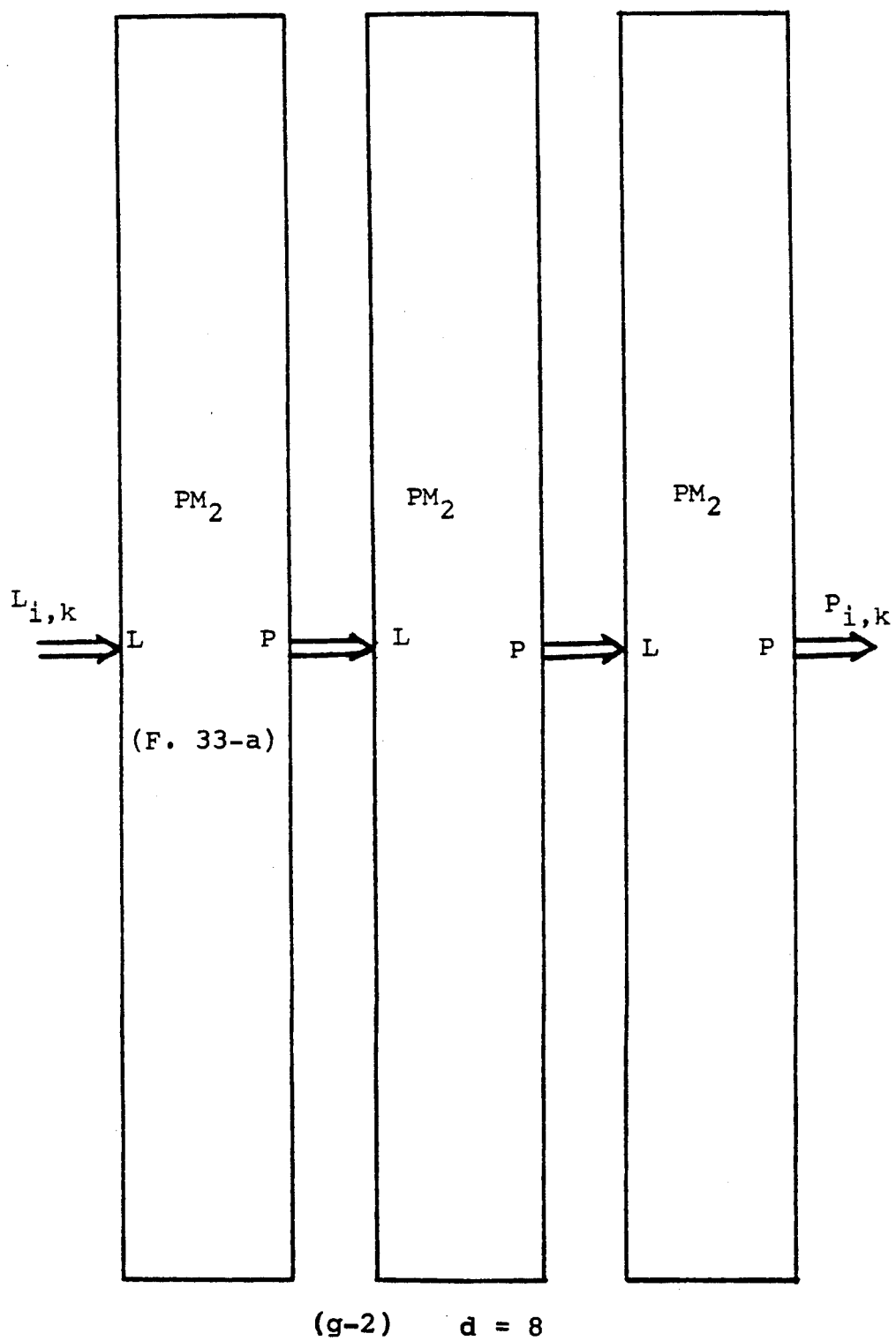

FIG. 33g-1 is a PM$_8$ constructed from HM$_8$'s, HA$_8$'s, FAL's, and CHA$_8$'s of FIGS. 30, 31, 3-1, and 32, respectively, according to the following IOR:

$$P_{s,k}^* = \begin{cases} H_{s,k}^d & \text{if } k = 1 \\ H_{s,k}^a & \text{if } k = 2 \\ P_{s,k} & \text{if } k = 3 \\ P_{s,k} C_{0,k-1} + P_{s-1,k} C_{1,k-1} & \text{if } 3 < k \leq n \end{cases} \quad (44\text{-d})$$

$$C_{t,n} = \begin{cases} C_{t,n}^d C_{0,n} & \text{if } t = 0 \\ C_{t,n}^d C_{0,n} + C_{t-1,n}^d C_{1,n} & \text{if } 0 < t < 8 \end{cases}$$

where C$_{j,k}$ is as defined for relations (5), P$_{s,k}$ is as given in relations (44-c), H$_s{}^d$'s and H$_s{}^a$'s are as given in relations (41) and (42), respectively. The PM$_4$ and the PM$_8$ of FIGS. 33c-2 and 33g-2 are constructed from two and three cascaded PM$_2$'s, respectively, of FIG. 33-a. All the PM$_d$'s of FIGS. 33 except FIGS. 33c-2 and 33g-2 are merely particular instances of the 1×n−PM of FIG. 29. The design of FIGS. 33c-2 and 33g-2 can be repeated for any power of 2 combinationally as shown in the two FIGS. or sequentially around only one PM$_2$. The case is correct for the PM$_5$ of FIG. 33-d. Indeed, the idea can be generalized for all the PM$_d$'s. The purpose from the PM$_d$'s is to implement step 1 of ALG 4 (i.e., to obtain the multiples M$_2$, M$_3$, ..., M$_9$ in parallel)

with hardware much less than what is required if eight $1 \times n$-PM's of FIG. 29 are used for the same purpose.

Figure 34:
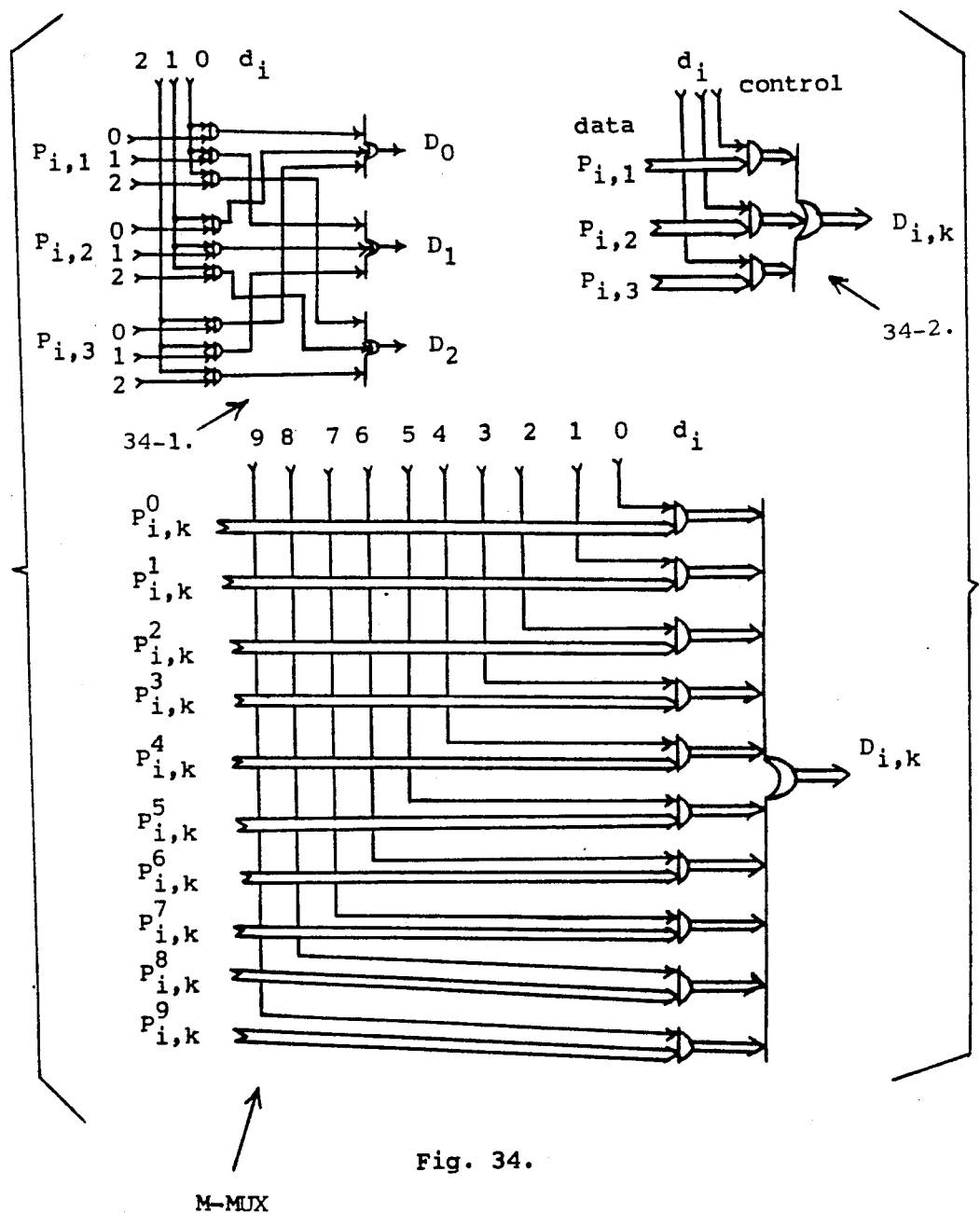
FIGS. 34 are illustrations for the logic diagram of a TPC multiplier multiplexer(M-MUX)

FIG. 34 is a M-MUX drawn according to the following IOR:

$$D_{i,k} = \sum_{j=0}^{r-1} P_{i,k}^j d_j \qquad (45)$$

where $i,j = 0, 1, \ldots, r-1$ and $k = 1, 2, \ldots, n$. Such M-MUX is a special multiplexer in which $P_{i,k}^j$ are the data inputs and $d_j$ are the control variables. Its purpose is to choose the right multiple as required by step 2 of ALG 4 where $P_{i,k}^j$'s are the multiples and $d_j$ is the outgoing digit of the multiplier. FIG. 34-1 shows the whole logic for $r = 3$ and FIG. 34-2 shows the corresponding abbreviation.

Figure 35:
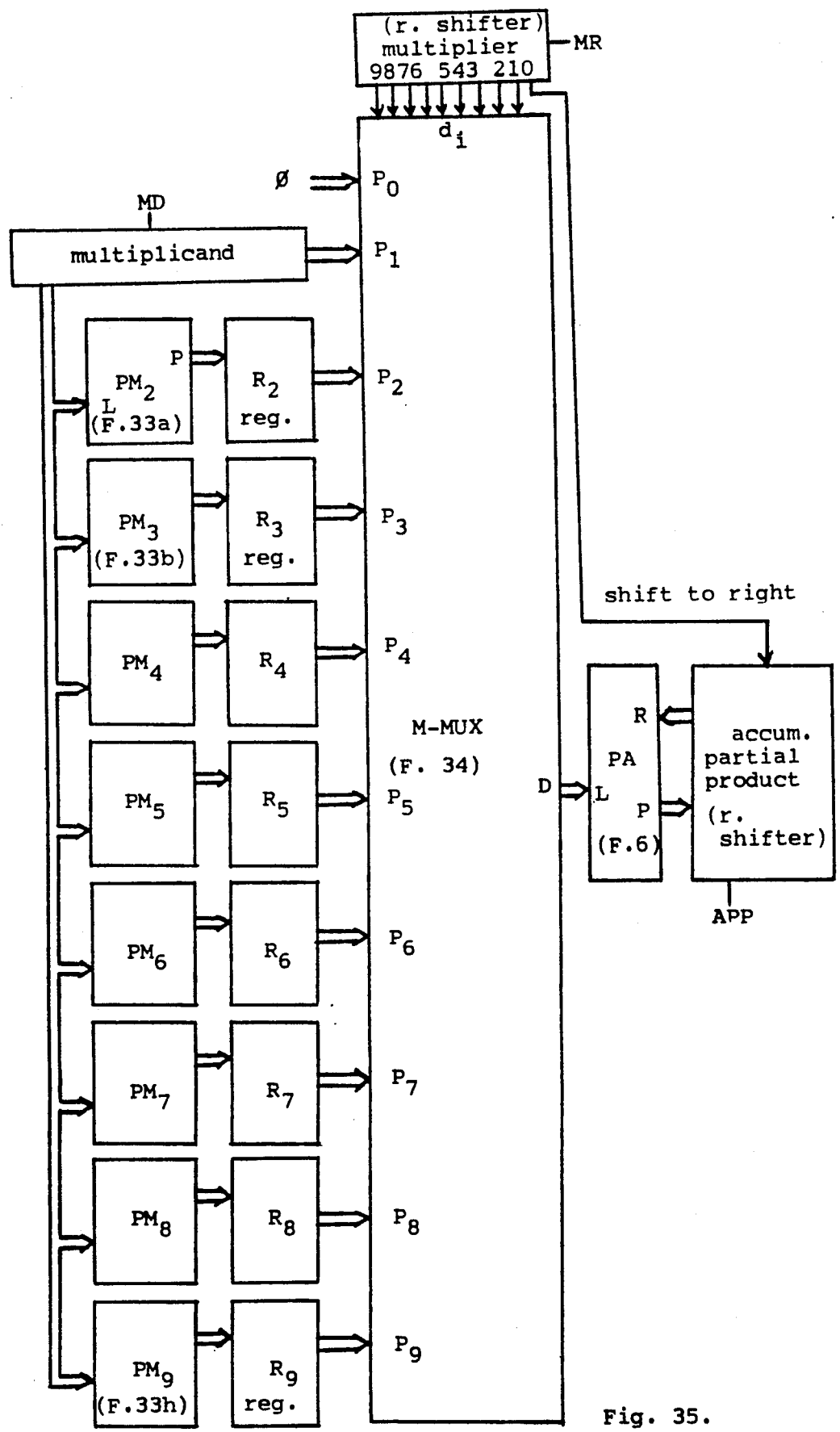
FIG. 35 is a block diagram for TPC add-shift multiplier(ASM)

FIG. 35 is a ASM constructed from $PM_d$'s of FIGS. 33, a M-MUX of FIG. 34, a PA of FIG. 6, multiple registers ($R_d$'s), a multiplicand register (MD), a multiplier right-shift register (MR), and an accumulated partial product register (APP) according to the following algorithm written in a RTL-like notation;

ALGORITHM 5
1. $PM_d$'s←MD.
2. $R_d$'s←$PM_d$'s.
3. Repeat
   i. If LSD of MR=0 goto v.
   ii. M-MUX data←$R_d$'s, M-MUX controls←LSD of MR.
   iii. PA $L_{inputs}$←M-MUX, PA $R_{inputs}$←APP.
   iv. APP←PA, $P_{i,k}$←$P_{i,k+1}$ in MR.
   v. $P_{i,k}$←$P_{i,k+1}$ in APP.
   until LSD of MR=∅.

Figure 36:
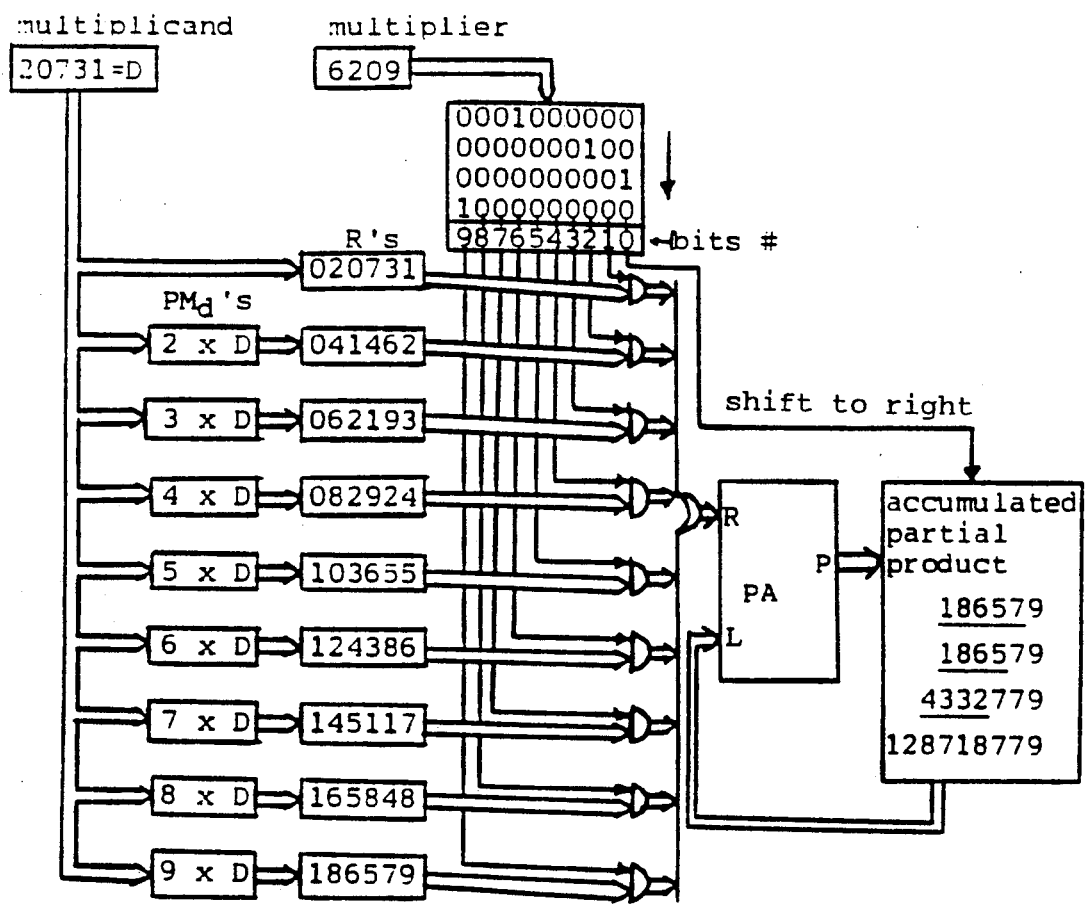
FIG. 36 is a numerical illustration for the ASM of FIG. 35.

The ASM of FIG. 35 is merely an implementation for ALG 4. ALG 5 is the same but more descriptive in terms of hardware components. FIG. 36 is a numerical illustration for the process of the ASM of FIG. 35. The description continued next on the division devices FIGS. 37 through 39.

The divide procedure in this invention is based on three concepts: al-Kashi's algorithm for division, the idea of transforming a mathematical formula into corresponding input-output relations, and the TP-code itself.

ALG. 6A: Al-Kashi's Algorithm for Division

1. Write down the dividend, draw a line across the top of the dividend and lines down the page separating the digits of the dividend, and write the divisor some distance down the page in the same columns of the corresponding most significant digits of the dividend.

2. Obtain the multiples $M_1, M_2, \ldots, M_9$ of the divisor as explained for the multiply operation.

3. Find the greatest digit whose multiple is less than what above the divisor from the dividend.

4. Write the digit obtained by step 3 in the output row above the least significant digit of the divisor, subtract the corresponding multiple from what above and on the left of the divisor from the dividend, and draw a line above the remainder to show that it has been done with what above it from the dividend.

5. Write the divisor shifted one place to the right in the next row above and draw a line above the old copy to show that it has been done with what below.

6. Repeat steps 3 through 5 for the remaining digits of the dividend.

7. The quotient is what in the output row and the remainder is what above the divisor.

Let ABOVE denote what above the divisor from the dividend in al-Kashi's table and let $d_{next}$ denote the next MSD after the n MSD's of the dividend, assuming that the divisor D consists of n digits. Al-Kashi's divide algorithm is written in a RTL-like notation as follows:

ALG. 6B: Al-Kashi's divide procedure in a RTL-like notation
1. ABOVE←n MSD's from dividend, output row←∅.  (46)
2. $M_d$←D × d for d = 1, 2, ..., and 9, respectively.
3. Repeat
   i. Find a d such that $M_d \leq$ ABOVE $< M_{d+1}$.
   ii. ABOVE←(ABOVE − $M_d$) × 10 + $d_{next}$,
       output row←(output row) × 10 + d.
   Until $d_{next}$ = ∅.
4. Quotient←output row, remainder←ABOVE.
   Next, transforming the division formula
   dividend = (quotient) × (divisor) + remainder into corresponding input-output relations. Let R denote the range of the divisor in the dividend (i.e., let R denote ABOVE of ALG 6B). The quotient is extracted one digit at a time, i.e., at a given iteration of the divide process one interested only in what corresponds to R from the dividend, the quotient digit $q_i$ due to be found, the divisor D, and the remainder r. Thus, with respect to a given iteration of the divide operation, relation (46) is reduced into the following formula:

$$R = q_i \times D + r, 0 \leq r < D \qquad (47)$$

Relation (47) and the relation $M_i \leq R < M_{i+1}$ of ALG 6B are equivalent since both tell the same thing, i.e., both tell that the quotient digit, at the given iteration, is $q_i$. Thus, the quotient digit of a given iteration of the divide operation is $q_i$ if $M_i \leq R < M_{i+1}$. Let $G_i$ (for greater than or equal) denote $M_i \leq R$ and let $L_i$ (for less than) denote $R < M_i$. Then, the above biconditional statement is as follows: $q_i$ if $G_i$ is true and $L_{i+1}$ is also true, i.e., $$q_i G_i L_{i+1} \qquad (48)$$

Since $0 \geq R$ and $R < D \times 10$ are always true, by definition, which means $G_0 L_{10} = 1$, relations (48) are as follows:

$$\begin{aligned}
q_0 &= G_0 L_1 = L_1 \\
q_1 &= G_1 L_2 \\
q_2 &= G_2 L_3 \\
q_3 &= G_3 L_4 \\
q_4 &= G_4 L_5 \\
q_5 &= G_5 L_6 \\
q_6 &= G_6 L_7 \\
q_7 &= G_7 L_8 \\
q_8 &= G_8 L_9 \\
q_9 &= G_9 L_{10} = G_9.
\end{aligned} \qquad (49)$$

Relations (49) are the required input-output relations according to the quotient digit of any iteration of the divide operation will be extracted. The relationship to the TP-code is that $G_i L_{i+1} = 1$ for one and only one value of i, otherwise there will be more than one quotient digit for a given iteration which is impossible according to formula (47). Means that $(q_0, q_1, \ldots, q_9)$ represents the chosen quotient digit according to the TP-code. Furthermore, ALG 6B is a nondeterministic procedure since step i is assumed to be implemented by trial-error procedure, but when the quotient digit is extracted according to the implementation of relations (49) in parallel the divide procedure becomes deterministic which is a very important step with respect to the hardware implementation. The following algorithm is a deterministic modification for al-Kashi's divide algorithm.

ALG. 7: Deterministic version of al-Kashi's division algorithm
1. $R \leftarrow n$ MSD's from $DN$, $P_q \leftarrow \emptyset$.
2. $M_i \leftarrow D \times i$ for $i = 1, 2, \ldots,$ and 9, respectively.
3. Repeat.
   i. Obtain the quotient digit $q_i$ according to relations (49).
   ii. $R \leftarrow (R - M_i) \times 10 + d_{next}$, where $M_i$ is the multiple of $q_i$ of step i, $P_q \leftarrow (P_q \times 10 + q_i)$.
   Until ($r = 0$) or ($P_q = $ max.), where DN denotes the dividend, $P_q$ denotes partial quotient, R as defined for relation (47), D and $d_{next}$ are as defined for ALG 6B. The divide operation is implemented in this invention according to ALG 7.

FIG. 7 is a Q-MUX drawn according to the following IOR:

$$D_{i,k} = \sum_{j=0}^{r-1} P_{i,k}^j q_j \qquad (50)$$

$$q_j^{out} = q_j^{in}$$

where $P_{i,k}{}^j$ is as defined for the M-MUX of FIGS. 34 and $q_j$ are as defined in relations (49). Relations (50) are exactly relation (45) except that the control variables $q_j$ are extended to form outputs for the quotient digit. The purpose from such Q-MUX is to output the quotient digit $q_j$ and, at the same time, to choose the right multiple $M_j$ as required by steps i and ii of ALG 7.

Figure 37:
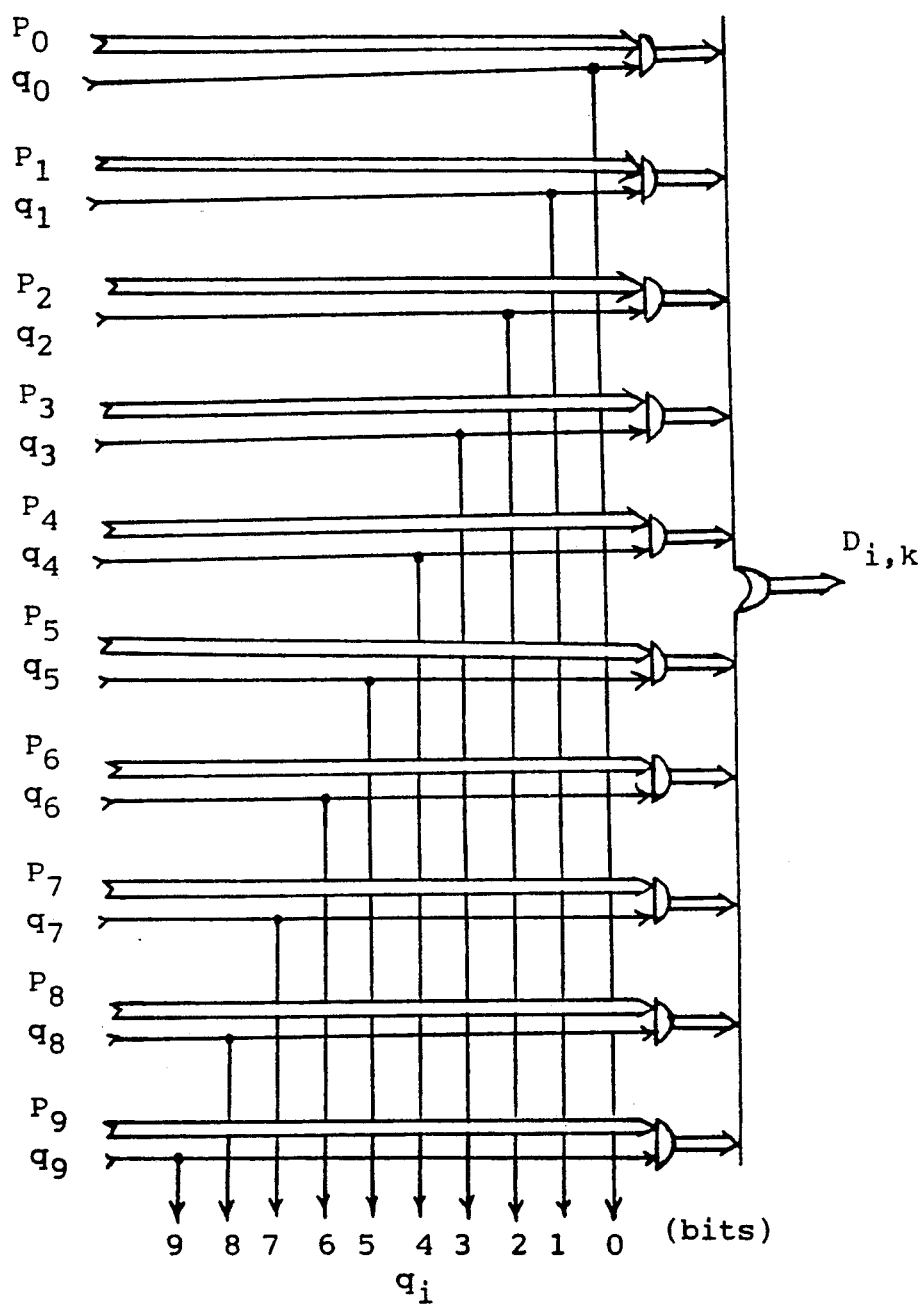
FIG. 37 is a logic diagram for a TPC quotient multiplexer(Q-MUX)
Figure 38A:
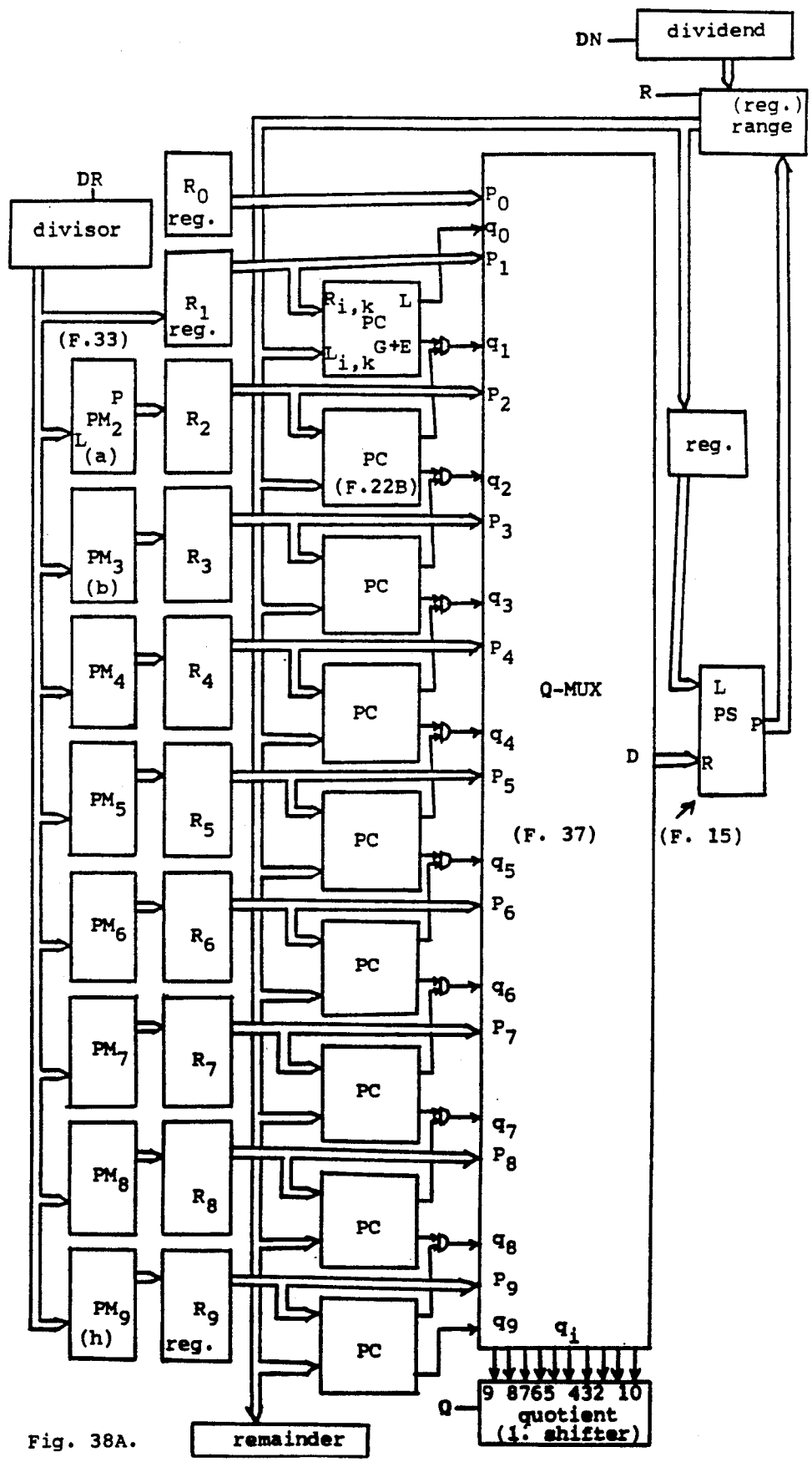
FIGS. 38A, 38B and 38C are block diagrams for a TPC deterministic divider(DD)

FIG. 38A is a DD constructed from $PM_d$'s of FIGS. 33, PC's of FIG. 22B, a PS of FIG. 15, a Q-MUX of FIG. 37, multiple registers ($R_d$'s), a divisor register (D), a dividend register (DN), a range register (range, a delay register (reg), a remainder register (r), a quotient left-shift register (Q), and combinational logic (CL) according to the following algorithm written in a RTL-like notation:

ALGORITHM 8A
1. $PM_d$'s $\leftarrow D$, $n$ LSD's of range $\leftarrow n$ MSD's of $DN$.
2. $R_d$'s $\leftarrow PM_d$'s.
3. Repeat
   i. PCs' $R_{inputs} \leftarrow R_d$'s, PCs' $L_{inputs} \leftarrow$ range.
   ii. CL $\leftarrow$ PC's (for forming $q_j$).
   iii. Q-MUX data $\leftarrow R_d$'s, Q-MUX controls $\leftarrow q_j$, $Q_{j,1}$ of $Q \leftarrow q_j$ from Q-MUX.
   iv. PS's $L_{inputs} \leftarrow$ range, PS's $R_{inputs} \leftarrow$ Q-MUX, $r \leftarrow$ range, $Q_{j,k+1} \leftarrow Q_{j,k}$ in $Q$.
   v. $n$ MSD's of range $\leftarrow$ PS, LSD of range $\leftarrow$ next MSD from $DN$.
   Until (next MSD of $DN = \emptyset$ and $r = 0$) or $Q = $ maximum.

Figure 38B:
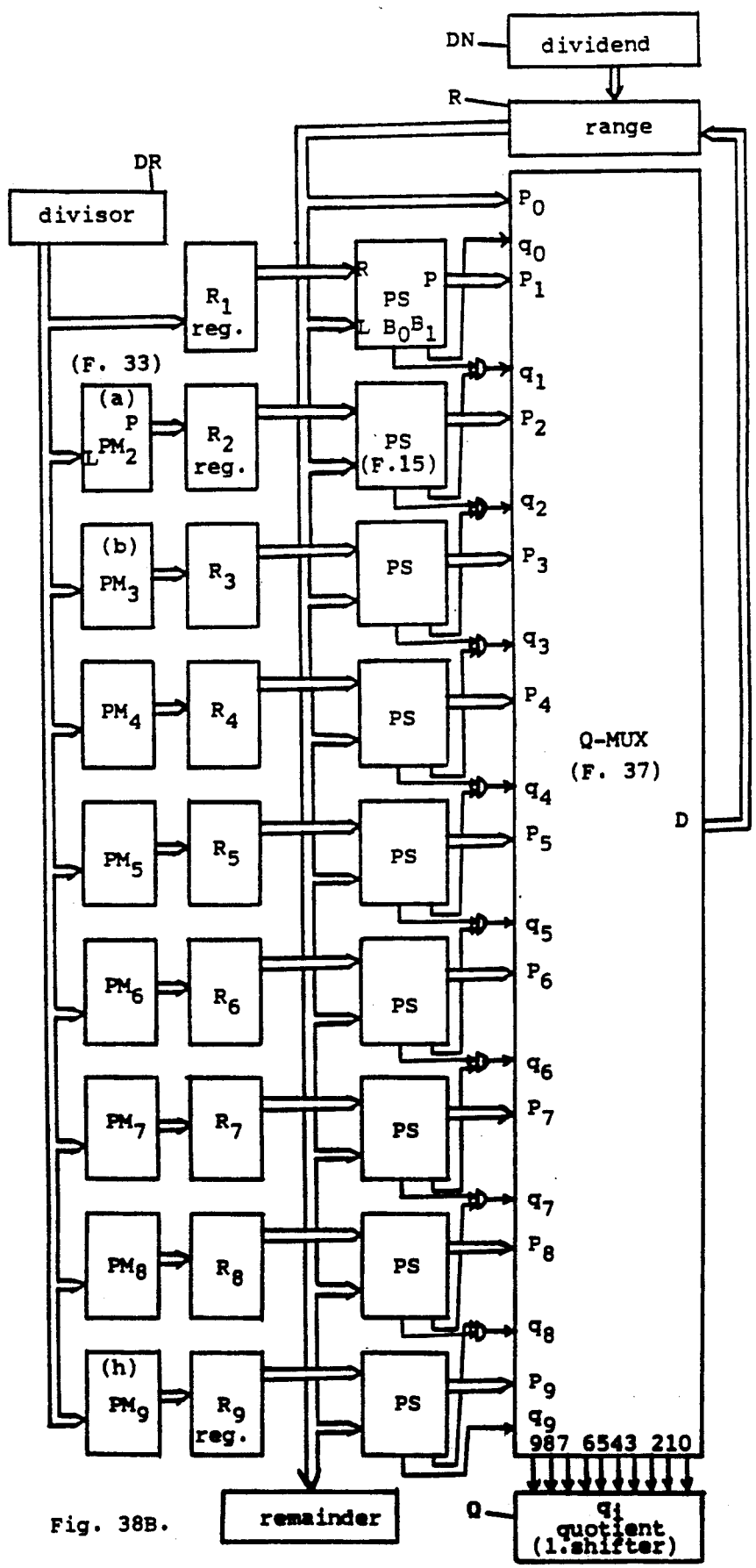

FIG. 38B is another DD constructed from the same components of the DD of FIG. 38A except that the PS is eliminated and the PC's are replaced by PS's according to the following algorithm written in a RTL-like notation:

ALGORITHM 8B
1. $PM_d$'s $\leftarrow D$, $n$ LSD's of range $\leftarrow n$ MSD's of $DN$.
2. $R_d$'s $\leftarrow PM_d$'s.
3. Repeat
   i. PSs' $R_{inputs} \leftarrow R_d$'s, PSs' $L_{inputs} \leftarrow$ range. $r \leftarrow$ range.
   ii. CL $\leftarrow B_{j,i}$'s of PS's, Q-MUX data $\leftarrow$ PS's, Q-MUX controls $\leftarrow q_j$ from CL, $Q_{j,1}$ of $Q \leftarrow q_j$.
   iii. $n$ MSD's of range $\leftarrow$ Q-MUX, LSD of range $\leftarrow$ next MSD from $DN$, $Q_{j,k+1} \leftarrow Q_{j,k}$ in $Q$.

Until $Q = $ maximum.

Figure 39:
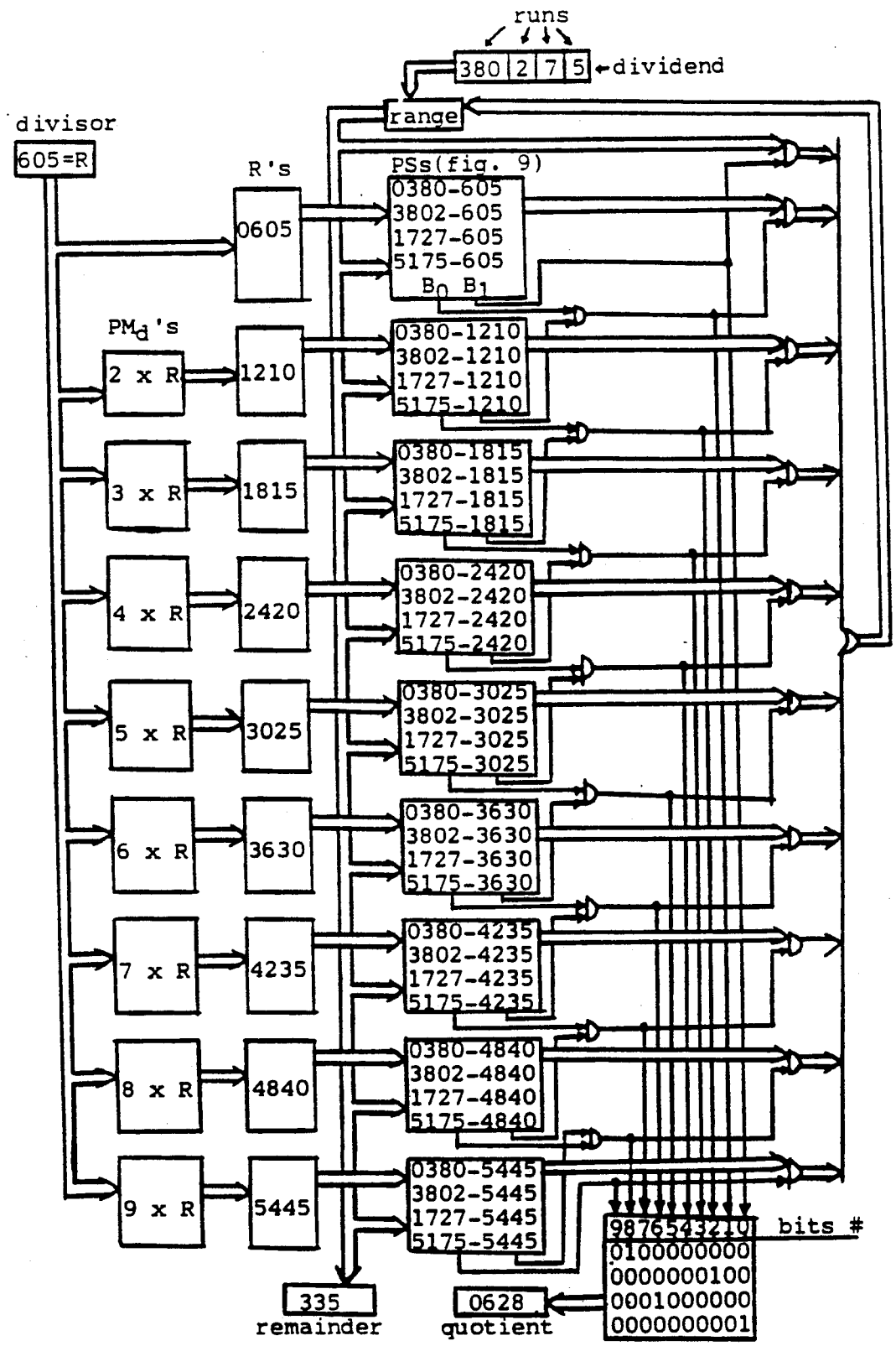
FIG. 39 is a numerical illustration for the DD of FIG. 38B.

FIGS. 38A and 38B are the same except, as mentioned above, that the PS of FIG. 38A is eliminated and the PC's are replaced by PS's in FIG. 38B. Both are implementations to ALG 7. FIG. 39 is a numerical example for the process of the DD of FIG. 38B.

Figure 38C:
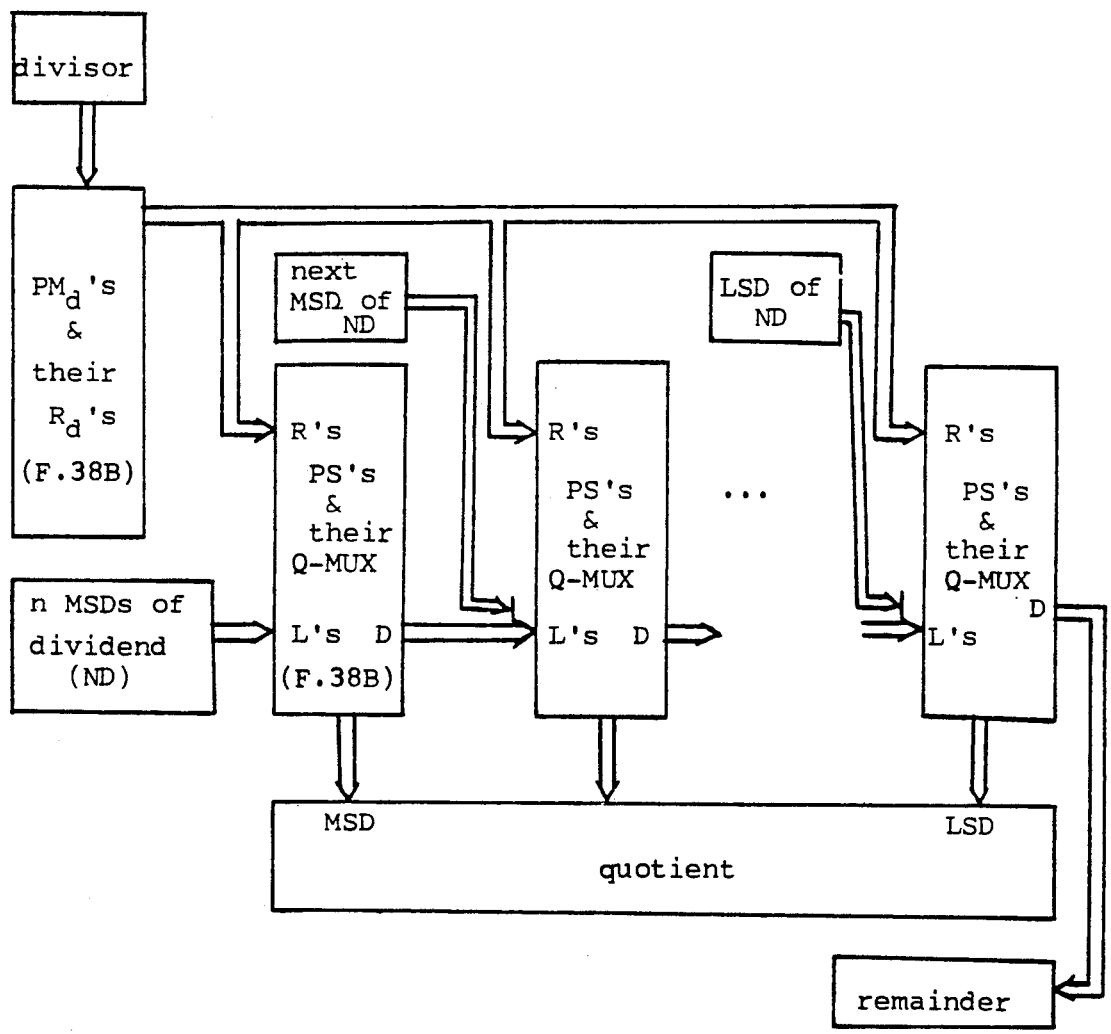

FIG. 38C is a third organization for the DD drawn according to the following algorithm:

ALG. 8C: A Design Procedure

1. Keep the $PM_d$'s and their immediate registers the way they are in FIG. 38B.
2. Convert the repeat loop of ALG 7 into a for loop by determining that the loop should be executed m times only.
3. Riplicate the PS's, CL and Q-MUX section of the DD of FIG. 38B m times.
4. Connect the $q_j$'s outputs of the sections of step 3 to the corresponding digits of the Q-register.
5. Connect the outputs of $R_d$'s to the corresponding R's inputs of the PS's of all sections of step 3.
6. Connect the outputs of the Q-MUX of section i to the non-LSD of the L's inputs of section i+1 (for i=1, 2, ..., m−1) and the output of section m to the r-register.
7. Connect the n MSD's of the DN to the L's inputs of the first section and the remaining digits of the DN to the LSD's of the L's inputs of the remaining sections, respectively.

The sequencing steps of the process of the DD of FIG. 38C are immediate from FIG. 38B. FIG. 38C is a little step (little because the for and the repeat loops are basically the same) to break the barrier of the sequentiality born in FIGS. 38A and 38B at least to have a divider with no feed back connection. It is clear that the divider of FIG. 38B is faster (i.e., has less time delays) than the divider of FIG. 38A and that the divider of FIG. 38C is faster than the divider of FIG. 38B but almost with reverse order in the hardware complexity. To be continued next on the implementation of extract square root operation.

Again, the extract square root procedure of this invention is based on three concepts: al-Kashi's algorithm for square root extraction, the transformation of a mathematical formula into corresponding input-output relations, and the nature of the TP-code itself (i.e., extract square root operation is very similar to divide operation).

ALG. 9A: Al-Kashi's algorithm for square root extraction

1. Write down the radicand divided into groups (cycles) of two digits each starting from the right.
2. Draw a line across the top of the radicand and lines down the page separating the cycles similar to what has been done for the divide operation.
3. Find the greatest digit $d_1$ whose square is less than or equal to the figure of the first cycle (i.e., the left most cycle).
4. Write $d_1$ twice above the first cycle and some distance (as required for the work) below the second digit of the same cycle.
5. Subtract the square of $d_1$ from what above and to the left of the below $d_1$ from the radicand and draw a line above the remainder to show that it has been done with what above it from the radicand.

6. Add the above $d_1$ to the below $d_1$ (i.e., double $d_1$) and write the sum shifted one place to the right on the next row above the below $d_1$ and draw a line under the obtained sum to show that it has been done with what below.

7. Find the greatest digit $d_2$ so that when attached (i.e., $d_2$) to the sum of step 6 from the right and the result is multiplied by $d_2$ itself, the product does not exceed what above and to the left from the radicand (i.e., the product does not exceed the number formed by attaching the second cycle to the right of the remainder of step 5).

8. Write $d_2$ twice above the second cycle and down the page attached to the sum of step 6 from the right.

9. Subtract the product of $d_2$ and the below number of step 8 from what above and to the left of such below number from the radicand (i.e., from the partial radicand) and draw a line above the remainder to show that it has been done with what above it.

10. Add the top $d_2$ to the below number of step 8 and write the sum on the next row above but shifted one place to the right and draw a line above the old number (i.e., the number of step 8) to show that it has been done with what below it.

11. Repeat steps 7 through 10 for the remaining cycles.

12. The integral part of the square root is what is written above the cycles; if the final remainder is zero then the radicand is a perfect square otherwise the radicand is an imperfect square and the fraction part is, by conventional approximation, the final remainder divided by twice the integral part plus one.

Let R and $P_s$ denote partial radicand and partial square root, respectively, and let $C_{next}$ denote the left most cycle due to be brought in from the radicand. Then, ALG 9A is written in a RTL-like notation as follows:

ALG. 9B: Al-Kashi's squareroot algorithm in a RTL-like notation

1. Divide the radicand into groups (cycles) of two digits each starting from the right.

2. $P_s \leftarrow \emptyset$, $R \leftarrow C_{next}$.
3. Repeat
   i. Find a digit $d$ satisfies
      $(20 \times P_s + d)d \leq R < (20 \times P_s + d + 1)(d + 1)$.
   ii. $R \leftarrow [R - (20 \times P_s + d)d] \times 100 + C_{next}$.
   iii. $P_s \leftarrow (10 \times P_s + d)$.
   Until $C_{next} = \emptyset$.
4. squareroot $\leftarrow P_s R/(2 \times P_s + 1)$.

It should be clear that: 1. ALG 9A is a special case of al-Kashi's general algorithm for extracting the $n^{th}$ root. 2. Al-Kashi used tables in addition to Arabic text for the description of his algorithm. 3. ALG 9A gives exact figure for the integral part of the required square root but an approximated ratio for the fraction part. Next, transforming the square root extract formula $$\text{radicand} = (\text{squareroot}) \times (\text{squareroot}) + \text{remainder}, \quad (51)$$

where $0 \leq (\text{remainder}) < 2 \times (\text{squareroot}) + 1$, into a corresponding input-output relations. Al-Kashi termed the number $(20 \times P_s + d)$, appeared in ALG 9B, the below number because such a number always appears below the partial radicand in al-Kashi's table. Let B denote al-Kashi's below number, i.e., the expression $(20 \times P_s + d)$ appeared in algorithm 9B. Similar to the quotient, the square root is formed by extracting one digit at a time. Means that at a given iteration of extract square root operation, one interested only in the below number B, the partial radicand R (i.e., what above B from the radicand) and the square root digit $S_d$ due to the extracted for the given iteration. Thus, for a given iteration of the extract square root operation, formula (51) is reduced into $$R = B \times S_d + r, 0 \leq r < B \quad (52)$$

Formulae (52) and (47) are algebraically identical which means that D and B play similar rules in their operations. Thus, the multiples $M_1, M_2, \ldots, M_9$ for an extract square root operation are defined by $M_d = B \times d$ for $d = 1, 2, \ldots, 9$, respectively, and accordingly ALG 9B is rewritten as follows:

ALG. 9C: A modification for ALG 9B

1. Divide the radicand into groups (cycles) of two digits each starting from the right.
2. $P_s \leftarrow \emptyset$, $R \leftarrow C_{next}$.
3. Repeat
   i. $B \leftarrow (20 \times P_s + d)$.
   ii. $M_d \leftarrow B \times d$ for $d = 1, 2, \ldots, 9$, respectively.
   iii. Find a digit d such that $M_d \leq R < M_{d+1}$.
   iv. $R \leftarrow (R - M_d) \times 100 + C_{next}$.
   v. $P_s \leftarrow (10 \times P_s + d)$.
   Until $C_{next} = \emptyset$.
4. Squareroot $\leftarrow P_s R/(2 \times P_s + d)$.

ALGS 6B and 9C are similar except that the multiples are formed outside the loop in ALG 6B because D is constant during its operation while the multiples of ALG 9C are formed inside the loop because B is dynamic (i.e., varies with each iteration) during its operation. By the same argument following formula (47), relations (48) and (49) are rewritten, respectively, for the extract squareroot operation as follows:

$$S_d = G_d L_{d+1} \quad (53)$$

$$\begin{aligned}
S_d &= G_d L_d + 1 \quad &(53)\\
S_0 &= L_1 \\
S_1 &= G_1 L_2 \\
S_2 &= G_2 L_3 \\
S_3 &= G_3 L_4 \\
S_4 &= G_4 L_5 \quad &(54)\\
S_5 &= G_5 L_6 \\
S_6 &= G_6 L_7 \\
S_7 &= G_7 L_8 \\
S_8 &= G_8 L_9 \\
S_9 &= G_9.
\end{aligned}$$

Relations (54) are the required input-output relations according to the squareroot digit of any iteration of a given extract squareroot operation will be extracted. The relationship to the TP-code is as mentioned following relations (49). For the same reason mentioned following relations (49) also, ALG 9C is a non-deterministic algorithm but for the same reason given there also it is modified into a deterministic algorithm as follows:

ALG. 10: A deterministic version of ALG 9C

1. Starting from the radix point and going in both directions (left and right), divide the radicand into groups (cycles) of two digits each.
2. $P_s \leftarrow \emptyset$, $R \leftarrow C_{next}$ (i.e., the left most cycle).

3. Repeat i. B←(20×$P_s$+d).

ii. $M_d$←B×d for d=1, 2, ..., 9, respectively.

iii. Obtain the squareroot digit $S_d$ according to relations (54).

iv. R←(R−$M_d$)×100+$C_{next}$, where $M_d$ is the multiple of $S_d$ of step iii.

v. $P_s$←(10×$P_s$+$S_d$).

Until $P_s$=maximum.

4. Squareroot←$P_s$, where the radix point in $P_s$ is after m places from the left assuming that there are m cycles to the left of the radix-point in the output of step 1.

The square root extractor of this invention is an implementation to ALG 10.

Figure 40:
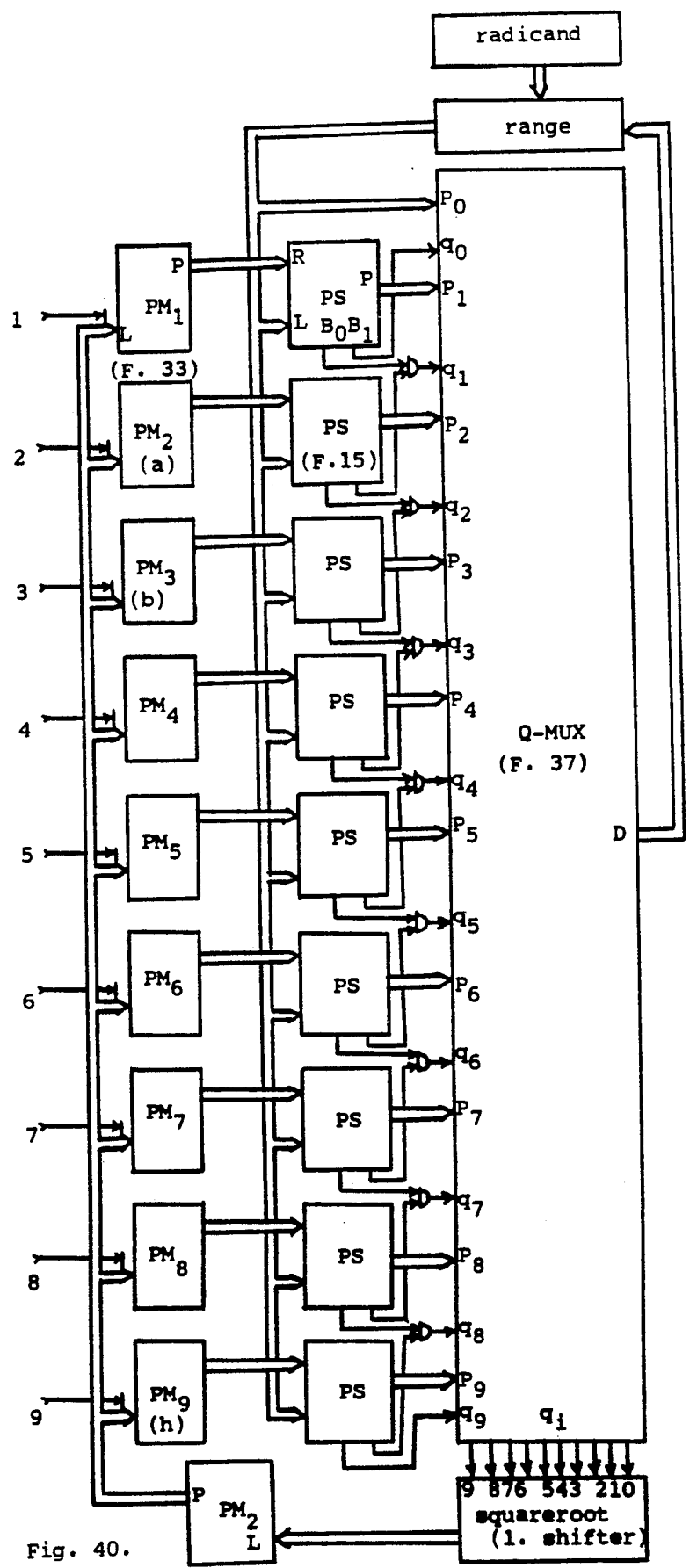
FIG. 40 is a block diagram for a TPC deterministic square root extractor(SRE)

FIG. 40 is a SRE constructed from $PM_d$'s of FIGS. 33, PS's of FIG. 15, a Q-MUX of FIG. 37, radicand register (RD), range register (R), squareroot left-shift register (S), a $PM_2$ of FIG. 33-a for evaluating the term 2×$P_s$ and combinational logic (CL) for implementing relations (54) according to the following algorithm written in a RTL-like notation:

ALG. 11

1. The LSD's of the inputs of $PM_d$'s←d's for d=1, 2, ..., 9, respectively; the two MSD's of R←$C_{next}$ from RD.

3. Repeat i. Non-LSD's of the inputs of the $PM_d$'s←$PM_2$.

ii. PSs' $L_{inputs}$←R; PSs' $R_{inputs}$←$PM_d$'s.

iii. CL←$B_{j,i}$'s of the PS's; Q-MUX data←PS's; Q-MUX controls←$q_j$ from CL; $S_{j,l}$ of S←$q_j$.

iv. $PM_2$←S; the two LSD's of R←$C_{next}$ from RD; non-two LSD's of R←Q-MUX.

v. $S_{j,k+1}$←$S_{j,k}$ in S, (a left-shift op. in reg. S).

Until S=maximum.

As it clear from the comparison of FIGS. 38B and 40, the loop (range, PS's, Q-MUX, range) including Q-register and the $PM_d$'s is the same in both FIGS. The difference is that: 1) the multiple registers $R_d$'s are eliminated from FIG. 40 because the multiples of ALG 10 are dynamic, 2) the S-register is coupled to the $PM_2$ in FIG. 40 for evaluating the term 2×$P_s$ appeared in the B number of ALG 10 and that 3) the LSD's of the inputs of the $PM_d$'s are coupled to the constants 1, 2, ..., and 9, respectively, and the remaining inputs of the $PM_d$'s are commonly coupled to the output of the $PM_2$ for forming the B number (2×$P_s$+d) for the $PM_d$'s. The designs of FIGS. 38A and 38C are repeated similarly for the SRE of FIG. 40. To be continued next on generalized adders FIGS. 41 through 46.

ALG 1 can be generalized in two dimensions: 1) with respect to any radix r, and 2) with respect to more than one-digit operand half adder. In case 1, ALG 1 and the consequent procedures are similar to mathematical formulae independent from the radix. Means that the process done so far with respect to the decimal systems can be repeated for any other radix greater than 1. More economically, the decimal numeral set (0, 1, ..., 9) is an instance of the general set (0, 1, ..., r−1) and accordingly the decimal input-output relations are instances of the general input-output relations. Means that as the decimal set is modified into the general set simply by replacing 9 by r−1, the decimal input-output relations are modified into the general form simply by replacing 9 by r−1 in such relations. With respect to case 2, the inputs $L_i$ and $R_j$ of relations (3) are replaced by $L_{ir}^4 ... L_{i2}^2 L_{il}^1$ and $R_{jr}^4 ... R_{j2}^2 R_{j1}^1$, respectively, and ALG 1 is applied accordingly, where r=1, 2, ..., etc., i.e., r is the digit number of the given operand. FIGS. 41-46, next, are designed accordingly.

Figure 41:
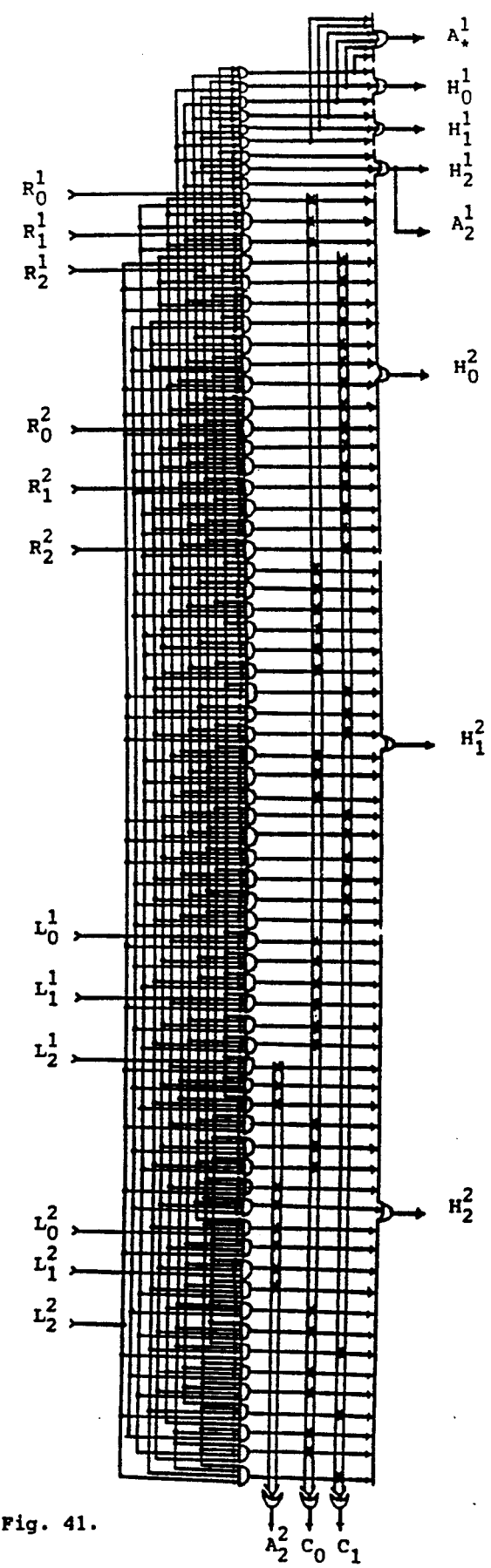
FIG. 41 is a logic diagram for a TPC r-digit operand half adder(HA$_r$) for the case r=2.

FIG. 41 is a $HA_r$ drawn according to the following IOR for the case b=3 and r=2, where b is the radix here:

$$H_i^v = \sum_{0 \leq j,k < b} L_{j1} R_{k2} \text{ such that} \quad (55)$$

$$I_1 + I_2 = id_{v-1} ... d_2 d_1 (\text{mod } b^v)$$

$$A_{b-1}^v = \prod_{j=1}^{v} H_{b-1}^j$$

$$A_*^v = (A_{b-1}^v)' = \sum_{j=1}^{v} \sum_{i=0}^{b-2} H_i^j$$

$$C_i^d = \sum_{0 \leq j,k < b} L_{j1} R_{k2} \text{ such that}$$

$$\lfloor (I_1 + I_2)/b^r \rfloor = i, \text{ where}$$

$$L_{j1} = L_{jv}^v ... L_{j2}^2 L_{j1}^1;$$

$$R_{j2} = R_{kv}^v ... R_{k2}^2 R_{k1}^1;$$

$$I_1 = j_v ... j_2 j_1;$$

$id_{v-1} ... d_2 d_1$ is an integer in which i is the MSD and $d_{v-1}$, ..., $d_2$, $d_1$ are the remaining digits; b denotes the radix; r denotes the length (in digits) of the given operand; v=1, 2, ..., r; $j_v$, $k_v$=0, 1, ..., b−1. Relations (55) are similar to relations (3) except that the inputs and the sum output in relations (55) represent more than one-digit numbers and that the nines function $A_{b-1}^v$ and the non-nine function $A_*^v$ vary from right to left with respect to the digits of $H_i^v$.

Figure 42A:
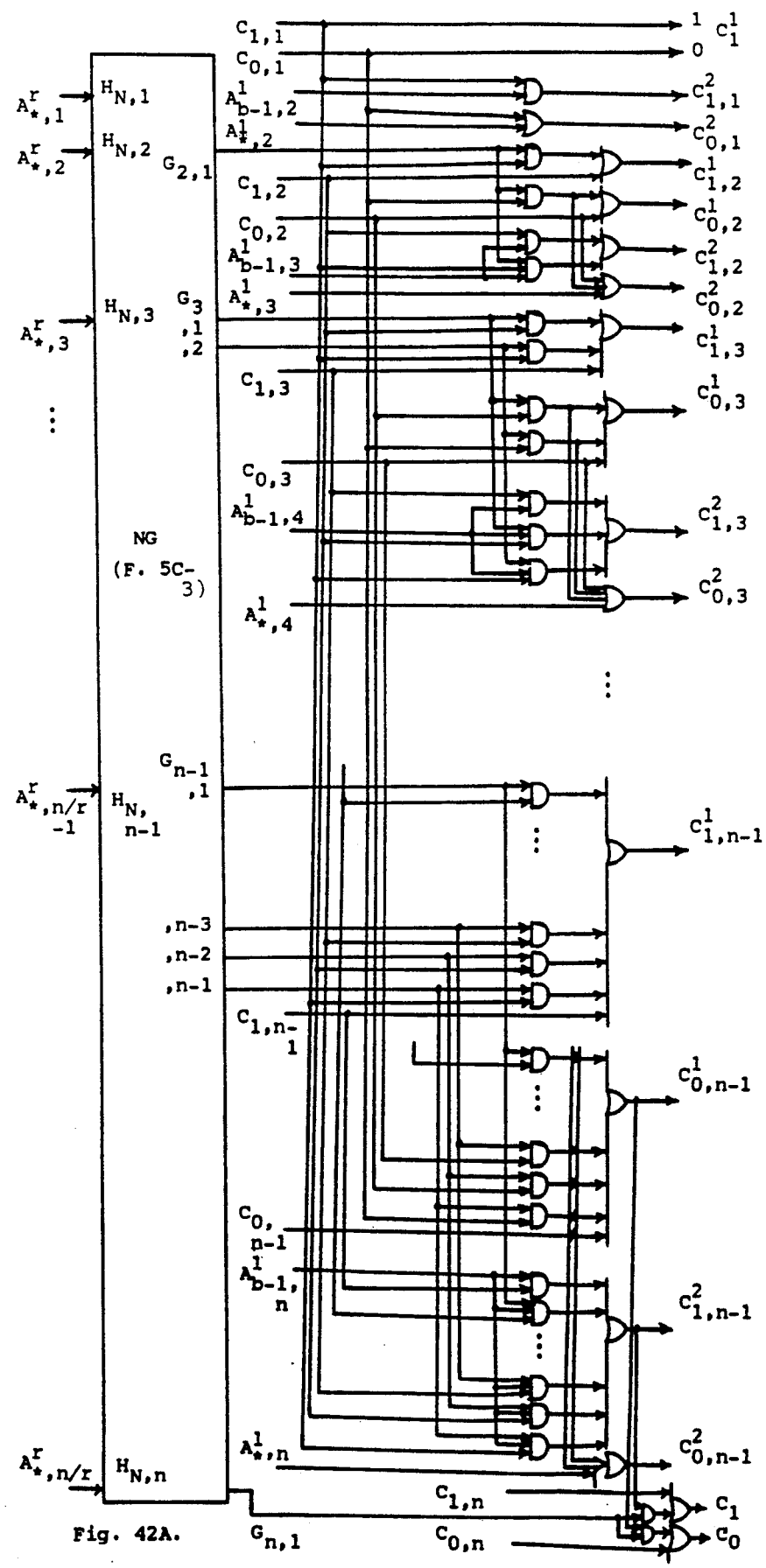
FIGS. 42A, 42B and 42C are three organizations for the logic diagram of a TPC bidimensional PA oriented CLA(b$_{CLA}$)
Figure 42B:
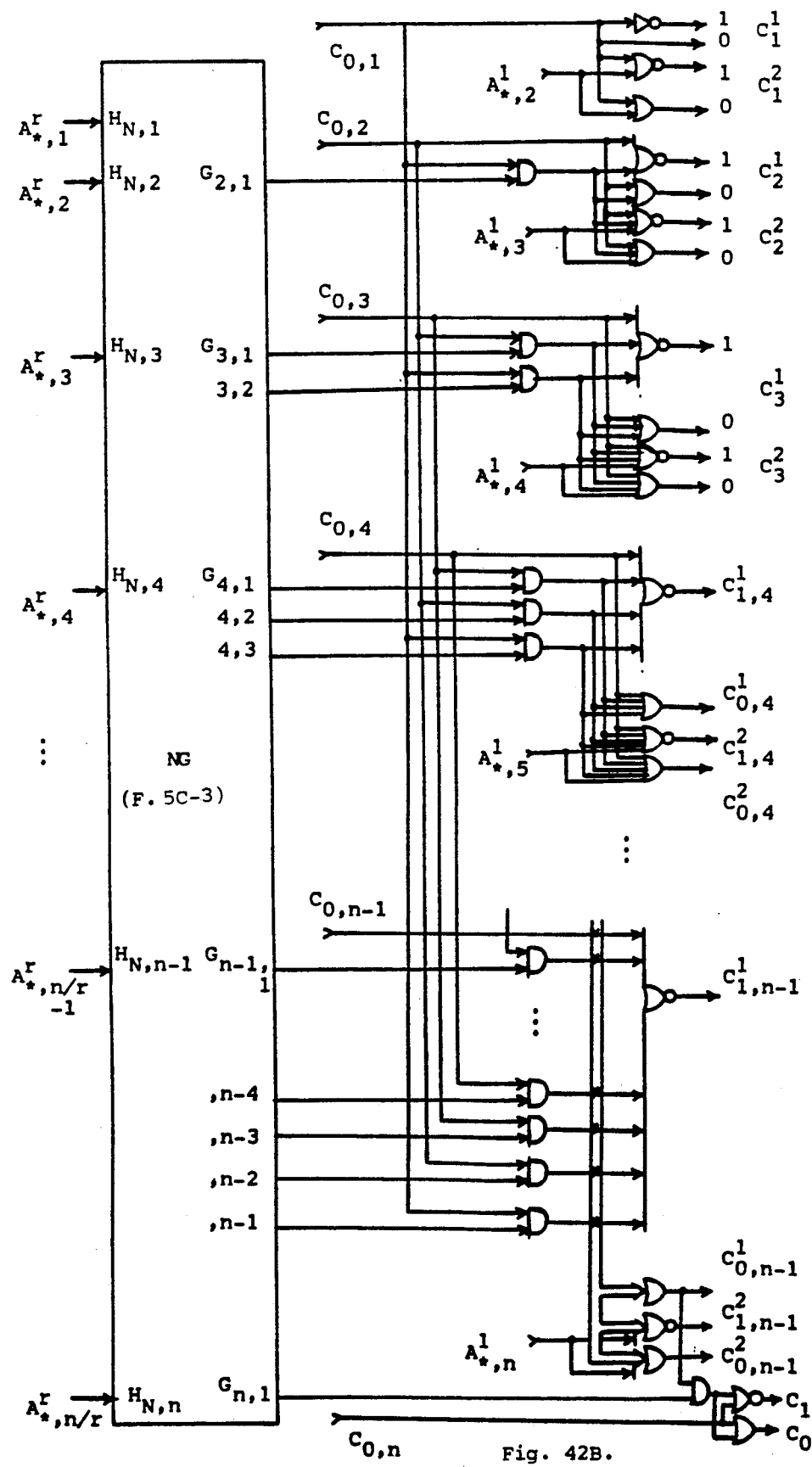
Figure 42C:
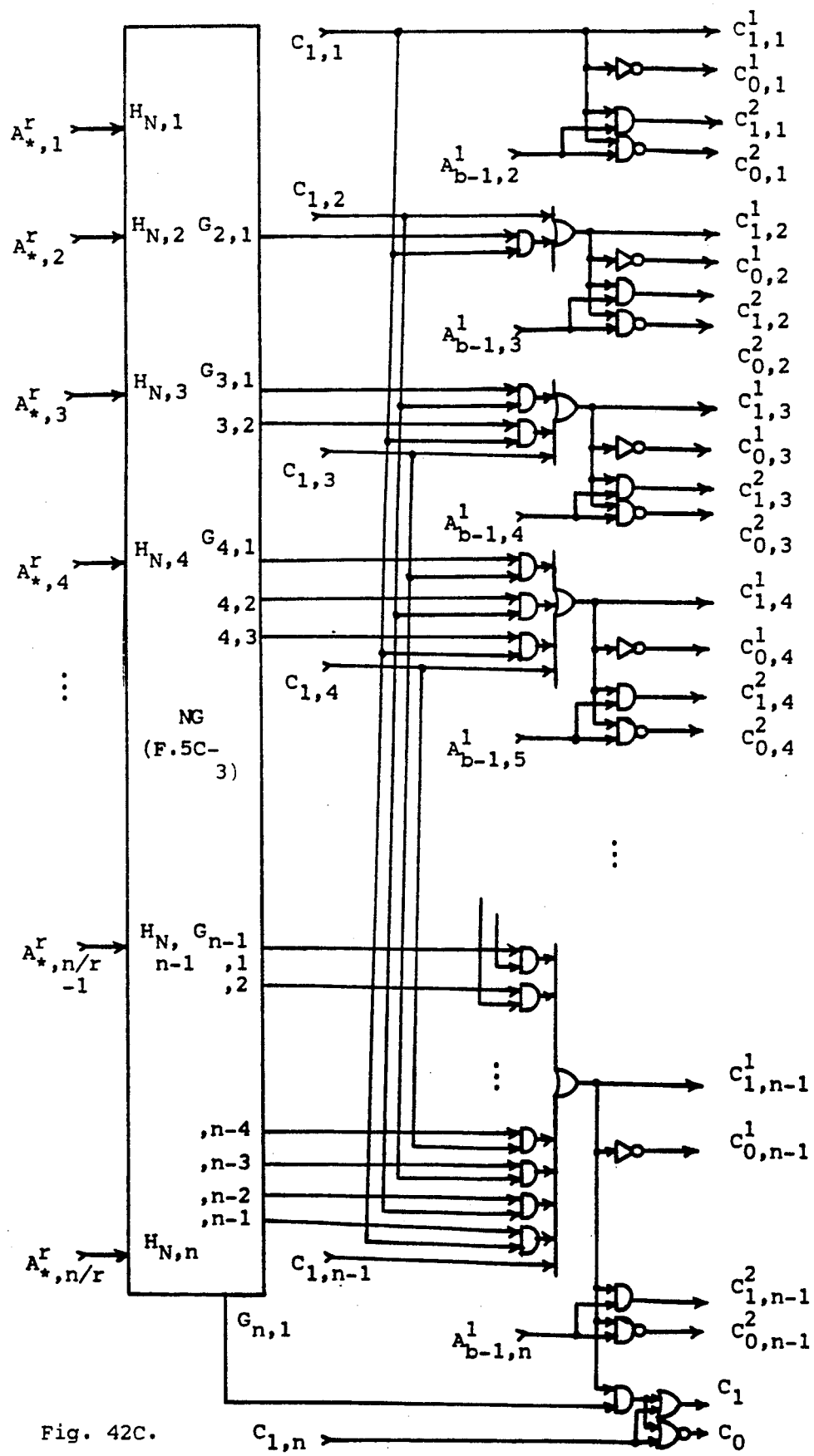

FIGS. 42A, 42B, and 42C are three organization for a $b_{CLA}$ drawn according to the following IOR, respectively:

$$C_{i,k}^v = \begin{cases} A_{b-1,k+1}^{v-1}\left(C_{i,k}^d + \sum_{t=1}^{k-1} \prod_{s=0}^{t-1} A_{b-1,k-s}^r C_{i,k-t}^d\right) & \text{if } i = 1 \\ A_{*,k+1}^{v-1} C_{i,k}^d + \sum_{t=1}^{k-1} \prod_{s=0}^{t-1} A_{b-1,k-s}^r C_{i,k-t}^d & \text{if } i = 0 \end{cases} \quad (56a)$$

$C_{0,k}^v$ is as in relations (56a) second equation, $$C_{l,k}^v = (C_{0,k}^v) \quad (56b)$$

$C_{l,k}^v$ is as in relations (56a) first equation, $$C_{0,k}^v = (C_{l,k}^v) \quad (56c)$$

where $A_{b-1,k+1}^0 = A_{b-1,(n/r)+1}^v = 1$; $A_{*,k+1}^0 = A_{*,(n/r)+1}^v = \emptyset$; $C_{0,1}^d = C_{0,1} + A_{b-1,1}^4$; r, v, $A_{b-1,k}^v$ and $A_{*,k}^v$ are as given in relations (55); n is a multiple of r; and k=1, 2, ..., n/r. Relations (56) are similar also to relations (8) and (9) except that the carries of relations (56) are propagated in two dimensions: one from right to left through the r digits of a given $HA_r$ and the other from top to bottom through the n/r $HA_r$'s.

Figure 43:
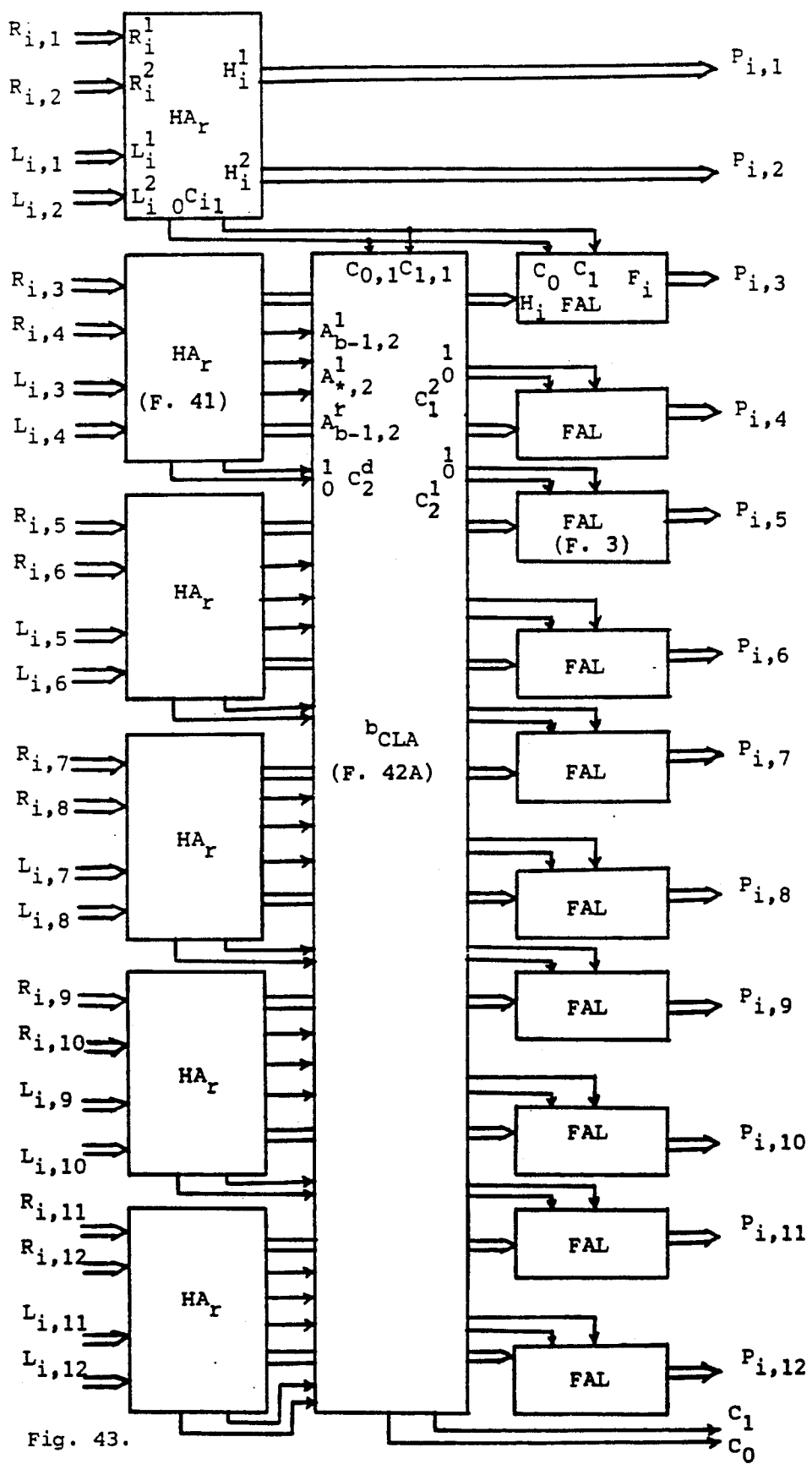
FIG. 43 is a block diagram for a TPC bidimensional PA(BPA)

FIG. 43 is a BPA comprised from $HA_r$'s of FIG. 41, a $b_{CLA}$ of FIG. 42A, and FAL's of FIG. 3 according to the following IOR:

$$P_{i,k}^{v} = \begin{cases} H_{i,k}^{v} & \text{if } k = 1 \\ H_{i,k}^{v}C_{0,k-1}^{v} + H_{i-1,k}^{v}C_{1,k-1}^{v} & \text{if } 1 < k \end{cases} \quad (57)$$

$$C_j = C_{j,n/r}^{v}$$

where $H_{i,k}^{v}$'s ($k=1, 2, \ldots, n/r$) and $C_{i,k}^{v}$'s are as given in relations (55) and (56), respectively. As in the PA of FIG. 6, the BPA of FIG. 43 consists of three block levels: half adder level, CLA level, and FAL level. The main difference between such two adders is that the half adders of the BPA of FIG. 43 are two-digit operand half adders.

Figure 45:
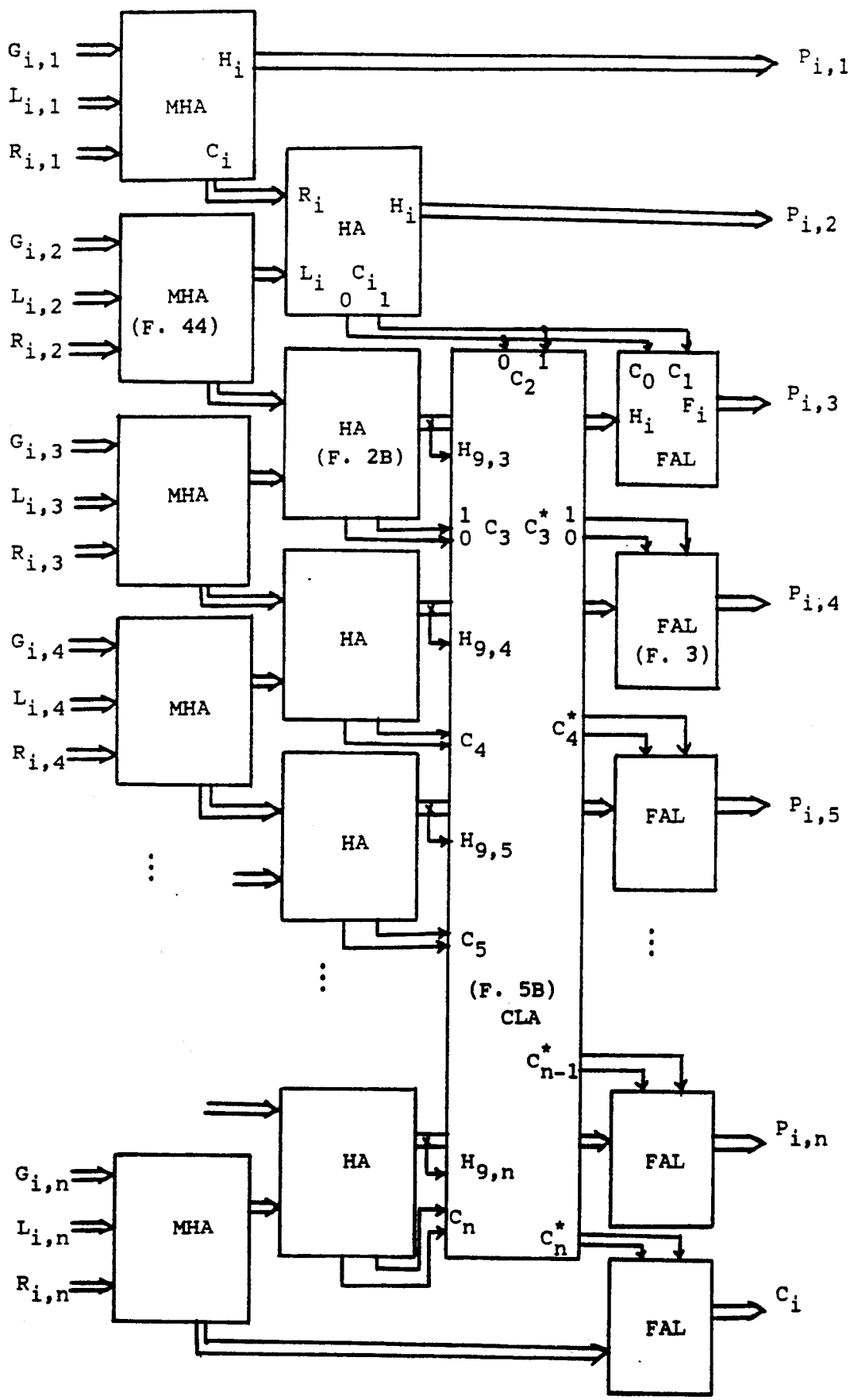
FIG. 45 is a block diagram for a TPC multi-operand parallel adder(MPA)

The third generalization of ALG 1, in this invention, is the case of more than two operands as will be illustrated in the design of FIG. 45, next.

Figure 44:
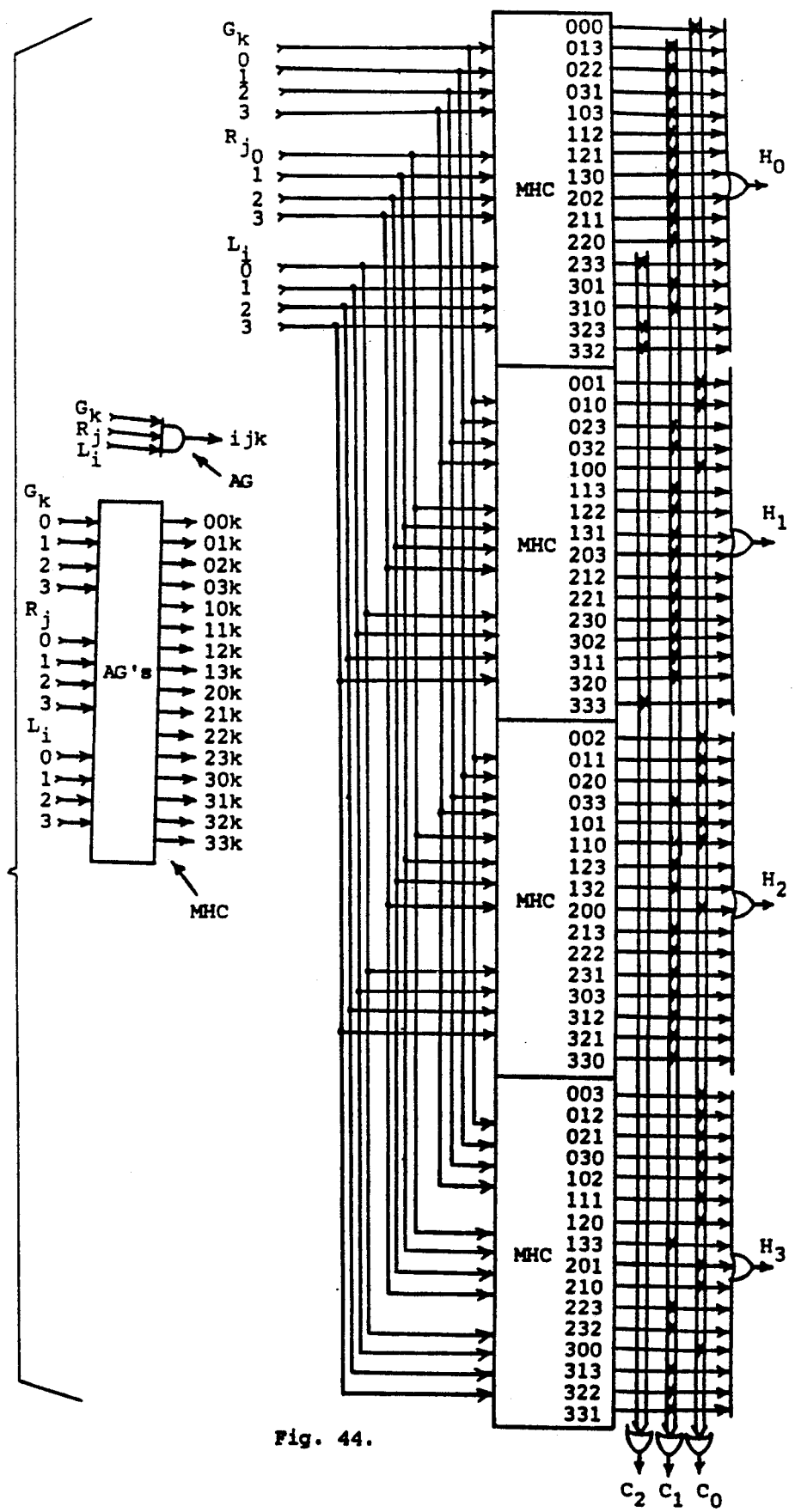

FIG. 44 is a MHA comprised from multi-operand half adder cells (MHC) according to the following IOR, for the case b=4 and n=3:

$$H_i^n = \sum_{0 \leq j_k < b} L_{j1}^1 L_{j2}^2 \ldots L_{jn}^n \text{ such that } \sum_{k=1}^{n} j_k = i (\text{mod } b) \quad (58)$$

$$C_i^n = \sum_{0 \leq j_k < b} L_{j1}^1 L_{j2}^2 \ldots L_{jn}^n \text{ such that } \left\lfloor \left(\sum_{k=1}^{n} j_k\right)/b \right\rfloor = i$$

where b denotes the radix; $L_{j1}^1, L_{j2}^2, \ldots, L_{jn}^n$ (for $j_k = 0, 1, 2, \ldots, b-1$) are digits in the same significant positions of operands 1, 2, ..., and n, respectively; and $n \leq b$. The operation table from which relations (58) are written is obtained by either of the following two methods:

Method 1.
i. Find the Cartesian product $L_{j1}^1 \times L_{j2}^2 \times \ldots \times L_{jn}^n$.
ii. Find the sum of the subscripts of each tuple.

Method 2.
i. Find the arithmetic operation table for $L_{j1}^1$ and $L_{j2}^2$ and let such a table be denotes by [I].
ii. Find [I]+j for $j = 0, 1, \ldots, b-1$ and again let the new table be denoted by [I].
iii. Repeat step (ii) for $L_{j4}^4, L_{j5}^5, \ldots,$ and $L_{jn}^n$.

For example, method 1 for the case b=4 and n=3 is as follows:

$$L_{j1}^1 \times L_{j2}^2 \times L_{j3}^3 = (L_0^1, L_1^1, L_2^1, L_3^1) \times (L_0^2, L_1^2, L_2^2, L_3^2) \times (L_0^3, L_1^3, L_2^3, L_3^3) = (0, 1, 2, 3) \times (0, 1, 2, 3) \times (0, 1, 2, 3)_{b=4} =$$

tuples sums
(0,0,0) 00 (0,0,1) 01 (0,0,2) 02 (0,0,3) 03
(0,1,3) 10 (0,1,0) 01 (0,1,1) 02 (0,1,2) 03
(0,2,2) 10 (0,2,3) 11 (0,2,0) 02 (0,2,1) 03
(0,3,1) 10 (0,3,2) 11 (0,3,3) 12 (0,3,0) 03
(1,0,3) 10 (1,0,0) 01 (1,0,1) 02 (1,0,2) 03
(1,1,2) 10 (1,1,3) 11 (1,1,0) 02 (1,1,1) 03
(1,2,1) 10 (1,2,2) 11 (1,2,3) 12 (1,2,0) 03
(1,3,0) 10 (1,3,1) 11 (1,3,2) 12 (1,3,3) 13
(2,0,2) 10 (2,0,3) 11 (2,0,0) 02 (2,0,1) 03
(2,1,1) 10 (2,1,2) 11 (2,1,3) 12 (2,1,0) 03
(2,2,0) 10 (2,2,1) 11 (2,2,2) 12 (2,2,3) 13
(2,3,3) 20 (2,3,0) 11 (2,3,1) 12 (2,3,2) 13
(3,0,1) 10 (3,0,2) 11 (3,0,3) 12 (3,0,0) 03
(3,1,0) 10 (3,1,1) 11 (3,1,2) 12 (3,1,3) 13
(3,2,3) 20 (3,2,0) 11 (3,2,1) 12 (3,2,2) 13
(3,3,2) 20 (3,3,3) 21 (3,3,0) 12 (3,3,1) 13 and for the same example, method 2 is as follows:

| +0 | 0 | 1 | 2 | 3 |
|---|---|---|---|---|
| 0 | 00 | 01 | 02 | 03 |
| 1 | 01 | 02 | 03 | 10 |
| 2 | 02 | 03 | 10 | 11 |
| 3 | 03 | 10 | 11 | 12 |

[I] + 0

| +1 | 0 | 1 | 2 | 3 |
|---|---|---|---|---|
| 0 | 01 | 02 | 03 | 10 |
| 1 | 02 | 03 | 10 | 11 |
| 2 | 03 | 10 | 11 | 12 |
| 3 | 10 | 11 | 12 | 13 |

[I] + 1

| +2 | 0 | 1 | 2 | 3 |
|---|---|---|---|---|
| 0 | 02 | 03 | 10 | 11 |
| 1 | 03 | 10 | 11 | 12 |
| 2 | 10 | 11 | 12 | 13 |
| 3 | 11 | 12 | 13 | 20 |

[I] + 2

| +3 | 0 | 1 | 2 | 3 |
|---|---|---|---|---|
| 0 | 03 | 10 | 11 | 12 |
| 1 | 10 | 11 | 12 | 13 |
| 2 | 11 | 12 | 13 | 20 |
| 3 | 12 | 13 | 20 | 21 |

[I] + 3.

Once the operation table is found, the remaining process for obtaining the IOR is as in ALG 1.

FIG. 45 is a MPA constructed from MHA's of FIG. 44, HA's of FIG. 2B, a CLA of FIG. 5B, and FAL's of FIG. 3 according to the following IOR:

$$H_i^p = \sum_{0 \leq j, k < b} H_j^n C_k^n \text{ such that } j + k = i (\text{mod } b) \quad (59)$$

$$C_i^d = \sum_{0 \leq j, k < b} H_j^n C_k^n \text{ such that } \lfloor (j + k)/b \rfloor = i$$

$$P_{i,k} = \begin{cases} H_{i,k}^n & \text{if } k = 1 \\ H_{i,k}^q & \text{if } k = 2 \\ H_{i,k}^q C_{0,k-1}^* + C_{i-1,k}^n C_{1,k-1}^* & \text{if } 2 < k \leq n \end{cases}$$

$$C_i = C_{i,n}^n C_{0,n}^* + C_{i-1,n}^n C_{1,n}^*.$$

where $H_j^n$'s and $C_j^n$'s are as given in relations (58), and $C_{j,k}^*$ is as given in relation (9). The MPA of FIG. 45 is merely a $1 \times n - PM$ of FIG. 29 in which the HM's of FIG. 27 are replaced by MHA's of FIG. 44. Such MPA can be used for partial products and series evaluations.

Figure 46:
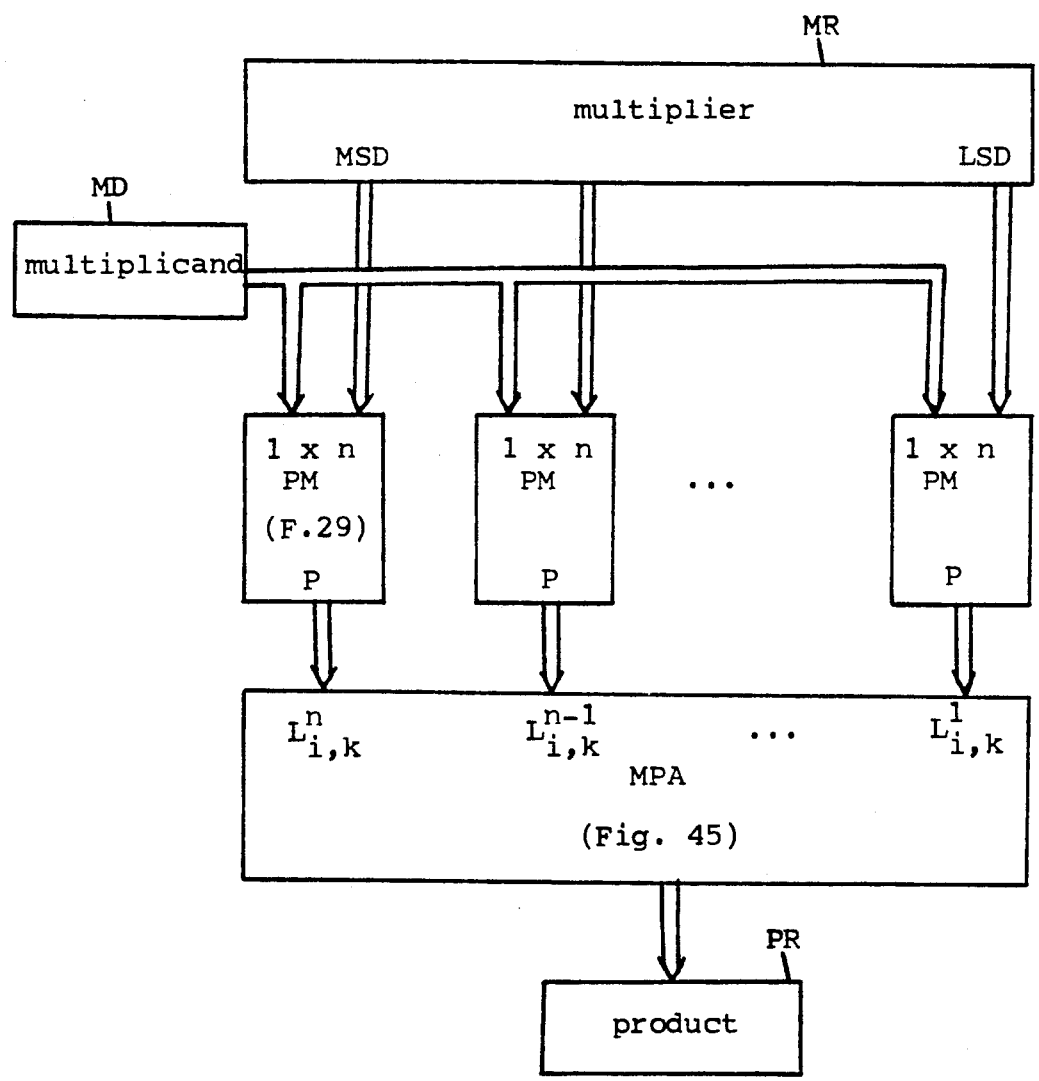
FIG. 46 is a block diagram for a TPC parallel multiplexer(PM)

FIG. 46 is a PM constructed from n-digit multiplicand register (MD), m-digit multiplier register (MR), n+m−digit product register (PR), $1 \times n - PM$'s of FIG. 29, and a $n+1−$operand MPA of FIG. 45 according to the following algorithm written in a RTL (register transfer language)-like notation

ALG. 12

1. $1 \times n - PMs'$ $L_{inputs} \leftarrow MD$, $R_{inputs}$ of the $k^{th}$ $1 \times n - PM \leftarrow$ the $k^{th}$ digit from MR.
2. $MPA \leftarrow 1 \times n - PM$'s.
3. $PR \leftarrow MPA$.

The MPA of FIG. 46 is a combinational implementation for the multiply operation. The only limitation, in addition to the AND gate fan-in, is that the length (in digits) of one of the operands must be less than or equal to the radix b according to relations (58). AND gate fan-in is the main limitation because the above mentioned length limitation can be removed by combining the design of the $HA_r$ of FIG. 41 with the design of the MHA of FIG. 44. To be continued next on combinational unit devices FIGS. 47 through 63.

So far four combinational implementations for the operations add, subtract, compare, and Boolean functions and three sequential implementations for the multiply, divide, and extract square root operations has been described individually. Next, the description of combining the four combinational implementations into a combinational unit then the description of combining the three sequential implementations into a sequential unit.

The PA of FIG. 6 consists of three block levels: HA-level, CLA-level, and FAL-level, and accordingly, the four combinational implementations will be unified according to the following algorithm.

ALG. 13: Combinational unit design procedure

1. Combine the corresponding devices, taken two at a time, at the HA-level.
2. Combine the corresponding devices at the CLA-level.
3. Combine the corresponding devices at the FAL-level.
4. Connect the devices of steps 1, 2, and 3 according to the levelling order of FIG. 6.
5. Repeat steps 1 through 4 for the involved implementations (old and new) taken two at a time until the formation of the required unit, where device here meant a block component as the HA while implementation meant a processor of type the PA of FIG. 6. The unification of a given two devices may be done by combining their logic diagrams directly or by unifying their input-output relations then drawing the required logic diagram accordingly.

Figure 47:
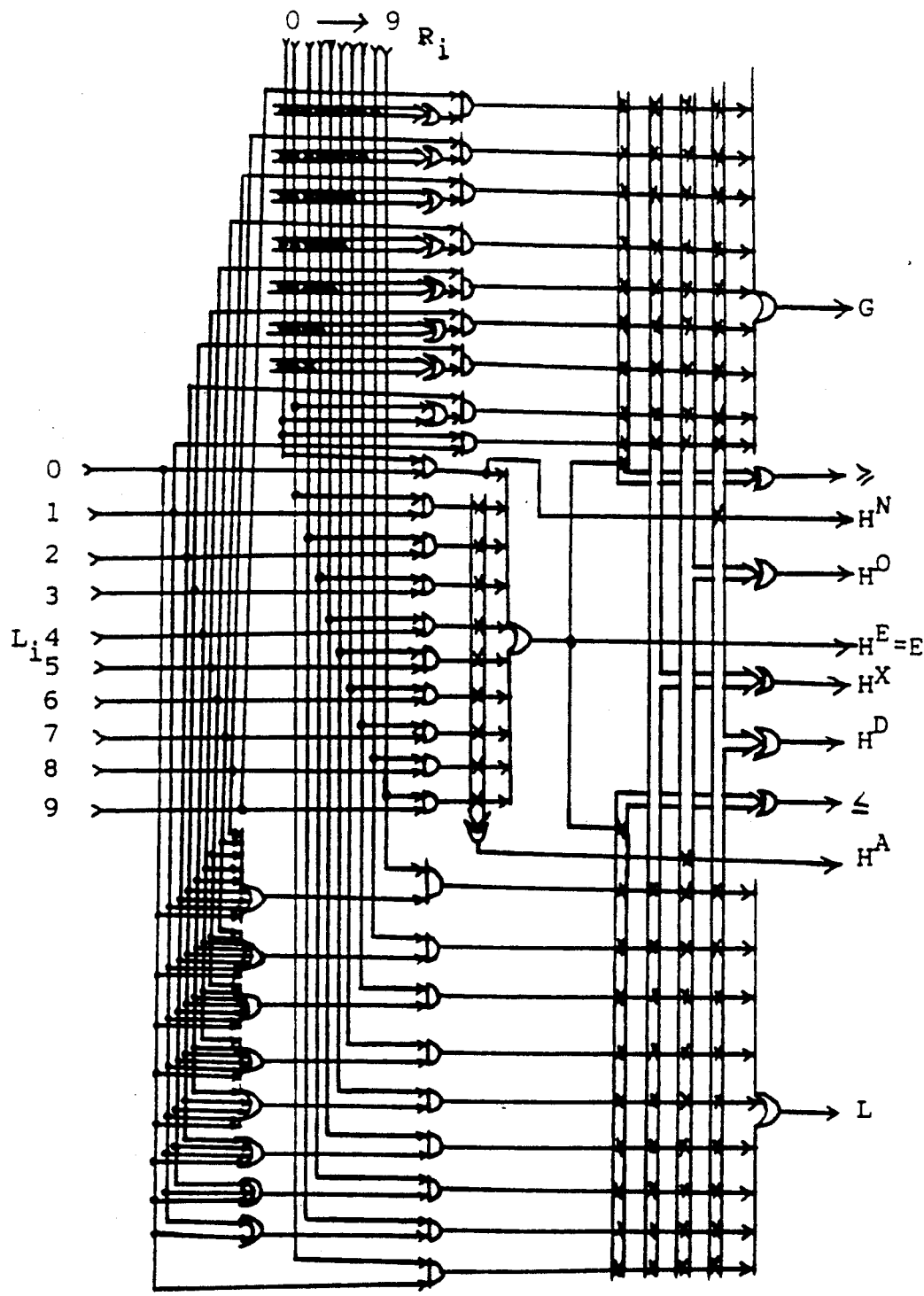
FIG. 47 is a logic diagram for a TPC two-digit comparator-Booleaner(TCB)

FIG. 47 is a TCB drawn according to the following IOR which are a combination of relations (33) and (35):

$$G^d = \sum_{0 \leq j < i < r} L_i R_j \quad (60)$$

$$L^d = \sum_{0 \leq i < j < r} L_i R_j$$

$$\text{``}\geq\text{''} = G^d + E^d$$

$$E^d = H^E = \sum_{i=0}^{r-1} L_i R_i$$

$$\text{``}\leq\text{''} = L^d + E^d$$

$$H^N = L_0 R_0;$$

$$H^A = \sum_{i=1}^{r-1} L_i R_i$$

$$H^x = H_x = G^d + L^d$$

$$H^O = (H^N)' = H^A + H^x = \sum_{\substack{0 \leq i, j < r \\ i+j \neq 0}} L_i R_j$$

$$H^D = (H^A)' = H^N + H^x = L_0 R_0 + \sum_{\substack{0 \leq i, j < r \\ i \neq j}} L_i R_j$$

Figure 48:
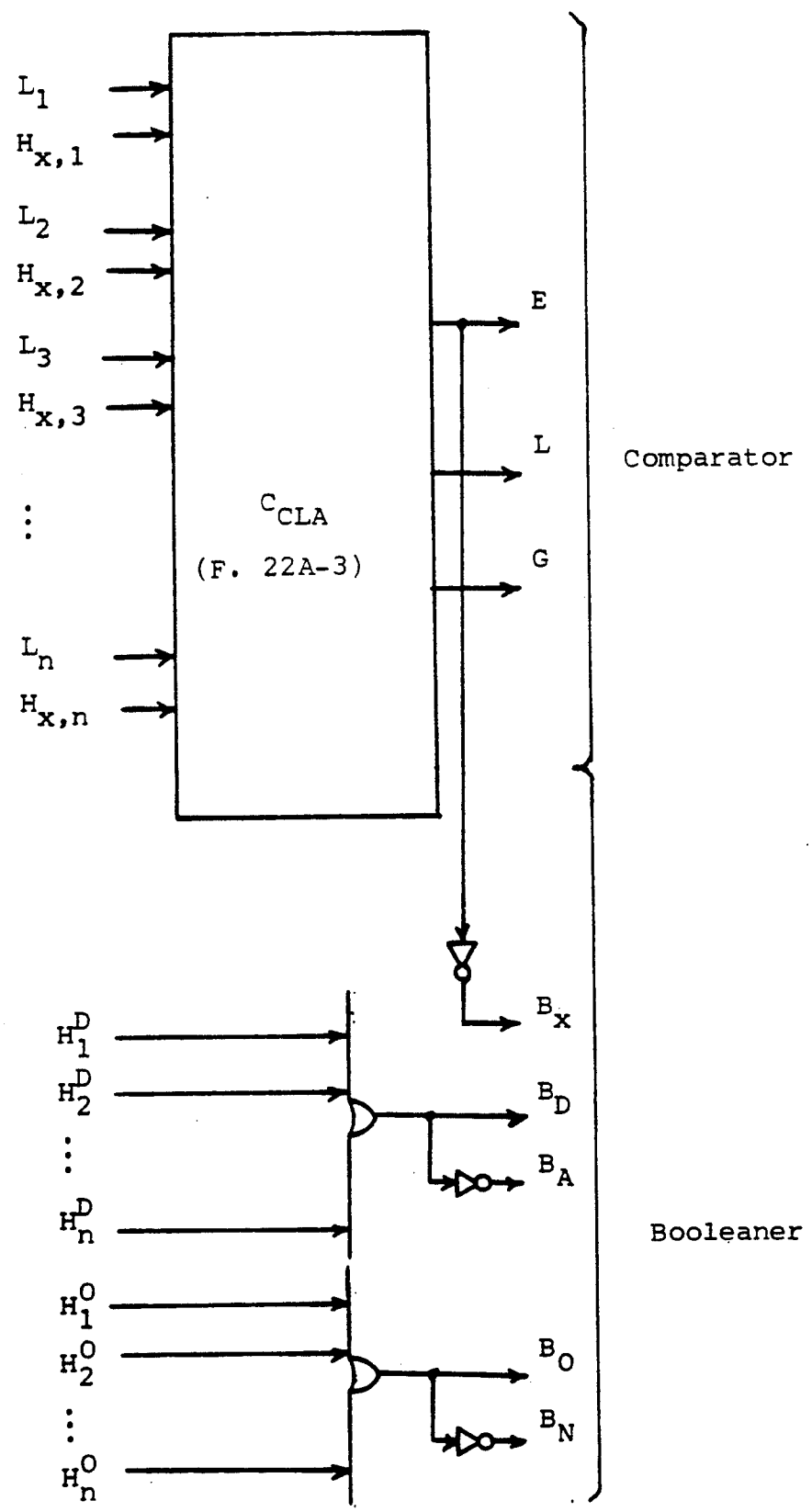
FIG. 48 is a logic diagram for a TPC comparator-Booleaner oriented CLA(CB$_{CLA}$)
Figure 49:
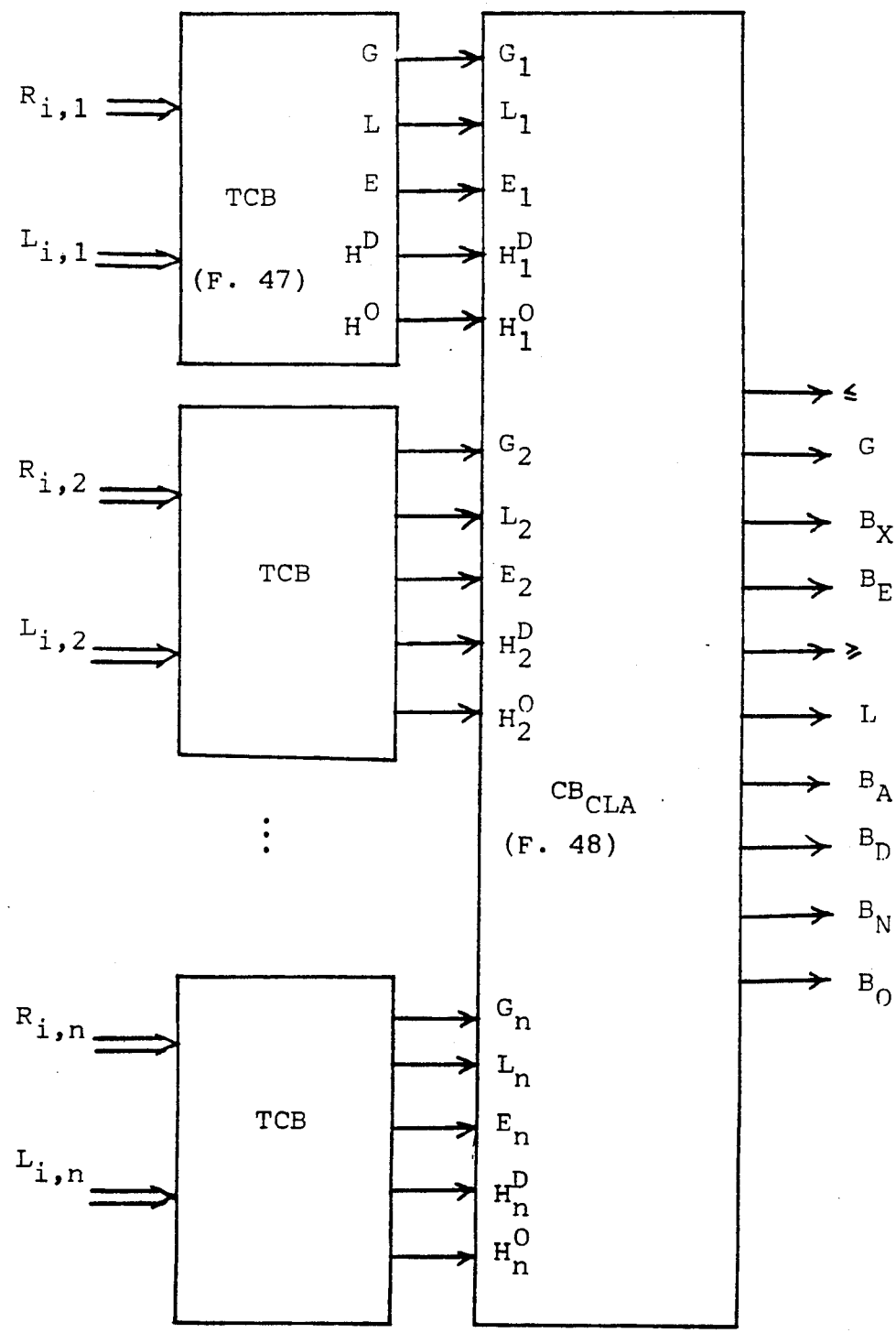
FIG. 49 is a block diagram for a TPC parallel comparator-Booleaner(PCB)

FIGS. 48 and 49 are $CB_{CLA}$ and PCB, respectively, drawn according to the following IOR obtained by combining relations (34) with relations (36):

$$G_k = G_k^d + \sum_{t=1}^{k-1} \prod_{s=0}^{t-1} E_{k-s}^d G_{k-t}^d = G_k^d + \quad (61)$$

$$\sum_{t=1}^{k-1} G_{k,t} G_{k-t}^d = (L_k + E_k)'$$

-continued $$L_k = L_k^d + \sum_{t=1}^{k-1} \prod_{s=0}^{t-1} E_{k-s}^d L_{k-t}^d = L_k^d +$$

$$\sum_{t=1}^{k-1} G_{k,t} L_{k-t}^d = (G_k + E_k)'$$

$$E_k = B_E = (B_x)' = \prod_{t=1}^{k} E_t^d$$

$$B_N = (B_O)' = \prod_{t=1}^{k} H_t^N$$

$$B_x = (B_E)' = L_k + G_k = \sum_{t=1}^{k} H_t^x$$

$$B_O = B_x + B_A = \sum_{t=1}^{k} H_t^O$$

$$B_A = (B_D)' = \prod_{t=1}^{k} H_t^A$$

$$B_D = B_x + B_N = \sum_{t=1}^{k} H_t^D.$$

FIG. 48 is drawn directly according to relations (61) while FIG. 49 is constructed from n TCB's of FIG. 47 coupled to a n-input $CB_{CLA}$ of FIG. 48 according to relations (61).

Figure 50:
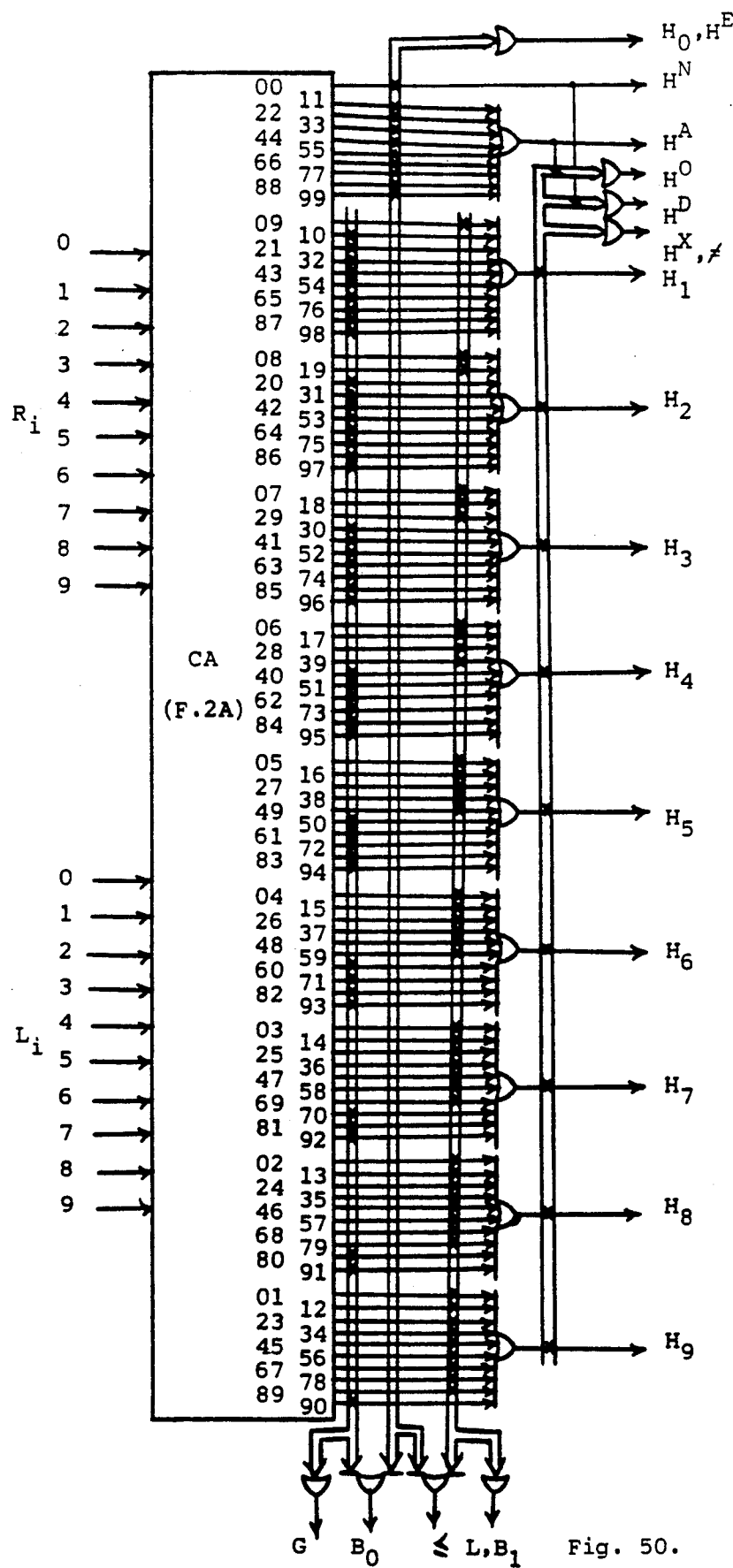
FIG. 50 is a logic diagram for a TPC half subtractor-comparator-Booleaner(HSCB)

FIG. 50 is a HSCB drawn according to the following IOR obtained by combining relations (19) with relations (60):

$$H_i = \sum_{0 \leq j, k < r} L_j R_k \text{ such that } i = \begin{cases} j - k & \text{if } j \geq k \\ (10 + j) - k & \text{if } j < k \end{cases} \quad (62)$$

$$H_0 = E^d = H^E = H^A + H^N = \sum_{i=0}^{r-1} L_i R_i$$

$$G^d = (L^d + E^d)' = \sum_{0 \leq j < i < r} L_i R_j$$

$$L^d = B_1 = \sum_{0 \leq i < j < r} L_i R_j$$

$$H^N = L_0 R_0;$$
$$B_0 = G^d + E^d;$$
$$H^x = H_x = G^d + L^d$$
$$H^D = H^N + H^x;$$

$$H^A = \sum_{i=1}^{r-1} L_i R_i$$

$$H^O = H^A + H^x.$$

Figure 51:
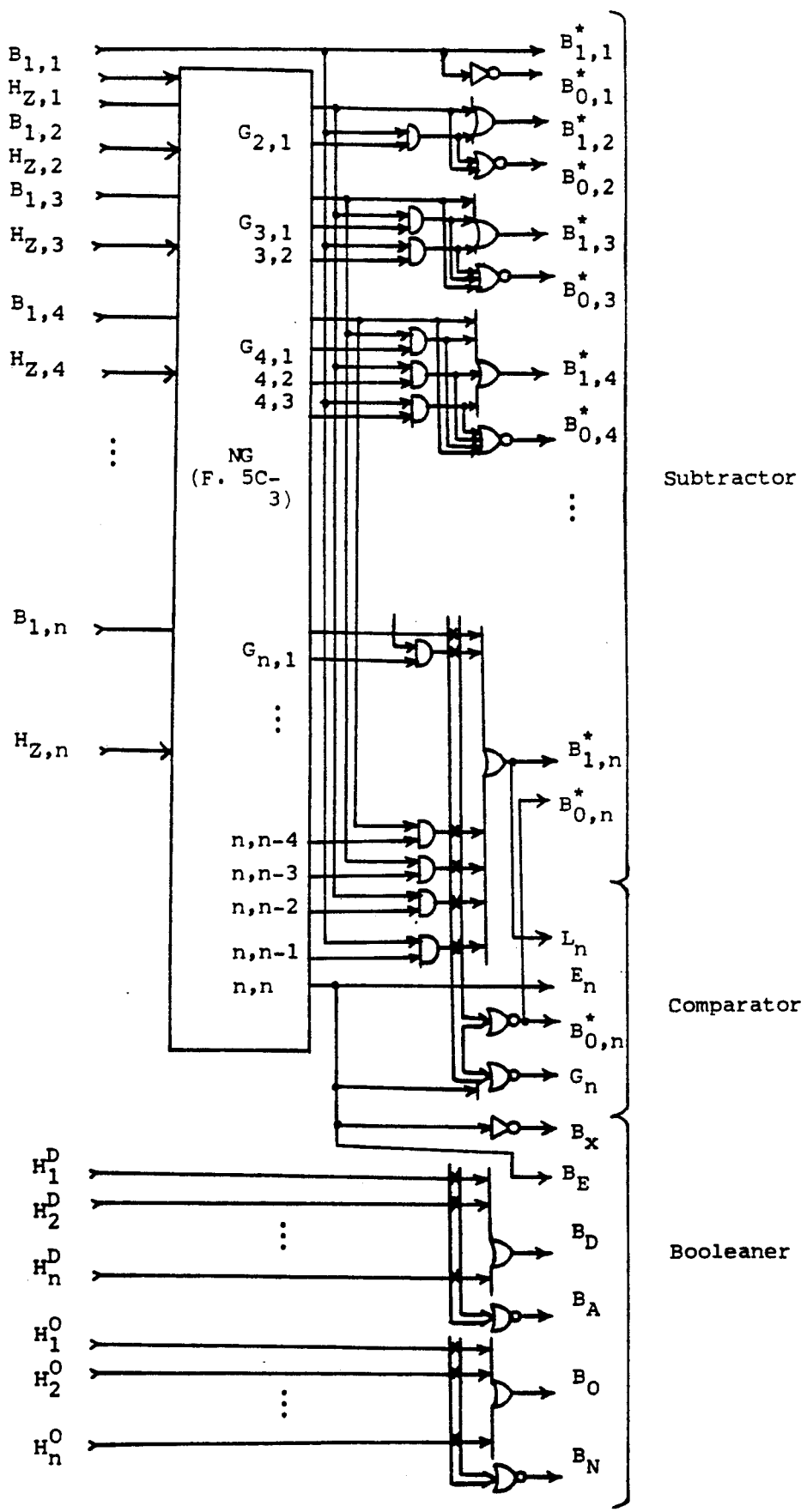
FIG. 51 is a logic diagram for a TPC subtractor-comparator-Booleaner oriented CLA(SB$_{CLA}$)

FIG. 51 is a $SB_{CLA}$ drawn according to the following IOR obtained by combining relations (61) with relations (22):

$$B_{0,k} = (B_{1,k})' = G_k + E_k \quad (63)$$

$$B_{1,k} = L_k = L_k^d + \sum_{t=1}^{k-1} \prod_{s=0}^{t-1} E_{k-s}^d L_{k-t}^d = L_k^d + \sum_{t=1}^{k-1} G_{k,t} L_{k-t}^d$$

$$G_k = G_k^d + \sum_{t=1}^{k-1} \prod_{s=0}^{t-1} E_{k-s}^d G_{k-t}^d = G_k^d +$$

-continued $$\sum_{t=1}^{k-1} G_{k,t} G_{k-t}^d = (L_k + E_k)'$$

$$E_k = (B_x)' = B_E = \prod_{s=1}^{k} E_s^d = \prod_{s=1}^{k} H_{0,s} = \left(\sum_{s=1}^{k} H_{x,s}\right)' = G_{k,k}$$

$$B_N = (B_O)' = \prod_{t=1}^{k} H_t^N;$$

$$B_O = B_x + B_A = \sum_{t=1}^{k} H_t^O$$

$$B_x = G_k + L_k = \sum_{t=1}^{k} H_t^x;$$

$$G_{k,t} = \prod_{s=0}^{t-1} E_{k-s}^d = \prod_{s=0}^{t-1} H_{0,k-s} = \left(\sum_{s=t}^{k} H_{x,s}\right)'$$

$$B_A = (B_D)' = \prod_{t=1}^{k} H_t^A;$$

$$B_D = B_x + B_N = \sum_{t=1}^{k} H_t^D.$$

Figure 52:
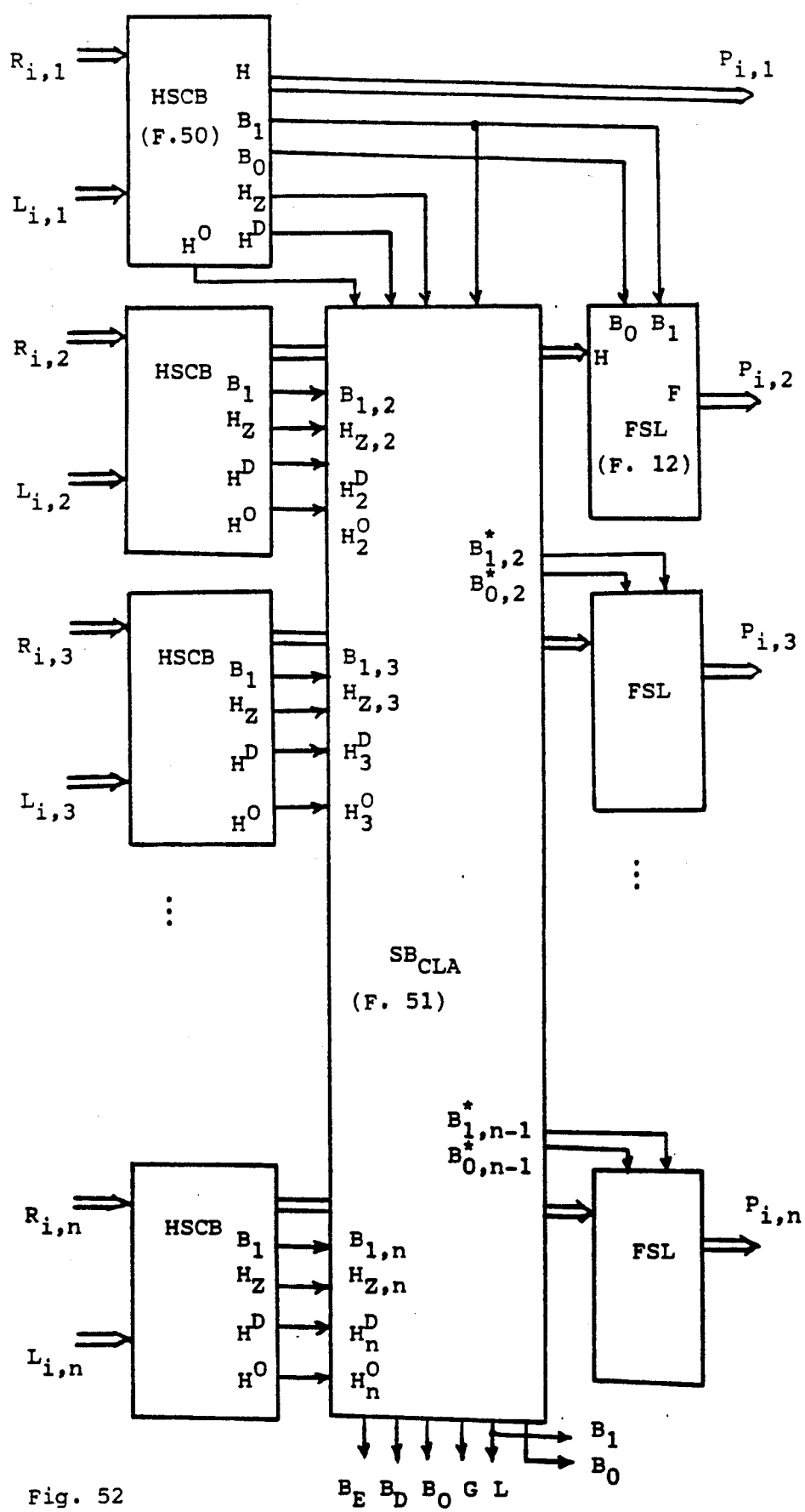
FIG. 52 is a block diagram for a TPC parallel subtractor-comparator-Booleaner(PSCB)

FIG. 52 is a PSCB comprised from HSCB's of FIG. 50, a $SB_{CLA}$ of FIG. 51 and FSL's of FIG. 12 according to the following IOR which are a combination of relations (63) and (23):

$$P_{i,k} = \begin{cases} H_{i,k} & \text{if } k = 1 \\ H_{i,k} B_{0,k-1} + H_{i+1,k} B_{1,k-1} & \text{if } 1 < k \leq n \end{cases} \quad (64)$$

$$B_j = B_{j,n}$$

E, L, G, $B_E$, $B_D$ and $B_O$ are as given in relations (63), where $H_{i,k}$'s are as given in relations (62) and $B_{j,k}$'s are as given in relations (63). FIGS. 49 and 52 are designed precisely according to ALG 13. FIG. 49 is a combination of FIGS. 22B and 25 while FIG. 52 is a combination of FIGS. 15 and 49. FIG. 49 consists of two block levels and accordingly its functions (outputs) are obtained from the CLA-level in FIG. 52.

Figure 53:
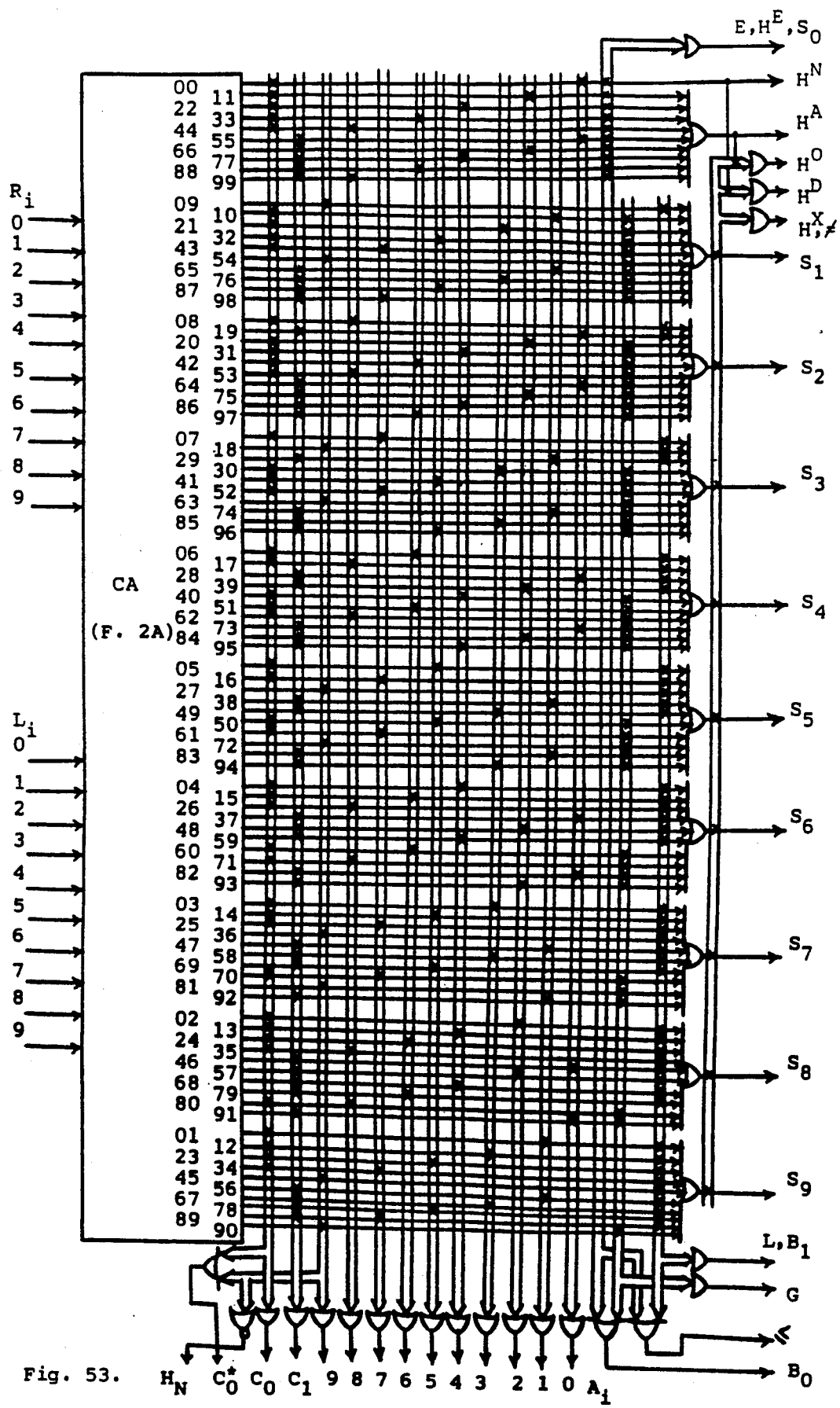
FIG. 53 is a logic diagram for a TPC parallel half adder-subtractor/comparator-Booleaner(PHAS)

FIG. 53 is a PHAS drawn according to the following IOR obtained by combining relations (3) with relations (62):

$$A_i = \sum_{0 \leq j,k \leq 9} L_j R_k \text{ such that } j + k = i(\text{mod } 10) \quad (65)$$

$$S_i = \sum_{0 \leq j,k \leq 9} L_j R_k \text{ such that } i = \begin{cases} j - k & \text{if } j > k \\ (10 + j) - k & \text{if } j < k \end{cases}$$

$$S_0 = H^E = E = \sum_{i=0}^{9} L_i R_i; H_N = \left(\sum_{i+j=9} L_i R_j\right)'$$

$$C_0 = \sum_{i+j<9} L_i R_j; \ C_0^* = \sum_{i+j\leq 9} L_i R_j; \ C_1 = \sum_{i+j>9} L_i R_j$$

$$B_0 = G; \ B_0^* = G + E; \ B_1 = L$$

$$G = \sum_{i>j} L_i R_j; \ L = \sum_{i<j} L_i R_j$$

$$H^N = L_0 R_0; \ H_A = \sum_{i=1}^{9} L_i R_i$$

$$H^x = H_x = H_Z = L + G; \ H^D = H^x + H^N; \ H^O = H^x + H^A.$$

Figure 54:
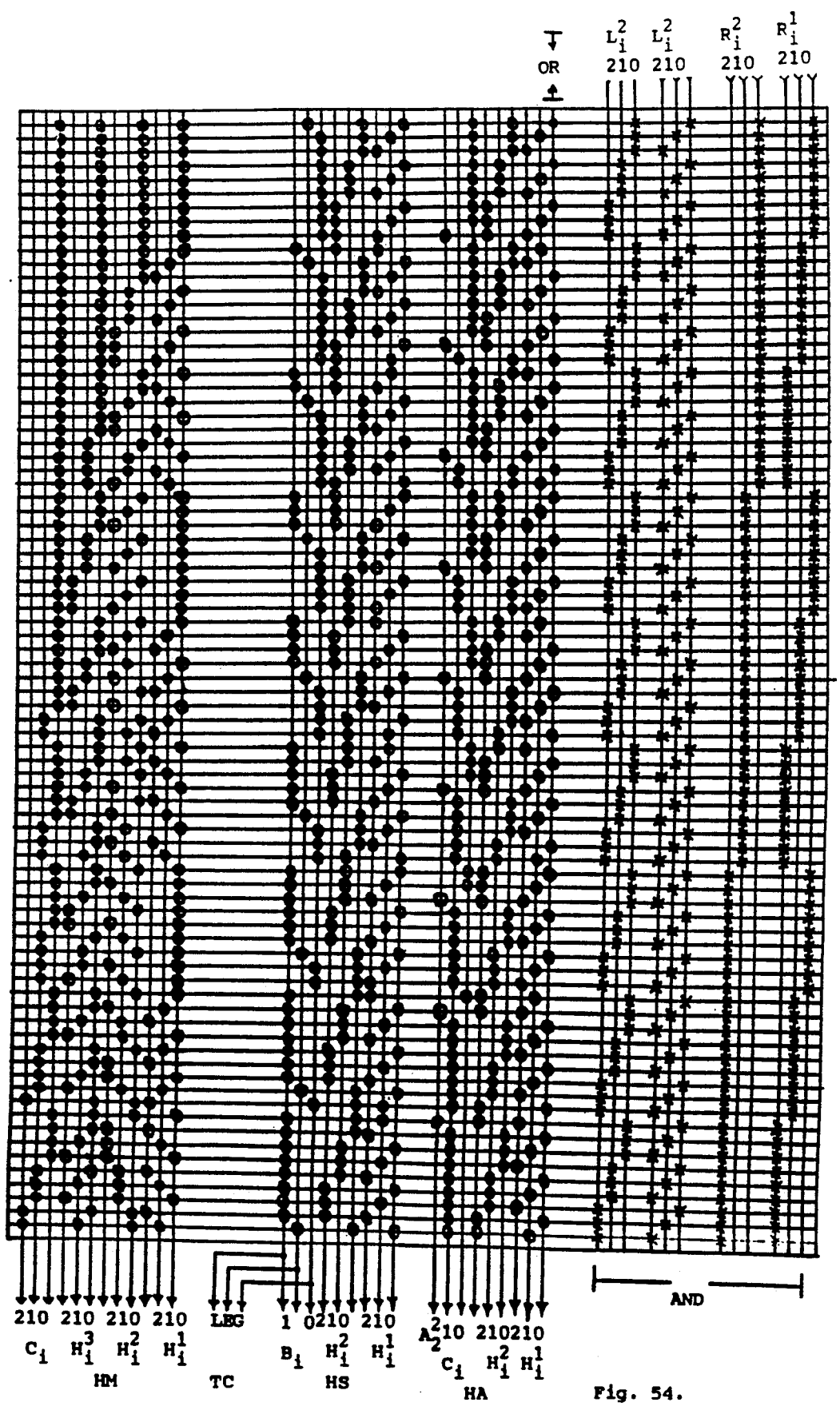
FIG. 54 is a logic diagram for a TPC r-digit operand half adder-subtractor/multiplier-comparator(-HASMC$_r$) for r=2.

FIG. 54 is a $PHASMC_r$ drawn, for the case $b=3$ and $r=2$, according to the following IOR:

$$H_i^v = \sum_{0 \leq j,k < b} L_{I_1} R_{I_2} \text{ such}$$
that $I_1 + I_2 = id_{v-1} \ldots d_2 d_1 (\text{mod } b^v)$ $$C_i^v = \sum_{0 \leq j,k < b} L_{I_1} R_{I_2} \text{ such that } \lfloor (I_1 + I_2)/b^r \rfloor = i \quad (66a)$$

$$A_{b-1}^v = \prod_{t=1}^{v} H_{b-1}^t; \ A_*^v = (A_{b-1}^v)' = \sum_{t=1}^{v} \sum_{i=0}^{b-2} H_i^t$$

$$H_i^v = \sum_{0 \leq j,k < b} L_{I_1} R_{I_2} \text{ such}$$

that $= \begin{cases} \lfloor (I_1 - I_2)/b^{v-1} \rfloor & \text{if } I_1 \geq I_2 \\ \lfloor ((b^v + I_1) - I_2)/b^{v-1} \rfloor & \text{if } I_1 < I_2 \end{cases}$ $$\sum_{0 \leq j,k < b} L_{I_1} R_{I_2} = \begin{cases} B_0 & \text{if } I_1 \geq I_2 \\ B_1 & \text{if } I_1 < I_2 \end{cases} \quad (66s)$$

$$B_0^v = \prod_{t=1}^{v} H_0^t;$$

$$B_*^v = (B_0^v)' = \sum_{t=1}^{v} \sum_{i=1}^{b-1} H_i^t$$

$$\sum_{0 \leq j,k < b} L_{I_1} R_{I_2} = \begin{cases} G & \text{if } I_1 > I_2 \\ E & \text{if } I_1 = I_2 \\ L & \text{if } I_1 < I_2 \end{cases} \quad (66c)$$

$$H_i^\mu = \sum_{0 \leq j,k < b} L_{I_1} R_{I_2} \text{ such that } I_1 \cdot I_2 = id_{u-1} \ldots d_2 d_1 (\text{mod } b^u)$$

$$c_i^m = \sum_{0 \leq j,k < b} L_{I_1} R_{I_2} \text{ such that } \lfloor (I_1 \cdot I_2)/b^{2r-1} \rfloor = i \quad (66m)$$

where $L_{I_1}$, $R_{I_2}$, $I_1$, $I_2$, b, r, v, $j_v$ and $k_v$ are as defined for relations (55), $C_i^m$ denotes the carry outputs of the multiplier, and $u = 1, 2, \ldots, 2r-1$. Relations (66a) are exactly relations (55) rewritten here, as given there, for the add operation. Relations (66s), (66c) and (66m) are obtained by applying the same procedure (of relations 55) for subtract, compare and multiply operations, respectively. So far, ALG 1 is generalized three times: 1) for any radix (the decimal input-output relations are rewritten in the general form simply by replacing 9 by $r-1$), 2) for more than one-digit input half adder (the $HA_r$ of FIG. 41), 3) for more than one operand (the MPA of FIG. 45), and the fourth generalization is the instantaneous implementation for more than one operation illustrated by FIGS. 47, 50, 53, and 54. FIG. 54 shows, for the given example, that add, subtract, compare and multiply operations can be implemented instantaneously-on the same inputs-in a half adder time delay. FIG. 53, which is a combination of FIGS. 2B and 50, illustrates what is meant by the claim mentioned in connection with relation (1) that the AND implementation is the same for all involved arithmetic operations. It is not the case, however, with respect to the OR implementation, i.e., every involved operation outputs on special set of OR gates. In other words, FIG. 53 consists of two levels of logical gates: an AND-level common to all involved operations and an OR-level in which every involved operation has its own set of OR gates. Means that the design of the remaining two block levels (CLA and FAL levels) can be finished in one of two methods: 1) connect the outputs of every operation to the already designed CLA and FAL levels for that operation in order to have a unit with separate but instantaneous outputs for all involved operations, 2) use multiplexers or control variables when necessary and continue the design according to ALG 13. Only option no. 2 will be followed in this invention although option no. 1 is logical also since less hardware is required for the CLA and the FAL block levels specially with the CLA of FIG. 5C-6.

Figure 55:
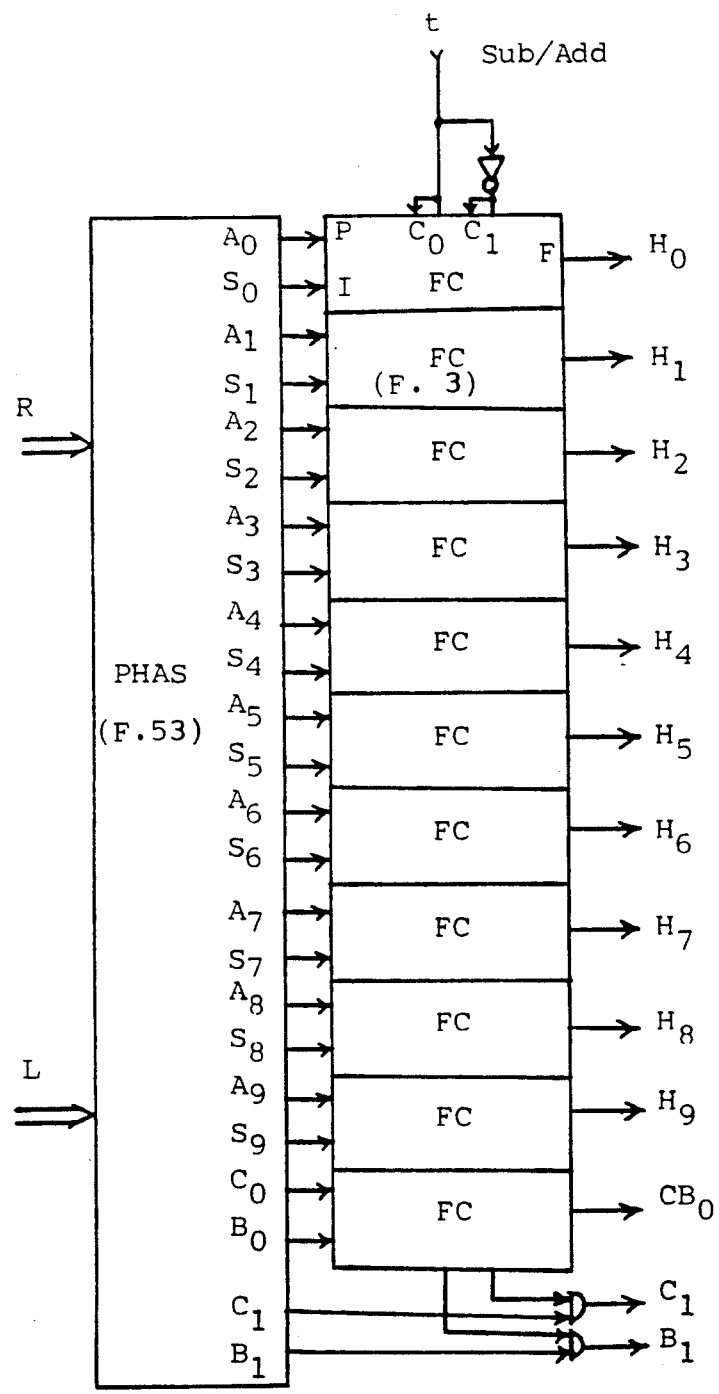
FIG. 55 is a block diagram for a TPC half adder-subtractor(HAS)

FIG. 55 is a HAS comprised from a PHAS of FIG. 53, FC's of FIG. 3, a control variable t and combinational logic according to the following IOR:

$$H_i = A_i t' + S_i t \quad (67)$$
$$(CB)_0 = C_0 t' + B_0 t$$
$$C_1^* = C_1 t'; \quad B_1^* = B_1 t$$

where t is a control variable denotes add for value 0 and subtract for value 1, $A_i$, $S_i$, $C_j$, and $B_j$ are as given in relations (65). The remaining functions of relations (65) are the same for the HAS of FIG. 55 except that they are associated with the subtract operation via the control variable t.

Figure 56:
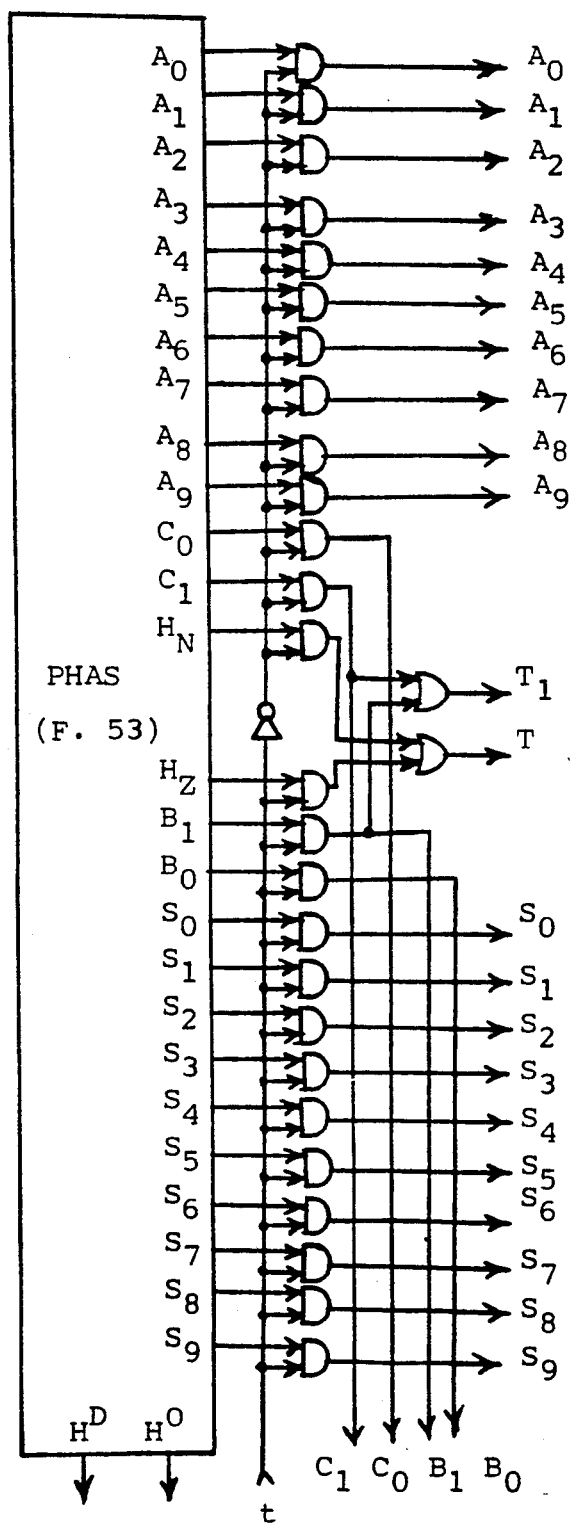
FIG. 56 is a block diagram for a TPC parallel adder-subtractor oriented HAS.

FIG. 56 is a PAS oriented HAS comprised from a PHAS of FIG. 53, a control variable t and combinational logic according to the following IOR:

$$A_i^* = A_i t'; \quad S_i^* = S_i t \quad (68)$$
$$C_j^* = C_j t'; \quad B_j^* = B_j t$$
$$T_1 = C_1 t' + B_1 t; \quad T = H_N t' + H_Z t;$$
$$T_0 = T_1'$$

the remaining functions of relations (65) are the same here except, again, that they are associated with the subtract operation via the control variable t; $A_i$, $S_i$, $C_j$, $B_j$, $H_N$ and $H_Z$ are as given in relations (65), and t is as assigned in relations (67). The carry $C_1$ is needed to be combined with the borrower $B_1$ and the non-nine function $H_N$ is needed to be combined with the non-zero function $H_Z$ for the CLA block level while the remaining functions are not. The carries $C_j^*$ and the borrowers $B_j^*$ are not needed if k<n.

Figure 57:
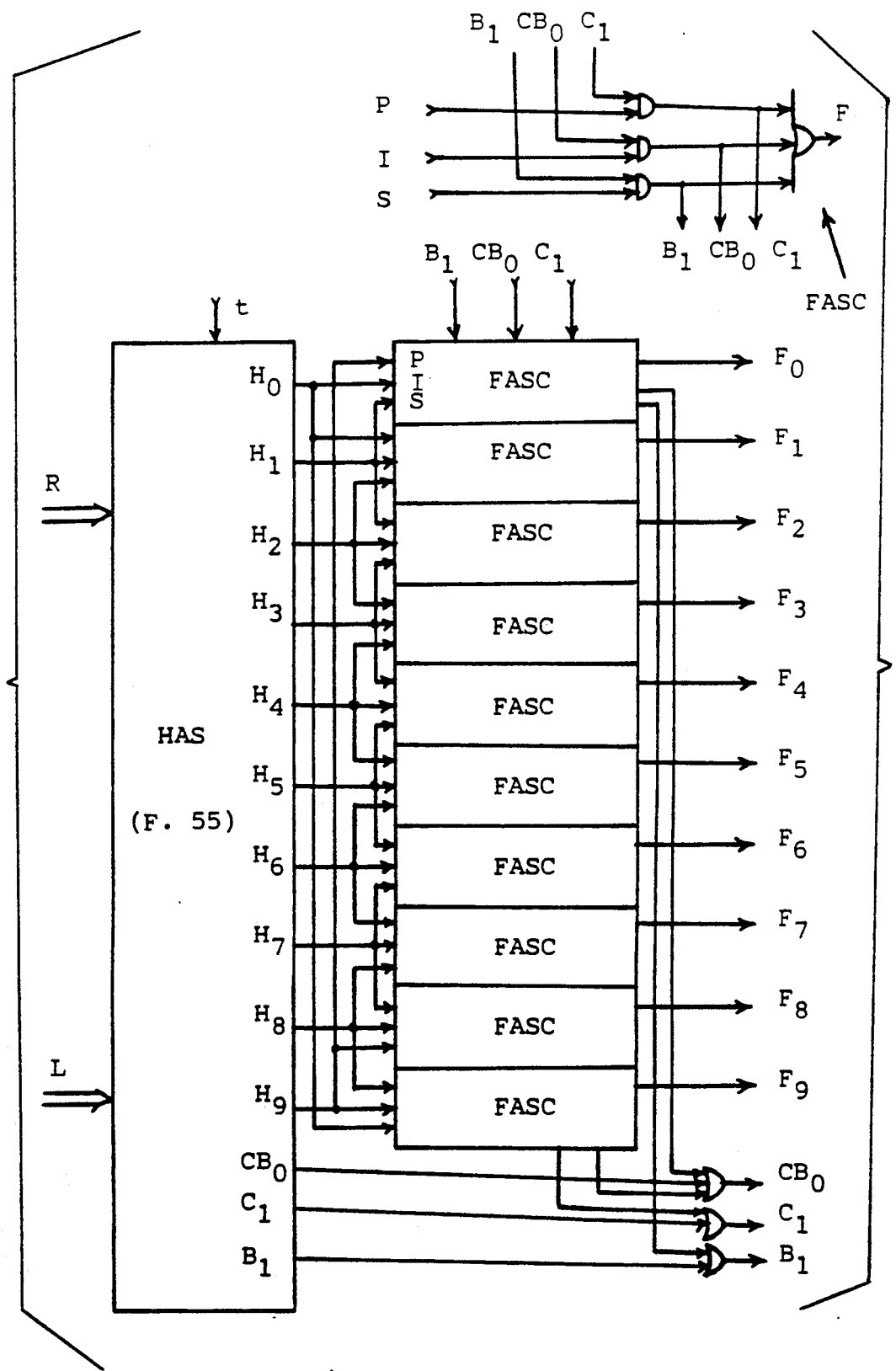
FIG. 57 is logic diagram for a TPC full adder-subtractor (FAS)

FIG. 57 is a FAS constructed from a HAS of FIG. 55, ten full adder-subtractor cells (FASC), and combinational logic according to the following IOR:

$$F_i = H_i(CB_0) + H_{i-1}C_1 + H_{i+1}B_1 \quad (69)$$
$$CB_0^* = CB_0^d + (H_9 + H_0)CB_0$$
$$C_1^* = C_1^d + H_9C_1; \quad B_1^* = B_1^d + H_0B_1$$

where $H_i$ and $CB_O$ are as given in relations (67), $C_1$ and $B_1$ denote $C^*_1$ and $B^*_1$ of relations (67), respectively.

Figure 58:
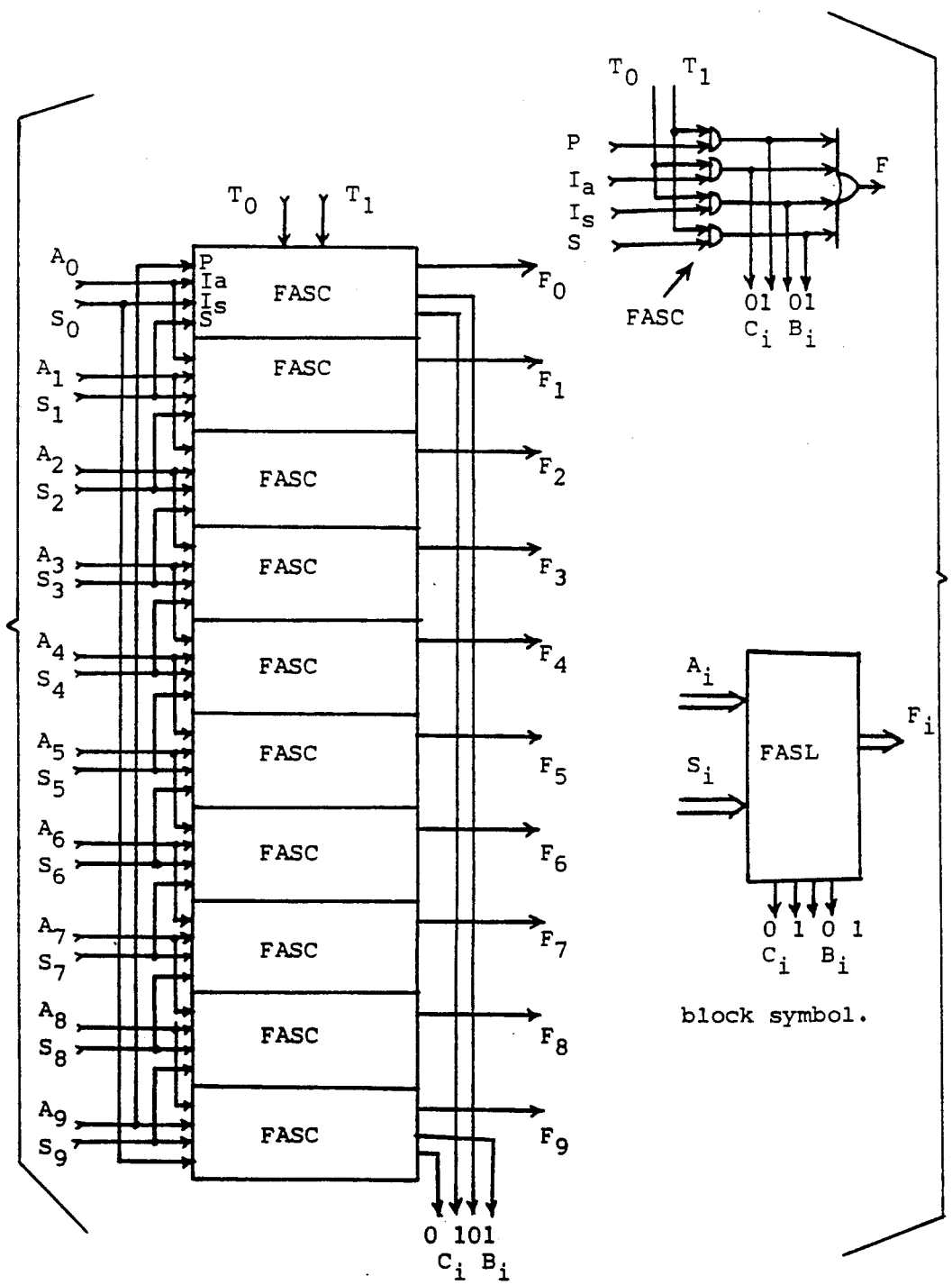

FIG. 58 is a FASL comprised from ten full adder-subtractor cells(FASC) according to the following IOR:

$$F_i = (A_i^* + S_i^*)T_0 + (A_{i-1}^* + S_{i+1}^*)T_1 \quad (70)$$

-continued
$$C_j = A_9^* T_j; \quad B_j = S_0^* T_j$$

where $A^*_i$ and $S^*_i$ (for i=0, 1, ..., 9) and $T_j$ (for j=0, 1) are as given in relations (68). A FASC has two carry inputs $T_j$, four data inputs P(for predecessor), $I_1$(for the self of $A_i$), $I_s$(for the self of $S_i$) and S(for successor). The carry inputs are common to all such FASC's while data input $A_i$ is connected to the $I_a$ of cell i and to the P of the successor of cell i, and data input $S_i$ is connected to the $I_s$ of cell i and to the S of the predecessor of cell i as indicated by relations(70). Again, $C_j$ and $B_j$ are not needed if k<n. With respect to ALG 13, FIG. 58 represents the combination of the corresponding devices(-FIGS. 3-1 and 12) at the FAL-level.

Figure 59:
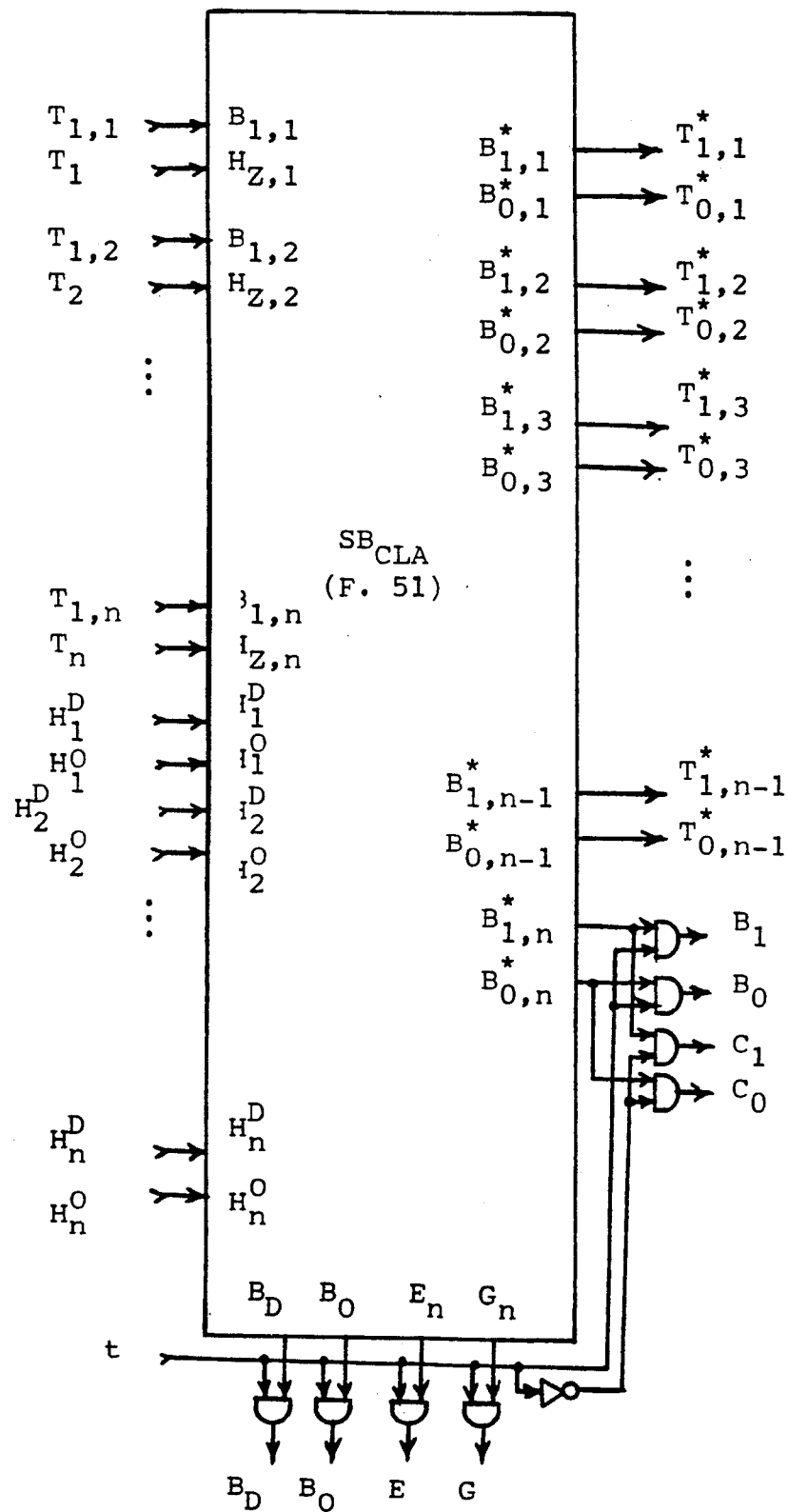
FIG. 59 is a block diagram for a TPC parallel adder-subtractor/comparator-Booleaner oriented CLA(AB-$_{CLA}$)

FIG. 59 is a $AB_{CLA}$ drawn according to the following IOR:

$$T_{1,k}^* = T_{1,k}^d + \sum_{t=1}^{k-1} G_{k,t} T_{1,k-t}^d = L_k \quad (71)$$

$$T_{0,k}^* = (T_{1,k}^*)' = G_k + E_k; \quad G_k = (L_k + E_k)'$$
$$E_k = B_E = (B_x)' = G_{k,k}$$

$$G_{k,t} = \left(\sum_{s=t}^{k} T_s\right)'$$

$$C_j = (T_{j,n}^*)'t; \quad B_j = (T_{j,n}^*)t; \quad L_n^* = B$$
$$E_n^* = E_n t; \quad G_n^* = G_n t; \quad B_O^* = B_O t; \quad B_D^* = B_D t$$
$$B_E^* = E_n^*; \quad B_A^* = B_A t; \quad B_x^* = B_x t; \quad B_N^* = B_N t$$

where $T_{j,k}^d$, $T_k$ and t as given in relations(68), $B_O$, $B_N$, $B_D$, $B_A$, $B_E$ and $B_x$ are as given in relations(63). FIG. 59 is merely a modification for FIG. 51 wherein: the Boolean inputs are kept as in FIG. 51 while the remaining inputs are formed according to relations(68), the Boolean and compare operations are associated with the subtract operation, and the final carry and borrower outputs $C_j$ and $B_j$ are recovered from the $T^*_{j,n}$ via the control variable t. With respect to ALG 13, FIG. 19 represents the combination of the corresponding devices (FIGS. 5C-6 and 61) at the CLA block level.

Figure 60:
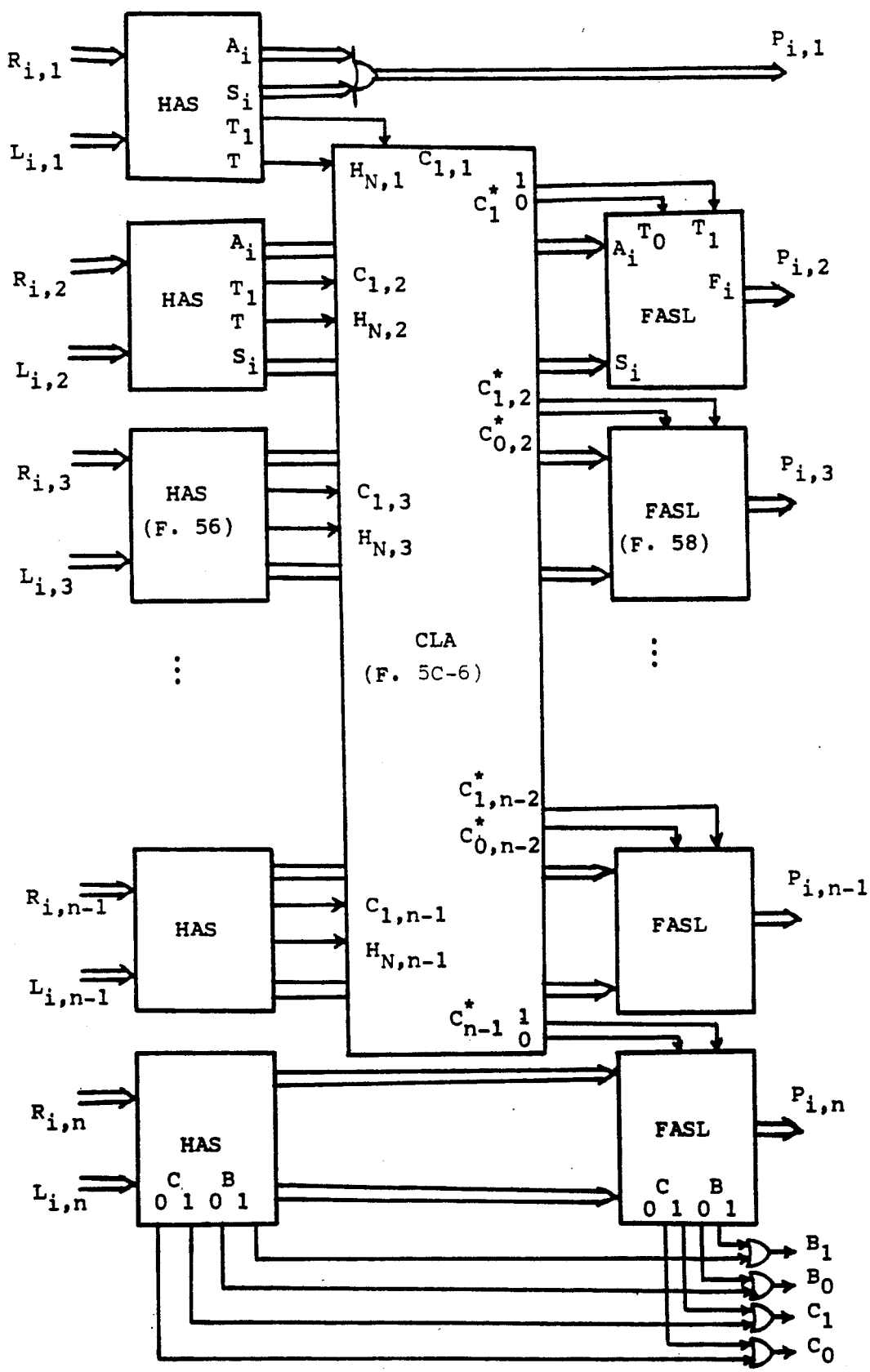
FIG. 60 is a block diagram for a TPC parallel adder-subtractor(PAS)

FIG. 60 is a PAS comprised from HAS's of FIG. 56, a CLA of FIG. 5C-6, FASL's of FIG. 58 and combinational logic according to the following IOR:

$$P_{i,k} = \begin{cases} A_{i,k}^* + S_{i,k}^* & \text{if } k = 1 \\ (A_{i,k}^* + S_{i,k}^*)T_{0,k-1}^* + (A_{i-1,k}^* + S_{i+1,k}^*)T_{1,k-1}^* \\ & \text{if } 1 < k \end{cases} \quad (72)$$

$$C_j = C_{j,n}^d + C_{j,n}; \quad B_j = B_{j,n}^d + B_{j,n}$$

where $A^*_{i,k}$ and $S^*_{i,k}$ are given in relations(68), $C_{j,n}^d$ and $B_{j,n}^d$ are the direct carries and borrowers of the $n^{th}$ HAS of FIG. 56, $C_{j,n}$ and $B_{j,n}$ are as given in relations (70), and $T^*_{j,k}$ is as given in relations (71). It has been mentioned that the CLA's are the same when the inputs $C_{j,k}^d$ and $H_{N,k}$ of an adder are replaced, respectively, by $B_{j,k}^d$ and $H_{Z,k}$ of a corresponding subtractor. For the same reasoning, such CLA's are the same also when either of the above inputs are replaced by $T_{j,k}^d$ and $T_k$, respectively, of relations (68). In other words, the CLA's of the adders, the subtractors, and the adder-subtractors are the same.

Figure 61:
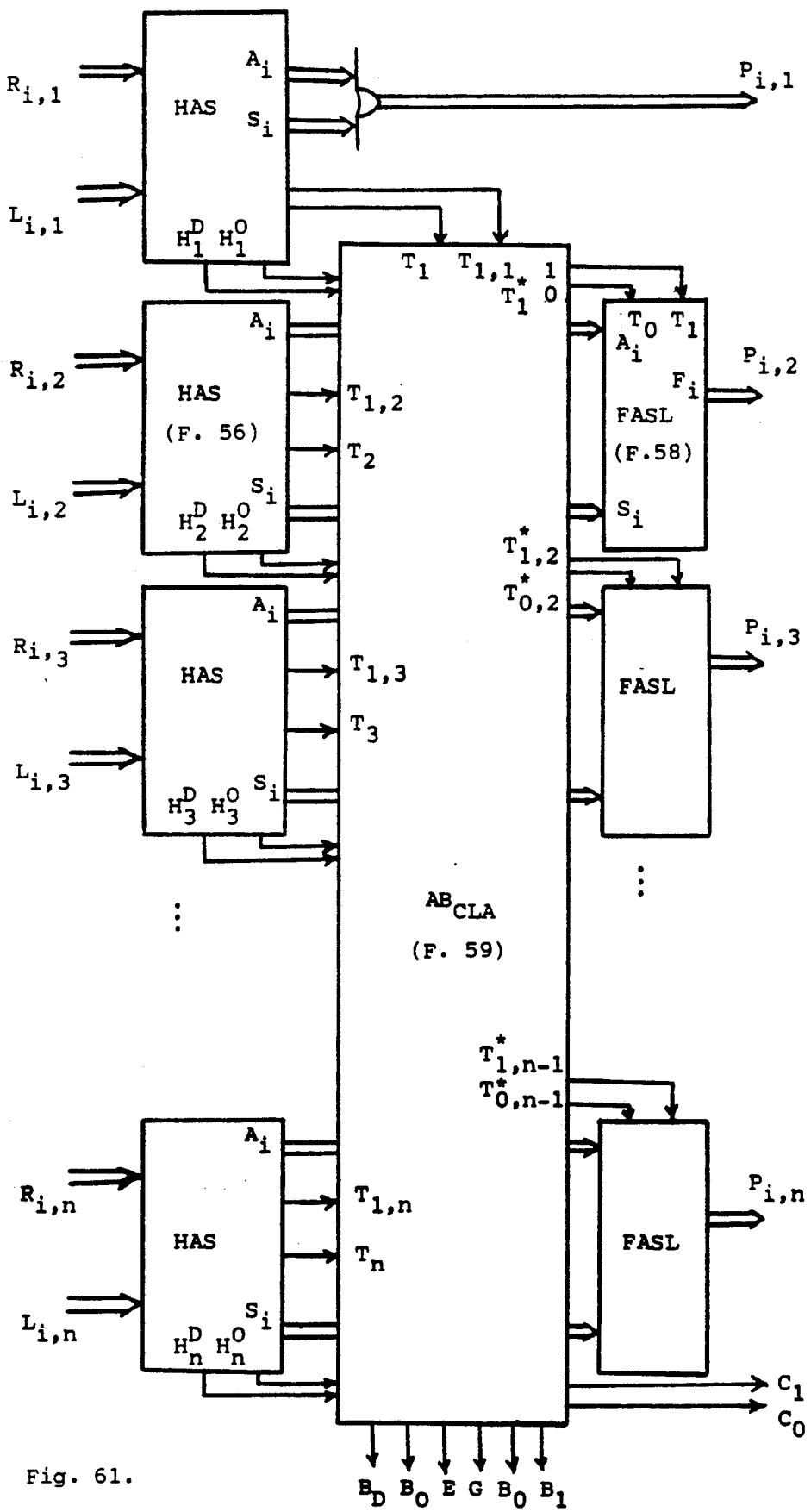
FIG. 61 is a block diagram for a TPC parallel adder-subtractor/comparator-Booleaner(PASCB)
Figure 52A:
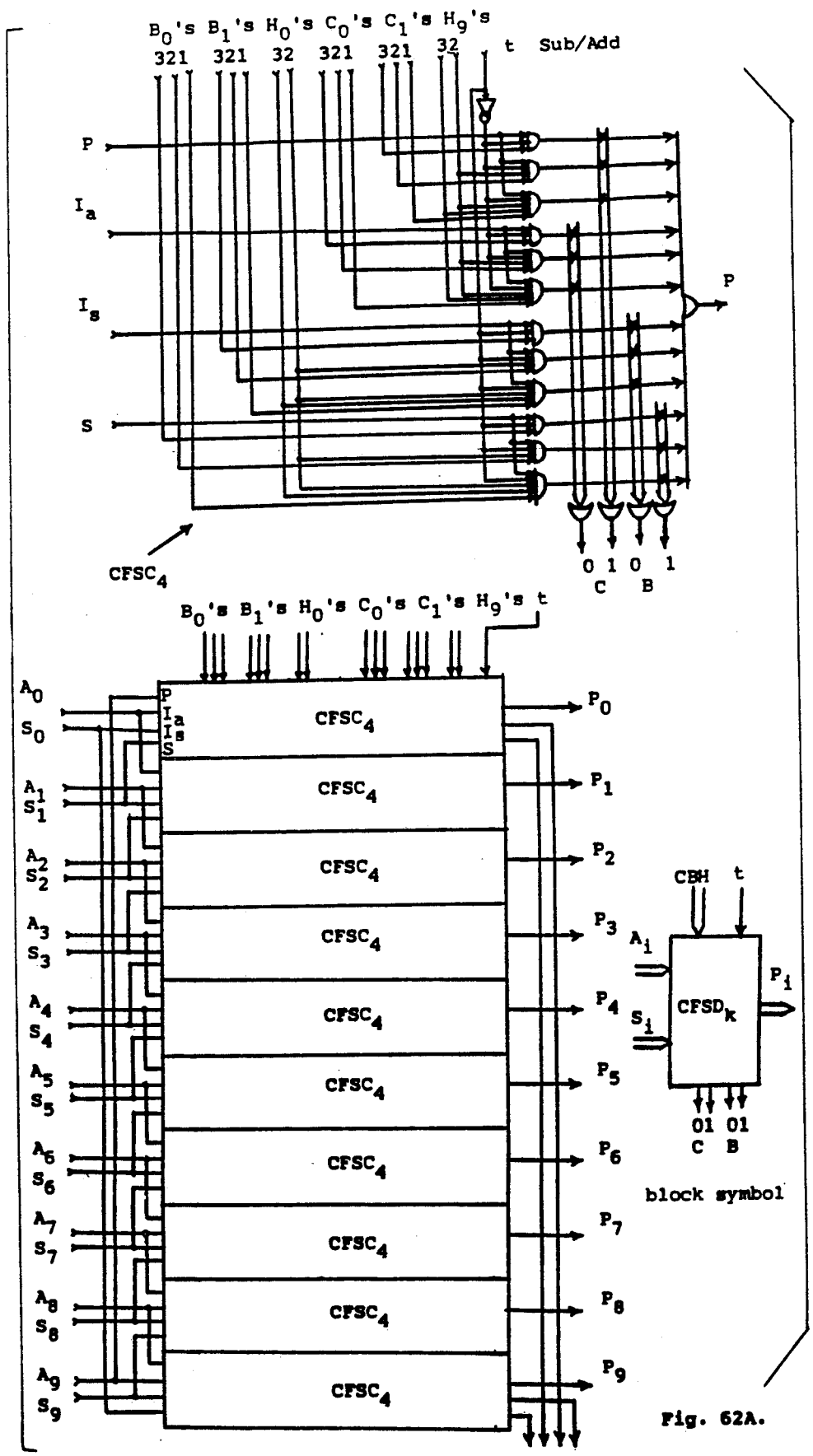

FIG. 61 is a PASCB comprised from HAS's of FIG. 56, FASL's of FIG. 58, and a $AB_{CLA}$ of FIG. 59 according to the following IOR:

$$P_{i,k} = \begin{cases} A^*_{i,k} + S^*_{i,k} & \text{if } k = 1 \\ (A^*_{i,k} + S^*_{i,k})T^*_{0,k-1} + (A^*_{i-1,k} + S^*_{i+1,k-1})T^*_{1,k-1} \\ \quad \text{if } 1 < k \end{cases} \quad (73)$$

where $T^*_{j,k}$ (for $j=0, 1$) and the remaining outputs of relations(71) are as given there, $A^*_{i,k}$ and $S^*_{i,k}$ are as given relations(68). FIG. 61 is a modification for FIG. 60 wherein: the CLA of FIG. 60 is replaced by a n-input $AB_{CLA}$ of FIG. 59 for implementing the compare and Boolean operations instantaneously with the subtract operations. FIGS. 60 and 61 are both designed according to algorithm 13.

FIG. 62A is a $CFSD_k$ constructed from ten CLA and GASL $k^{th}$ decade cells($CFSC_k$) according to the following IOR:

$$P_{i,k} = \begin{cases} (A_{i,k} \, C^d_{0,k-1} + A_{i-1,k} \, C^d_{1,k-1})t' + \\ (S_{i,k} \, B^d_{0,k-1} + S_{i+1,k} \, B^d_{1,k-1})t + \\ \sum_{y=1}^{k-2} \prod_{s=1}^{y} [A_{9,k-s}(A_{i,k} \, C^d_{0,k-y-1} + A_{i-1,k} \, C^d_{1,k-y-1})t' + \\ S_{0,k-s}(S_{i,k} \, B^d_{0,k-y-1} + S_{i+1,k} \, B^d_{1,k-y-1})t] \end{cases} \quad (74)$$

$$C_{j,k} = \left( \sum_{y=1}^{k-1} \prod_{s=0}^{y-1} A_{9,k-s} \, C^d_{j,k-y} \right) t'$$

$$B_{j,k} = \left( \sum_{y=1}^{k-1} \prod_{s=0}^{y-1} S_{0,k-s} \, B^d_{j,k-y} \right) t$$

where t is a control variable denotes add for value 0 and subtract for value 1, $A_{i,k}$, $S_{i,k}$, $C_{j,k}^d$ and $B_{j,k}^d$ are as given in relations (65). Each $CFSC_k$ has carry inputs $C_{j,k}$'s, borrower inputs $B_{j,k}$'s, nine inputs $H_{9,k}$'s, zero inputs $H_{0,k}$'s, control input t, and four data inputs identical to those of the GASC of FIG. 58. The non-data inputs are common to all such cells and the data inputs are connected as in the FASL of FIG. 58. The shown $CFSC_k$ is for the case $k=4$.

Figure 62B:
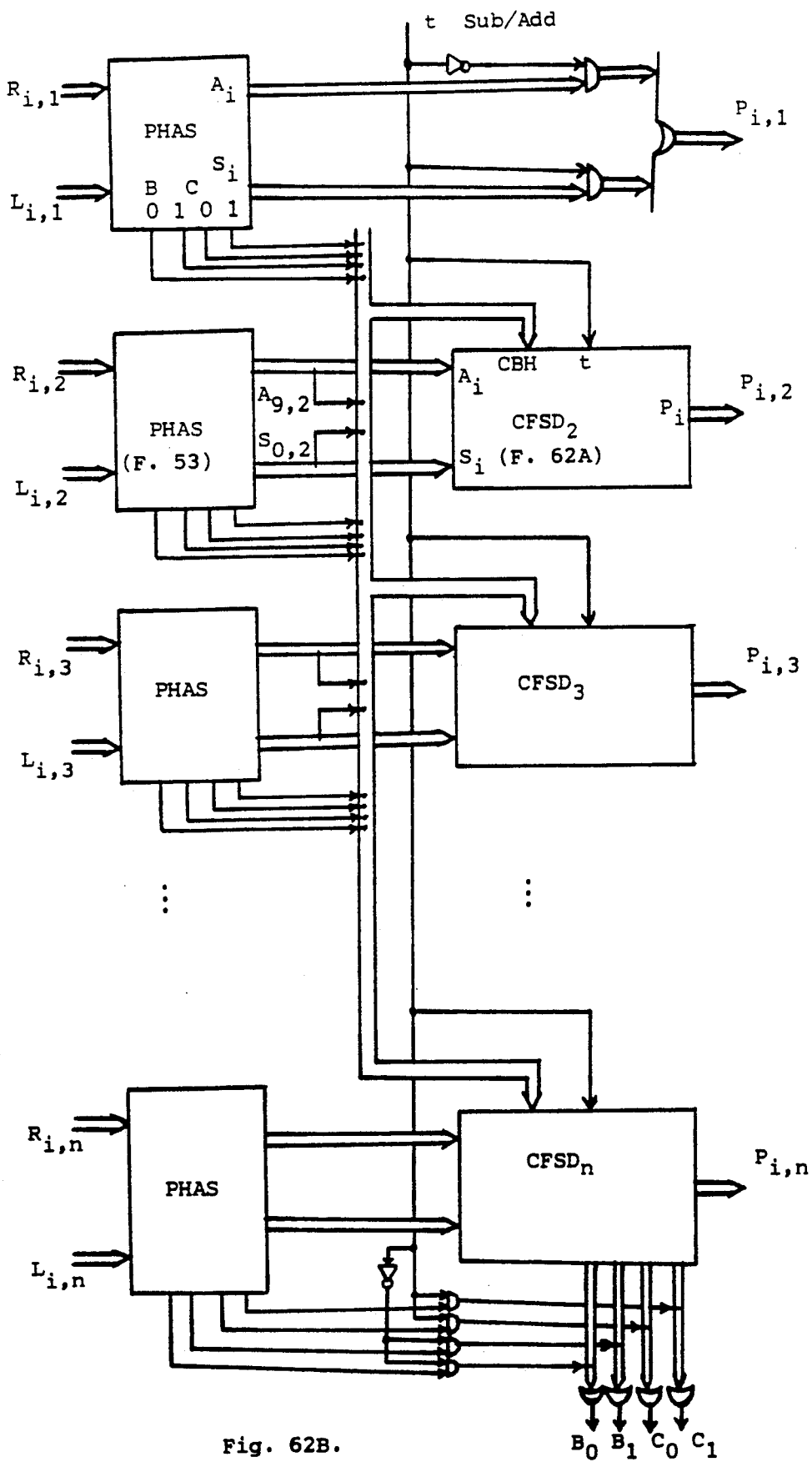
FIG. 62B is another block organization for the PAS.
Figure 63:
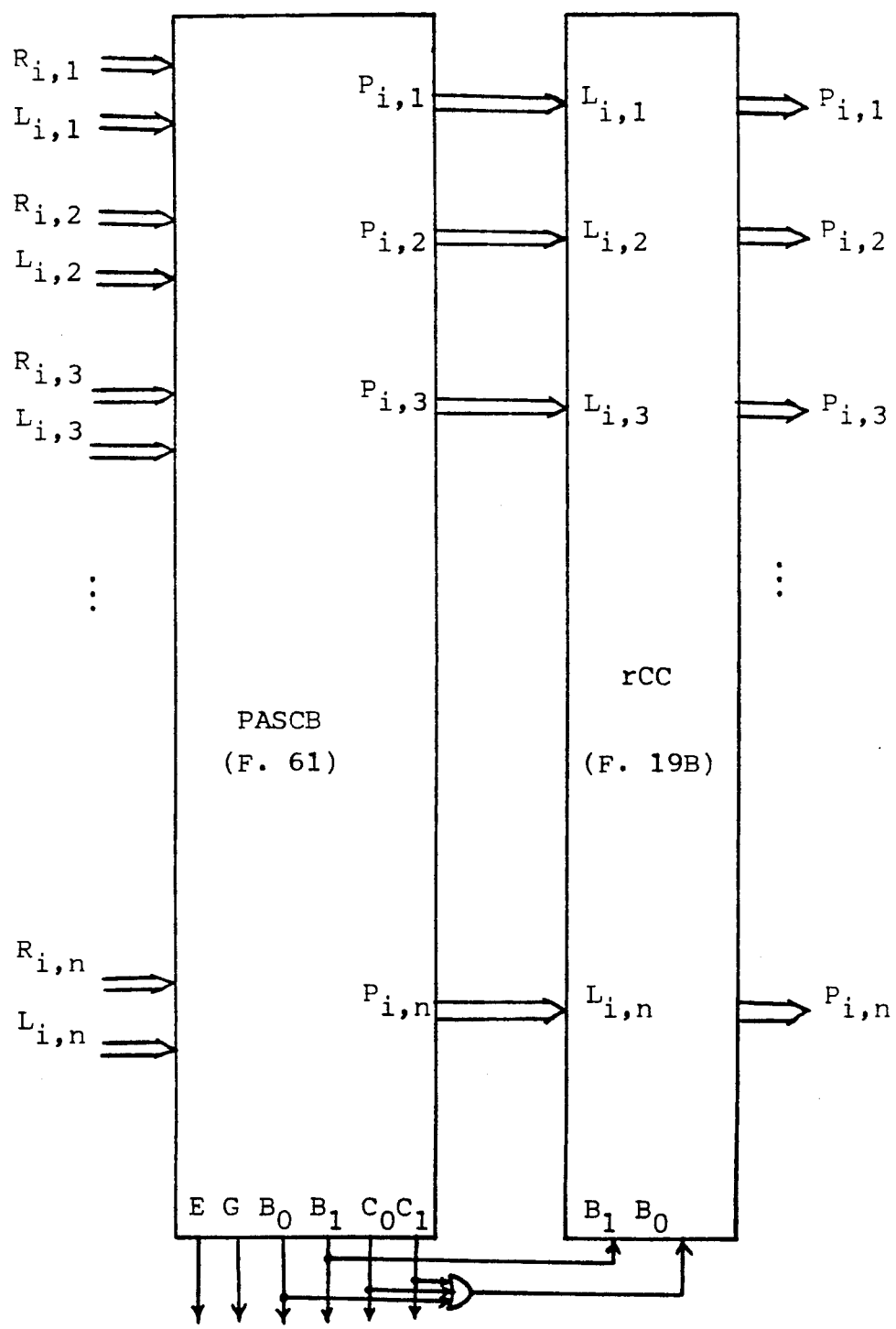
FIG. 63 is a block diagram for a TPC positive integers combinational unit(PCU)

FIG. 62B is another organization for the PAS constructed from PHAS's of FIG. 63, $CFSD_k$'s of FIG. 62A, control variable t, and combinational logic according to the following IOR:

$$P^*_{i,k} = \begin{cases} A_{i,k}t' + S_{i,k}t & \text{if } k = 1 \\ P_{i,k} & \text{if } 1 < k \leq n \end{cases} \quad (75)$$

$$C_j = C^d_{j,n}t' + C_{j,n}; \quad B_j = B^d_{j,n}t' + B_{j,n}$$

where $C_{j,n}^d$ and $B_{j,n}^d$ are the direct carries and borrowers, respectively, of the $n^{th}$ PHAS, t, e,acu/t/, $P_{i,k}$, $A_{i,k}$, $S_{i,k}$, $C_{i,n}$ and $B_{j,n}$ are as given for relations(74). FIG. 62B is merely a combination of the PA of FIG. 7B and the PS of FIG. 16B according to ALG 13.

FIG. 63 is a PCU constructed from a PASCB of FIG. 61 coupled to a rCC of FIG. 19B according to the following IOR:

$$P^*_{i,k} = \quad (76)$$

$$\begin{cases} P_{10-i,k} & \text{if } k = 1 \text{ and } i \text{ is either 0 or 5} \\ P_{i,k}B_0^* + P_{10-i,k}B_1^* & \text{if } k = 1 \text{ and } i \text{ is neither 0 nor 1} \\ P_{i,k}B_0^* + P_{9-i,k}Z_{0,k-1}B_1^* + P_{10-i,k}Z_{1,k-1}B_1^* & \text{if } 1 < k \leq n \end{cases}$$

where $P_{i,k}$, $C_j$, $B_j$ and the remaining outputs of relations (73) are as given there, $Z_{k,k}$ is as given in relations(28), $P_{10,k} = P_{0,k}$, $B^*_1 = B_1$ and $B^*_0 + C_0 + C_1$. FIG. 63 is the unit of the four implementations: PA of FIG. 6, CPS of FIG. 20, PC of FIG. 22B and PB of FIG. 25 sought according to ALG 13. Although there are four operations, there are only two modes either add or subtract because the compare and the given six Boolean functions are implemented instantaneously in association with the subtract operation. As indicated by relations(67), the unit of FIG. 63 is a modification for the CPS of FIG. 20 wherein the PS of FIG. 15 is replaced by the PASCB of FIG. 61 and the carries $C_0$ and $C_1$ are ORed with the borrower $B_0$ for the conditional input $B_0$ of the rCC. To be continued next on positive integers sequential unit devices FIGS. 64A through 65C.

The main feature of sequential circuits is the existence of feedback connections(loops) and accordingly the unification process of sequential circuits is focused not only on merging the corresponding blocks but also on identify and unify the corresponding loops. The following algorithm is not as definite as ALG 13 and should be dealt with accordingly.

ALG. 14: A heuristic procedure for sequential unit design

1. Designate the circuit of greatest number of loops as the standard circuit.
2. Identify the corresponding loops.
3. Unify the corresponding links of the loops of step 2 according to ALG 13.
4. Unify the corresponding blocks not covered by step 3 according to ALG 13.
5. Retain the unsimilar loops modified according to steps 3 and 4.
6. Construct the required unit from the devices obtained by steps 3 through 5 connected in the same order of those of the standard circuit using control variables, multiplexers, and combinational logic if necessary.

Figure 64A:
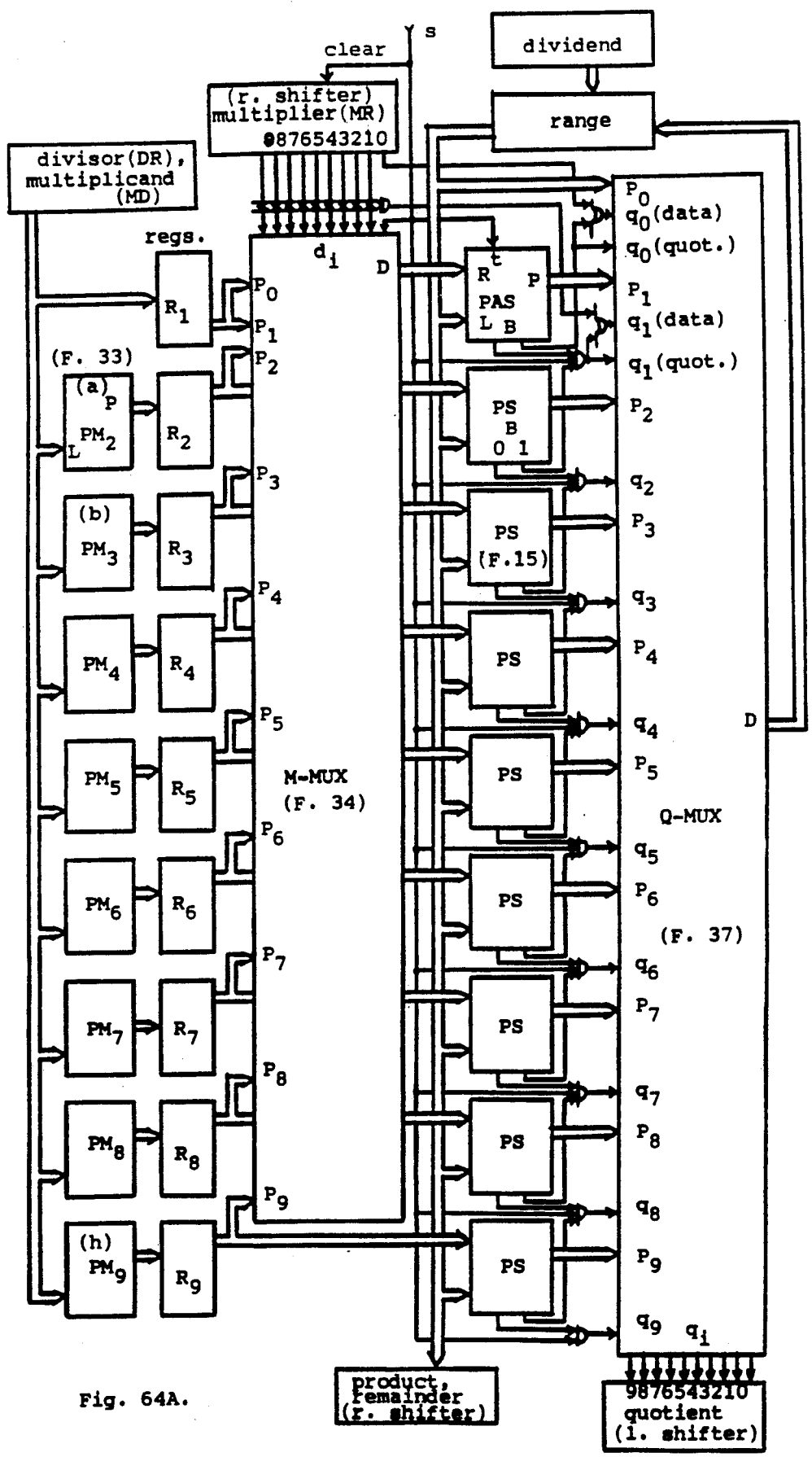
FIG. 64A is a block diagram for a TPC sequential multiplier-divider(SMD)

FIG. 64A is a SMD comprised from the devices of the ASM of FIG. 35 and the DD of FIG. 38B where the divisor and the remainder registers of the DD are combined with the multiplicand(MD) and the product(P) registers of the ASM respectively, the PA of the ASM and the $1^{th}$ PS of the PS's of the DD are combined into the PAS of FIG. 60, the remaining registers $R_d$'s, MR, range(R), DN and Q and the remaining devices $PM_d$'s, last eight PS's, M-MUX and Q-MUX of said ASM and/or DD are kept with no duplication and for the same functions and, also, from a control variable s and combinational logic(CL) according to the following algorithm written in RTL-like notations:

ALG. 15

1. PAS input t←s, M-MUX control $d_0$←s.

2. If s=1 then goto 6, (* follows is a multiply operation*).
3. $PM_d$'s←MD.
4. $R_1$←MD, $R_2$ through $R_9$←corresponding $PM_d$'s.
5. Repeat: MULTIPLY ROUTINE
   i. $R_{i,k}$←$R_{i,k+1}$ in R, $P_{i,k}$←$P_{i,k+1}$ in P,
      M-MUX data $P_0$ and $P_1$←$R_1$,
      M-MUX remaining data←corresponding $R_d$'s,
      M-MUX controls $d_1$ to $d_9$←corresponding bits from MR.
   ii. PAS inputs L and R←reg. R and M-MUX respectively.
   iii. Q-MUX data $P_0$ and $P_1$←reg. R and PAS respectively, Q-MUX control $d_1$←($d_1+d_2+\ldots+d_9$) of MR.
   iv. MSD's of R←Q-MUX, $R_{i,k}$←$R_{i,k+1}$ in MR.
   v. $R_{i,k}$←$R_{i,k+1}$ in R, (* a right-shift op, in reg. R*).
   vi. P←R.
Until LSD of MR=∅.
6. MR←∅, $RM_d$'s←MD, n LSD's of R←n MSD's of DN.
7. $R_1$←MD, remaining $R_d$'s←corresponding $PM_d$'s.
8. Repeat: DIVIDE ROUTINE
   i. $Q_{i,k+1}$←$Q_{i,k}$ in Q, (* left-shift op. reg. Q*).
   ii. Inputs L's of PS's←R, input L of PAS←R, P←R, input R of PAS←M-MUX,
      inputs R's of PS's←corresponding $R_d$'s.
   iii. CL←$B_{j,i}$ of PAS and PS's.
   iv. Q-MUX data $P_0$ and $P_1$←R and PAS respectively,
      Q-MUX remaining data←corresponding PS's,
      Q-MUX controls←$q_i$ from CL, $Q_{i,l}$ of Q←$q_i$ of Q-MUX.
   v. MSD's of R←Q-MUX, LSD of R←next MSD from DN.
Until (next MSD from DN=∅) or (rem.=0) or (Q=maximum).

Figure 64B:
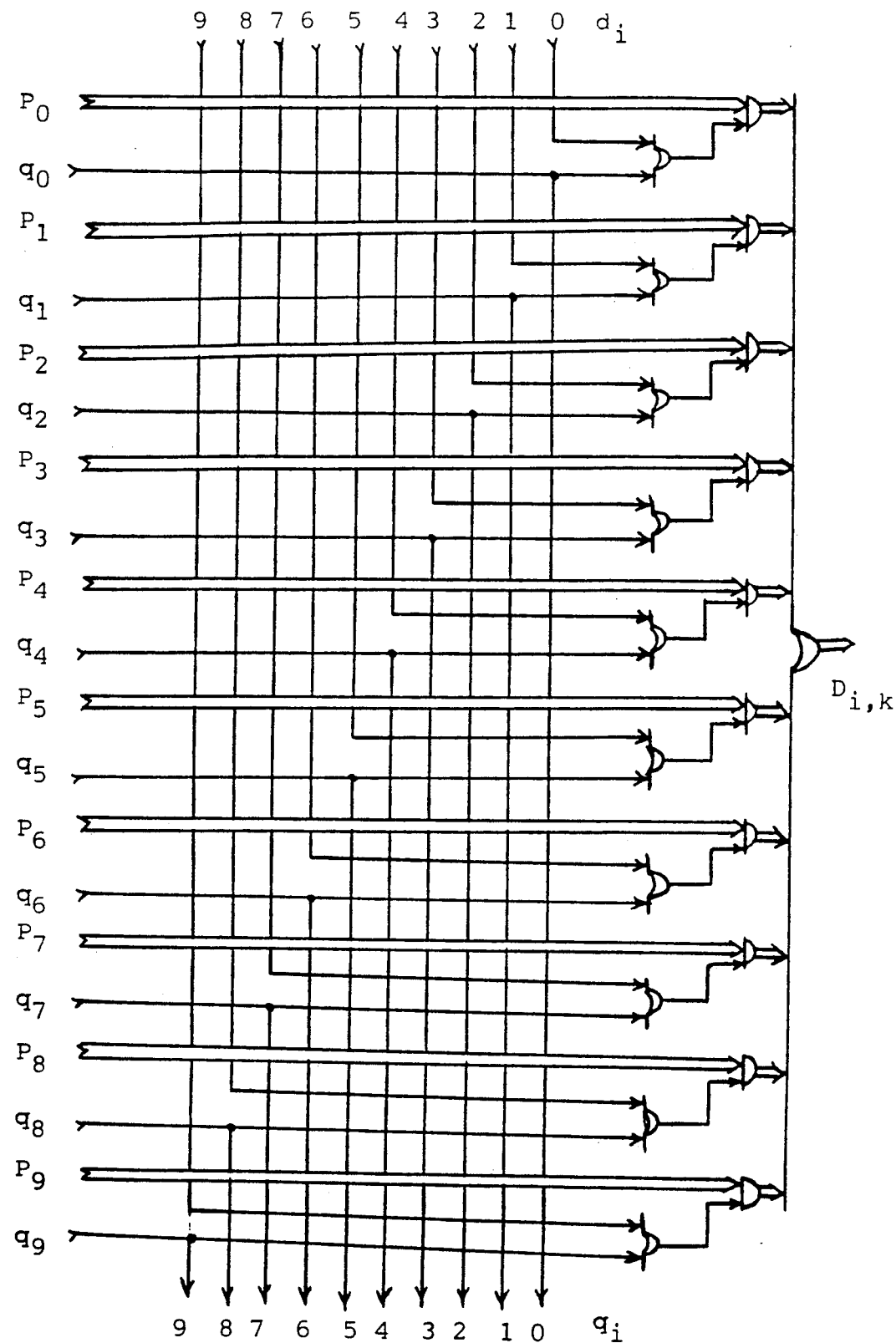
FIG. 64B is a logic diagram for a TPC multiplier-quotient multiplexer(MQ-MUX)

FIG. 64B is a MQ-MUX constructed from M-MUX of FIG. 34 and Q-MUX of FIG. 37 according to the following IOR:

$$D_{i,k} = \sum_{j=0}^{r-1} P^j_{i,k}(d_j + q_j), \quad q^{out}_j = q^{in}_j \qquad (77)$$

where $P^j_{i,k}$, $d_j$ and $q_j$ are as defined for relations (45) and (50).

Figure 64C:
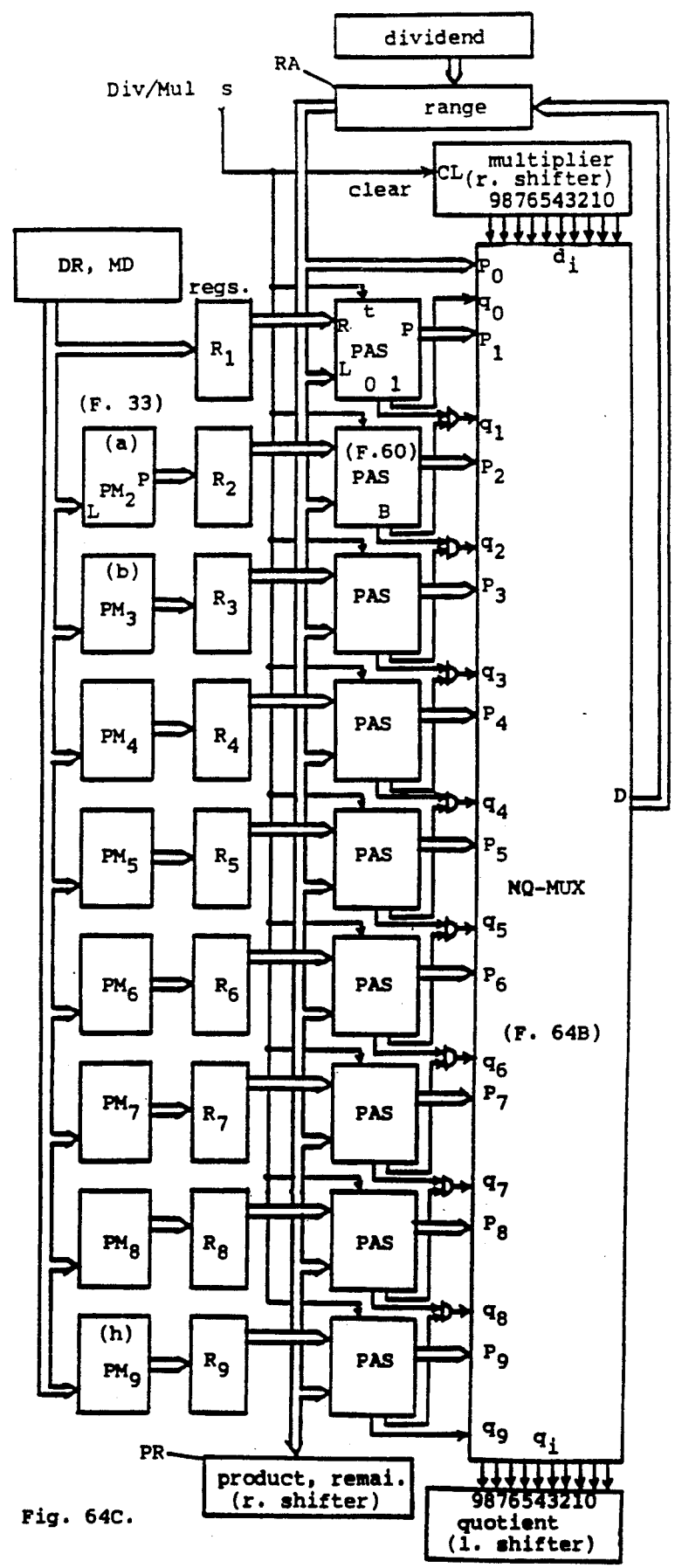
FIG. 64C is another block organization for the SMD of FIG. 64A.

FIG. 64C is another organization for the SMD comprised from the same components of the SMD of FIG. 64A with the PS's are replaced by PAS's, the M-MUX and the Q-MUX are combined into a MQ-MUX of FIG. 64B and ALG 15 is modified as in the following algorithm written RTL-like notations also:

ALG. 16

1. Inputs t of PAS's←s.
2. s=1 then goto 6, (* go to a divide operation *).
3. $PM_d$'s←MD, $R_1$←MD.
4. $R_2$ through $R_9$←corresponding $PM_d$'s.
5. Repeat: MULTIPLY ROUTINE
   i. $R_{i,k}$←$R_{i,k+1}$ in R, $P_{i,k}+P_{i,k+1}$ in P.
   ii. Inputs L of PAS's←R,
      inputs R of PAS's←corresponding $R_d$'s.
   iii. MQ-MUX data $P_0$←R,
      MQ-MUX data $P_1$ through $P_9$←corresponding PAS's,
      MQ-MUX controls $d_i$←corresponding bits from MR.
   iv. MSD's of R←MQ-MUX, $R_{i,k}$←$R_{i,k+1}$ in MR.
   v. $R_{i,k}$←$R_{i,k+1}$ in R.
   vi. P←R.
Until LSD of MR=∅.
6. MR←∅, $PM_d$'s←MD, $R_1$←MD,
   n LSD's of R←in n MSD's from DN.
7. $R_2$ through $R_9$←corresponding $RM_d$'s.
8. Repeat: DIVIDE ROUTINE
   i. $Q_{i,k+1}$←$Q_{i,k}$ in Q (* left shift op. within reg. Q*),
      inputs L's of PAS's←R, P←R,
      inputs R's of PAS's←corresponding $R_d$'s.
   ii. CL←$B_{j,i}$ of PAS's.
   iii. MQ-MUX data $P_0$←R, $Q_{i,l}$ of Q←$q_i$ from MQ-MUX,
      MQ-MUX data $P_1$ through $P_9$←corresponding PAS's,
      MQ-MUX controls $q_i$←corresponding $q_i$ from CL.
   iv. MSD's of R←MQ-MUX, LSD of R←next MSD from DN.
Until Q reaches maximum.

Figure 65A:
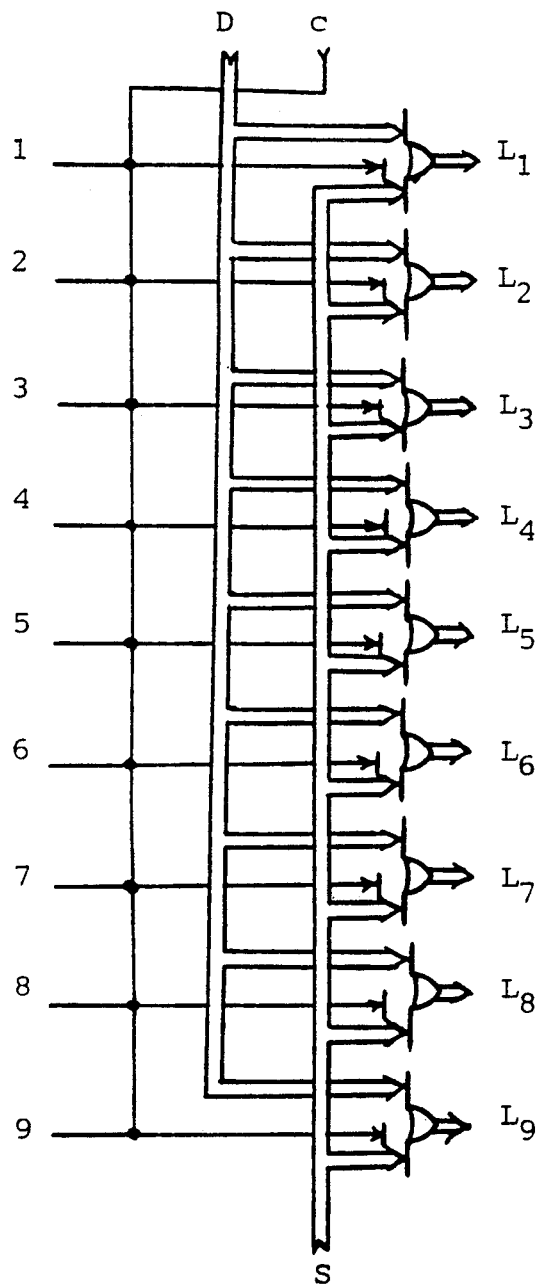
FIG. 65A is a logic diagram for a TPC divider-square root extractor multiplexer(DS-MUX)

FIG. 65A is a DS-MUX drawn according to the following IOR:

$$L^j_{i,k} = \begin{cases} D_{i,k} + C_i & \text{if } k = 1 \\ D_{i,k} + S_{i,k-1} & \text{if } 1 < k \leq n \\ S_{i,k} & \text{if } n < k \end{cases} \qquad (78)$$

where $C_i$ denotes a digit, $D_{i,k}$ denotes the divisor, $S_{i,k}$ denotes partial squareroot, $i=0, 1, \ldots, r-1$ and $j=1, 2, \ldots, r-1$. $L_{i,k}^j$ is abbreviated in the diagram by $L_j$.

Figure 65B:
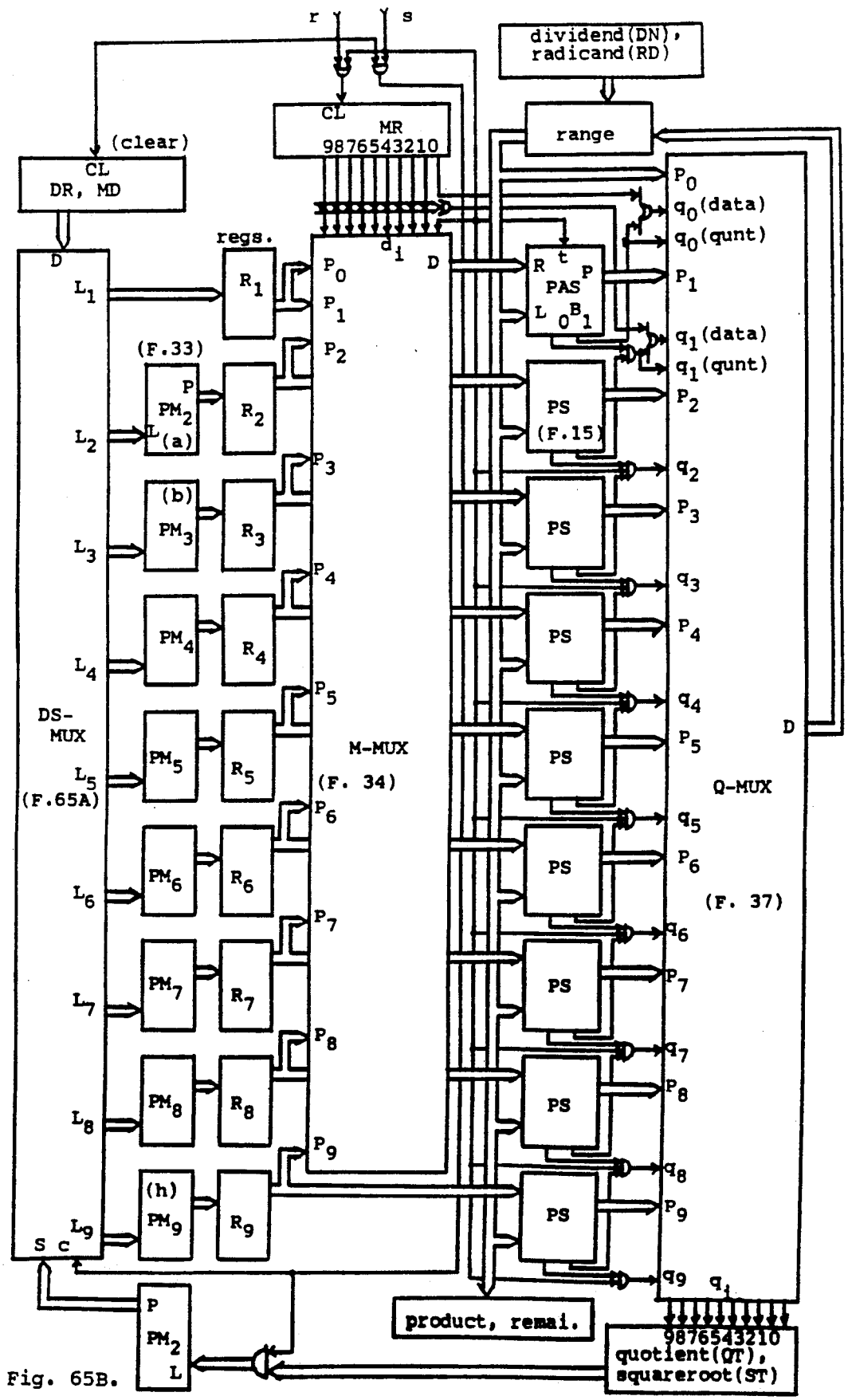
FIG. 65B is a block diagram for a PTC positive integers sequential unit(PSU)

FIG. 65B is a PSU comprised from the devices of the SRE of FIG. 40 and the SMD of FIG. 64A where registers RD and S of the SRE are combined with registers DN and Q of the SMD respectively, the range register(R) is modified into a bidirectional shift-register, the $1^{th}$ PS of the PS's of the SRE is combined with the PAS of the SMD, the remaining registers $R_d$'s, MD, MR and P, and the remaining devices $PM_d$'s, $PM_2$, PS's, M-MUX and Q-MUX of said SRE and/or SMD are kept with no duplication and for the same functions and, also, from the DS-MUX of FIG. 65A and by using combinational logic(CL) and another control variable r, in addition to the s of the SMD, according to the following algorithm written in RTL-like notations:

ALG. 17

1. Input t of PAS←s.
2. If s=1 then goto 7, (* go to divide operation *).
3. DS-MUX data D←MD.
4. $PM_d$'s←corresponding $L_d$'s of DS-MUX, $R_1$←$L_1$ of DS-MUX.
5. $R_2$ through $R_9$←corresponding $PM_d$'s.
6. MULTIPLY ROUTINE OF ALG. 15.
7. If r=1 then goto 12, (* go to a squareroot operation *). 8. MR←∅, DS-MUX←MD, n LSD's of R←n MSD's from DN.
9. $R_1$ and $PM_d$'s←corresponding $L_d$'s from DS-MUX.
10. $R_2$ through $R_9$←corresponding $PM_d$'s.
11. DIVIDE ROUTINE OF ALG. 15.
12. MD←∅, MR←∅, DS-MUX data $C_i$←rs.
13. Repeat: SQUAREROOT ROUTINE
   i. DS-MUX data S←$PM_2$,
      two LSD's of R←left most cycle from DN.
   ii. $R_1$ and $PM_d$'s←corresponding $L_d$'s of DS-MUX.
   iii. $R_2$ through $R_9$←corresponding $PM_d$'s.

iv. M-MUX data $P_0 \leftarrow R_1$, M-MUX control $d_0 \leftarrow s$.
v. Input R of PAS←M-MUX, $Q_{i,k+1} \leftarrow Q_{i,k}$ in Q,
 inputs R of PS's←corresponding $R_d$'s,
 inputs L of PAS and PS's←R, P←R.
vi. CL←s and $B_{j,i}$ of PAS and PS's, Q-MUX data $P_0$ to $P_9$
 ←(R, PAS and corresponding PS's respectively),
 Q-MUX controls←corresponding $q_i$ from CL,
 $Q_{i,l}$ of Q←$q_i$ from Q-MUX.
vii. MSD's of R←Q-MUX, $PM_2 \leftarrow Q(rs)$.
viii. $R_{i,k+1} \leftarrow R_{i,k}$ in R, (* left-shift op. in reg. R*).
Until (last cycle=∅) or rem.=0) or (Q=maximum).

Figure 65C:
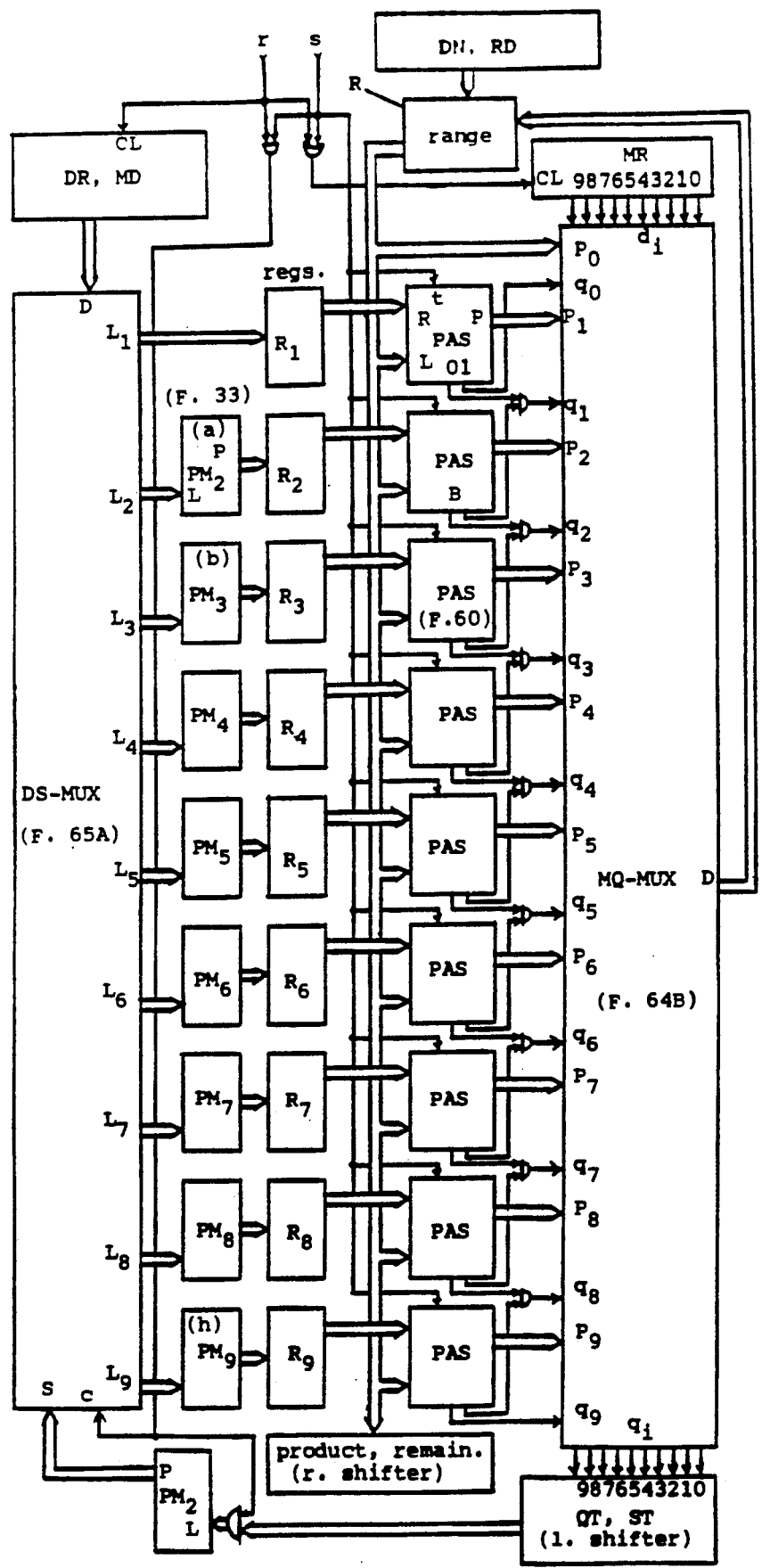
FIG. 65C is another organization for the PSU of FIG. 65B.

FIG. 65C is another organization for the PSU comprised with the SMD of FIG. 64C instead of the SMD of FIG. 64A for the PSU of FIG. 65B according to the following algorithm written in RTL-like notations also:

ALG. 18

1. Inputs t of PAS's←s.
2. If r+s=1 then go to 7, (* following is a multiply op. *).
3. DS-MUX data D←MD.
4. $R_1$ and $PM_d$'s←corresponding $L_d$'s of DS-MUX.
5. $R_2$ through $R_9$←corresponding $PM_d$'s.
6. MULTIPLY ROUTINE OF ALG. 16.
7. If rs=1 then goto 12, (* go to a squareroot op. *).
8. MR←∅, n LSD's of R∅n MSD's from DN, DS-MUX data D←MD.
9. $R_1$ and $PM_d$'s←corresponding $L_d$'s of DS-MUX.
10. $R_2$ through $R_9$←corresponding $PM_d$'s.
11. DIVIDE ROUTINE OF ALG. 16.
12. MD←∅, MR←∅, $C_i$ inputs of DS-MUX←rs.
13. Repeat: SQUARE ROOT ROUTINE.
 i. DS-MUX data S←$PM_2$,
  two LSD of R←left most cycle from DN.
 ii. $R_1$ and $PM_d$'s←corresponding $L_d$'s of DS-MUX.
 iii. $R_2$ through $R_9$←corresponding $PM_d$'s,
  $Q_{i,k+1} \leftarrow Q_{i,k}$ in Q.
 iv. L inputs of PAS's←R, P←R, R inputs of PAS's←corresponding $R_d$'s.
 v. CL←$B_{j,i}$ of PAS's.
 vi. MQ-MUX data $P_9$←R, $Q_{i,l}$ of Q←$q_i$ from MQ-MUX,
  MQ-MUX data $P_1$ through $P_9$←corresponding PAS's,
  MQ-MUX controls←$q_i$ from CL.
 vii. MSD's of R←MQ-MUX, $PM_2$←Q(rs).
 viii. $R_{i,k+1} \leftarrow R_{i,k}$ in R.
Until (last cycle=∅) or (rem.=0) or (Q=maximum).

In less formal language: FIG. 64A is merely a combination of FIGS. 35 and 38B with the control variable s, FIG. 64B is a direct combination of FIGS. 34 and 37, FIG. 64C is a modification to FIG. 64A wherein the M-Mux and the Q-MUX are replaced together by the MQ-MUX of FIG. 64B and the PS's are replaced by PAS's of FIG. 60, FIG. 65A is a multiplexer-like in which either ($C_i$, $S_{i,k}$) or $D_{i,k}$ data is allowed to pass to $R_1$ and the $PM_d$'s, FIG. 65B is a combination of FIGS. 40 and 64A using an additional control variable r and the DS-MUX of FIG. 65A, and FIG. 65C is a modification for FIG. 65B wherein the PS's are replaced by PAS's and the M-MUX and Q-MUX are replaced together by the MQ-MUX of FIG. 64B as in FIG. 64C. FIGS. 65B and 65C are two organizations for the unit of the three sequential implementations given in FIGS. 35, 38B, and 40. To be continued next on signed integers devices FIGS. 66 through 69.

Figure 66:
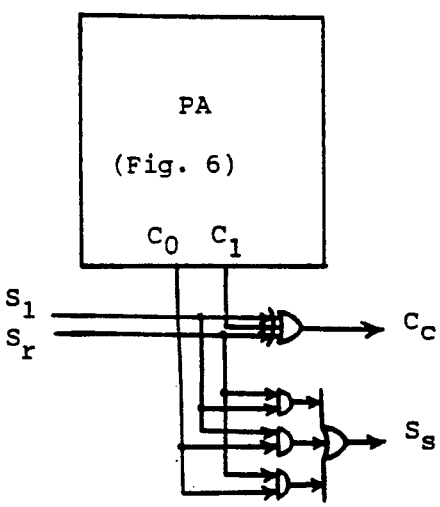
FIG. 66 is a block diagram for a TPC r's complement adder ($CA_r$)

FIG. 66 is a $CA_r$ comprised from the PA of FIG. 6 and combinational logic according to the following IOR:

$$P'_{i,k} = P_{i,k} \quad (79)$$
$$C_c = S_1 \oplus S_r \oplus C_1$$
$$S_s = S_1 S_r + (S_1 + S_r) C_0$$

where $P_{i,k}$, $C_0$ and $C_1$ are as given in relations(11), $S_1$ and $S_r$ are the signs of the inputs $L_{i,k}$ and $R_{i,k}$, respectively, of the PA given in r's complement representation, $C_c$ and $S_s$ are the carry and the sign of the output of the $CA_r$.

Figure 67A:
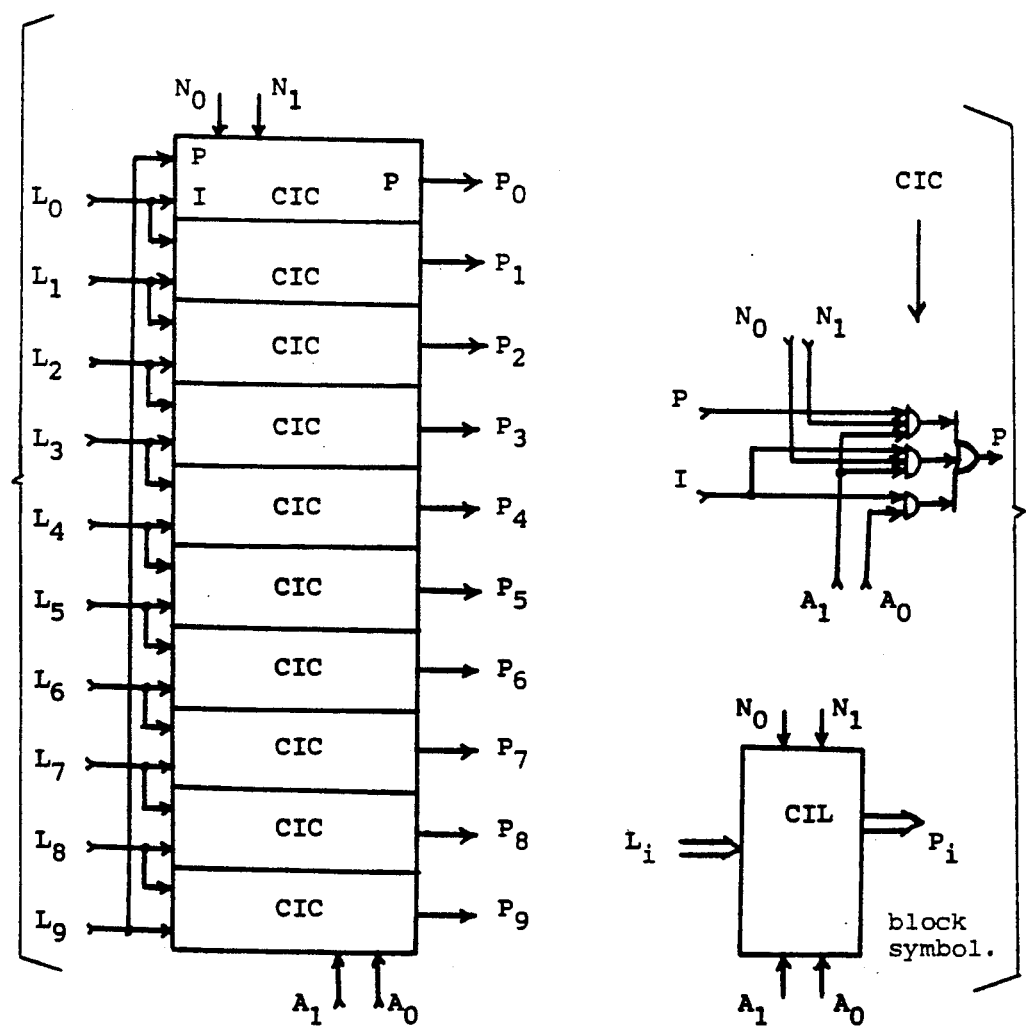

FIG. 67A is a CIL comprised from ten conditional incrementer cells(CIC) according to the following IOR:

$$P_i = L_i A_0 + L_i N_0 A_1 + L_{i-1} N_1 A_1 \quad (80a)$$

where $A_j$ and $N_j$ are control variables, $L_{-1} = L_{r-1}$, and i=0, 1, ..., r−1. Every CIC has two data inputs I (for self) and P (for predecessor) and four control inputs $A_j$ and $N_j$ (for j=0, 1). $A_j$ means perform the increment operation on the given input in case of $A_1 = 1$ and $N_j$ means nines detector as will be explained shortly. The control inputs are common for all such CIC's while data input i(for i=0, 1, ..., r−1) is connected to the I of cell no. i and to the p of the successor of cell no. i as indicated by relation (80a).

Figures 1, 2, 3, 67B:
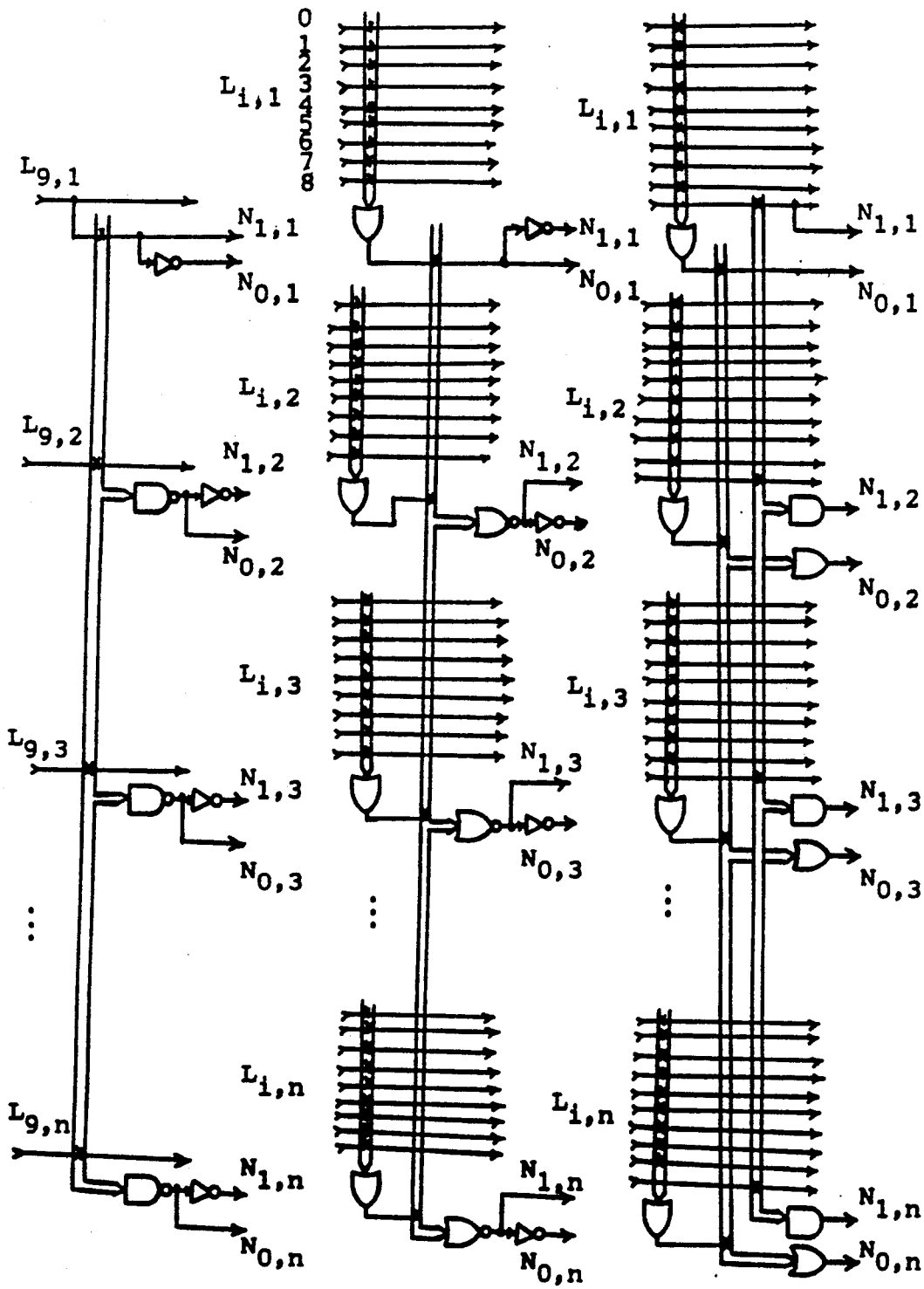

FIGS. 67B are three organizations for the IND drawn according to the following IOR:

$$N_{0,k} = \left( \prod_{j=1}^{k} L_{r-1,j} \right)'; \quad N_{1,k} = (N_{0,k})' \quad (80\text{b-i})$$

$$N_{1,k} = \left( \sum_{j=1}^{k} \sum_{i=0}^{r-2} L_{i,j} \right)'; \quad N_{0,k} = (N_{1,k})' \quad (80\text{b-ii})$$

$$N_{1,k} = \prod_{j=1}^{k} L_{r-1,j}, \quad N_{0,k} = \sum_{j=1}^{k} \sum_{i=0}^{r-2} L_{i,j} \quad (80\text{b-iii})$$

where $L_{i,k}$ (for i=0, 1, ..., r−1 and k=1, 2, ..., n) is the given input. The increment by 1 operation is absorbed by the first non-nine LSD. It is unknown, however, whether there is and if yes where is the first non-nine LSD. $N_{0,k}$ and $N_{1,k}$ of relations(80b) tell, respectively, whether or not there is a non-nine digit among the k LSD's of the input of relations (80b). Thus, the name and the purpose from the IND's of FIGS. 67B.

Figure 67C:
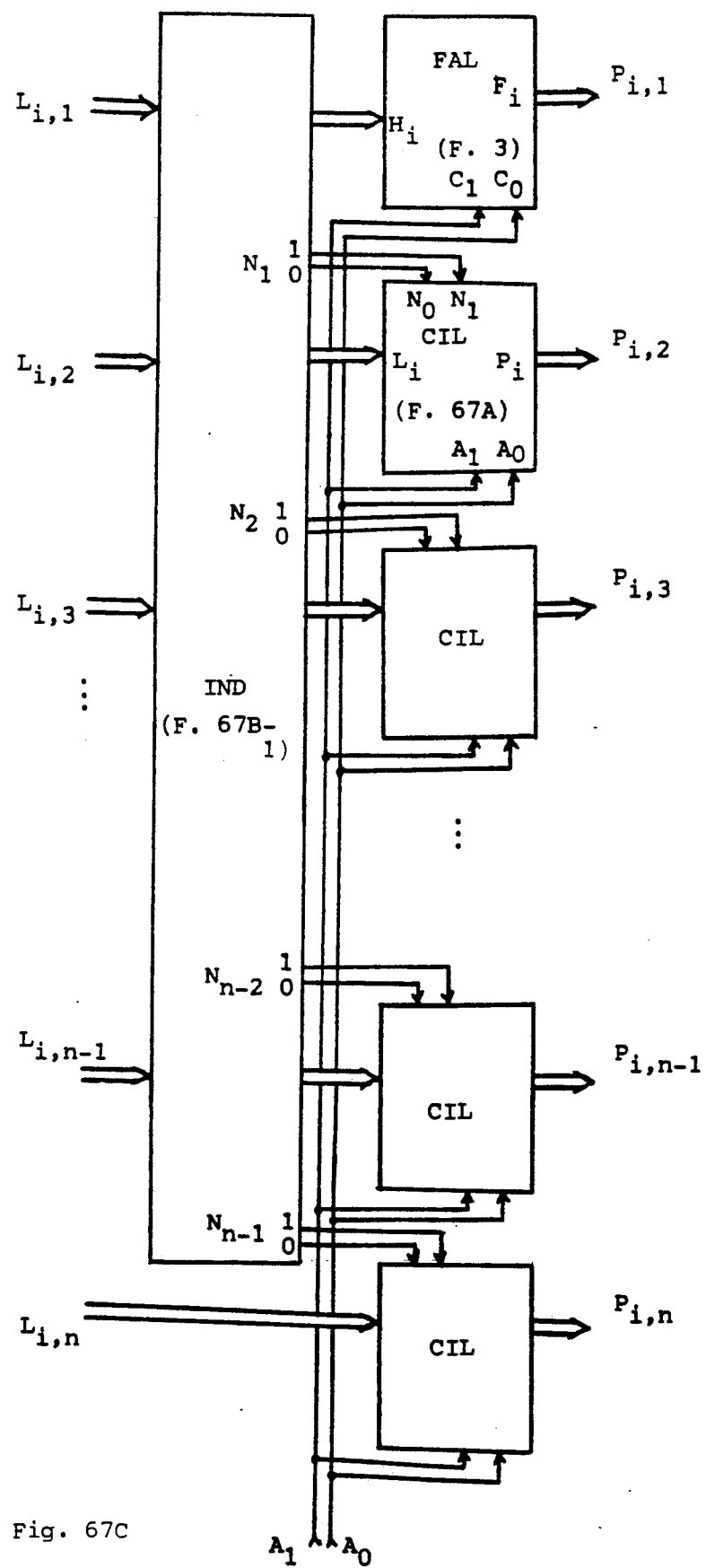
FIG. 67C is a block diagram for a TPC conditional incrementer(CI)

FIG. 67C is a CI comprised from a FAL of FIG. 3-1, a IND of FIGS. 67B and CIL's of FIG. 67A according to the following IOR:

$$P_{i,k} = \begin{cases} L_{i,k} A_0 + L_{i-1,k} A_1 & \text{if } k = 1 \\ L_{i,k} A_0 + L_{i,k} N_{0,k-1} A_1 + L_{i-1,k} N_{1,k-1} A_1 & \text{if } 1 < k \leq n \end{cases} \quad (80c)$$

where $A_j$ and $L_{i,k}$ are as defined for relation (80a), $N_j$ is as given in relations (80b). As it clear from relations(80c) and FIG. 67C, $N_j$ is in an internal control variable while $A_j$ is an external control variable.

Figure 68:
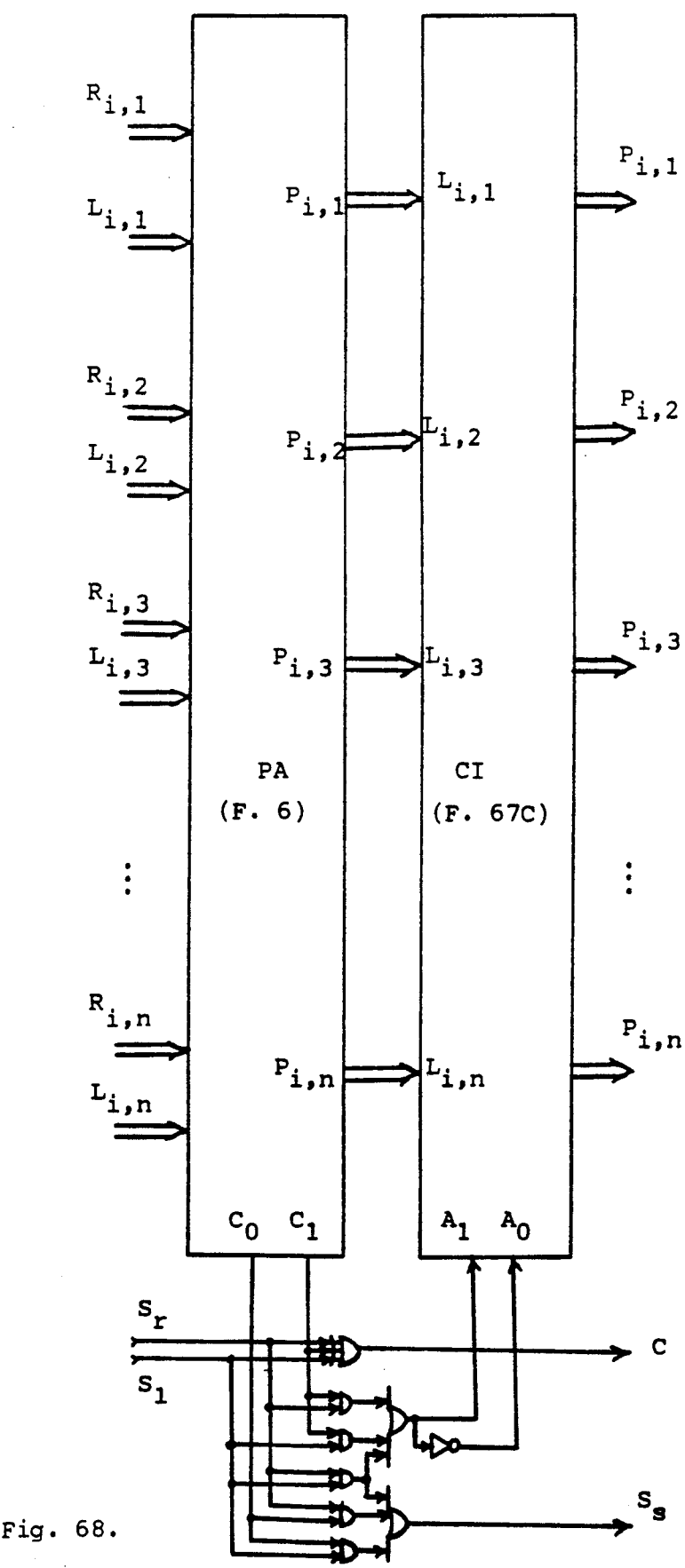
FIG. 68 is a block diagram for a TPC r-1's complement adder($CA_{r-1}$)

FIG. 68 is a $CA_{r-1}$ comprised from a PA of FIG. 6, a CI of FIG. 67C and combinational logic according to the following IOR:

$$P^r_{i,k} = \begin{cases} P_{i,k}A_0 + P_{i-1,k}A_1 & \text{if } k = 1 \\ P_{i,k}A_0 + P_{i,k}N_{0,k-1}A_1 + P_{i-1,k}N_{1,k-1}A_1 & \text{if } 1 < k \leq n \end{cases} \quad (81)$$

$$C_c = S_1 \oplus S_r \oplus C_1$$
$$S_s = S_1S_r + (S_1 + S_r)C_0$$
$$A_1 = S_1S_r + (S_1 + S_r)C_1$$
$$A_0 = (A_1)' = S_1'S_r' + (S_1' + S_r')C_0$$

where $P_{i,k}$ and $C_j$ are as given in relations (11), $S_1$ and $S_r$ are the signs of the inputs $L_{i,k}$ and $R_{i,k}$, respectively, of the PA given in $r-1$'s complement and $N_{j,k}$ is as given in relations (80b).

Figure 69:
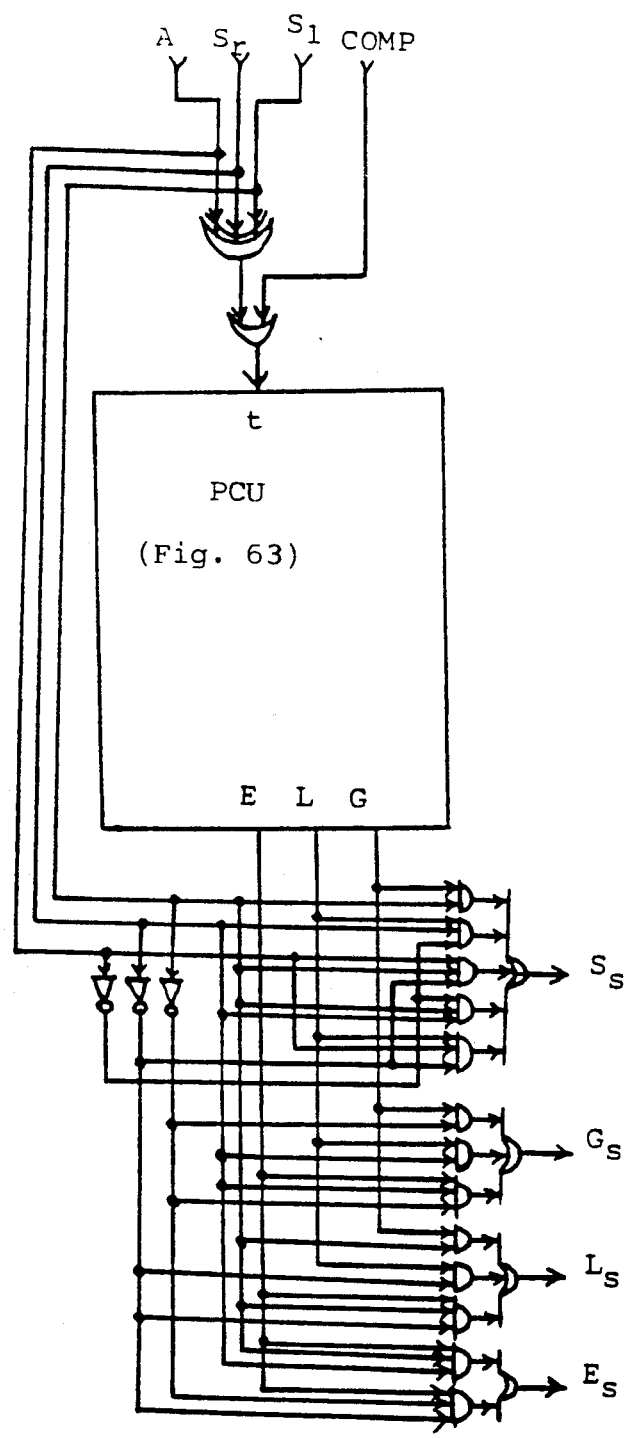
FIG. 69 is a block diagram for a TPC sign magnitude combinational unit(SCU)

FIG. 69 is a SCU comprised from the PCU of FIG. 63 and combinational logic according to the following IOR:

$$t = (S_1 \oplus S_r \oplus A) + COMP \quad (82)$$
$$P^s_{i,k} = P^*_{i,k}$$

$$C^s_j = C_j$$
$$S_s = S_1(S_r \oplus A) + S_1G + (S_r \oplus A)L$$
$$G_s = GS_1 + LS_r + ES_rS_1$$
$$E_s = E(S_1 \quad S_r) = G'_sL'_s$$
$$L_s = LS'_r + GS_1 + ES_1S'_r$$

where $P^*_{i,k}$, $C_j$, G, L and E are as given in relations(76), $S_1$ and $S_r$ are the signs of the inputs $L_{i,k}$ and $R_{i,k}$, respectively, of the PCU in sign magnitude representation, A and COMP are two command variables mean add if $A=0$ and and subtract if A or $COMP=1$.

Sign magnitude, $r-1$'s complement and r's complement are three cases well known in the art for representing signed integers. FIGS. 69, 68 and 66 are three adders for such three cases, respectively, according to this invention. As it clear from the above three FIGS., the modification of a positive integers adder into a signed integers adder is external to the positive integers adder. In all three cases, the modification is very simple except that the end carry, if occured, is required to be added to the output of the positive integers adder in case of the $r-1$'s complement adder and led to the design of the CI of FIG. 67C. The modification comes after the positive integers adder for the r's and $r-1$'s complement cases while comes before and after for the sign magnitude case because the add and the subtract operations are both required to be performed for such case and accordingly the sign magnitude adder needs to be programmed whether to perform an add or a subtract operation. It is optional in case of the SCU of FIG. 69 whether to take the compare functions E, L and G from the positive integers adder for only magnitude comparison or from the modificational logic for sign and magnitude comparison. The after modification logic of FIG. 69 has no effect on the time delay of the output of the PCU because E, L and G are ready from the CLA-level. The $r-1$'s complement adder can be modified into an $r-1$'s complement-r's complement adder simply by associating the output of the r's complement adder with $A_0$ in relations(81). Also, the CI of FIG. 67C and the rCC of FIG. 19B are similar which means that a universal adder for the mentioned above three representations can be designed. The sign magnitude representations, however, is suitable for all implementations discussed so far according to this invention and accordingly the unit of FIG. 69 will not be complicated further. The input-output relations of the carry $C_c$, the sign $S_s$ of the output, and the conditional increment variable $A_j$ appeared in relations (79) and (81) are obtained according to the conventional methods explained in [Mano]. Relations (82) are based on the following algorithm which is based on subtraction algorithm given in [Mano] also.

ALG. 19: Modification for sign magnitude A/S algorithm

1. Add the two magnitudes $M_L$ and $M_R$ of the minuend $L_{i,k}$ are identical and $A=0$ or if $S_1$ and $S_r$ are different and $A=1$, where A, $S_1$, and $S_r$ are as defined for relations(82).

2. subtract $M_R$ from $M_L$ if either $S_1$ and $S_r$ are identical and $A=1$ or if $S_1$ and $S_r$ are different and $A=0$.

3. The sign $S_s$ of the output is negative if:
   (a) step 1, $S_1$ is negative, $S_r$ and A are different or
   (b) step 2, $S_1$ is negative and $M_L > M_R$ or $S_r$ and A are different and $M_L < M_R$.

Equations t and $S_s$ of relations (82) are equivalent to steps 2 and 3, respectively.

The sign magnitude representation is optimal with respect to the sequential operations multiply, divide, and extract square root since the extract square root operation is defined on positive numbers only and the sign of the inputs of multiply or divide operation do not intervene in which operation should be performed neither the output depends on the signs of the inputs. As it well known, the sign $S_m$ of the output of a sign magnitude multiplier-divider is negative if the signs $S_1$ and $S_r$ of the inputs are different and neither of the magnitudes of the inputs is zero. Thus, the PSU of FIG. 65C can be modified into a sign magnitude sequential unit(SSU) simply by adding the logic required by the following relation:

$$S_m = (S_1 \oplus S_r)Z'B' \quad (83)$$

where $Z = \prod_{k=1}^{n} L_{0,k}$ and $B = \prod_{k=1}^{n} R_{0,k}$.

Figure 70:
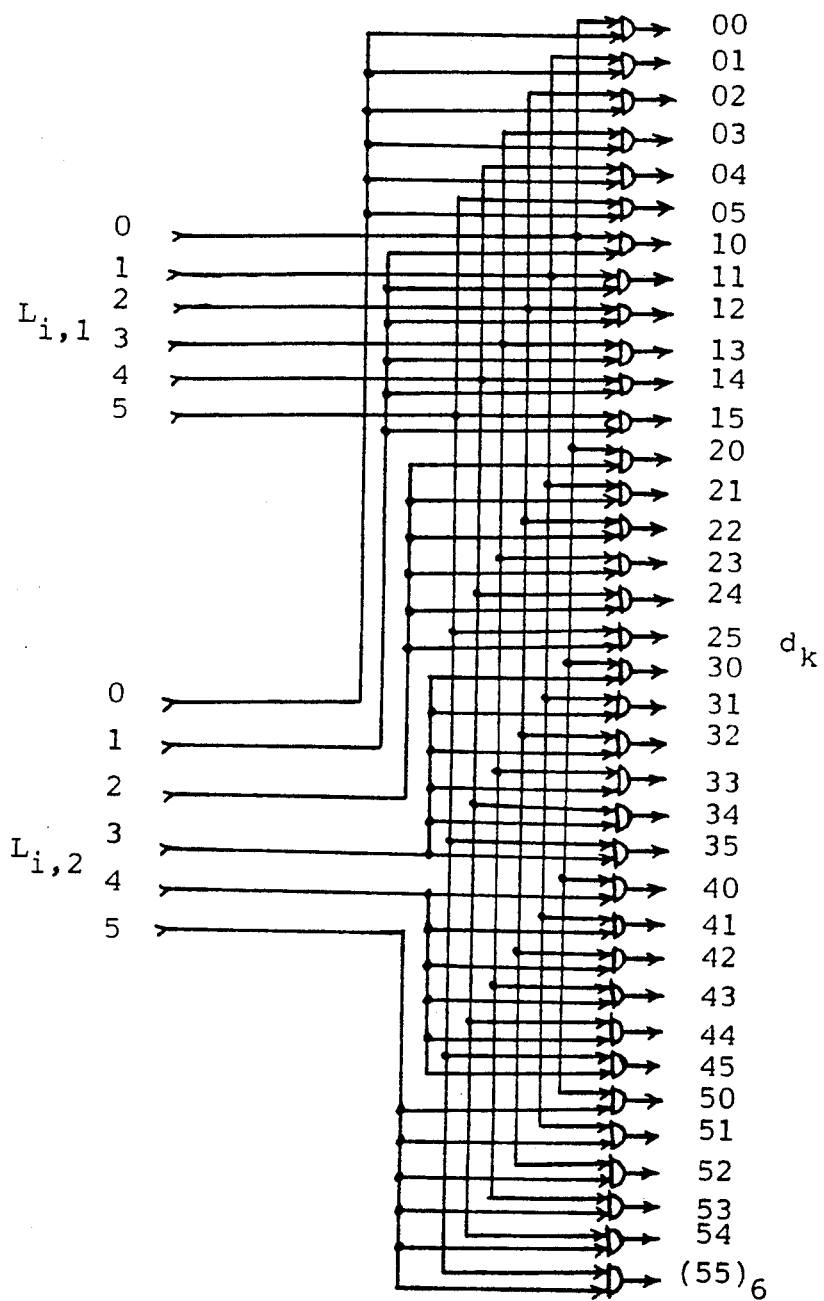
FIG. 70 is a logic diagram for a TPC decoder(DR)

To be continued next on uni-operand devices FIGS. 70-;86.

Unioperand devices exist almost everywhere in digital systems. The devices of FIGS. 17, 18C, and 33 are examples of unioperand devices met so far. Square root extract operation is externally a unioperand operation, yet internally a bioperand operation since the left most cycle and the first multiplex reach the subtractors at the same time. The purpose from most of the unioperand devices about to be introduced is evident form their familiar names. Those with less familiarities are special cases and their purpose will be apparent from their connections with the arithmetic unit that will be given later on.

FIG. 70 is a DR drawn according to the following IOR, for the case $n=2$ and $r=6$:

$$d_k = \prod_{j=1}^{n} L_{i,j} \text{ such that } i_n \ldots i_2i_1 = k \quad (84)$$

where $L_{i,k}$ (for $i=0, 1, \ldots, r-1$) is the input, r denotes the radix, and $k=0, 1, \ldots, r^n-1$. Relation (84) is obtained according to the following algorithm:

Alg. 20: Decoders design algorithm

1. List the numbers 0 through $r^n-1$, respectively.

2. Let there be an AND gate corresponding to every number of step 1.

3. Connect the input lines(there are rn of them) to the AND gates as indicated by the corresponding numbers.

Figure 71:
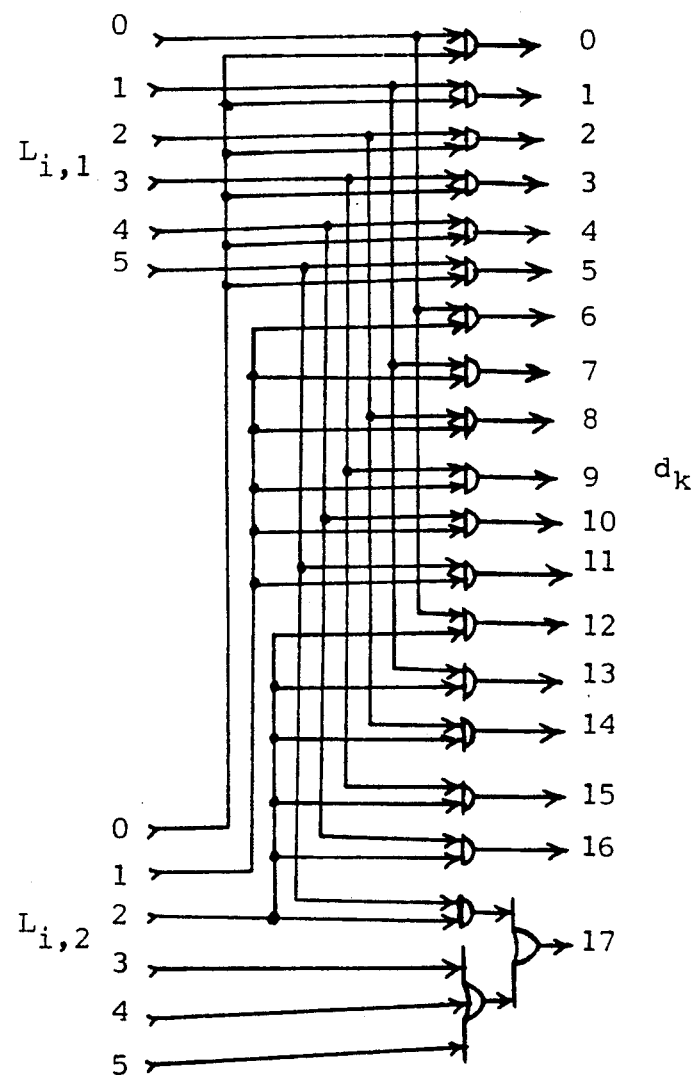
FIG. 71 is a logic diagram for a TPC trimmed decoder(TD) for the case r=6, n=2, and m=17.

FIG. 71 is a TD drawn according to the following IOR, for the case n=2, r=6 and m=17:

$$d_k = \begin{cases} \prod_{j=1}^{n} L_{i,j} \text{ such that } i_n \ldots i_2 i_1 = k < m \\ \prod_{j=1}^{n} L_{i,j} + \sum_{j=m}^{n} \sum_{i=0}^{r-1} L_{i,j} \text{ such that } i_n \ldots i_2 i_1 = k \geq m \\ k=m \qquad k>m \end{cases} \tag{85}$$

where r, k, and $L_{i,k}$ are as defined for relation (84). The difference between the decoder of FIG. 70 and the trimmed decoder of FIG. 71 is that the outputs m+1, m+2, ..., $r^n-1$ are not required in case of the TD and accordingly ORed with the maximum required output m. TD will be used for aligning the mantissas in a floating-point arithmetic unit where the smaller mantissa is required to be shifted at most specific number of places.

Figure 72:
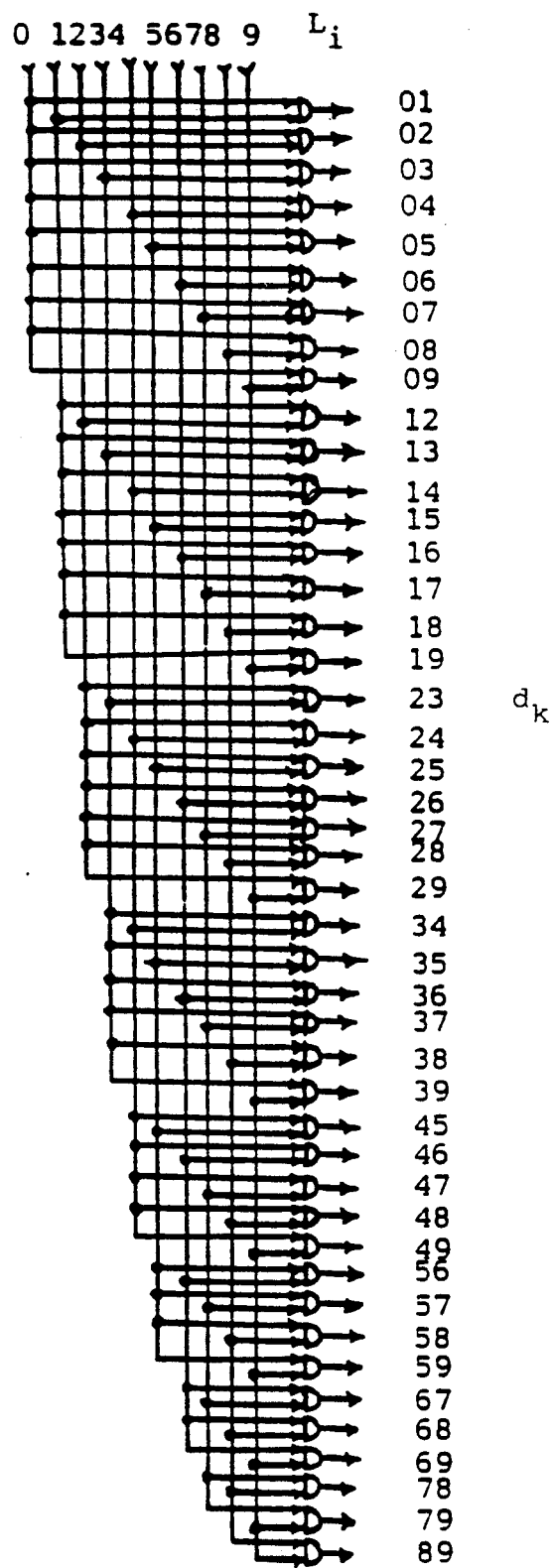
FIG. 72 is a logic diagram for a TPC c-out-of-r decoder (CDR) for the case r=10 and c=2.

FIG. 72 is a CDR drawn, for the case c=2 and r=10, according to the following IOR:

$$d_k = \prod_{j=1}^{c} L_{i,j} \tag{86}$$

where k is a combination of (0, 1, ..., r−1) taken c at a time. FIG. 72 can be used as a characters or instruction-code decoder when c is less than r and the characters are assigned words from r-bit code according to the combinations k's. The case of the diagram is an example. The designs of FIGS. 71 and 72 follows from ALG. 20.

Figure 73:
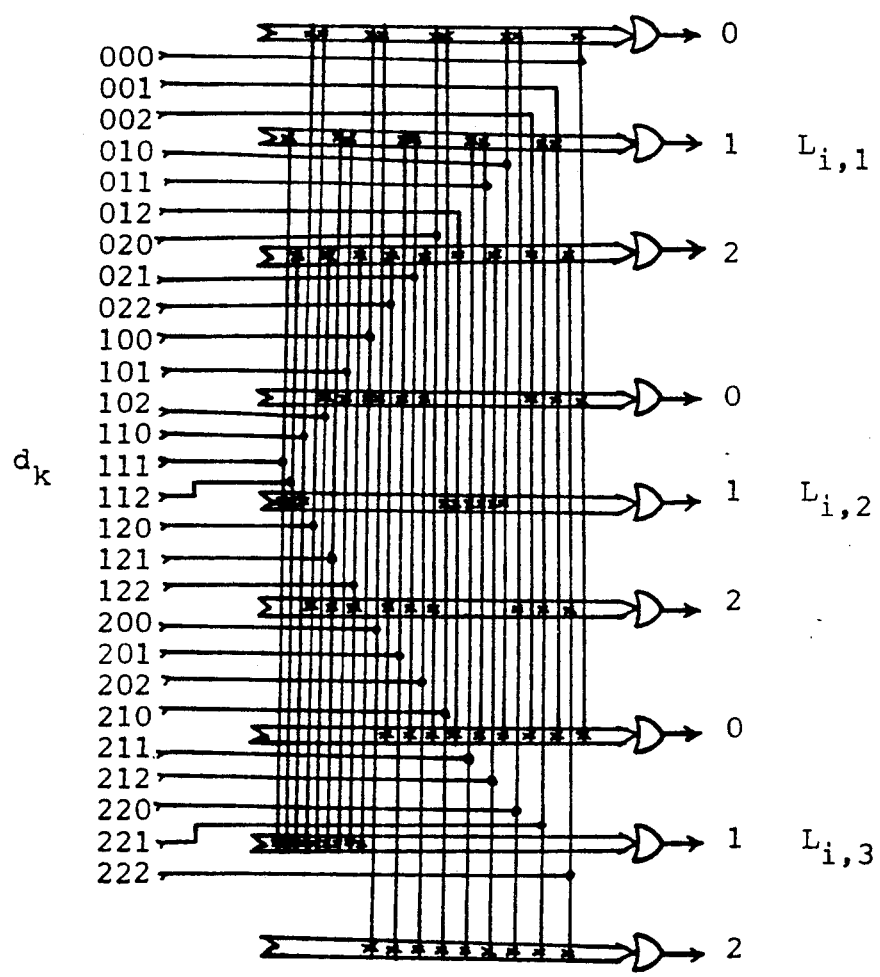
FIG. 73 is a logic diagram for a TPC encoder(ER)

FIG. 73 is a ER drawn, for the case r=3 and n=3, according to the following IOR:

$$L_{i,j} = \sum_{k} d_k \text{ such that there is a digit } i \text{ in position } j \text{ of integer } k \tag{87}$$

where $d_k$ is as given in relation (84). Relation (87) is obtained according to the following algorithm:

ALG. 21: A TPC encoder design procedure

1. List the numbers 0 through $r^n-1$, respectively.
2. Let there be rn OR gates in front of the numbers of step 1 listed according to the labelling $L_{i,j}$, where (for i=0, 1, ..., r−1 and j1, 2, ..., n) i denotes digit i and j denotes the position of digit i in the numbers of step 1.
3. Connect the inputs representing the numbers of step 1 to the OR gates according to the labelling $L_{i,j}$.

The case of the diagram is an example on the application of ALG 21.

Figure 74:
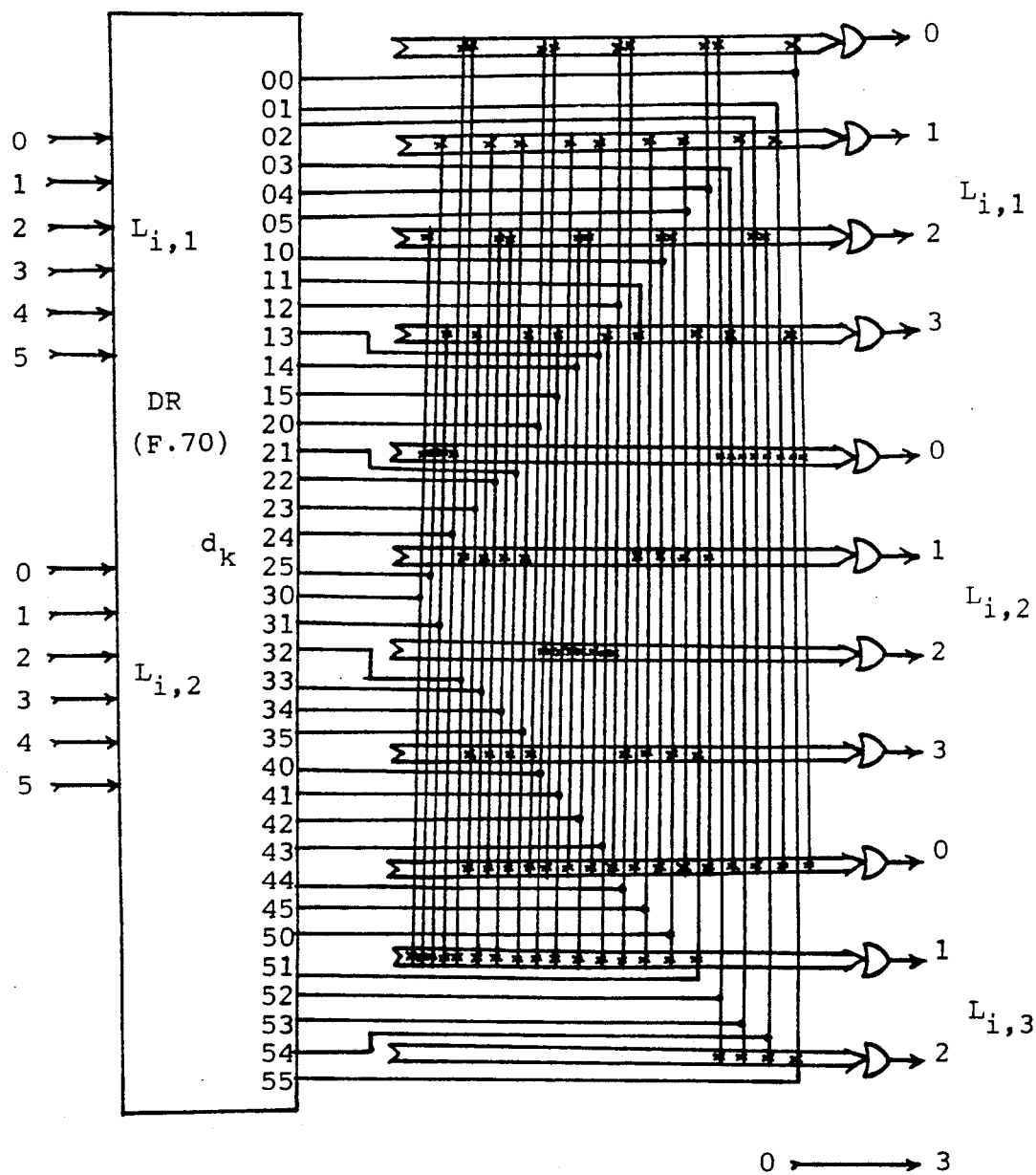
FIG. 74 is a logic diagram for a TPC radix converter(RC) for the case $r_1=6$, $n_1=2$, $r_2=4$, and $n_2=3$.

FIG. 74 is a RC drawn according to the following IOR:

$$d_{k_1} = \prod_{j=1}^{n_1} L_{i,j}^1$$

such that $i_{n_1} \ldots i_2 i_1 = k_1$ where $i=0, 1, \ldots, r_1-1$; $j=1, 2, \ldots, n_1$; and $k_1=0, 1, \ldots, r_1^{n_1}-1$ $$L_{i,j}^2 = \sum_{k_2} d_{k_2}$$

such that there is a digit i in position j of integer $k_2$ where $i=0, 1, \ldots, r_2-1$; $j=1, 2, \ldots, n_2$; and $k_2=0, 1, 2, \ldots, (r_1^{n_1}-1)_{r_2}=m$. Relations (88) are obtained according to the following algorithm:

ALG. 22: A radix converters design procedure.

1. ALG 20 with respect to $r_1$.
2. ALG 21 with respect to $r_2$ and with inputs $k_1$'s of the outputs of step 1.

Indeed, the decoder of FIG. 70 is a radix converter from radix r to radix $r^n$ while the encoder of FIG. 73 is a radix converter from radix $r^n$ to radix r and accordingly the RC of FIG. 74 is a decoder-encoder combination that converts its data form radix $r_1$ to radix $r_1^{n_1}$ then converts the same data from radix $r_1^{n_1}$ to radix $r_2$, i.e., a radix converter from radix $r_1$ to radix $r_2$. The diagram is drawn for the case $r_1=6$, $n_1=2$, $r_2=4$, and $n_2=3$.

Figure 75:
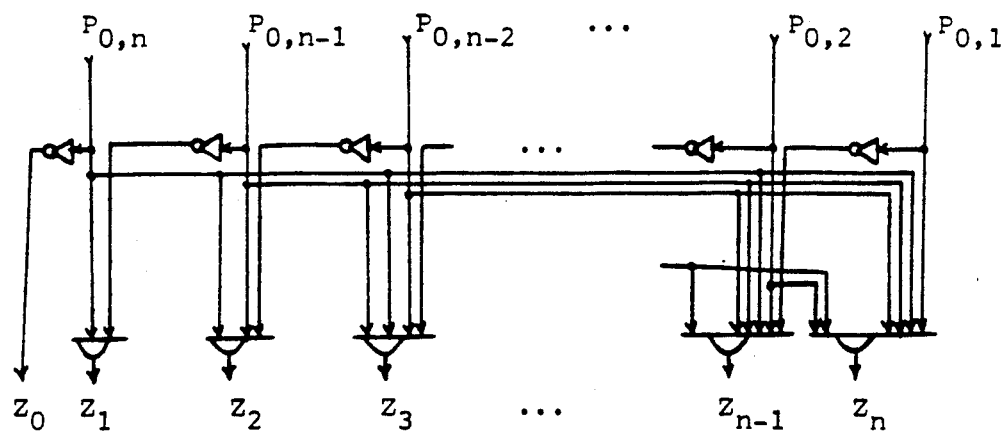
FIG. 75 is a logic diagram for a TPC leading zeros detector(LZD)

FIG. 75 is a LZD drawn according to the following IOR:

$$Z_i = \begin{cases} P'_{0,n} & \text{if } i = 0 \\ \prod_{j=0}^{i-1} P_{0,n-j} P'_{0,n-i} & \text{if } 0 < i < n \\ \prod_{j=1}^{n} P_{0,j} & \text{if } i = n \end{cases} \tag{89}$$

where $P_{0,k}$'s are the zeros of the number $P_{i,k}$ (for i=0, 1, ..., r−1 and k=1, 2, ..., n).

Figure 76:
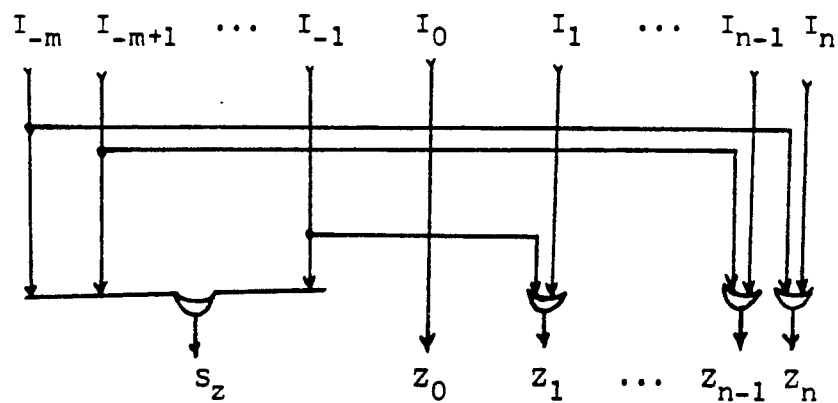
FIG. 76 is a logic diagram for a TPC quantitive signals converter(QSC) into sign magnitude quantitive signals.

FIG. 76 is a QSC drawn according to the following IOR:

$$Z_i = \begin{cases} I_0 & \text{if } i = 0 \\ I_i + I_{-i} & \text{if } 0 < i \leq m \leq n \text{ or } 0 < i \leq n \leq m \\ I_i & \text{if } m < i \leq n \\ I_{-i} & \text{if } n < i \leq m \end{cases} \tag{90}$$

$$S_z = \sum_{i=+m}^{1} I_{-i}$$

where $(I_{-m}, \ldots, I_{-1}, I_0, I_1, \ldots, I_n)$ are mutually exclusive, i.e., only one member can be 1 at a time.

Figure 77:
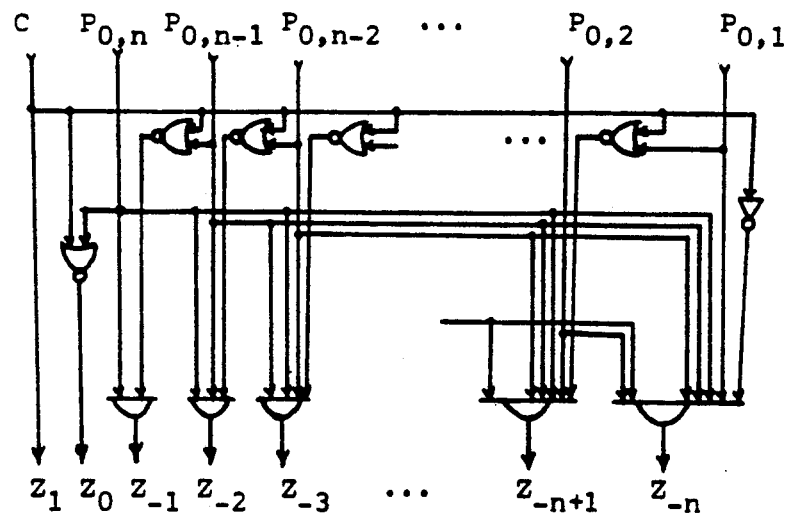
FIG. 77 is a logic diagram for a TPC carry and leading zeros detector(CLZD)

FIG. 77 is a CLZD drawn according to the following IOR:

$$Z_0 = C_1 P'_{0,n} \tag{91}$$
$$Z_1 = C_1$$

$$Z_{-i} = \begin{cases} C_1 \prod_{j=0}^{i-1} P_{0,n-j} P'_{0,n-i} & \text{if } 0 < i < n \\ C_1 \prod_{j=n}^{1} P_{0,j} & \text{if } i = n \end{cases}$$

where $P_{0,k}$ is as defined for relations (89) and $C_1$ denotes the carry of the output $P_{i,k}$. The LZD of FIG. 75 tells how many leading zeros are there in a decoded form. The CLZD of FIG. 77 tells the same but with output that can be either positive, zero, or negative. The QSC of FIG. 76 converts the output of the CLZD of FIG. 77 into sign and magnitude. The magnitude of the output of the QSC can be fed into an encoder so that it can be converted into an integer in the required radix. Both the CLZD and the QSC together with their following encoder will appear for the same purpose in the floating-point unit later on.

Figure 78:
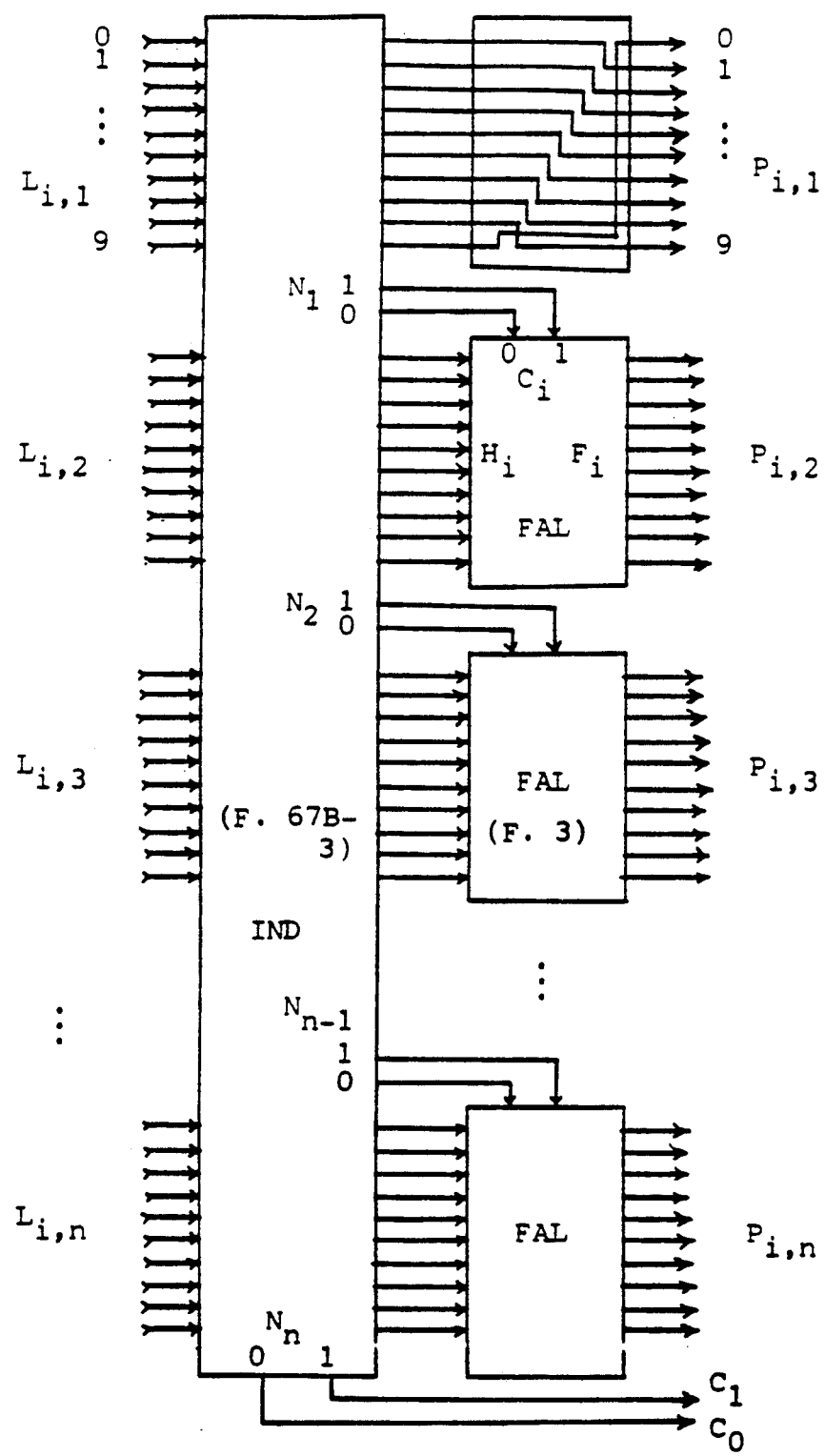
FIG. 78 is a block diagram for a TPC incrementer-(IR)

FIG. 78 is a IR constructed from a IND of FIG. 67B-3 and FAL's of FIG. 301 according tot he following IOR:

$$P_{i,k} = \begin{cases} L_{i-1,k} & \text{if } k = 1 \\ L_{i,k} N_{0,k-1} + L_{i-1,k} N_{1,k-1} & \text{if } 1 < k \leq n \end{cases} \quad (92)$$

$$C_j = N_{j,n}$$

where $L_{i,k}$ and $N_{j,k}$ are as defined for relations (80b), $L_{-1,k} = L_{9,k}$, and $i = 0, 1, \ldots, 9$.

Figure 79:
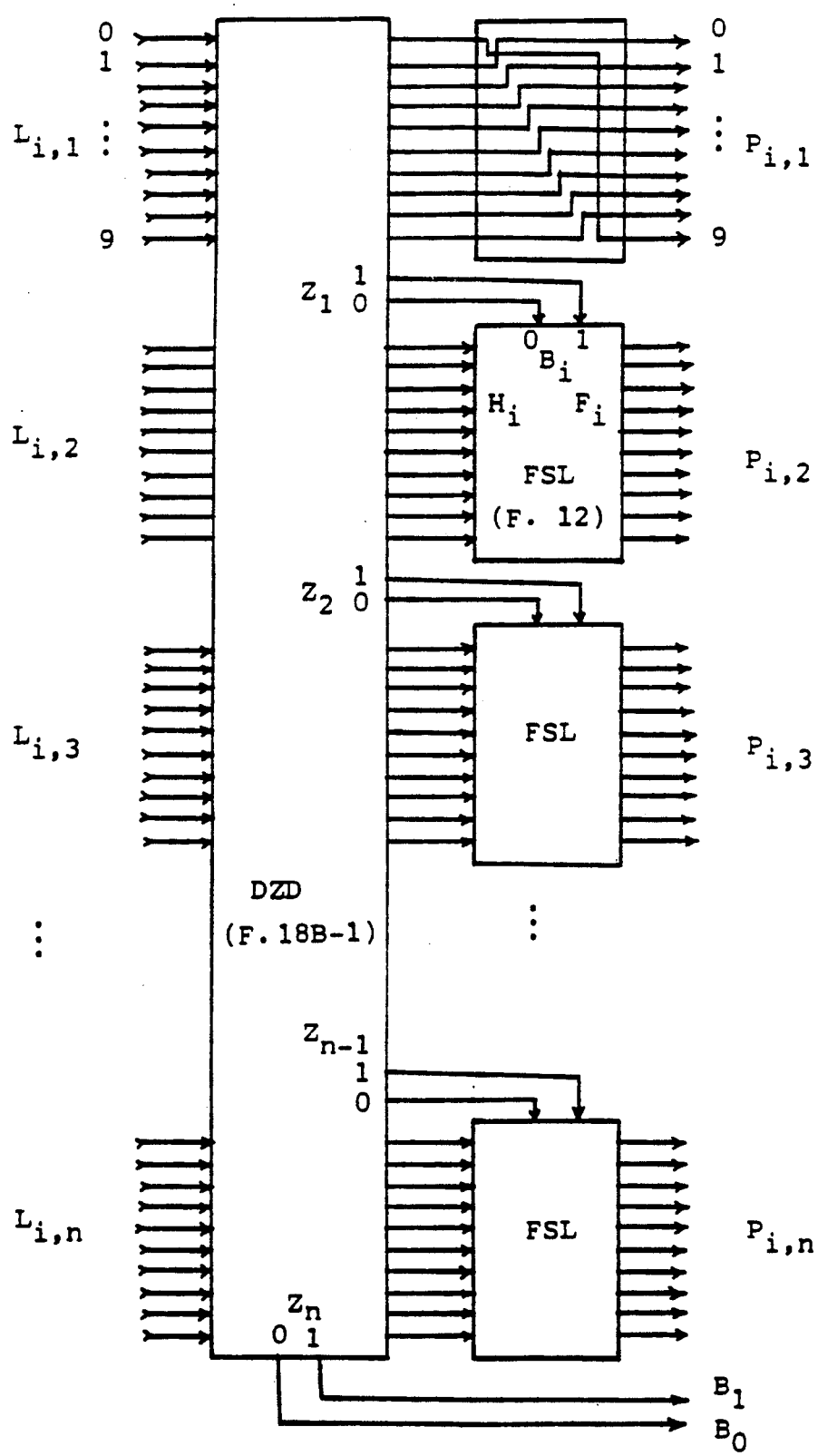
FIG. 79 is a block diagram for a TPC decrementer(DER)

FIG. 79 is a DER constructed from a DZD of FIG. 18B-1 and FSL's of FIG. 12 according to the following IOR:

$$P_{i,k} = \begin{cases} L_{i+1,k} & \text{if } k = 1 \\ L_{i,k} Z_{0,k-1} + L_{i+1,k} Z_{1,k-1} & \text{if } 1 < k \leq n \end{cases} \quad (93)$$

$$B_j = Z_{j,n}$$

where $L_{10,k} = L_{0,k}$ and $Z_{j,k}$ is as given in relations (28).

Figure 80A:
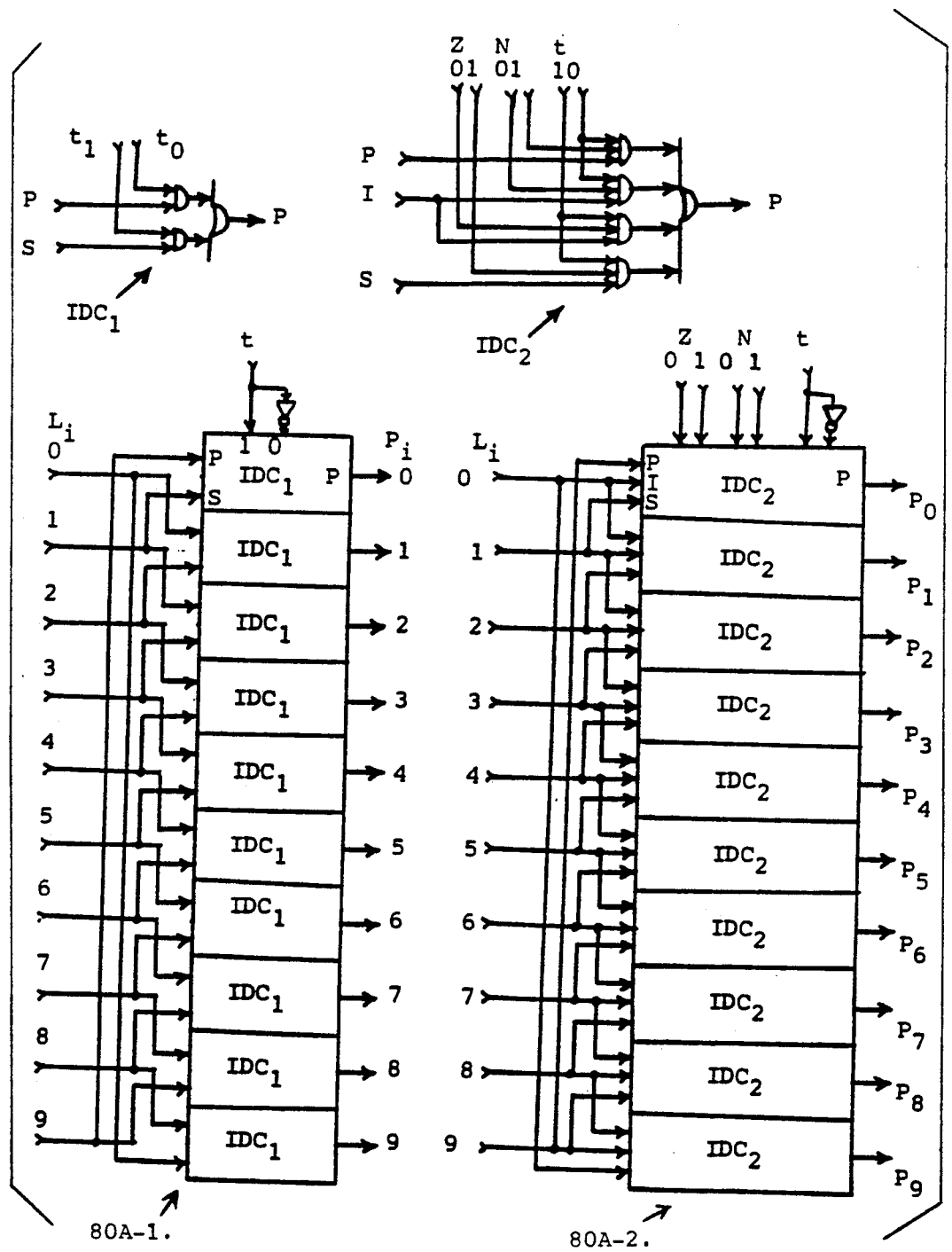

FIGS. 80A-1 and 80A-2 and IDL's for a LSD and a non-LSD, respectively, constructed each, from ten increment-decrement cells(ICD$_1$) and (ICD$_2$), respectively, according to the following IOR:

$$P_i = \begin{cases} L_{i-1}t' + L_{i+1}t & \text{for the LSD} \\ L_i N_0 t' + L_i Z_0 t + L_{i-1} N_1 t' + L_{i+1} Z_1 t & \text{for a non-LSD} \end{cases} \quad (94)$$

where t is a control variable denotes increase for value 0, decrease for value 1, $N_j$ and $Z_j$ are control variables denote nines and zeros detectors, respectively, and $L_i$ (for $i = 0, 1, 2, \ldots, 9$) denote the input data.

Figures 1, 2, 3, 80B:
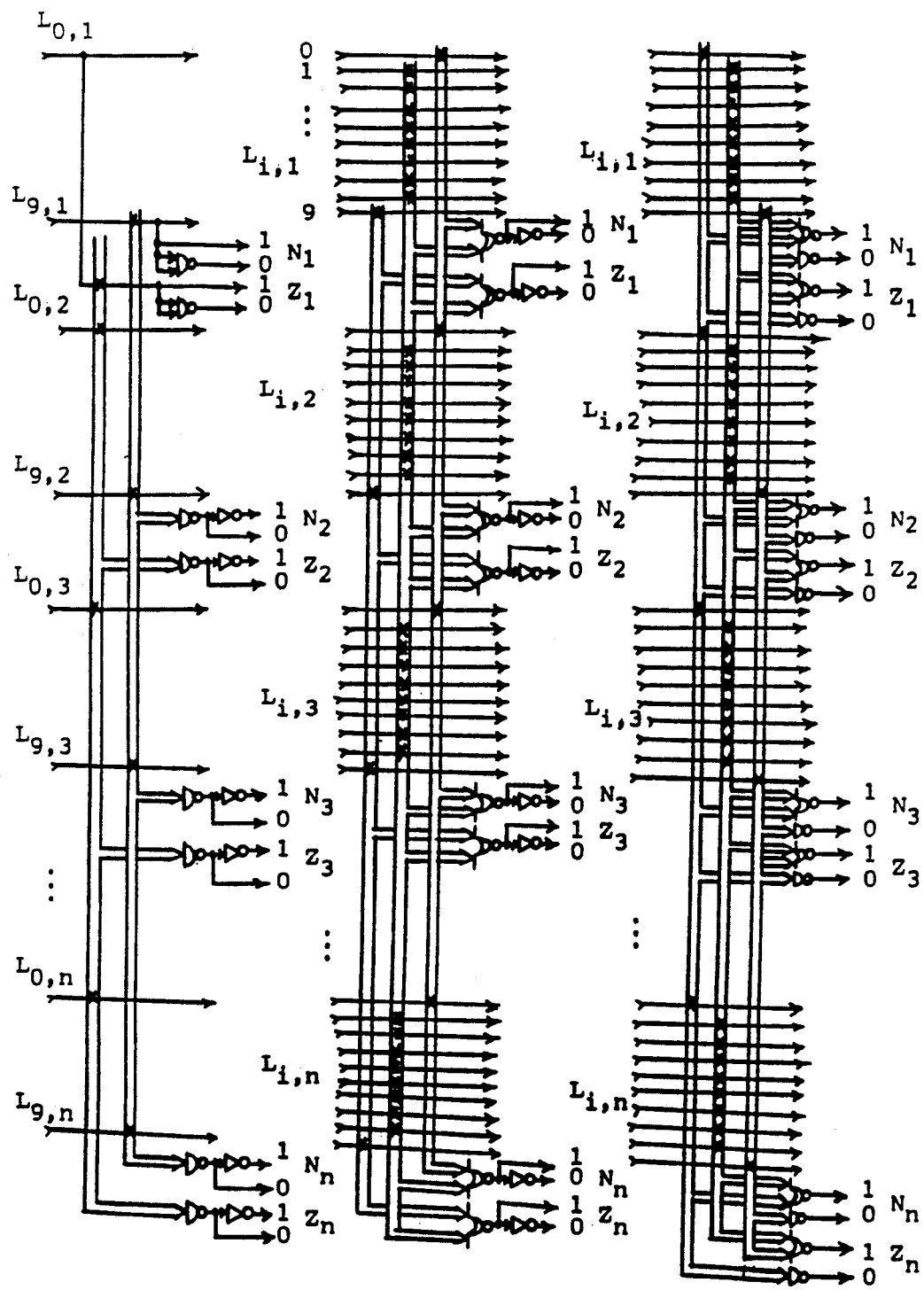

FIGS. 80B are three organizations for the NZD drawn according to the following IOR, respectively:

$$N_{0,k} = \left( \prod_{j=1}^{k} L_{9,j} \right)' ; N_{1,k} = (N_{0,k})' \quad (95\text{-i})$$

$$Z_{0,k} = \left( \prod_{j=1}^{k} L_{0,j} \right)' ; Z_{1,k} = (Z_{0,k})'$$

$$N_{1,k} = \left( \sum_{j=1}^{k} \sum_{i=0}^{r-2} L_{i,j} \right)' ; N_{0,k} = (N_{1,k})' \quad (95\text{-ii})$$

$$Z_{1,k} = \left( \sum_{j=1}^{k} \sum_{i=1}^{r-1} L_{i,j} \right)' ; Z_{0,k} = (Z_{1,k})'$$

$$N_{1,k} = \left( \sum_{j=1}^{k} \sum_{i=0}^{r-2} L_{i,j} \right)' ; N_{0,k} = \left( \prod_{j=1}^{k} L_{9,j} \right)' \quad (95\text{-iii})$$

$$Z_{1,k} = \left( \sum_{j=1}^{k} \sum_{i=1}^{r-1} L_{i,j} \right)' ; Z_{0,k} = \left( \prod_{j=1}^{k} L_{0,j} \right)'$$

which are relations (28) and (80b) written together.

Figure 80C:
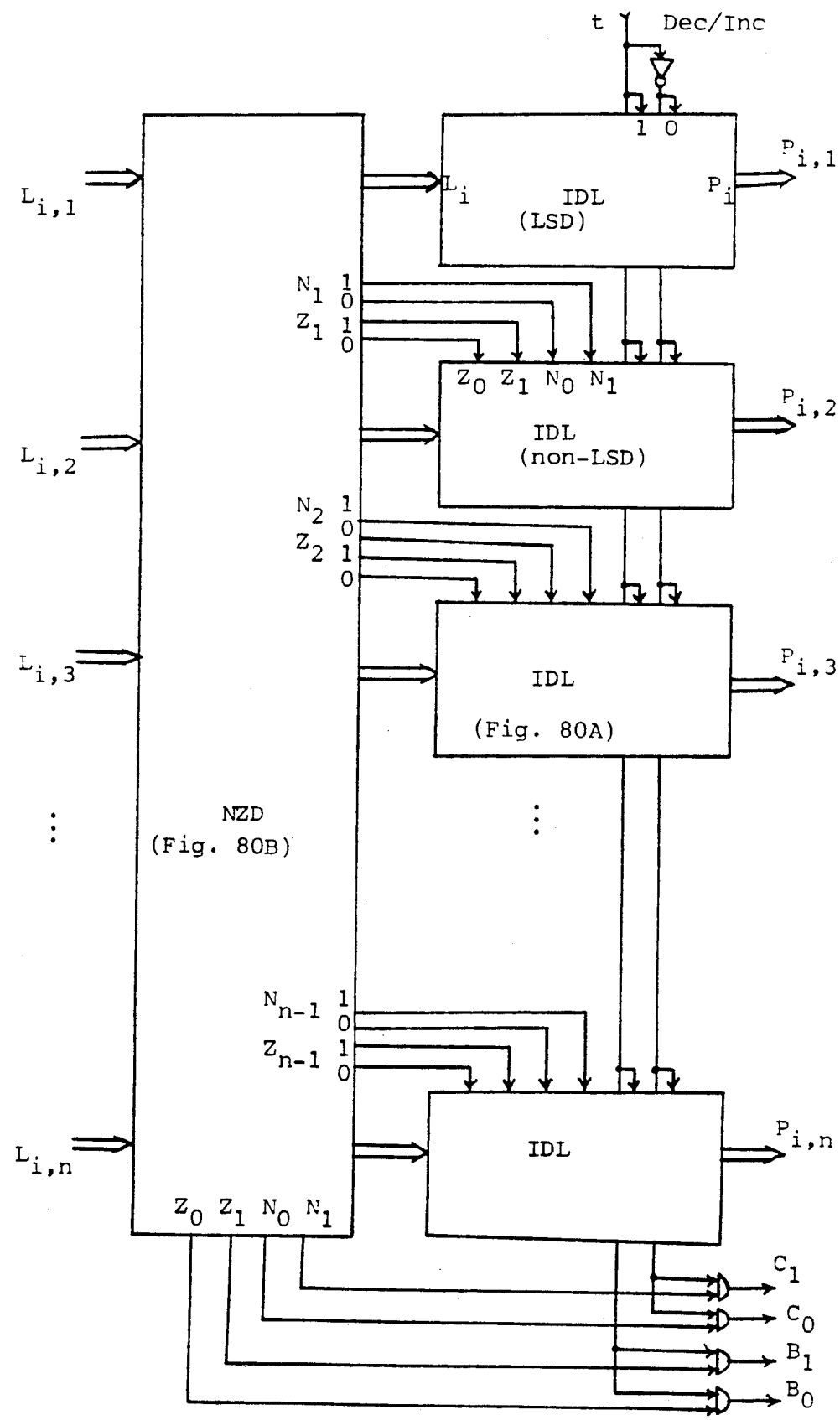
FIG. 80C is a block diagram for a TPC incrementer-decrementer(ID)

FIG. 80C is a ID constructed from a NZD of FIGS. 80B, IDL's of FIGS. 80A, and combinational logic according to the following IOR:

$$P_{i,k} = \begin{cases} t' L_{i-1,k} + t L_{i+1,k} & \text{if } k = 1 \\ t' L_{i,k} N_{0,k-1} + t L_{i,k} Z_{0,k-1} + \\ t' L_{i-1,k} N_{1,k-1} + t L_{i+1,k} Z_{1,k-1} & \text{if } 1 < k \leq n \end{cases} \quad (96)$$

$$C_j = t' N_{j,n}; B_j = t Z_{j,n}$$

where $L_{i,k}$ and t are as defined for relations (94), $N_{j,k}$ and $Z_{j,k}$ are as given in relations (95).

Figure 81A:
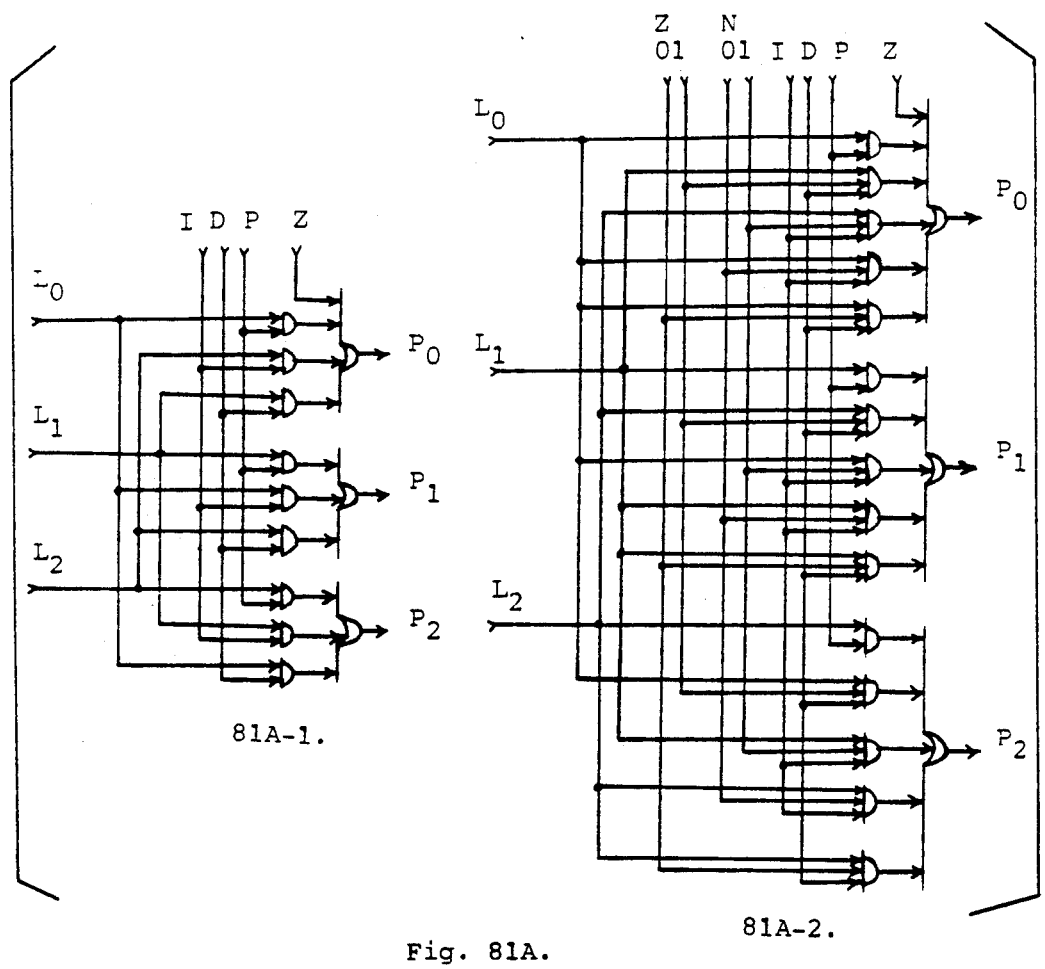

FIGS. 81A-1(2) are IDLZ's for a LSD and a non-LSD, respectively, drawn according to the following IOR:

$$P_i = \begin{cases} T_1 + Z & \text{if } i = 0 \text{ and } L_i \text{ is a LSD} \\ T_1 & \text{if } i > 0 \text{ and } L_i \text{ is a LSD} \\ T_2 + Z & \text{if } i = 0 \text{ and } L_i \text{ is a non-LSD} \\ T_2 & \text{if } i > 0 \text{ and } L_i \text{ is a non-LSD} \end{cases} \quad (97)$$

where $R_1 = PL_i + IL_{i-1} + DL_{i+1}$; $Z_j$ and $N_j$ are as given in relations (95); $T_2 + PL_i + IL_i N_0 + DL_i Z_0 + IL_{i-1} N_1 + DL_{i+1} Z_1$; I, D, P, and Z denote increase, decrease, pass with no change, and set the given input $L_i$ to zero, respectively, and $i = 0, 1, \ldots, r-1$. The diagram is drawn for the case $r = 3$.

Figure 81B:
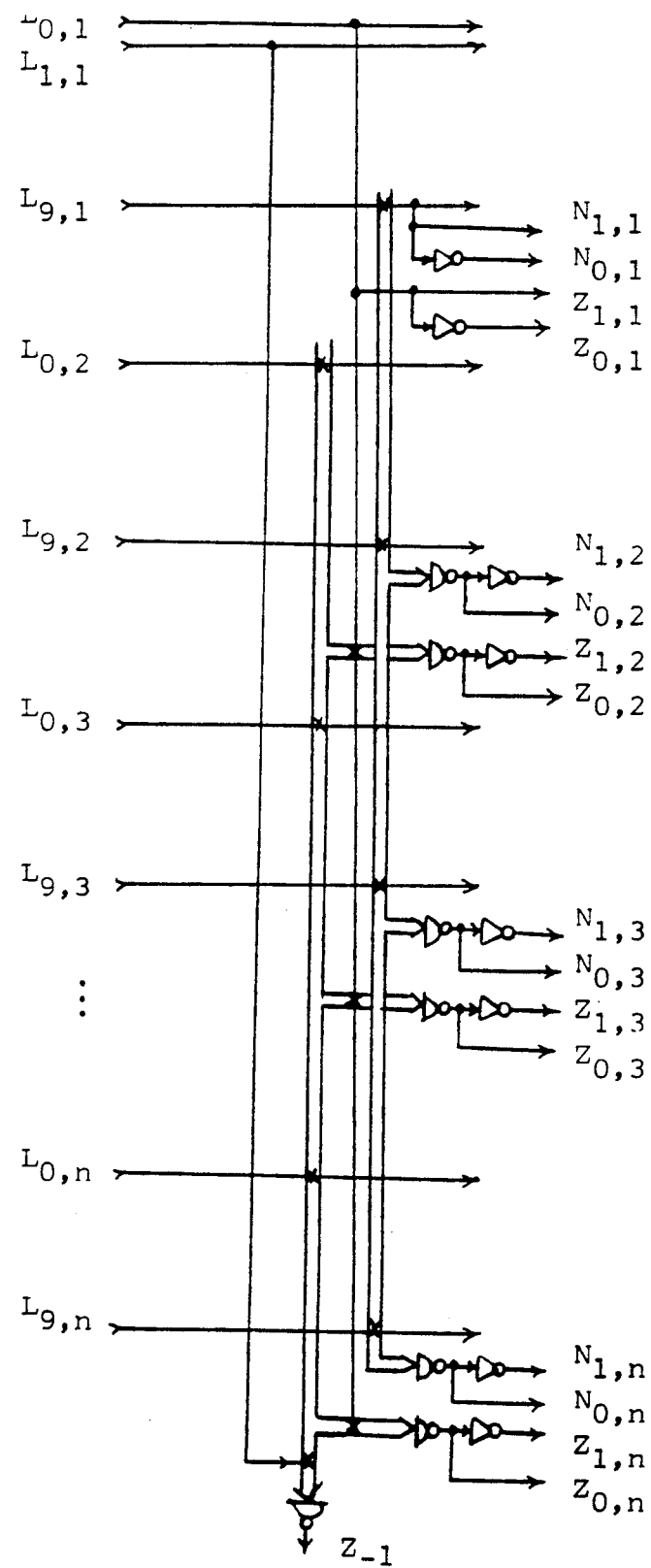
FIG. 81B is a logic diagram for a TPC increment-decrement with pass and set to zero capabilities oriented nines-zeros detector(INZD)

FIG. 81B is a INZD drawn according to the following IOR:

$$N_{0,k} = \left( \prod_{j=1}^{k} L_{9,j} \right)' ; N_{1,k} = (N_{0,k})' \quad (98)$$

$$Z_{0,k} = \left( \prod_{j=1}^{k} L_{0,j} \right)' ; Z_{1,k} = (Z_{0,k})'$$

$$Z_{-1} = \left( L_{1,1} \prod_{j=2}^{n} L_{0,j} \right)'$$

which are exactly relations (95-i) with the additional function $Z_{-1}$.

Figure 81C:
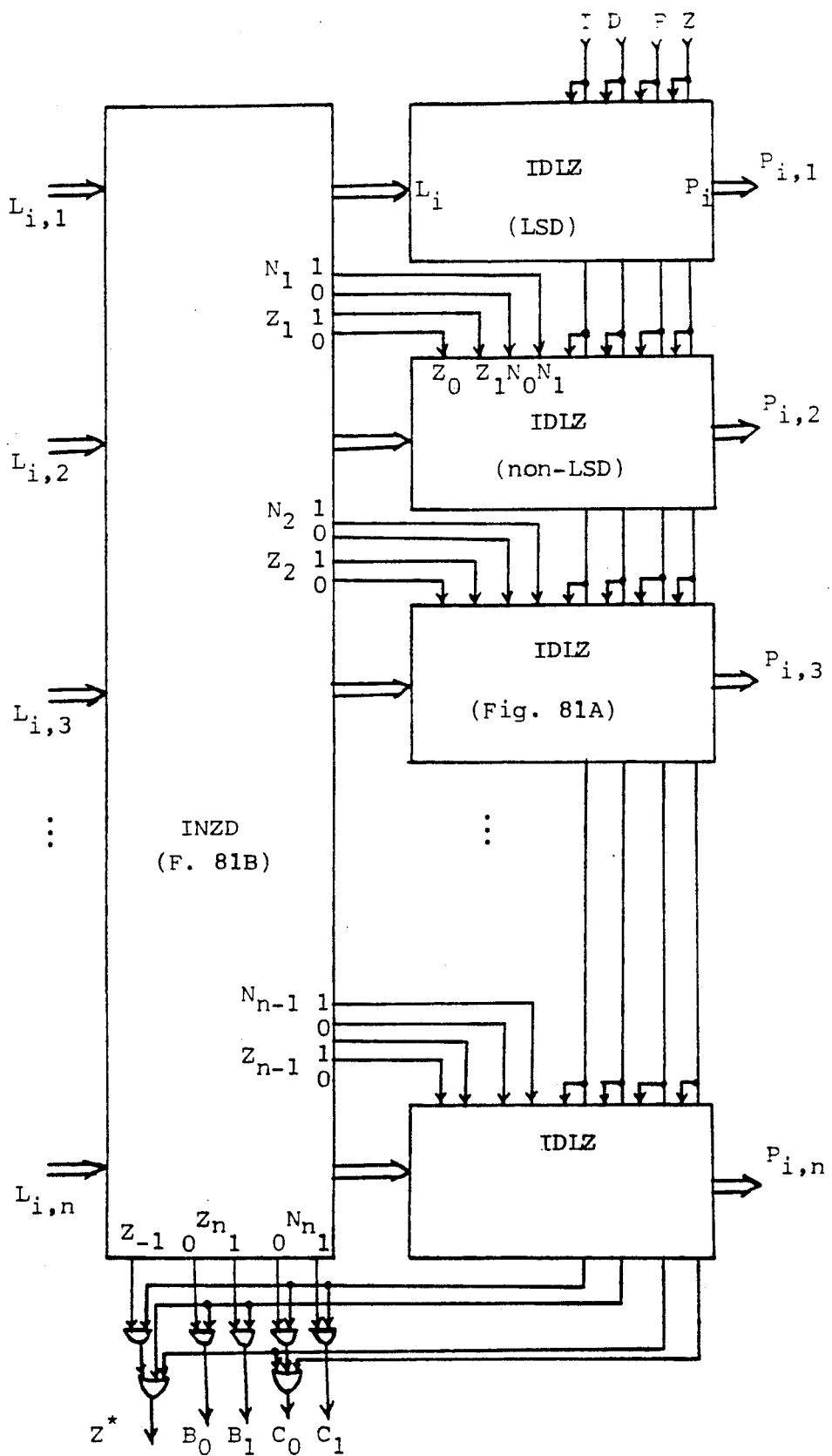
FIG. 81C is a block diagram of a TPC positive integers incrementer-decrementer with pass and set to zero capabilities(PIDPZ)

FIG. 81C is a PIDPZ constructed from a INZD of FGI. 81B, IDLZ's of FIGS. 81A, and combinational logic according to the following IOR:

$$P_{i,k}^* = P_{i,k}; Z^* = P + D + IZ_{-1} \quad (99)$$

$$C_1 = IN_{1,n}; C_0 = Z + P + IN_{0,n}$$

-continued $$B_j = DZ_{j,n}$$

where $P_{i,k}$ is as given in relations (96), $Z_{j,n}$, $N_{j,n}$, and $Z_{-1}$ are as given in relations (98), I, D, P, and Z are as defined for relations(97).

Figure 81D:
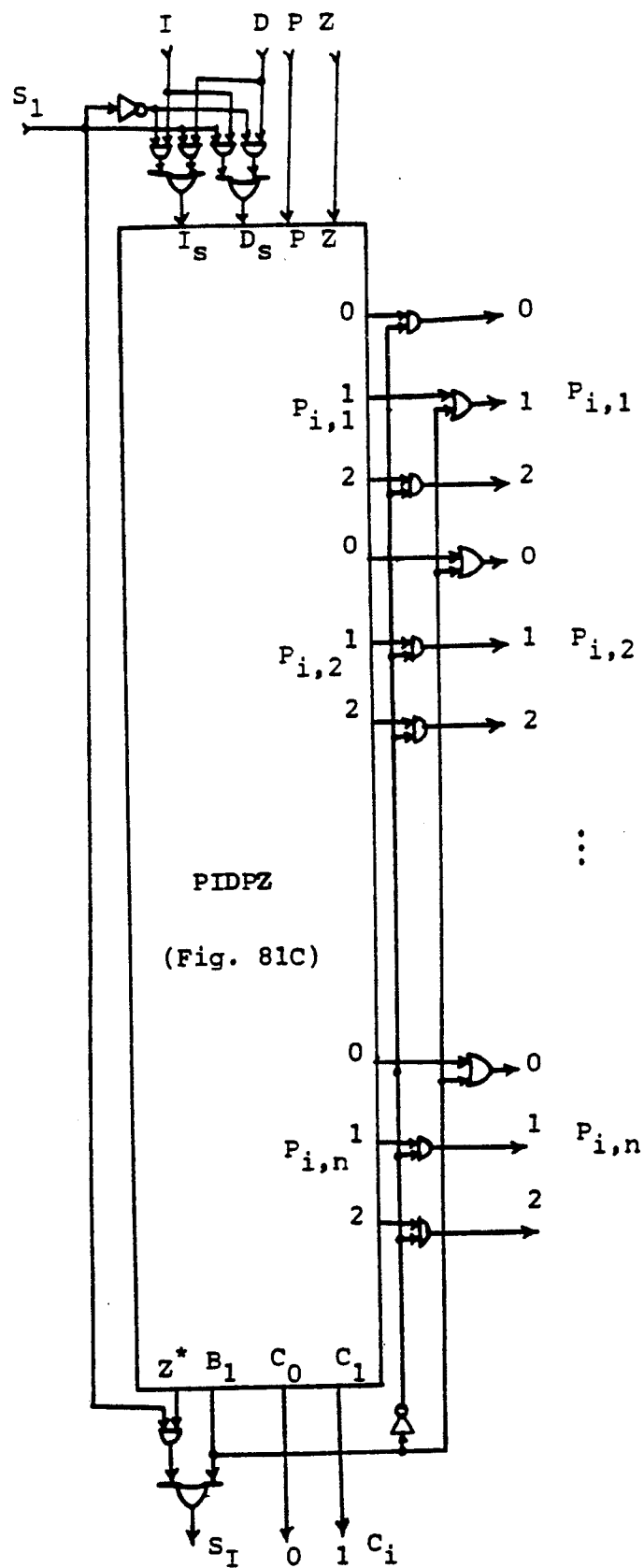
FIG. 81D is a block diagram for a TPC sign magnitude IDPZ(SIDPZ)

FIG. 81D is a SIDPZ constructed from the PIDPZ of FIG. 81C and combinational logic according to the following IOR:

$$I_s = S_1D + S'_1I; \; D_s = S_1I + S'_1D \quad (100)$$

$$P^s_{i,k} = \begin{cases} P^*_{i,k} + B_1 & \text{if } i = k = 1 \text{ or if } i = 0 \text{ and } 1 < k \leq n \\ B'_1 P^*_{i,k} & \text{if } (i = 0 \text{ and } k = 1) \text{ or} \\ & (i > 0 \text{ and } 1 < k \leq n) \end{cases}$$

$$C^s_j = C_j; \; S_1 = B_1 + S_1Z^*$$

where $S_1$ is the sign of the input $L_{i,k}$ given in sign magnitude representation, $P^*_{i,k}$, $B_1$, $C_j$, and $Z^*$ are as given in relations (99), I, D, P, and Z are as given relations (97). FIGS. 78 through 81D are all increment-decrement devices. FIG. 78 is constructed from FIGS. 3-1 and 67B while FIG. 79 is constructed from FIGS. 12 and 18B. FIG. 80C is a combination of FIGS. 78 and 79 with the increase/decrease variable t. The incrementer-decrementer of FIG. 80C is modified into a positive integers incrementer-decrementer with pass and set to zero capabilities(PIDPZ) in FIG. 81C which is modified into sign magnitude incrementer-decrementer with pass and set to zero capabilities(SIDPZ) in FIG. 81D. The SIDPZ of FIG. 81D will appear in the floating-point unit later on. All the above incrementer-decrementers are unit incrementer-decrementers, i.e., only 1 is either added to or subtracted from the given input at a time. The unit incrementer, however, can be generalized into a $d \times r^{c-1}$ incrementer for which relations (92) are modified as follows:

$$P^c_{i,k} = \begin{cases} L_{i,k} & \text{if } k < c \\ L_{i-d,k} & \text{if } k = c \\ L_{i,k}N_{0,k-1} + L_{i-d,k}N_{1,k-1} & \text{if } c < k \end{cases} \quad (101)$$

where i, d = 0, 1, ..., r−1; c, k = 1, 2, ..., n; $L_{i-d,k} = L_{r-d,k}$ if i > d;

$$N_{1,k} = \prod_{j=c}^{k} \left( \sum_{i+d \geq r} L_{i,j} \right) \text{ and } N_{0,k} = \sum_{j=c}^{k} \left( \sum_{i+d < r} L_{i,j} \right).$$

The other relations are generalized similarly which means that the above unit incrementer-decrementers can be generalized into $d \times r^{c-1}$ incrementer-decrementers.

Figure 82A:
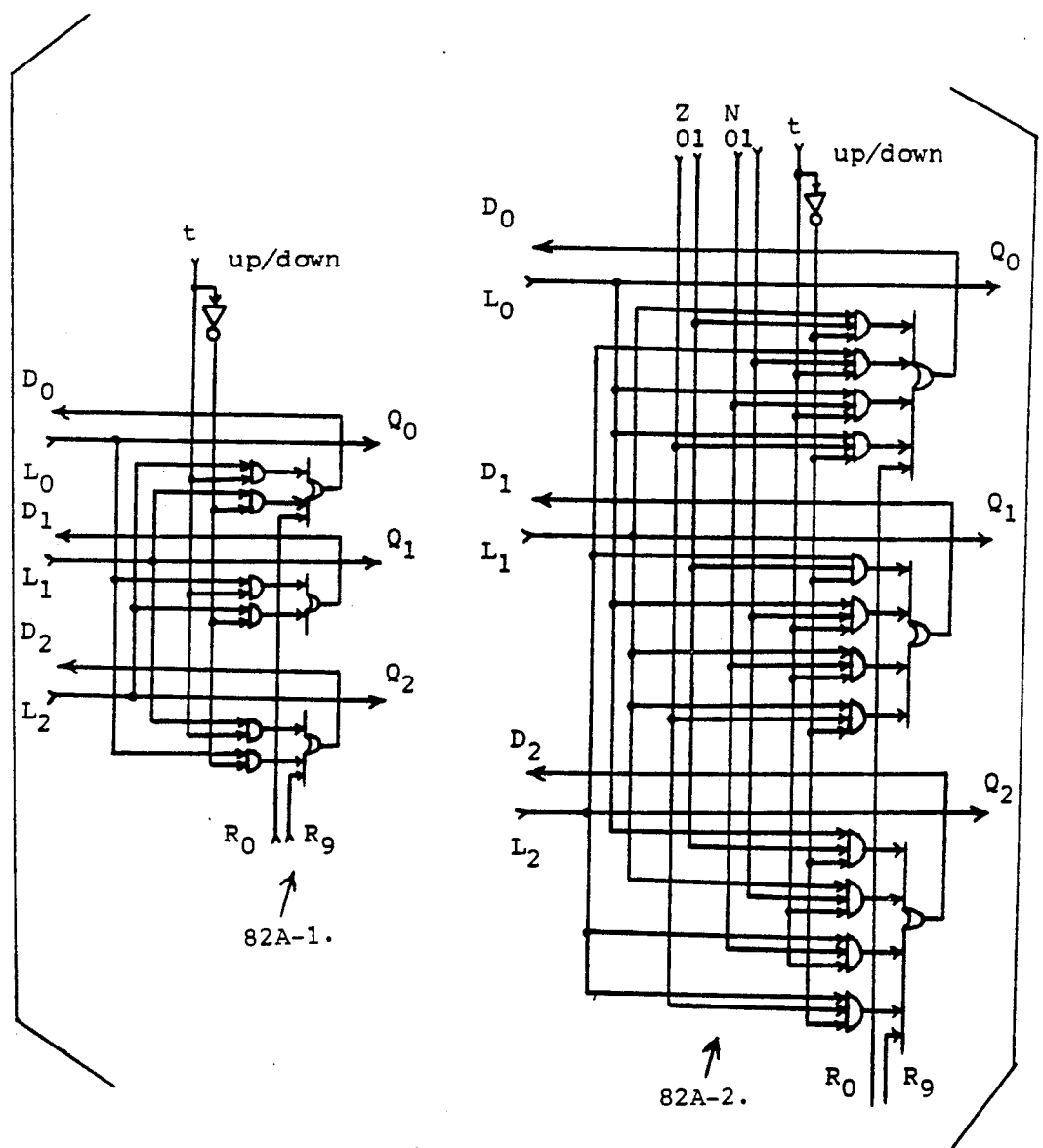

FIGS. 82A-1(2) are UCL's for a LSD and a non-LSD, respectively, drawn, for the case r=3, according to the following IOR:

$$D_i = \begin{cases} T_1 + R_0 & \text{if } LSD \text{ and } i = 0 \\ T_1 & \text{if } LSD \text{ and } 0 < i < r - 1 \\ T_1 + R_{r-1} & \text{if } LSD \text{ and } i = r - 1 \\ T_2 + R_0 & \text{if } non\text{-}LSD \text{ and } i = 0 \\ T_2 & \text{if } non\text{-}LSD \text{ and } 0 < i < r - 1 \\ T_2 + R_{r-1} & \text{if } non\text{-}LSD \text{ and } i = r - 1 \end{cases} \quad (102)$$

where $T_1 = Q_{i-1}(t) + Q_{i+1}(t')$; $R_9$ and $R_{r-1}$ are control variables denote set to zero and set to nine, respectively; $T_2 = Q_iN_0t + Q_iZ_0t' + Q_{i-1}N_1t + Q_{i+1}Z_1t'$; t is a control variable denotes count up and down for values 1 and 0, respectively; $N_j$ and $Z_j$ are nines and zeroes detectors and $Q_i$ is the output of Flip-Flop no. i in the given counter register.

Figure 82B:
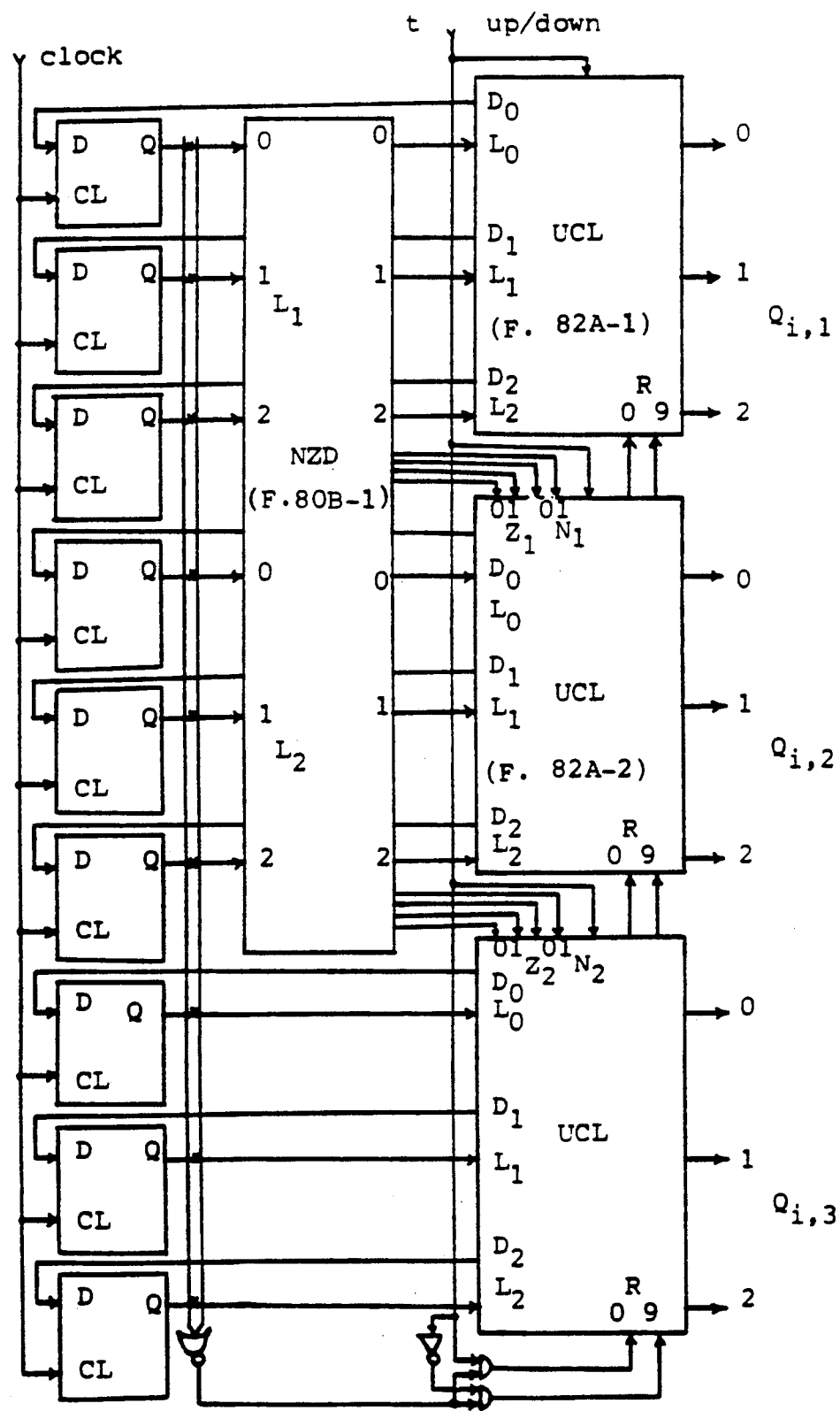
FIG. 82B is a logic diagram for TPC modulo $r^n$ up-/down counter(MUC)

FIG. 82B is a modulo $r^n$ up/down counter comprised from UCL's of FIG. 82A, a NZD of FIGS. 80B, D-type Flip-Flop's (D-FF) and combinational logic according to the following IOR:

$$D_{i,k} = \begin{cases} T_1 + R_0 & \text{if } i = 0 \text{ and } k = 1 \\ T_1 & \text{if } 0 < i < r - 1 \text{ and } k = 1 \\ T_1 + R_{r-1} & \text{if } i = r - 1 \text{ and } k = 1 \\ T_2 + R_0 & \text{if } i = 0 \text{ and } k > 1 \\ T_2 & \text{if } 0 < i < r - 1 \text{ and } k > 1 \\ T_2 + R_{r-1} & \text{if } i = r - 1 \text{ and } k > 1 \end{cases} \quad (103)$$

where $T_1 = t \; Q_{i-1,k} + t' Q_{i+a,k}$;

$$R_0 = \left( \sum_{j=1}^{n} \sum_{i=0}^{r-1} Q_{i,j} \right)' t;$$

$T_2 = Q_{i,k}(t \; N_{0,k-1} + t'Z_{0,k-1}) + t \; Q_{i-1,k}N_{1,k-1} + t'Q_{i+1,k}Z_{1,k-1}$;

$$R_{r-1} = \left( \sum_{j=1}^{n} \sum_{i=0}^{r-1} Q_{i,j} \right)' t';$$

$N_{j,k}$ are as given in relations(95); t and $Q_{i,k}$ are as defined for relations(102). The diagram of FIG. 82B is shown for the case r=n=3. Such a counter is merely a synchronous register coupled to a modified(for the case either set to zeros or to nines) incrementer-decrementer and the output of the incrementer-decrementer is connected to the input of the synchronous register. Combining registers with incrementer-decrementers for forming counters is a well known technique in the art. The main difference is that the incrementer-decrementers of this invention are different from those of the conventional system. Because such connection between counters and incrementer-decrementers and because the generalization of relations (101), the counter of FIG. 82B can be modified into a modulo $r^n$ counter with count step in the form $d \times r^{c-1}$. Such a counter can be used as an adder-subtractor by feeding one of the operands into the synchronous register as an external input and dividing the other operand into count steps of the form $d \times r^{c-1}$. For example, such count steps for the number 1850669 are $1 \times 10^6$, $8 \times 10^5$, $5 \times 10^4$, $0 \times 10^3$, $6 \times 10^2$, $6 \times 10^1$, and $9 \times 10^0$, a case in which two numbers of such size can be added(subtracted) in only 7 count steps.

FIG. 82 is a CRS drawn according to the following IOR:

$$P_{i,k}^R = \begin{cases} d_{m_1} & \text{if } i = 0 \text{ and } m_1 = n \\ + \sum_{j=0}^{n-k} L_{i,n-j} d_{n-k-j} + \sum_{j=n-k+1}^{m_1} d_j & \text{if } i = 0, n > m_1, \text{ and } n - k \leq m_1 \\ + \sum_{j=0}^{n-k} L_{i,n-j} d_{n-k-j} & \text{if } 0 < i < r, m_1 < n, \text{ and } n - k \leq m_1 \\ + \sum_{j=0}^{m_1} L_{i,k+j} d & \text{if } m_1 < n \text{ and } n - k > m_1 \end{cases}$$ (104)

where $k = n, n-1, \ldots, 1$; $m_1 = 0, 1, \ldots, n$; $i = 0, 1, \ldots, r-1$; $d_k$ denotes shift the given input k places to the right; and $L_{i,k}$ denotes the input data to be shifted.

Figure 84:
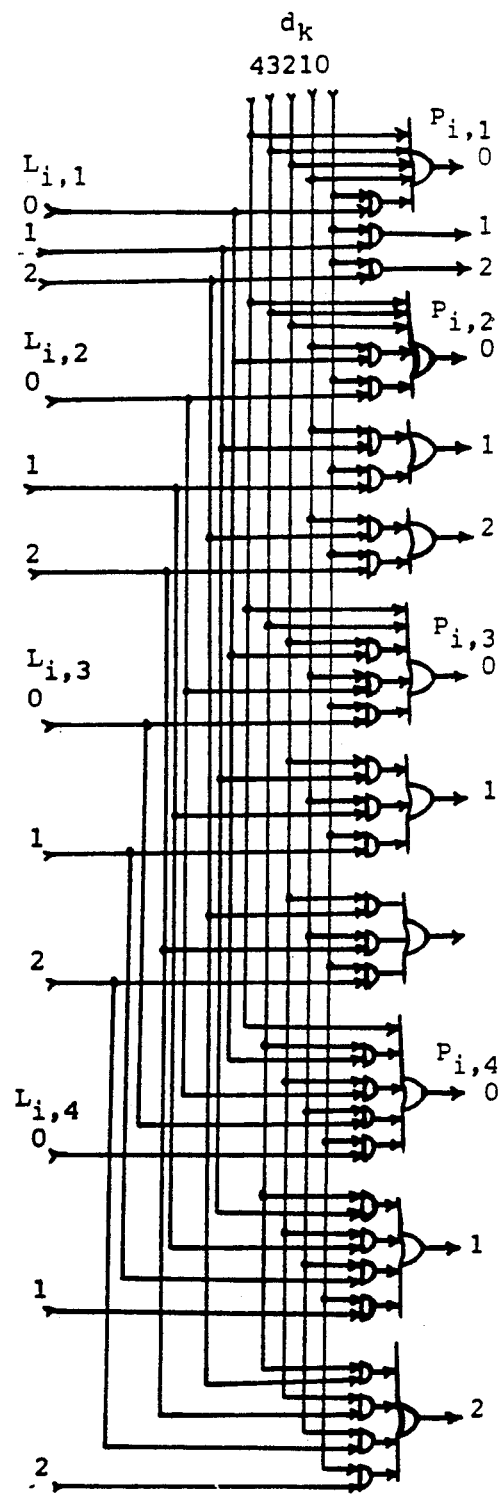

FIG. 84 is a CLS constructed from combinational logic according to the following IOR:

$$P_{i,k}^L = \begin{cases} d_{m_2} & \text{if } i = 0 \text{ and } m_2 = n \\ + \sum_{j=0}^{k-1} L_{i,j+1} d_{k-j-1} + \sum_{j=k}^{m_2} d_j & \text{if } i = 0, m_2 < n, \text{ and } k \leq m_2 \\ + \sum_{j=0}^{k-1} L_{i,j+1} d_{k-j+1} & \text{if } 0 < i < r, m_2 < n, \text{ and } k \leq m_2 \\ + \sum_{j=0}^{m_2} L_{i,k-j} d_j & \text{if } m_2 < n \text{ and } k > m_2 \end{cases}$$ (105)

where $m_2 = 0, 1, \ldots, n$; $k = 1, 2, \ldots, n$; $L_{i,k}$ is as defined for relations (104); $d_k$ means shift the given data k places to the left.

Figure 85:
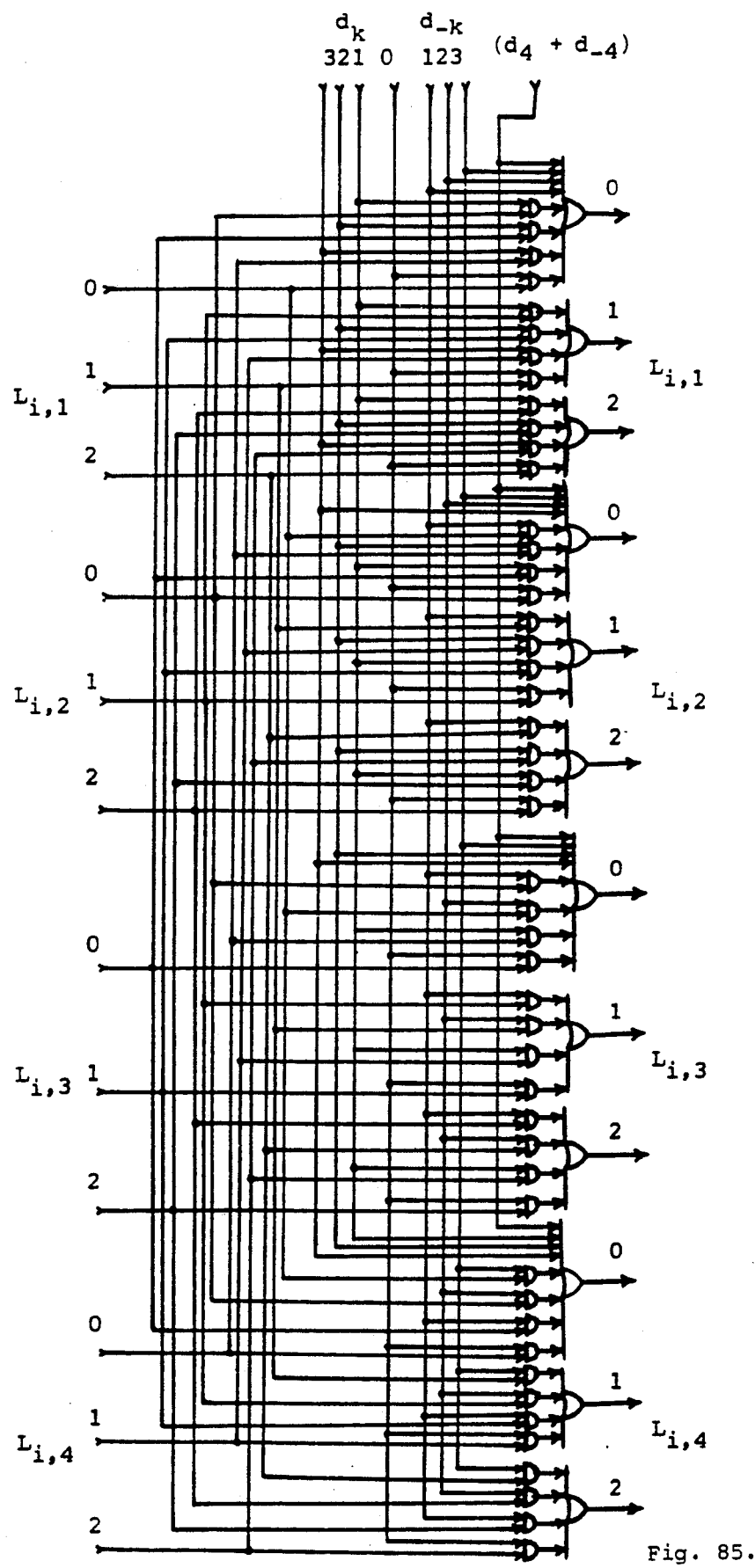

FIG. 85 is a CBS constructed from combinational logic according to the following IOR:

$$P_{i,k}^B = P_{i,k}^L + P_{i,k}^R \qquad (106)$$

where $P_{i,k}^R$ and $P_{i,k}^L$ are as given in relations (104) and (105), respectively, and either $d_{m_1}$ or $d_{m_2}$ can be 1 (i.e., on) at a time. All the above three shifters will appear in the floating-point unit later on.

Figure 86:
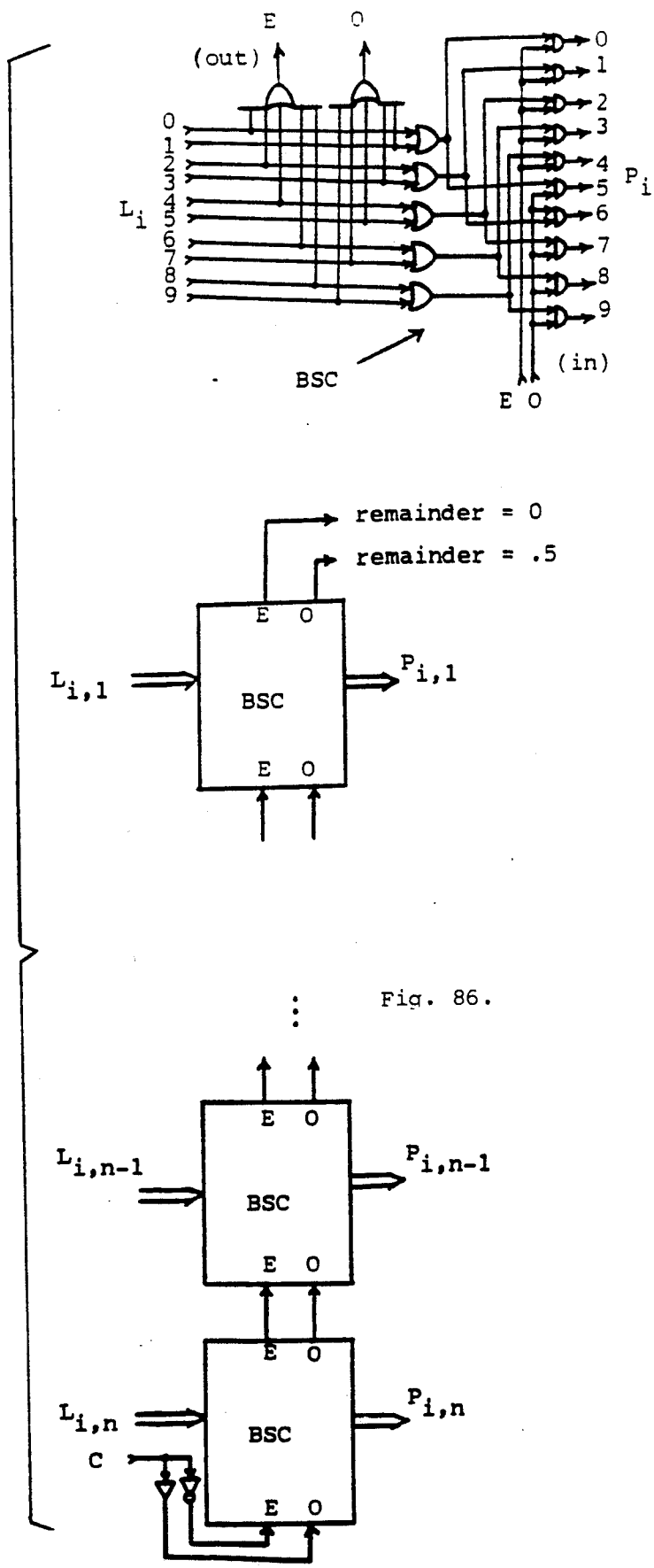

FIG. 86 is a BR constructed from bisector cells(BSC) according to the following IOR:

$$P_{i,k} = \begin{cases} L_{2i,k} + L_{2i+1,k} & \text{if } k = n \text{ and } i < r/2 \\ (L_{2i,k} + L_{2i+1,k})E_{k+1} & \text{if } 2i + 1 \leq r \text{ and } k < n \\ (L_{2i-r,k} + L_{2i+1-r,k})O_{k+1} & \text{if } 2i \geq r \text{ and } k < n \end{cases}$$ (107)

remainder = $O_1$
where $$E_k = \sum_{0 \leq i < r/2} L_{2i,k}; \quad O_k = \sum_{0 \leq i < (r-1)/2} L_{2i+1,k};$$

and $L_{i,k}$ (for $i = 0, 1, \ldots, r-1$ and $k = 1, 2, \ldots, n$) denotes the input. BR divides its input by 2 and for that purpose it will appear in the devices of floating-point unit later on. To be continued next on fixed-point unit FIGS. 87.

Figure 87A:
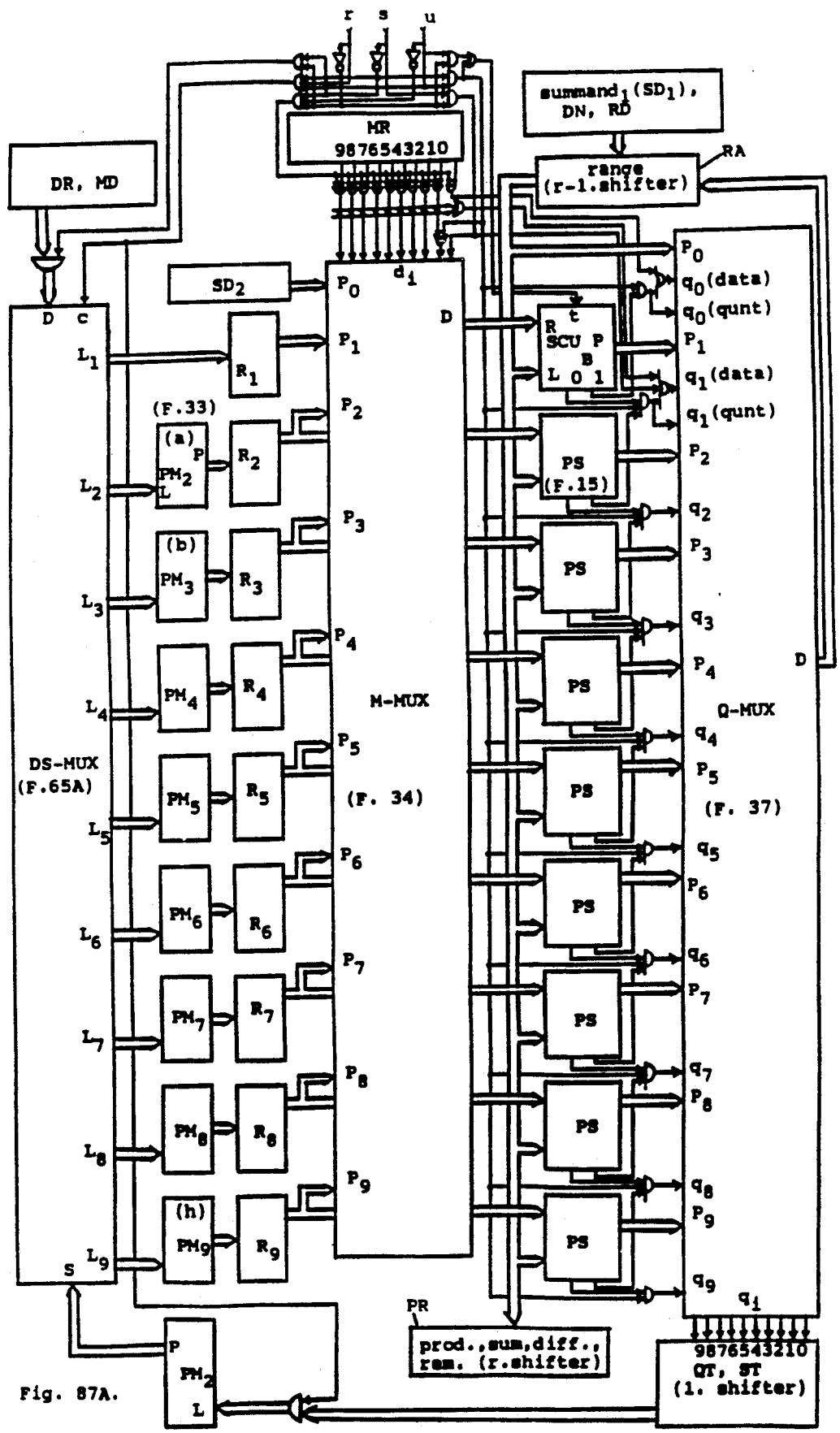
FIG. 87A is a block diagram for a TPC sign magnitude fixed-point arithmetic unit(PAU)

FIG. 87A is a PAU comprised from the PSU of FIG. 65B and the SCU of FIG. 69 with the PAS of the PSU is combined with and replaced by the SCU, $R_1$ is confined to input $P_1$ and another register sum and$_2$(SD$_2$) is coupled to input $P_0$ of the M-MUX of the PSU, and with the remaining components of the PSU are kept the same for the same functions and with an additional control variable u and additional combinational logic according to the following algorithm written in RTL-like notations:

ALG. 23

1. If $r(\bar{u}+s) = 1$ then stop, (* not allowed operation *).
2. SCU t input←$u(\bar{r}+\bar{s})$, M-MUX control $d_0$←$\overline{rs}$.
3. If e,ovs/r/ s=0 then goto 10, (* follows is an add or a sub. op. *).
4. R←DN, M-MUX data $P_0$←SD$_2$.
5. SCU $L_{input}$←R, SCU $R_{input}$←M-MUX.
6. Q-MUX data $P_1$←SCU, Q-MUX control $q_1$←$\bar{r}s$.
7. R←Q-MUX.
8. P←R.
9. $P_{i,k}$←$P_{i,k+1}$ in P, (* right-shaft op. in reg. P*).
10. If $\overline{rsu}$=0 then goto 16, (* follows a multiply op. *).
11. DS-MUX data D←MD($\overline{rs}$).
12. $R_1$ and PM$_d$'s←corresponding DS-MUX $L_d$'s.
13. $R_2$ through $R_9$←corresponding PM$_d$'s.
14. $d_1, d_2, \ldots, d_9$ of MR←$d_1(\overline{rs})+(su)$, $d_2(\overline{rsu})$, $d_3(\overline{rsu}), \ldots, d_9(\overline{rsu})$ respectively.
15. MULTIPLY ROUTINE OF ALG. 15.
16. If $\overline{rsu}$=0 then goto 21, (* follows is a divide op. *).
17. DS-MUX data D←MD($\overline{rs}$), n LSD's of R←n MDS's of DN.
18. $R_1$ and PM$_d$'s ←corresponding $L_d$'s from DS-MUX.
19. $R_2$ through $R_9$←corresponding PM$_d$'s.
20. DIVIDE ROUTINE OF ALG. 15.
21. DS-MUX data $C_i$←($\overline{rsu}$), ($rs$)←($\overline{rsu}$).
22. SQUAREROOT ROUTINE OF ALG. 17.

where $u = (S_1 \oplus S_r \oplus A)$, $S_U = S_s(\overline{rs}) + S_m(\overline{rs})$, A, $S_1$, $S_r$, and $S_s$ are as given for relations (82), $S_m$ is as given in relation (83), $S_U$ denotes the sign of the output of the PAU, and rsu=000, 001, 010, 011, 101, and else for multiply, divide, add, subtract or compare, extract square root, and not allowed operations respectively.

Figure 87B:
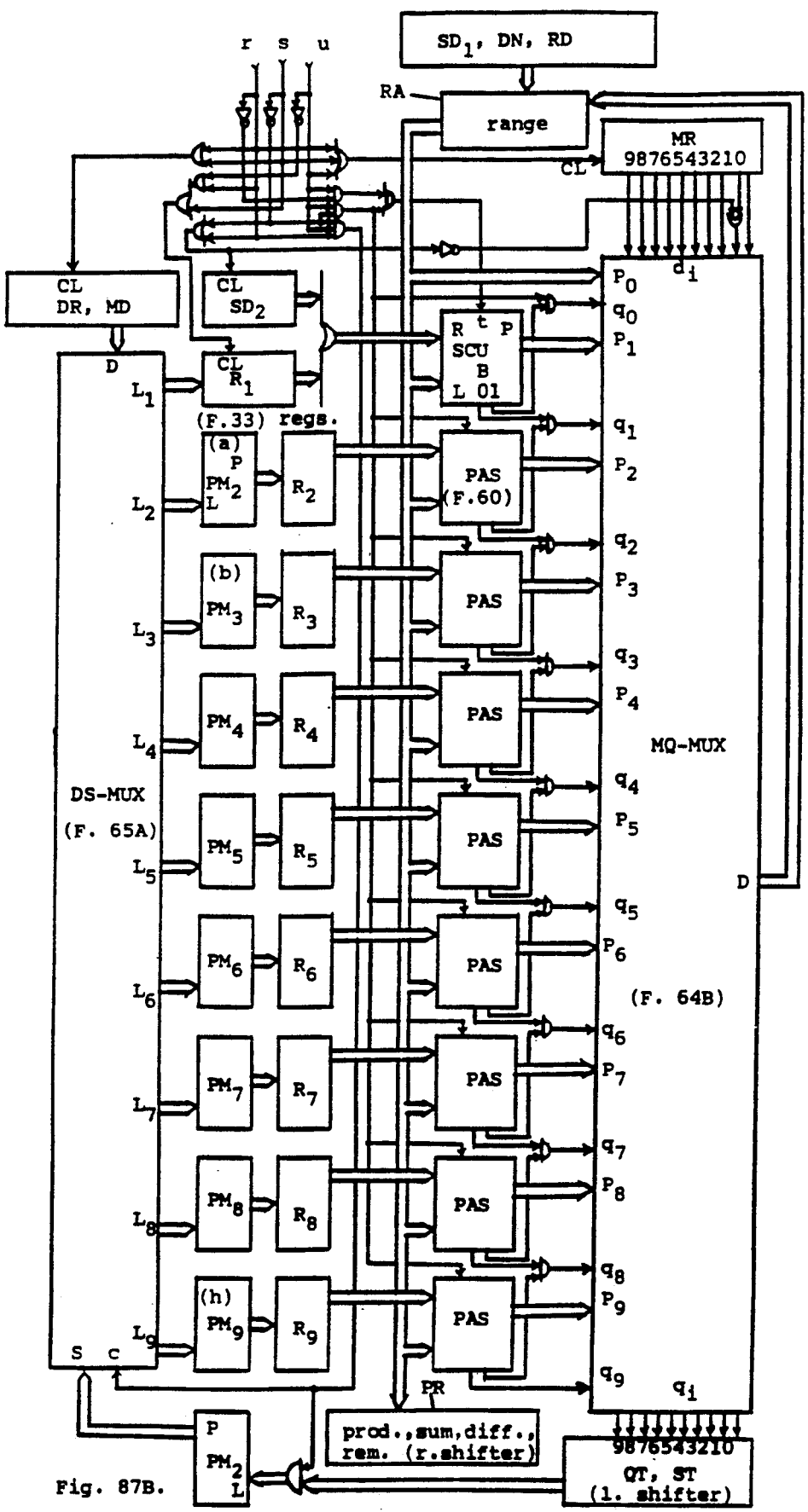
FIG. 87B is another organization for the PAU of FIG. 87A.

FIG. 87B is another organization for the PAU comprised with the PSU of FIG. 65C instead of the PSU of FIG. 65B for the PAU of FIG. 87A according to the following algorithm written in RTL-like notations also:

ALG. 24

1. If $r(\bar{u}+s) = 1$ then stop, (* not allowed operation *).
2. SCU $t_{input}$←$u(\bar{r}+\bar{s})$.
3. If $\bar{r}s+0$ then goto 10, (* follows is an add if $u\bar{r}+us+0$ and a subtract op. if $u\bar{r}+us=1$*).

4. MD←∅, R₁←∅, MR←∅, R←DN for SD₁.
5. SCU L$_{input}$←R, SCU R$_{input}$←SD₂, (* SD₂ is ORed with R₁ to the SCU R$_{input}$*).
6. MQ-MUX data P₁←SCU, MQ-MUX control d₁←$\overline{rs}$.
7. R←MQ-MUX, (* the sum is ready from the MQ-MUX *).
8. P←R.
9. P$_{i,k}$←P$_{i,k+1}$ in P.
10. If $\overline{rsu}$=0 then goto 15, (* follows is a multiply op. *).
11. SD₂←∅, DS-MUX data D←MD.
12. R₁ and PM$_d$'s←corresponding L$_d$'d from DS-MUX.
13. R₂ through R₉←corresponding PM$_d$'s.
14. MULTIPLY ROUTINE OF ALG. 16.
15. If $\overline{rsu}$=0 then goto 20, (* goto squareroot operation *).
16. SD₂←∅, MR←∅, DS-MUX data D←MD for DR, n LSD's of R←n MSD's from DN.
17. R₁ and PM$_d$'s←corresponding L$_d$'s of DS-MUX.
18. R₂ through R₉←corresponding PM$_d$'s.
19. DIVIDE ROUTINE OF ALG. 16.
20. DS₂←∅, MR←∅, MD←∅, DS-MUX data C$_i$←rsu, (rs)←(rsu).
21. SQUARE ROOT ROUTINE OF ALG. 18.

where u, S$_U$, and the assignments of the control variables are as given for ALG. 23. In short, the PAU of FIG. 87A is merely a combination of the PSU of FIG. 65B and the SCU of FIG. 69 using the control variables r, s, and u; combinational logic and the extra register SD₂. FIG. 87B is just a modification for the PAU of FIG. 87A corresponding to the PSU of FIG. 65C. To be continued next on floating-point unit FIGS. 88–91.

The normalized floating-point algorithm is summarized, mainly from [Mano], as follows:

ALG. 25: Floating-point algorithm i. Addition/subtraction

1. Check for zero operands.
2. Align the mantissas by equalizing their exponents.
3. Add/subtract the mantissas.
4. Normalize the resulting sum/difference.

ii. Multiplication/division

1. Check for zero operands.
2. Add/subtract exponents.
3. Multiply/divide mantissas.
4. Normalize the resulting product/quotient.

iii. Square root extraction

1. Check for negative operand.
2. Increment the exponent and shift the mantissa one place to the right if the exponent is an odd integer.
3. Halve the exponent.
4. Obtain the square root of the corresponding mantissa.

ALG. 25 show that the normalized floating-point algorithm is a fixed-point algorithm except align the mantissas and the post normalize steps. Such steps will be implemented in this invention as suggested in [Anderson, at al.] for the IBM System/360 Model 91 that the difference between the exponents (the number of leading zeros) be decoded into shift amount, the mantissa with smaller exponent by shifted right (left) by such amount, and that the number of leading zeros be subtracted from the equalized exponent, full explanation given in [Hwang]. This is why the floating-point adder of FIG. 88, for example, seems to be organized along the lines with the floating-point adder of the IBM/360 Model 91 [Anderson, et al.].

Figure 83:
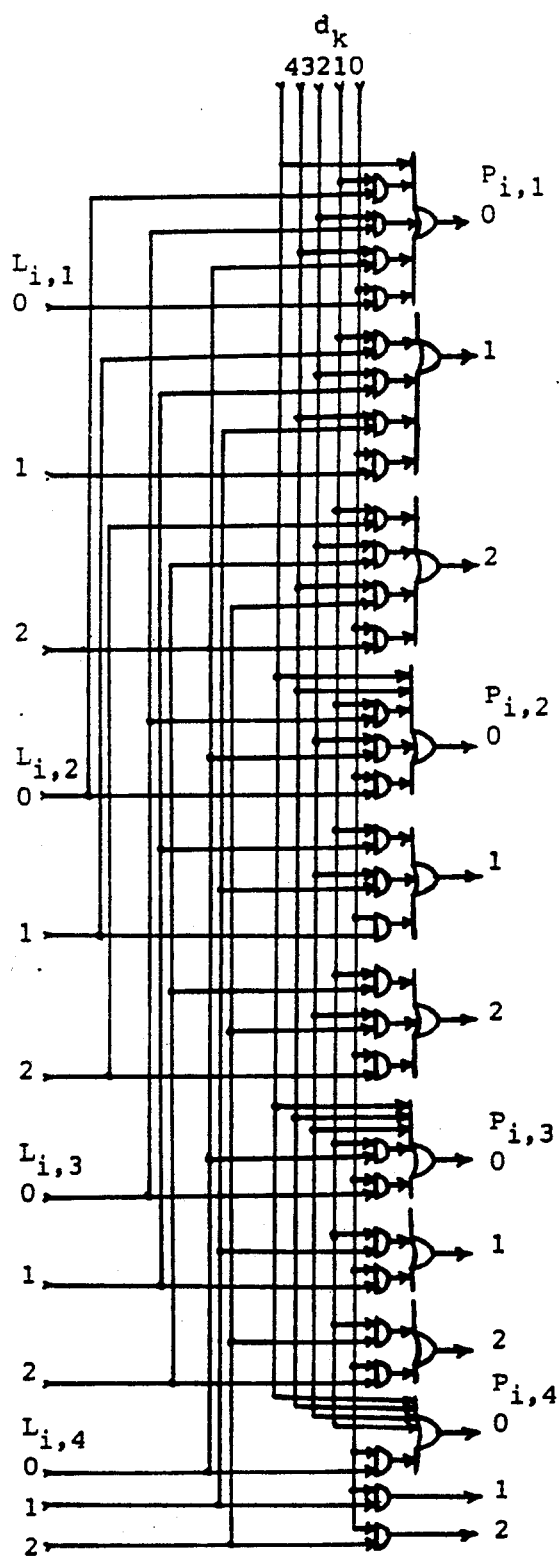
FIGS. 83, 84, and 85 are logic diagrams for TPC's combinational right, left, and bidirectional shifters, respectively.
Figure 88:
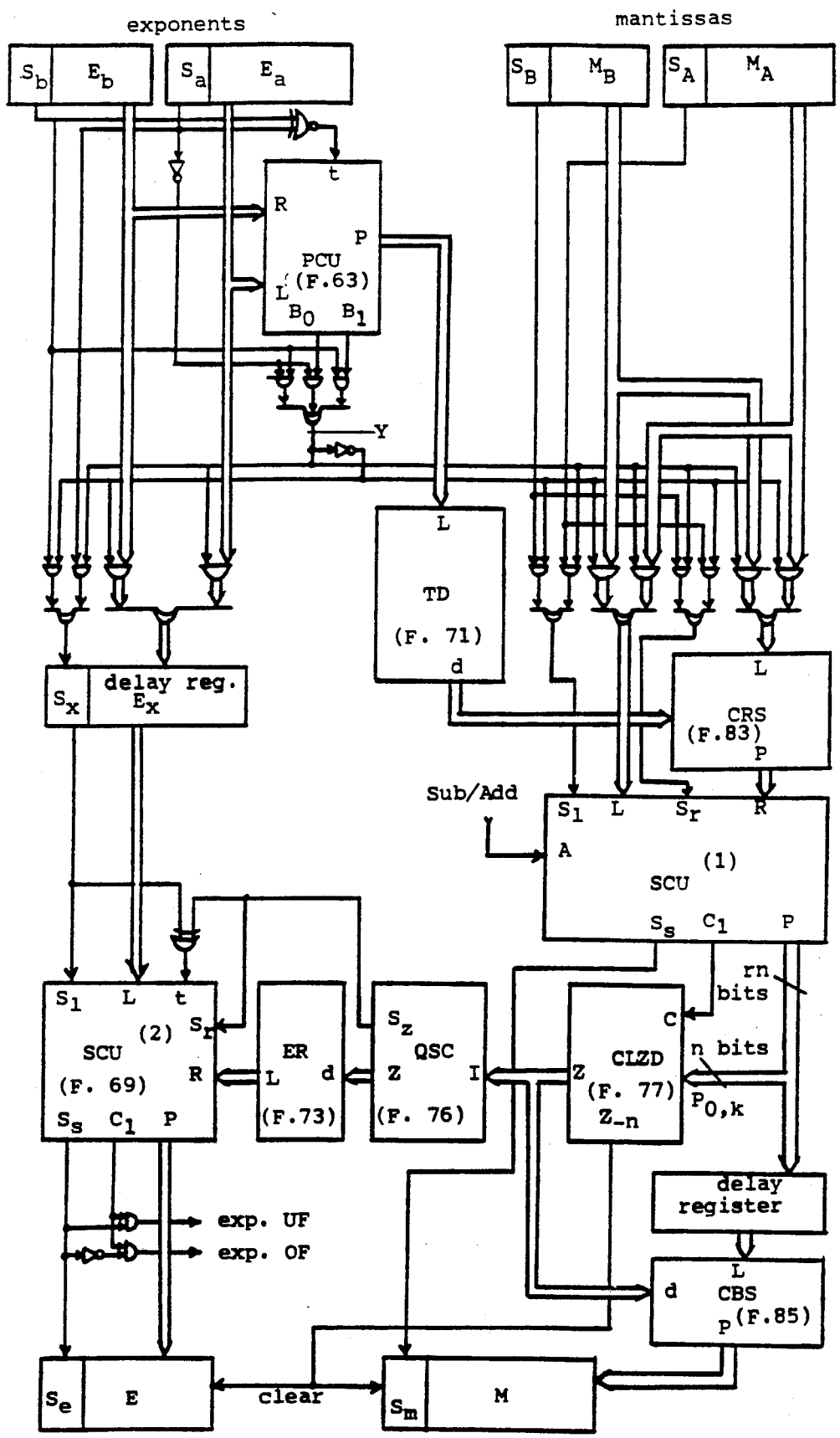
FIG. 88 is a block diagram for a TPC normalized floating-point adder-subtractor(EAS)

FIG. 88 is a FAS constructed from: two registers for holding the exponents E$_a$ and E$_b$ and their signs S$_a$ and S$_b$, respectively; two registers for holding the mantissas M$_A$ and M$_B$ and their signs S$_A$ and S$_B$, respectively; two registers for holding the exponent E and the mantissa M of the output and their signs S$_e$ and S$_m$, respectively; one delay register for holding the equalized exponent E$_x$ and its sign S$_x$; a PCU of FIG. 63 for obtaining the difference between the exponents; a TD of FIG. 71 for decoding the difference of the exponents; a CRS of FIG. 83 for shifting the mantissa of the smaller exponent to the right as many places as the number of the digits of the difference of the exponents; a SCU of FIG. 69 for adding/subtracting the mantissas; a CLZD of FIG. 77 for detecting the number of leading zeros and the carry of the output of the SCU of the mantissas in decoded form; a QSC of FIG. 76 for converting the output of the CLZD into sign and magnitude; a ER of FIG. 73 for converting the magnitude of the output of the QSC into an integer in the required radix; another SCU of FIG. 69 for adding/subtracting the output of the ER and the equalized exponent; a CBS of FIG. 85 for shifting the output P of the SCU of the mantissas right/left if necessary; a delay register for holding P temporarily; and combinational logic according to the following algorithm written in RTL-like notation:

ALG. 26

1. PCU inputs t, L, and R←S$_a$ ⊙ S$_b$, E$_a$, and E$_b$ respectively.
2. Y←$\overline{S}_a$S$_b$+$\overline{S}_a$B₀+S$_b$B₁, (* B₀ and B₁ are the carries of the PCU *).
3. S$_x$←S$_a$Y+S$_b$$\overline{Y}$, E$_x$←E$_a$Y+E$_b$$\overline{Y}$, TD←PCU.
4. CRS controls d$_k$←TD, CRS data L←M$_B$Y+M$_A$$\overline{Y}$.
5. SCU¹ inputs S₁, S$_r$, L, R, and A←S$_B$$\overline{Y}$+S$_A$Y, S$_B$Y+S$_A$$\overline{Y}$, M$_B$$\overline{Y}$+M$_A$Y, CRS, and Sub/Add respectively.

6. POST NORMALIZE ROUTINE i. CLZD input C←C₁ of SCU¹, CLZD inputs P$_{0,k}$←P$_{0,k}$ from the output of the SCU¹, S$_m$←S$_s$ of the SCU¹.
ii. QSC←Z₁, Z₀, Z₋₁, . . . , Z$_{-n+1}$ from the CLZD; CBS controls←Z₁, Z₀, Z₋₁, . . . , Z$_{-n+1}$ from CLZD; CBS data←P from the delay-reg. of the SCU¹.
iii. ER←Z's from the QSC, M←CBS.
iv. SCU² inputs t, S₁, S$_r$, L and R←(S$_x$⊕S$_z$), S$_x$, S$_z$, E$_x$ and ER respectively.
v. S$_e$←S$_s$ of the SCU², E←P of the SCU², exp. UF←S$_s$C₁, exp. OF←$\overline{S}_s$C₁, (*S$_s$ and C₁ are the sign and the carry of the output of SCU²*).
vi. If CLZD output Z$_{-n}$=1 then M←0, E←0, S$_e$←0, and S$_m$←0;

where SCU¹ denotes the mantissas adder, SCU² denotes the exponents second adder, the exponents and the mantissas are given in sign magnitude representation, and A of relations (82) is replaced by 0 in the equation of the S$_s$ of the SCU².

Figure 89:
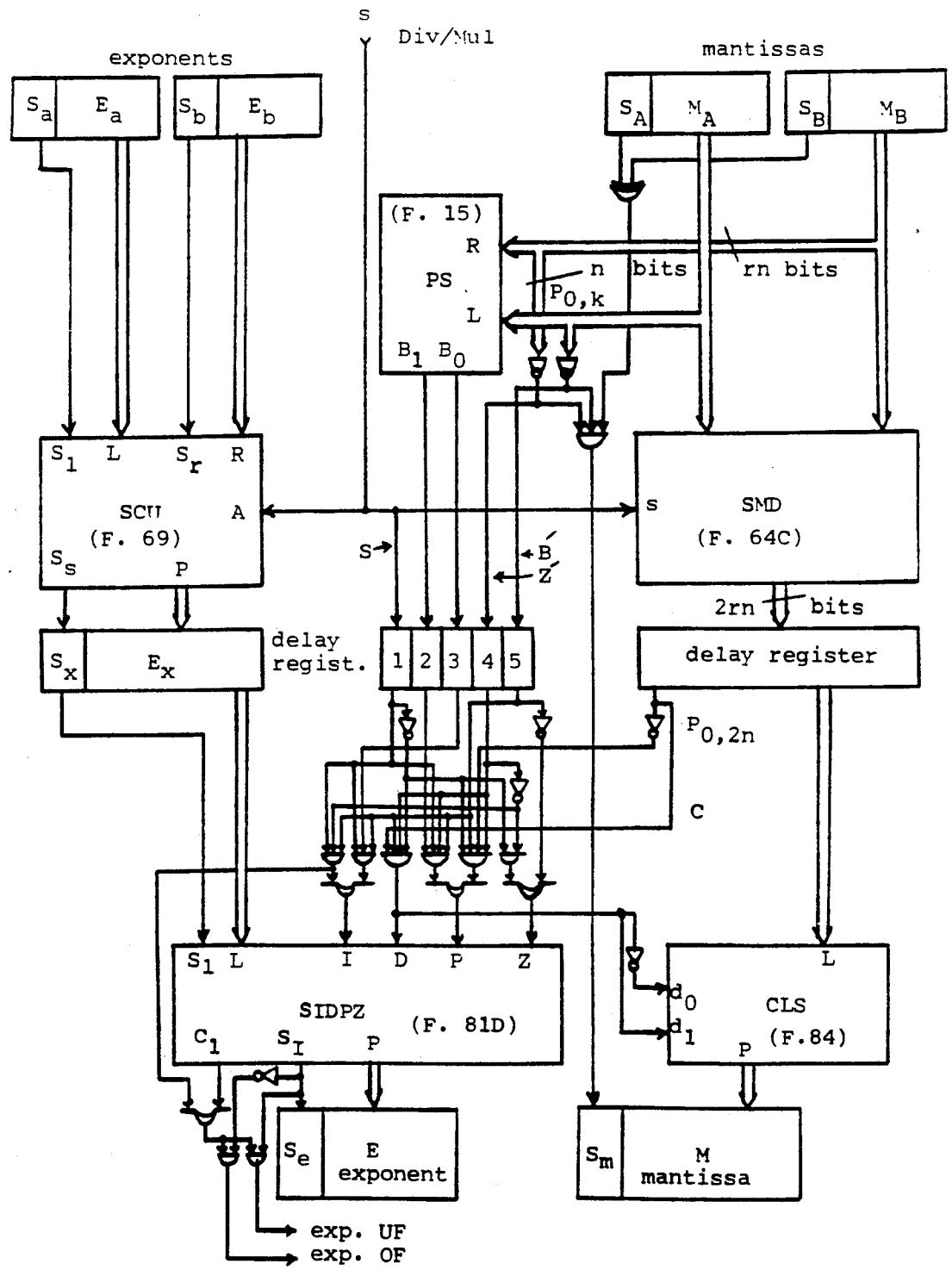
FIG. 89 is a block diagram for a TPC sign magnitude normalized floating-point multiplexer-divider(EMD)

FIG. 89 is a FMD comprised from: the same designated registers of the FAS of FIG. 88 with S$_x$/E$_x$ register being extended five cells for holding the variables S, B₁, B₀, Z and B; a PS of FIG. 15 for determining whether M$_A$≧M$_B$ or not; a SMD of FIG. 64C for multiply/divide mantissas; a SCU of FIG. 69 for add/subtract exponents; a SIDPZ of FIG. 81D for either increase, decrease, pass, or set the equalized exponent to zero; a CLS of FIG. 84 for shifting the output of the SMD to the left if necessary; a control variable s and combinational logic according to the following algorithm written in RTL-like notation:

ALG. 27

1. PS inputs L and R←$M_A$ and $M_B$ respectively; SMD reg. MD←$M_B$; SMD regs. MR and DN←$M_A$ for multiplier and dividend respectively; SMD control←s; SCU inputs $S_1$, L, $S_r$, R and A←$S_a$, $E_a$, $S_b$, $E_b$ and s, respectively; extended cells 1, 2, 3, 4 and 5 of $S_x/E_x$ register←S, $B_1$, $B_0$, $\overline{Z}$ and $\overline{B}$ respectively.
2. ALG. 16 for multiply/divide mantissas; $S_x$←$S_s$ of SCU; $E_x$←P of SCU.
3. SMD delay reg.←output P of SMD.
4. SIDPZ inputs $S_1$, L, I, D, P and Z←$S_x$, $E_x$, $S\overline{B}(\overline{Z}+B_0)$, $D\overline{BZS}$, $BZ(SB_1+\overline{SC})$ and $(\overline{SZ}+B)$ respectively; CLS controls $d_0$ and $d_1$←$(C\overline{BZS})$ and $C\overline{BZS}$ respectively; CLS data L←delay reg. of SMD.
5. $S_m$←$\overline{ZB}(S_A \oplus S_B)$; M←CLS; $S_c$←$S_I$ of SIDPZ; E←output P of SIDPZ; exp. UF←$(SZ\overline{B}+C_1)S_f$; exp. OF←$(SZ\overline{B}+C_1)\overline{S_f}$, where $C=P_{0,2n}$ of the output of SMD, B=($M_A$=0), Z=($M_B$=0), $B_0$=($M_A \geq M_B$), $B_1$=($M_A < M_B$) and S denotes control variable s(s=0 for multiply and s=1 for divide).

Figure 90:
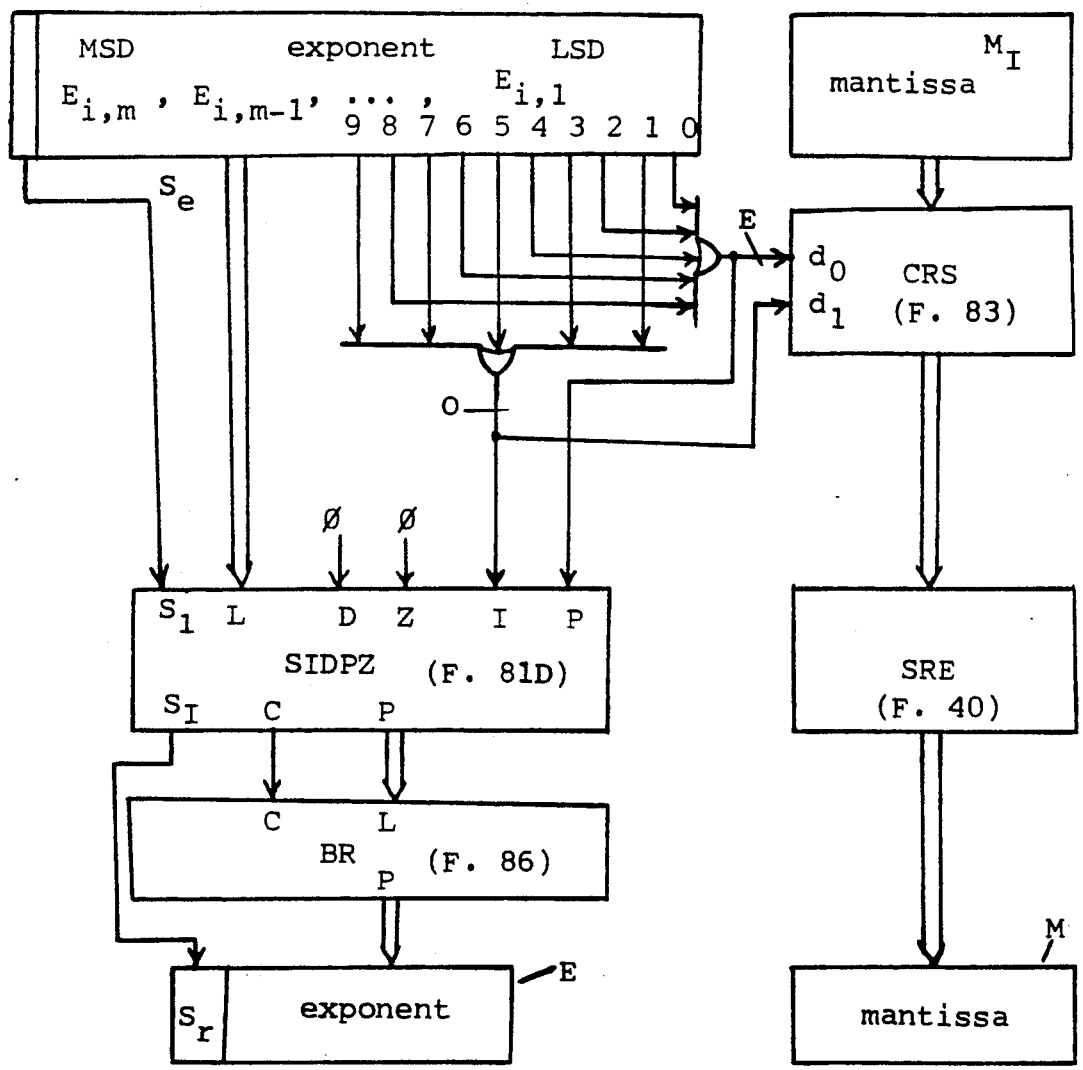
FIG. 90 is a block diagram for a TPC floating-point square root extractor(FSRE)

FIG. 90 is a FSRE constructed from: two registers for holding input and output exponents $E_{i,k}$ and E and their signs $S_e$ and $S_r$ respectively: two registers for holding input and output mantissas $M_I$ and M; combinational logic for determining whether the LSD of $E_{i,k}$ is an odd digit or not; a CRS of FIG. 83 for shifting the input mantissa one place to the right if necessary; a SIDPZ of FIG. 81D for either increase or pass the $E_{i,k}$; a SRE of FIG. 40 for $M_I$ square root extraction, and a BR of FIG. 86 for halving the $E_{i,k}$ according to the following algorithm written in RTL-like notation:

ALG. 28

1. $E^*$←$E_{0,1}+E_{2,1}+E_{4,1}+E_{6,1}+E_{8,1}$; 0←$E_{1,1}+E_{3,1}+E_{6,1}+E_{7,1}+E_{9,1}$.
2. CRS controls $d_0$ and $d_1$←$E^*$ and 0 respectively; CRS data←$M_I$; SIDPZ inputs $S_1$, L, D, Z, I and P←$S_e$, $E_{i,k}$, $\emptyset$, $\emptyset$, 0 and $E^*$ respectively.
3. SRE←CRS; BR inputs C and L←SIDPZ outputs C and P respectively; $S_r$←$S_I$ of SIDPZ.
4. ALG 11 for extracting square root of $M_I$.
5. E←BR; M←SRE.

Figure 91:
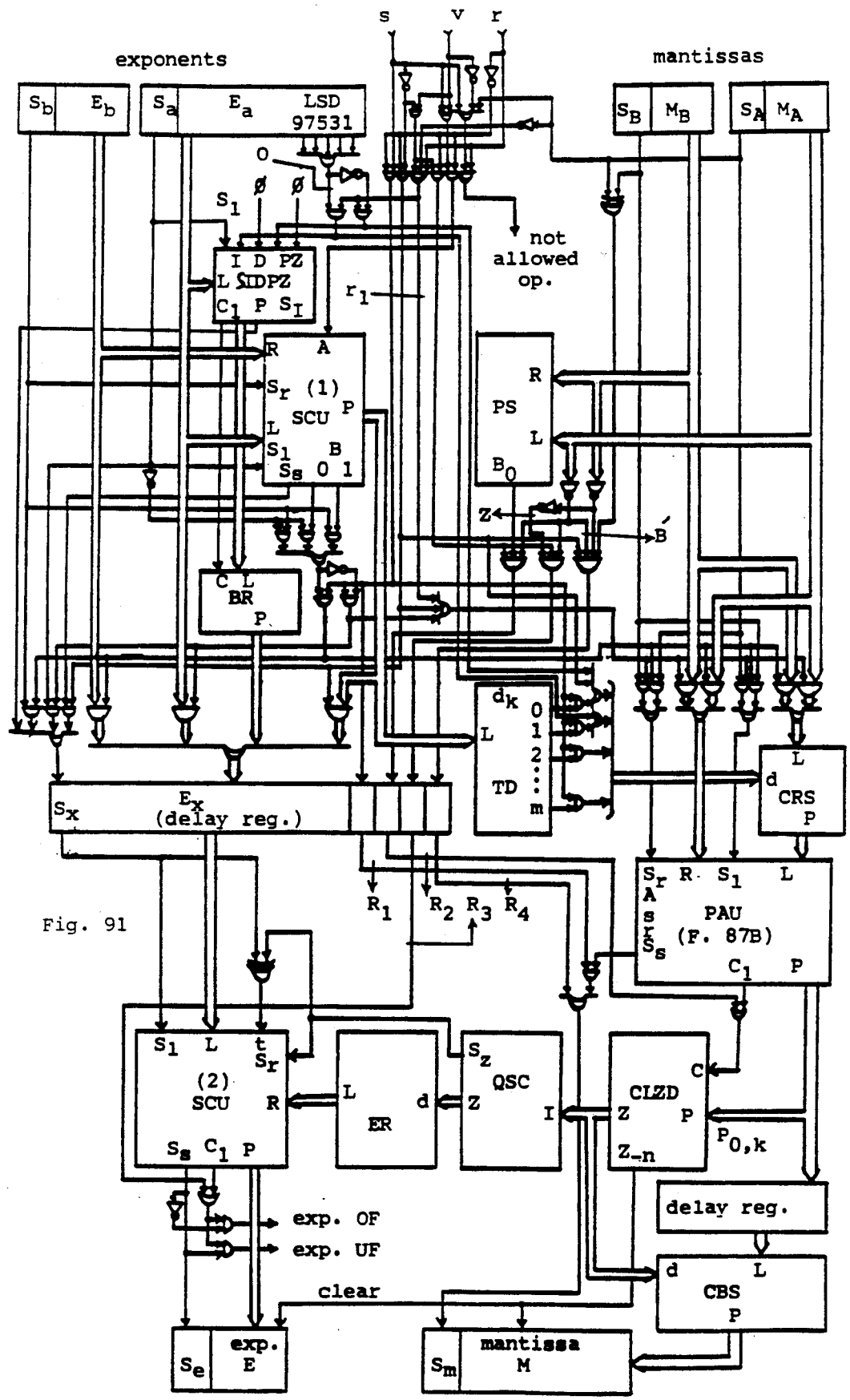
FIG. 91 is a block diagram for a TPC sign magnitude floating-point arithmetic unit(FAU)

FIG. 91 is a PAU constructed from the devices of the PAU, the FAS, the FMD and the FSRE of FIGS. 87B, 88, 89 and 90 respectively, where the devices of fixed-point sections of said FAS, FMD and FSRE are combined with the PAU; the corresponding devices of post normalize sections are combined and kept as in the FAS; the SIDPZ and the BR of the FSRE and the PS of the FMD are kept for the same functions; the PCU of the FAS is combined with the SCU of the FMD for exponents' first adder; the remaining corresponding devices of align mantissas' sections are combined and kept as in the FAS also with the $S_x/E_x$ being extended four cells $R_1$, $R_2$, $R_3$ and $R_4$ for holding temporary variables and also from three control variables r, s and v and from combinational logic according to the following algorithm written in RTL-like notations:

ALG. 29

1. If $r(s+\overline{v}+S_A)=1$ then stop, (* unassigned for op. *).
2. If $r_1=0$ the goto 7, (* it is not a squareroot op. *).
3. SIDPZ inputs L, $S_1$, I, D, P and Z←$E_a$, $S_a$, 0($r_1$), $\emptyset$, $\overline{0}(r_1)$, and $\emptyset$ respectively; CRS inputs $d_0$, $d_1$, and L ←$\overline{0}(r_1)$, 0($r_1$), and $M_A(r_1)$ respectively.
4. BR inputs C and L←SIDPZ outputs $C_1$ and P respectively; PAU input R←CRS; $S_x$←$S_I$ of SIDPZ.
5. $E_x$←BR.
6. goto 15, (* a fixed-point operation *).
7. $SCU^1$ inputs $S_1$, L, $S_r$, R and A←$S_a$, $E_a$, $S_b$, $E_b$ and $\bar{r}(s+v)$ respectively.
8. If $\bar{r}s=0$ then goto 13, (* follows is an add or a sub. op. *)/
9. TD←$SCU^1$; Y←Y($\bar{r}s$); $\overline{Y}$←$\overline{Y}(\bar{r}s)$; TD outputs $d_k$←$d_k(\bar{r}s)$; $R_1$←$\bar{r}s$.
10. CRS controls d's←TD; CRS data L←$Y(M_A)$ +$\overline{Y}(M_B)$; $S_x$←$YS_b+\overline{Y}S_a$; $E_x$←$Y(E_b)+\overline{Y}(E_a)$.
11. PAU inputs $S_r$, R, $S_1$, and L←$YS_B+\overline{Y}S_A$, $Y(M_B)+\overline{Y}(M_A)$, $YS_A+\overline{Y}S_B$, and CRS respectively.
12. goto 15, (* go to a fixed-point operation *).
13. PS inputs L and R←$M_A$ and $M_B$ respectively; CRS control $d_0$←rs; CRS data L←$\overline{rs}(M_A)$; $S_x$←$\overline{rs}(S_s)$; $E_x$←$\overline{rs}(P)$, (* $S_s$ and P are of $SCU^1$ *).
14. PAU inputs R and L←$\overline{rs}(M_B)$ and CRS respectively; $R_2$←$(\overline{rsv})B_0\overline{B}$; $R_3$←$(rsv)Z\overline{B}$; $R_4$←$(rsv)ZB \cdot (S_A \oplus S_B)$.
15. PAU inputs r, s and A←r, s and v, respectively.
16. ALG. 24 for operating the PAU.
17. PAU output $C_1$←$C_1+R_1$; PAU output $S_U$←$S_U R_1+R_4$; $SCU^2$ output $C_1$←$C_1+R_3$.
18. POST NORMALIZE ROUTINE OF ALG 26, where $r_1+(rvs')S'_A$, v denotes A of relations(82), 0 is as defined in ALG. 28, B, Z, Y, $B_0$ and $B_1$ are as defined for ALGS. 26 and 27. In short, FIGS. 88, 89 and 90 are designed according to ALGS 25 (i, ii and iii, respectively) then combined into the unit of FIG. 91 with additional combinational logic and three control variables according to the assignments rsv=000, 001, 010, 011, 101 and else for multiply, divide, add, subtract or compare, extract square root and unassigned operations, respectively. Such a unit consists of three sections: align mantissas, fixed-point and post normalize sections. Fixed-point and post normalize sections are the same as they are in FIGS. 87B and 88, respectively, and align the mantissas section is merely a modification for the corresponding section of FIG. 88. Indeed, align the mantissas section is a unit for three actions only: either squareroot, add/subtract or multiply/divide because align the mantissas for add and subtract operations is the same and align the mantissas for multiply/divide operations is also the same as it clear from FIGS. 88 and 89, respectively. Which operation should be implemented depends on the values of the control variables and the signs of the exponents in align the mantissas section and on the values of the control variables and the signs of the mantissas in the fixed-point section. The post normalize section is made the same for all involved operations. Align the mantissas and post normalize sections are both comprised from combinational circuits while the fixed-point section is a sequential unit. FIGS. 63, 65C, 87B and 91 together consist with the convention that the set of positive numbers is a subset of the set of the integers and that the set of the integers is a subset of the set of the real numbers. To be continued next on the biradix system of FIG. 92.

So far there is no reference to the memories in this invention. The reason is that data is converted into bits as well for the TP-codes and accordingly stored(memorized) by the same methods well developed for the conventional systems. The only difference is that the TP-codes are radix related and accordingly the size of a TPC-memory may depend on the chosen radix. For example, a 63-bit binary number requires only 63-bit register while the same number, which is approximately equivalent to 19-decimal digits, requires 190-bit register in case of the TP-decimal code. In general, the ratio of the size $R_r$(in bits) of a register of a number represented in a radix r TP-code to the size $R_2$ of the corresponding pure binary register is estimated by $$R_r/R_2 = r\log_r 2 \tag{108}$$

which can be taken as the ratio of the sizes of the corresponding memories required for numerical data. For non-numerical data, the corresponding ratio between the required sizes $N_r$ and $N_c$, respectively, is roughly estimated by $$N_r/N_c = r/c \tag{109}$$

where $r = c, c+1, c+2, \ldots$, $N_r$ is an r-bit alphanumeric code memory and $N_c$ is a c-bit alphanumeric code memory. The average of ratios (108) and (109) is given by $$M_r/M_c = (R_r/R_2 + N_r/N_c)2 = r(\log_r 2^c)/2c \tag{110}$$

which is approximately 2.13:1 for $c = 8$ and $r = 10$, i.e., the ASCII and TPC-decimal case. r-bit alphanumeric code is not mandatory for a radix r TPC-processor, however, because, in addition, radix converters can be used and the memory can be partitioned into numerical and non-numerical separate sections. In other words, there are three options for the memory with a TPC-processor:

1. r-bit alphanumeric code wherein the r words of the given code of FIG. 1 are reserved for the r digits and the remaining members of the characters set are assigned from the remaining words of the given code, (unrealistic when r is so small or so large with respect to the size of the characters set).

2. Bi-radix memory wherein numerical data is represented according to the given TP-code and non-numerical data is represented according to conventional coding methods, i.e., the memory is partitioned into numerical section wherein data is represented according to the given r-bit TP-code and non-numerical section wherein data is represented according to the given c-bit alphanumeric code.

3. A pure binary memory and a TPC-processor with radix converters, back and forth, between. Ratio (110), which corresponds to option 1, is 1 for option 3 and approximately $(\log_r 2^c)/2$ for option 2 on the assumption that the memory is equally divide between numerical and non-numerical sections.

Figure 92:
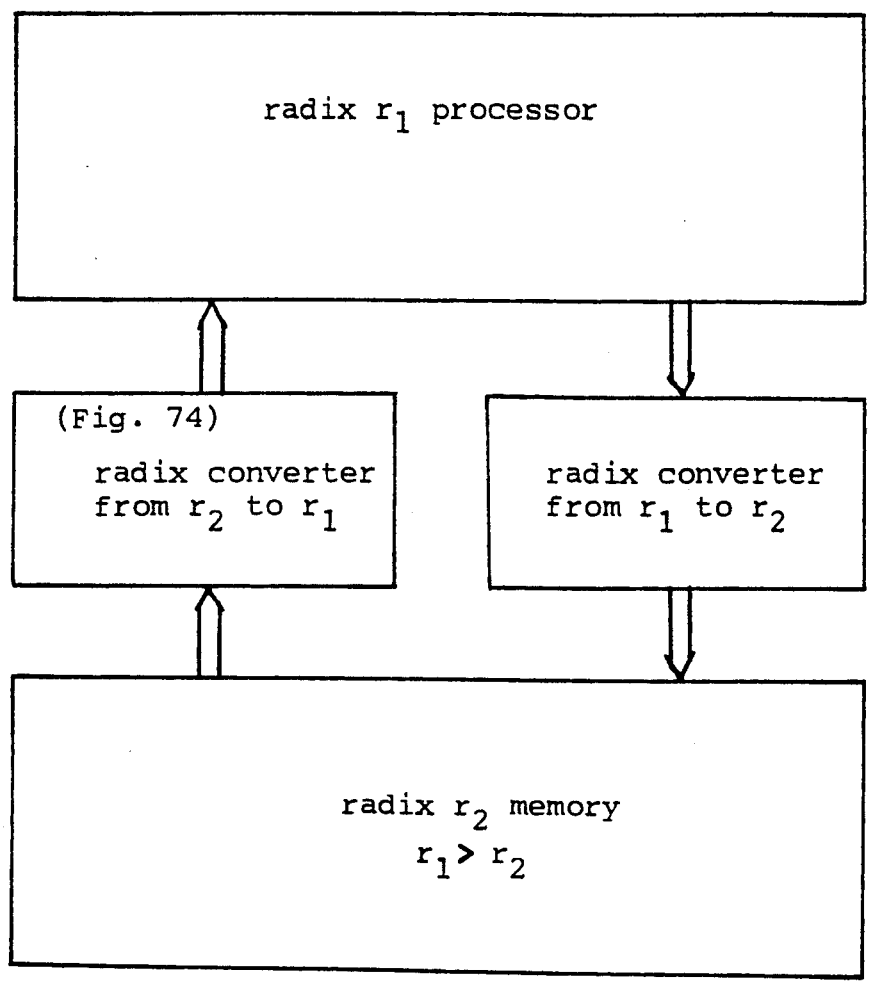
FIG. 92 is a block diagram for TPC biradix system.

FIG. 92 is a block diagram for the machine of option 3. In addition, it can be used as a machine for obtaining a lower bound and as a machine for reducing the multiply operation into a combinational operation in the general case, i.e., into an operation that can be implemented by a combinational circuit in the case of n-digit operand times m-digit operand. Lower bounds are conventionally related to AND gates fan-in limitation where it is well known, according to the relation $$v = \lceil \log_f(\log_b N) \rceil \tag{111}$$

in which f denotes the maximum AND gate fan-in allowed, b denotes the radix and N denotes the maximum input, that v is a lower bound on the add operation(i.e., the add operation can not be implemented, as specified, in less than v gate delays). Using the relation $$r_1 = \lceil N^{1/rf^v} \rceil = \lceil N^{1/n} \rceil \tag{112}$$

and FIG. 92, where r is as defined for relations(55), the add operation could be implemented in less than v gate delays. The same technique can be used for reducing the multiply operation into combinational operation, where relation(112) is used until n(the length of the input measured in digits) becomes less than the minimum of f and b then FIG. 46 is used as the processor of FIG. 92.

What are the complexity and the performance of TPC-computer compared to those of a corresponding pure binary computer? Unlike the design procedure which is independent from the radix, the hardware complexity and the performance of a TPC-computer are functions in the given radix r. The above discussion gives rough estimation of the size of a TPC-memory compared to the corresponding pure binary memory. Concerning non-memory elements, the floating-point unit of FIG. 91 consists of three sections: align the mantissas, fixed-point, and post normalize sections. Align the mantissas and the post normalize sections roughly match their counterparts in the corresponding pure binary unit but the fixed-point section is more complicated, in terms of the number of the contained components, than its pure binary counterpart. The fixed-point unit of FIG. 87B contains 2r non-register modules while the corresponding pure binary unit could be designed around only one PA. Means that the ratio of the number of non-register modules of a TPC fixed-point unit of type FIG. 87B to that of the corresponding pure binary unit is roughly 2r : 1. Down at the PA level, FIG. 6 consists of three block levels: HA, CLA, and FAL block levels. The gate counts in terms of 0 notation for such levels are $O(r^2n)$, $O(n^2)$, and $O(rn)$, respectively. The corresponding gate counts for the pure binary unit are $O(m)$, $O(m^2)$, and $O(m)$, respectively, where r denotes the radix of the TPC adder, n is the length of the input measured in digits of radix r and m is the length of the same input measured in bits. The ratio of the time delay of a TPC adder to that of the corresponding pure binary adder is roughly estimated by $$T = \log_f n/\log_f m = \log_f n/(\log_f n - \log_f \log_r 2) \tag{113}$$

where f denote the maximum gate fan-in allowed, n and m are as given above. Ratio (113) is always less than 1 for $2 < r = n < \infty$, which means that a TPC parallel adder performs better than the corresponding pure binary PA. By how much? The answer depends on the relation $N = r^n$ between r and n. When n hold constant and r is allowed to rise the curve of ratio (113) declines accordingly while when r hold constant at a value greater than 2 the same curve goes up with n but remains less than 1 for all finite values of N. For example, when $r = 10$, $N = 2^{16}$, $2^{32}$, and $2^{64}$, the corresponding values of ratio (113) are approximately 0.58, 0.65, and 0.72, respectively, which means that the corresponding TPC decimal adders reduce the time delays of the 16- bit, 32-bit, and 64-bit pure binary adders by approximately 2-fifth, 1.75-fifth, and 1.4-fifth, respectively. In addition, the units of FIGS. 87B and 91 are designed so that no reference to the memory is allowed during the execution of a given operation which means that such units perform much better than the corresponding pure binary units that reference the memory during the execution of their operations. Furthermore, the implementations of the divide and extract squareroot operations according to deterministic procedures and the fact that no radix conversion process is necessary increase the performance of the TPC arithmetic units. Another advantage related to the fact that the size of a memory module can not exceed $r^f$ words, where r denotes the radix and f denotes the maximum AND gate fan-in allowed in the address decoder of the given module. With $r=10$ and $f=8$, for example, a module with $10^8 = 100M$ words can be addressed by a TPC decoder while only a module of $2^8 = 256$ words can be addressed by the corresponding pure binary decoder. To be continued next on the claims of the invention.

The acronyms of the circuits are as given in the brief description of the drawings and IOR stands for Input-Output Relations.

I claim:

1. A tri-property code(TPC) parallel adder PA for performing the add operation upon two TPC represented operands of n-digit each of radix r each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead outputs to other devices; and $n-1$ TPC full adder logic devices FALs, each having data inputs coupled to sum outputs of a HA of said HAs, carry inputs coupled to corresponding outputs of the outputs of said CLA, and data outputs for delivering a TPC represented r-bit digit comprising together with remaining outputs of said FALs data outputs for said PA.

2. The PA of claim 1 with its CLA further including: TPC block CLA devices(BCLAs), each having carry and non-nine inputs coupled to corresponding outputs of the outputs of HAs of said HAs and carry outputs for delivering TPC carry look-ahead outputs to other devices; and a TPC final level CLA device(FCLA), having carry inputs coupled to corresponding outputs of said BCLAs and carry outputs connected to corresponding inputs of FALs of said FALs.

3. The PA of claim 1 further comprising for performing the add operation upon two $r-1$'s complement TPC represented operands: a TPC conditional incrementer device(CI) for increasing a TPC represented operand by one if a given condition is met and passing said operand unchanged otherwise, said CI comprising: a TPC increment oriented nines detector device(IND), having output means for delivering nine and non-nine indicate outputs to other devices; and $n-1$ TPC conditional increment logic devices(CILs), each having data inputs of r-bit coupled to corresponding outputs of the outputs of said PA, nine and non-nine control inputs coupled to corresponding outputs of the outputs of said IND, increase by one control input coupled to a combinational logic function equivalent to the ORing of (1) the ANDing of the signs of said two $r-1$'s complement operands and (2) the ANDing of carry one output of the outputs of said PA and the ORing of the signs of said two $r-1$'s complement operands, pass unchanged control input coupled to the complement of said combinational logic function, and data outputs for delivering a TPC represented r-bit digit comprising together with remaining outputs of said CILs and together with a carry and a sign outputs of $r-1$'s complement addition: data, carry and sign outputs for said PA further comprising said CI, wherein: said carry output of $r-1$'s complement addition is an output of a combinational logic function equivalent to the exclusive-ORing of the signs of said two $r-1$'s complement operands and carry one output of the outputs of said PA, and said sign output of $r-1$'s complement addition is an output of a combinational logic function equivalent to the ORing of (1) the ANDing of the signs of said two $r-1$'s complement operands and (2) the ANDing of carry zero output of the outputs of said PA and the ORing of the signs of said two $r-1$'s complement operands.

4. A TPC parallel subtractor PS for performing the straight subtract operation upon two TPC represented operands of n-digit each of radix r each, said PS comprising: n TPC half subtractors HSs, each having minuend and subtrahend operand inputs for receiving two TPC represented digits of r-bits each and output means for delivering TPC represented difference of r-bits, borrower and non-zero outputs to other devices; a TPC carry look-ahead CLA, having carry and non-nine inputs coupled to corresponding borrower and non-zero outputs of the outputs of said HSs and carry outputs for delivering TPC borrower look-ahead outputs to other devices; and $n-1$ TPC full subtractor logic devices FSLs, each having data inputs coupled to difference outputs of a HS of said HSs, borrower inputs coupled to corresponding carry outputs of the outputs of said CLA, and data outputs for delivering a TPC represented r-bit digit comprising together with remaining outputs of said FSLs data outputs for said PS.

5. A TPC parallel Booleaner PB for performing the six Boolean operations AND, NAND, OR, NOR, XOR and XNOR or equivalence in parallel upon two TPC represented operands of n-digit each of radix r each, said PB comprising: n TPC two-digit Booleaner devices TBs, each having data inputs for receiving two TPC represented digits of r-bits each and output means for delivering three signals representing the outputs of the three Boolean operations OR, NAND and XOR performed upon said two TPC represented digits to other devices; and a PB oriented CLA device ($B_{CLA}$), having input means coupled to corresponding outputs of said TBs and output means for delivering six output signals representing the outputs of said six Boolean operations performed upon said two TPC represented operands of n-digit each.

6. A TPC add-shift multiplier(ASM) for performing the multiply operation upon two TPC represented operands, said ASM comprising:

(i) a multiplicand register, a multiplier right-shift register, a partial product right-shift register, and working registers $R_d$'s for holding the multiples of a TPC represented operand by digit d for $d=2$ through 9 respectively;

(ii) a TPC parallel adder PA for performing the add operation upon two TPC represented operands of n-digit each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead outputs to other devices; and n−1 TPC full adder logic devices FALs, each having data inputs coupled to sum outputs of a HA of said HAs, carry inputs coupled to corresponding outputs of the outputs of said CLA, and data outputs for delivering a TPC represented r-bit digit part of data outputs of said PA;

(iii) eight TPC uni-operand devices $PM_d$'s for multiplying a TPC represented n-digit operand by digit d for d=2 through 9 respectively, wherein:

(1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and n−1 TPC half adder devices $HA_d$'s, each having data and carry inputs coupled to corresponding product and carry outputs of the outputs of said $HM_d$'s and data outputs for delivering a TPC represented r-bit digit part of data outputs of said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for d=3, 6, 7 and 9 respectively; n−1 TPC half adder devices $HA_d$'s for d=3, 6, 7 and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and n−2 FALs of said FALs of said PA, each having its data inputs coupled to sum outputs of a $HA_d$ of said $HA_d$'s, its carry inputs coupled to corresponding outputs of the outputs of said CLA, and its data outputs for delivering a TPC represented r-bit digit part of data outputs of said $PM_d$ for d=3, 6, 7 and 9 respectively;

(iv) a TPC multiplier multiplexer-like device M-MUX, having operand and control inputs and data outputs for choosing one out of r TPC represented operands; and (v) wherein: said M-MUX having its operand inputs coupled to said multiplicand and working registers and its control inputs coupled to said multiplier register; said PA having its inputs of one of its two operands coupled to said product register, its other operand inputs coupled to said M-MUX, and its outputs connected to said product register; and said $PM_d$'s having their inputs coupled to said multiplicand register and their outputs connected to said working registers.

7. A TPC deterministic divider(DD) for performing the divide operation upon two TPC represented operands, said DD comprising:

(i) a divisor register, a dividend left-shift register, a quotient left-shift register, a working register range(RA) coupled to said dividend register, a remainder register coupled to said range register and working registers $R_d$'s for holding the multiples of a TPC represented operand by digit d for d=1 through 9 respectively;

(ii) nine TPC parallel comparators PCs for performing each the compare operation upon two TPC represented operands of n-digit each, a PC of said PCs comprising: n TPC two-digit comparator devices TCs, each having first and second operand inputs for receiving two TPC represented digits of r-bits each and output means for delivering output signals representing the result of the compare operation performed upon said two TPC represented digits to other devices; and a PC oriented CLA device($C_{CLA}$), having input means coupled to corresponding outputs of said TCs and output means for delivering output signals representing the result of the compare operation performed upon said two TPC represented operands;

(iii) a TPC parallel subtractor PS for performing the straight subtract operation upon two TPC represented operands of n-digit each, said PS comprising: n TPC half subtractors HSs, each having minuend and subtrahend operand inputs for receiving two TPC represented digits of r-bit each and output means for delivering TPC represented difference of r-bits, borrower and non-zero outputs to other devices; a TPC carry look-ahead CLA, having carry and non-nine inputs coupled to corresponding borrower and non-zero outputs of the outputs of said HSs and carry outputs for delivering TPC borrower look-ahead outputs to other devices; and n−1 TPC full subtractor logic devices FSLs, each having data inputs coupled to difference outputs of a HS of said HSs, borrower inputs coupled to corresponding carry outputs of said CLA, and data outputs for delivering a TPC represented r-bit digit one of the digits comprising data outputs of said PS;

(iv) eight TPC uni-operand devices $PM_d$'s for multiplying a TPC represented n-digit operand by digit d for d=2 through 9 respectively, wherein:

(1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering a TPC represented product and carry outputs representing the result of multiplying said TPC represented r-bit digit by said digit d to other devices; and n−1 TPC half adder devices $HA_d$'s, each having data and carry inputs coupled to corresponding product and carry outputs of the outputs of said $HM_d$'s and data outputs for delivering a TPC represented r-bit digit one of the digits comprising data outputs of said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for d=3, 6, 7 and 9 respectively; n−1 TPC half adder devices $HA_d$'s for d=3, 6, 7 and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and $n-2$ TPC full adder logic devices FALs, each having data inputs coupled to sum outputs of a $HA_d$ of said $HA_d$'s, carry inputs coupled to corresponding outputs of the outputs of said CLA, and data outputs for delivering a TPC represented r-bit digit one of the digits comprising data outputs of said $PM_d$ for $d=3, 6, 7$ and 9 respectively;

(v) a TPC quotient multiplexer-like device Q-MUX, having operand and control inputs and data and quotient outputs for choosing one out of r TPC represented operands and delivering a TPC represented r-bit digit; and (vi) wherein: said Q-MUX having its operand inputs coupled to said working registers, its control inputs coupled to a TPC represented r-bit digit generate combinational logic having inputs coupled to compare outputs of said PCs, and its quotient outputs connected to said quotient register; said PCs having their first operand inputs coupled to said range register and their second operand inputs coupled to said working registers; said PS having its minuend operand inputs coupled to said range register, its subtrahend operand inputs coupled to data outputs of said Q-MUX, and its data outputs connected to said range register; and said $PM_d$'s having their inputs coupled to said divisor register and their outputs connected to said working registers.

8. A TPC deterministic divider(DD) for performing the divide operation upon two TPC represented operands, said DD comprising:

(i) a divisor register, a dividend left-shift register, a quotient left-shift register, a working register range(RA) coupled to said dividend register, a remainder register coupled to said range register and working registers $R_d$'s for holding the multiples of a TPC represented operand by digit d for $d=1$ through 9 respectively;

(ii) nine TPC parallel subtractors PSs for performing each the straight subtract operation upon two TPC represented operands of n-digit each, a PS of said PSs comprising: n TPC half subtractors HSs, each having minuend and subtrahend operand inputs for receiving two TPC represented digits of r-bits each and output means for delivering TPC represented difference of r-bits, borrower and non-zero outputs to other devices; a TPC carry look-ahead CLA, having carry and non-nine inputs coupled to corresponding borrower and non-zero outputs of the outputs of said HSs and carry outputs for delivering TPC borrower look-ahead outputs to other devices; and $n-1$ TPC full subtractor logic devices FSLs, each having data inputs coupled to difference outputs of a HS of said HSs, borrower inputs coupled to corresponding carry outputs of the outputs of said CLA, and data outputs for delivering a TPC represented r-bit digit one of the digits comprising data outputs of said PS;

(iii) eight TPC uni-operand devices $PM_d$'s for multiplying a TPC represented n-digit operand by digit d for $d=2$ through 9 respectively, wherein:

(1) $PM_2$ and $PM_5$ of said $PM_d$'s comprising each for $d=2$ and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and $n-1$ TPC half adder devices $HA_d$'s, each having data and carry inputs coupled to corresponding product and carry outputs of the outputs of said $HM_d$'s and output means for delivering a TPC represented r-bit digit one of the digits comprising data outputs of said $PM_d$ for $d=2$ and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for $d=3, 6, 7$ and 9 respectively; $n-1$ TPC half adder devices $HA_d$'s for $d=3, 6, 7$ and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and $n-2$ TPC full adder logic devices FALs, each having data inputs coupled to sum outputs of a $HA_d$ of said $HA_d$'s, carry inputs coupled to corresponding outputs of the outputs of said CLA, and data outputs for delivering a TPC represented r-bit digit one of the digits comprising data outputs of said $PM_d$ for $d=3, 6, 7$ and 9 respectively;

(iv) a TPC quotient multiplexer-like device Q-MUX, having operand and control inputs and data and quotient outputs for choosing one out of r TPC represented operands and delivering a TPC represented r-bit digit; and (v) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said quotient register, and its data outputs connected to said range register; said PSs having their minuend operand input coupled to said range register and their subtrahend operand inputs coupled to said working registers; and said $PM_d$'s having their inputs coupled to said divisor register and their outputs connected to said working registers.

9. A TPC bidimensional parallel adder(BPA) for performing the add operation upon two TPC represented operands of n-digit each of radix b each, said BPA comprising: TPC half adder devices $HA_r$'s, each having data inputs for receiving two TPC represented operands of r-digit each of radix b each and output means for delivering TPC represented r-digit sum, carry and non-nine outputs to other devices; a BPA oriented CLA device($b_{CLA}$), having carry and non-nine inputs coupled to corresponding outputs of the outputs of said $HA_r$'s and carry outputs for delivering TPC carry look-ahead outputs to other devices; and TPC full adder logic devices FALs, each having b-bit data input coupled to corresponding b-bit output of sum output of a $HA_r$ of said $HA_r$'s, carry inputs coupled to corresponding outputs of the outputs of said $b_{CLA}$, and data outputs for delivering a TPC represented b-bit digit part of data outputs of said BPA.

10. A TPC parallel multiplier device(PM) for performing the multiply operation upon two TPC represented operands, said PM comprising:
   (a) multiplicand, multiplier, and product registers;
   (b) TPC one by n array parallel multiplier devices($1 \times n - PM$'s) for multiplying each a TPC represented n-digit operand by another TPC represented one-digit operand, a $1 \times n - PM$ of said $1 \times n - PM$'s comprising:
      (i) n TPC half multiplier devices(HMs), each having data inputs for receiving TPC represented multiplier and multiplicand operands of one-digit each and output means for delivering TPC represented product and carry outputs to other devices;
      (ii) a TPC parallel adder PA for performing the add operation upon two TPC represented operands, comprising: $n-1$ TPC half adders HAs, each having data inputs for receiving two TPC represented digits and output means for delivering TPC represented sum, carry and nine outputs to other devices; a TPC carry look-ahead CLA, having carry and nine inputs coupled to corresponding outputs of the outputs of said HAs and carry outputs for delivering TPC carry look-ahead outputs to other devices; and $n-2$ TPC full adder logic devices FALs, each having data inputs coupled to sum outputs of a HA of said HAs, carry inputs coupled to corresponding outputs of the outputs of said CLA, and data outputs for delivering a TPC represented digit comprising together with remaining outputs of said FALs data outputs for said PA; and
      (iii) wherein: said HMs having their multiplier inputs coupled to said one-digit operand and their multiplicand inputs coupled to corresponding digits of said n-digit operand, and said PA having its inputs of one of its two operands coupled to corresponding carry outputs of said HMs and its inputs of its other operand coupled to corresponding product outputs of said HMs;
   (c) a TPC multi-operand parallel adder device(MPA) for performing the add operation upon more than two TPC represented operands in parallel, said MPA comprising:
      (i) n TPC multi-operand half adder devices(MHAs), each having data inputs for receiving more than two TPC represented digits in parallel and output means for delivering TPC represented sum and carry outputs representing the result of the add operation performed upon said more than two TPC represented digits to other devices; and
      (ii) said PA having its inputs of one of its two operands coupled to corresponding carry outputs of said MHAs and its inputs of its other operand coupled to corresponding sum outputs of said MHAs; and
   (d) wherein: said $1 \times n - PM$'s having their one-digit operand inputs coupled to corresponding digits of said multiplier register and their n-digit operand inputs mutually coupled to said multiplicand register, and said MPA having its inputs coupled to corresponding outputs of said $1 \times n - PM$'s and its output connected to said product register.

11. A TPC positive integers sequential unit(PSU) for performing multiply, divide, and extract squareroot operations upon TPC represented operands, said PSU comprising a combination of:
   (a) a TPC add-shift multiplier(ASM) for performing the multiply operation upon two TPC represented operands, said ASM comprising:
      (i) a multiplicand register, a multiplier right-shift register means, a partial product right-shift register, and working registers $R_d$'s for holding the multiples of a TPC represented operand by digit d for $d=2$ through 9 respectively;
      (ii) a TPC parallel adder PA for performing the add operation upon two TPC represented operands of n-digit each of radix r each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead signals to other devices; and $n-1$ TPC full adder logic devices FALs, each having data inputs coupled to sum outputs of a HA of said HAs, carry inputs coupled to corresponding outputs of said CLA, and data outputs for delivering a TPC represented r-bit digit comprising together with remaining outputs of said FALs data outputs for said PA;
      (iii) eight TPC uni-operand devices $PM_d$'s for multiplying a TPC represented n-digit operand by digit d for $d=2$ through 9 respectively, wherein:
         (1) $PM_2$ and $PM_5$ of said $PM_d$'s comprising each for $d=2$ and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and $n-1$ TPC half adder devices $HA_d$'s, each having data and carry inputs coupled to corresponding product and carry outputs of the outputs of said $HM_d$'s and output means for delivering a TPC represented digit of r-bits comprising together with remaining outputs of said $HA_d$'s data outputs for said $PM_d$ for $d=2$ and 5 respectively;
         (2) $PM_4$ and $PM_8$ of said $PM_d$'s comprising two and three cascaded stages of said $PM_2$ respectively; and
         (3) the remaining $PM_3$, $PM_6$, $PM_7$ and $PM_9$ of said $PM_d$'s comprising each: said $HM_d$'s for $d=3, 6, 7$ and 9 respectively; $n-1$ TPC half adder devices $HA_d$'s for $d=3, 6, 7$ and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and $n-2$ FALs of said FALs, each having its data inputs coupled to sum outputs of a $HA_d$ of said $HA_d$'s, its carry inputs coupled to corresponding outputs of the outputs of said CLA, and its data outputs delivering a TPC represented digit or r-bits part of data outputs of said $PM_d$ for d=3, 6, 7 and 9 respectively;

(iv) a TPC multiplier multiplexer-like device M-MUX, having operand and control inputs and data outputs for choosing one out of r TPC represented operands; and (v) wherein: said M-MUX having its operand inputs coupled to said multiplicand and working registers and its control inputs coupled to said multiplier register; said PA having its inputs of one of its two operands coupled to said M-MUX, its other operand inputs coupled to said product register and its outputs connected to said product register; and said $PM_d$'s having their inputs coupled to said multiplicand register and their outputs connected to said working registers;

(b) a TPC deterministic divider(DD) for performing the divide operation upon two TPC represented operands, said DD comprising:

(i) a dividend left-shift register, a quotient left-shift register, a working register range coupled to said dividend register, said multiplicand register for holding divisor, said product register coupled to said range register for holding remainder, and said working registers $R_d$'s for holding the multiples of the divisor by digit d for d=1 through 9 respectively;

(ii) nine TPC parallel subtractors PSs for performing each the straight subtract operation upon two TPC represented operands of n-digit each, a PS of said PSs comprising: n TPC half subtractors HSs, each having minuend and subtrahend operand inputs for receiving two TPC represented digits of r-bits each and output means for delivering TPC represented difference of r-bits, borrower and non-zero outputs to other devices; said CLA having its carry and non-nine inputs coupled to corresponding borrower and non-zero outputs of the outputs of said HSs and its carry outputs delivering borrower outputs to other devices; and n−1 TPC full subtractor logic devices FSLs, each having data inputs coupled to difference outputs of a HS of said HSs, borrower inputs coupled to corresponding carry outputs of the outputs of said CLA, and data outputs for delivering a TPC represented digit of r-bits comprising together with remaining outputs of said FSLs data outputs for said PS;

(iii) said $PM_d$'s;

a TPC quotient multiplexer-like device Q-MUX, having operand and control inputs and data and quotient outputs for choosing one out of r TPC represented operands and delivering a TPC represented digit; and (v) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said quotient register, and its data outputs connected to said range register; said PSs having their minuend operand inputs coupled to said range register and their subtrahend operand inputs coupled to said working registers; and said $PM_d$'s having their inputs coupled to said multiplicand register and their outputs connected to said working registers;

(c) a TPC squareroot extractor(SRE) for extracting squareroot of a TPC represented operand, said SRE comprising:

(i) a delay register $PM_1$ for holding intermediate result, and said dividend, quotient and range registers for holding radicand, partial squareroot and intermediate result respectively;

(ii) said nine PSs;

(iii) said $PM_d$'s;

(iv) said Q-MUX;

(v) said $PM_2$ for doubling partial squareroot; and (vi) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said quotient register, and its data outputs connected to said range register; said PSs having their minuend operand inputs coupled to said range register and their subtrahend operand inputs coupled to said $PM_d$'s including said $PM_1$; said $PM_d$'s having the least significant digit of their inputs set to digit d for d=1 through 9 respectively, and the remaining digits of their inputs coupled to said $PM_2$; and said $PM_2$ having its inputs coupled to said quotient/squareroot register;

(d) a TPC divisor/squareroot multiplexer-like device DS-MUX, having two operand inputs and r−1 operand outputs for choosing one out of two TPC represented operands; and (e) wherein:

(i) said nine PSs are combined each with said PA into nine TPC parallel adder-subtractors(PASs) for performing each addition and straight subtraction upon two TPC represented operands, wherein each: the HAs of said PA and the HSs of a PS of said PSs are combined into n TPC half adder-subtractor devices HASs, each having data inputs for receiving two TPC represented digits of r-bits each, control input for either add or subtract at a time and output means for delivering TPC represented sum and difference of r-bits each, carry/borrower and non-nine/non-zero outputs to other devices; said CLA having its inputs coupled to corresponding outputs of the outputs of said HASs; and the FALs of said PA and the FSLs of said PS are combined into n−1 TPC full adder-subtractor logic devices FASLs, each having sum and difference inputs coupled to corresponding outputs of a HAS of said HASs, carry/borrower inputs coupled to corresponding carry outputs of the outputs of said CLA, and data outputs for delivering a TPC represented r-bit digit comprising together with remaining outputs of said FASLs data outputs for a PAS of said PASs;

(ii) said M-MUX and said Q-MUX are combined into a TPC multiplier/quotient multiplexer-like device MQ-MUX, having operand inputs and quotient and multiplier control inputs and quotient and data outputs for choosing one out of r TPC represented operands and delivering a TPC represented digit; and (iii) said MQ-MUX having its operand inputs coupled to said range register and said PASs, its quotient control inputs coupled to a TPC represented r-bit digit generate combinational logic having inputs coupled to borrower outputs of said PASs, its multiplier control inputs coupled to said multiplier register, its quotient outputs connected to said quotient/squareroot register, and its data outputs connected to said range register; said PASs having their minuend operand inputs coupled to said range register and their subtrahend operand inputs coupled to said working registers; said $PM_2$ having its inputs coupled to said quotient/squareroot register; said DS-MUX having its inputs of one of its two operands coupled to said $PM_2$ and its other operand inputs coupled to said multiplicand/divisor register; and said $PM_d$'s having their inputs coupled to said DS-MUX and their outputs connected to said working registers.

12. The PSU of claim 11 wherein said multiplier right-shift register means comprising: a register for holding n TPC represented digits of r-bits each; a multiplexer having n data inputs of r-bits each, n-bit control input, and r-bit data output; and wherein: said register is connected to said multiplexer so that said n digits of said register comprising said n data inputs of said multiplexer and the significant positions of said n digits of said register comprising said n-bit control input of said multiplexer respectively.

13. A TPC sign magnitude combinational unit(SCU for performing addition, subtraction, comparison, and Boolean operations upon sign magnitude TPC represented operands, said SCU comprising:

(a) a TPC positive integers combinational unit(PCU) for performing addition, subtraction, comparison, and Boolean operations upon positive TPC represented operands, said PCU comprising:

(i) a TPC parallel adder-subtractor/comparator-Booleaner PASCB for performing addition, straight subtraction, comparison, and Boolean operations upon positive TPC represented operands, said PASCB comprising a combination of:

(1) a TPC parallel adder PA for performing the add operation upon two TPC represented operands of n-digit each of radix r each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead outputs to other devices; and n−1 TPC full adder logic devices FALs, each having data inputs coupled to sum outputs of a HA of said HAs, carry inputs coupled to corresponding outputs of the outputs of said CLA, and data outputs for delivering a TPC represented r-bit digit part of data outputs of said PA;

(2) a TPC parallel subtractor PS for performing the straight subtract operation upon two TPC represented operands of n-digit each, said PS comprising: n TPC half subtractors HSs, each having minuend and subtrahend operand inputs for receiving two TPC represented digits of r-bits each and output means for delivering TPC represented difference of r-bits, borrower and non-zero outputs to other devices; said CLA having its carry and non-nine inputs coupled to corresponding borrower and non-zero outputs of said HSs and its carry outputs for delivering TPC borrower look-ahead outputs to other devices; and n−1 TPC full subtractor logic devices FSLs, each having data inputs coupled to difference outputs of a HS of said HSs, borrower inputs coupled to corresponding carry outputs of the outputs of said CLA, and data outputs for delivering a TPC represented digit of r-bits part of data outputs of said PS;

(3) a TPC parallel comparator PC for performing the compare operation upon two TPC represented operands of n-digit each, said PC comprising: n TPC two-digit comparator devices TCs, each having data inputs for receiving two TPC represented digits of r-bits each and output means for delivering output signals representing the result of the compare operation performed upon said two TPC represented digits to other devices; and a PC oriented CLA device ($C_{CLA}$), having input means coupled to corresponding outputs of said TCs and output means for delivering output signals representing the result of the compare operation performed upon said two TPC represented operands;

(4) a TPC parallel Booleaner PB for performing the six Boolean operations AND, NAND, OR, NOR, XOR and XNOR or equivalence in parallel upon two TPC represented operands of n-digit each, said PB comprising: n TPC two-digit Booleaner devices TBs, each having data inputs for receiving two TPC represented digits of r-bits each and output means for delivering three signals representing the outputs of the three Boolean operations OR, NAND and XOR performed upon said two TPC represented digits to other devices; and a PB oriented CLA device($B_{CLA}$), having input means coupled to corresponding outputs of said TBs and output means for delivering output signals representing the outputs of said six Boolean operations performed upon said two TPC represented operands of n-digit each; and (5) wherein: the HAs of said PA, the HSs of said PS, the TCs of said PC and the TBs of said PB are combined into n TPC half adder-subtractor devices HASs, each having data inputs for receiving two TPC represented digits of r-bits each, subtract/add control input and output means for delivering TPC represented sum and difference of r-bits each, Boolean, carry/borrower and non-nine/non-zero outputs to other devices; the CLA of said PA, the $C_{CLA}$ of said PC, and the $B_{CLA}$ of said PB are combined into a PASCB oriented CLA device ($AB_{CLA}$), having Boolean, carry/borrower and non-nine/non-zero inputs coupled to corresponding outputs of the outputs of said HASs and output means for delivering carry/borrower look-ahead, compare, Boolean, carry zero, carry one, borrow zero and borrow one outputs to other devices; and the FALs of said PA and the FSLs of said PS are combined into n−1 TPC full adder-subtractor logic devices FASLs, each having sum and difference data inputs coupled to corresponding outputs of a HAS of said HASs, carry/borrower inputs coupled to corresponding carry/borrower look-ahead outputs of said AB-$CL_A$, and data outputs for delivering a TPC represented r-bit digit part of data outputs of said PASCB; and (ii) a TPC r's conditional complementor device(rCC) for performing r's complement operation upon a TPC represented n-digit operand if a given condition is met and passing said operand unchanged otherwise, said rCC comprising: a TPC decrement oriented zeros detector device (DZD), having output means for delivering zero and non-zero indicate outputs to other devices; and n TPC r's conditional complement logic devices(CCLs), each having data inputs of r-bits coupled to corresponding outputs of the outputs of said PASCB, zero and non-zero control inputs coupled to corresponding outputs of the outputs of said DZD, take r's complement control input coupled to borrow one output of said PASCB, pass unchanged control input coupled to a combinational logic function equivalent to the ORing of carry zero, carry one and borrow zero outputs of said PASCB, and data outputs for delivering a TPC represented r-bit digit comprising together with remaining outputs of said CCLs data outputs for said PCU; and (b) wherein: said PCU having its control input coupled to a combinational logic function equivalent to the exclusive-ORing of three bits represent a subtract/add instruction and two signs of said sign magnitude TPC represented operands for performing either add or subtract=compare-Boolean operation at a time upon said operands, and having outputs less than and greater than of its compare outputs together with said three bits connected to positive/negative signal generate combinational logic having output means for delivering a two-valued output signal comprising together with said data outputs of said PCU sign and magnitude outputs for said SCU.

14. A TPC floating-point adder-subtractor(FAS) for performing add and subtract operations upon two floating-point sign magnitude TPC represented operands, said FAS comprising:

(I) first operand exponent and mantissa registers, second operand exponent and mantissa registers, exponent and mantissa output registers, and a delay register for holding intermediate result;

(II) a TPC sign magnitude combinational unit(SCU) for performing addition, subtraction, comparison, and Boolean operations upon sign magnitude TPC represented operands, said SCU comprising:

(a) a TPC positive integers combinational unit(PCU) for performing addition, subtraction, comparison, and Boolean operations upon positive TPC represented operands, said PCU comprising:

(i) a TPC parallel adder-subtractor/comparator-Booleaner PASCB for performing addition, straight subtraction, comparison, and Boolean operations upon positive TPC represented operands, said PASCB comprising a combination of:

(1) a TPC parallel adder PA for performing the add operation upon two TPC represented operands of n-digit each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead signals to other devices; and n−1 TPC full adder logic devices FALs, each having data inputs coupled to sum outputs of a HA of said HAs, carry inputs coupled to corresponding outputs of the outputs of said CLA, and data outputs for delivering a TPC represented r-bit digit comprising together with remaining outputs of said FALs data outputs for said PA;

(2) a TPC parallel subtractor PS for performing the straight subtract operation upon two TPC represented operands of n-digit each, said PS comprising: n TPC half subtractors HSs, each having minuend and subtrahend operand inputs for receiving two TPC represented digits of r-bits each and output means for delivering TPC represented difference of r-bits, borrower and non-zero outputs to other devices; said CLA having its carry and non-nine inputs coupled to corresponding borrower and non-zero outputs of said HSs and its carry outputs for delivering TPC borrower look-ahead outputs to other devices; and n−1 TPC full subtractor logic devices FSLs, each having data inputs coupled to difference outputs of a HS of said HSs, borrower inputs coupled to corresponding carry outputs of said CLA, and data outputs for delivering a TPC represented r-bit digit comprising together with remaining outputs of said FSLs data outputs for said PS;

(3) a TPC parallel comparator PC for performing the compare operation upon two TPC represented operands of n-digit each, said PC comprising: n TPC two-digit comparator devices TCs, each having data inputs for receiving two TPC represented digits of r-bits each and output means for delivering output signals representing the result of the compare operation performed upon said two TPC represented digits to other devices; and a PC oriented CLA device($C_{CLA}$), having input means coupled to corresponding outputs of said TCs and output means for delivering output signals representing the result of the compare operation performed upon said two TPC represented operands;

(4) a TPC parallel Booleaner PB for performing the six Boolean operations AND, NAND, OR, NOR, XOR and XNOR or equivalence in parallel upon two TPC represented operands of n-digit each, said PB comprising: n TPC two-digit Booleaner devices TBs, each having data inputs for receiving two TPC represented digits of r-bits each and output means for delivering three signals representing the outputs of the three Boolean operations OR, NAND and XOR performed upon said two TPC represented digits to other devices; and a PB oriented CLA device($B_{CLA}$), having input means coupled to corresponding outputs of said TBs and output means for delivering output signals representing the outputs of said six Boolean operations performed upon said two TPC represented operands of n-digit each; and (5) wherein: the HAs of said PA, the HSs of said PS, the TCs of said PC and the TBs of said PB are combined into n TPC half adder-subtractor devices(HASs), each having data inputs for receiving two TPC represented digits of r-bits each, control input for performing either add or subtract-compare-Boolean operation at a time and output means for delivering TPC represented sum and difference of r-bits each, Boolean, carry/borrower and non-nine/non-zero outputs to other devices; the CLA of said PA, the $C_{CLA}$ of said PC and the $B_{CLA}$ of said PB are combined into a PASCB oriented CLA device ($AB_{CLA}$), having Boolean, carry/borrower and non-nine/non-zero inputs coupled to corresponding outputs of said HASs and output means for delivering carry/borrower look-ahead, compare, Boolean, carry zero, carry one, borrow zero and borrow one outputs to other devices; and the FALs of said PA and the FSLs of said PS are combined into n−1 TPC full adder-subtractor logic devices FASLs, each having sum and difference inputs coupled to corresponding outputs of a HAS of said HASs, carry/borrower inputs coupled to corresponding carry/borrower look-ahead outputs of said $AB_{CLA}$, and data outputs for delivering a TPC represented r-bit digit comprising together with remaining outputs of said FASLs data outputs for said PASCB; and (ii) a TPC r's conditional complementor device(rCC) for performing r's complement operation upon a TPC represented n-digit operand if a given condition is met and passing said operand unchanged otherwise, said rCC comprising: a TPC decrement oriented zeros detector device(DZD), having output means for delivering zero and non-zero indicate outputs to other devices; and n TPC r's conditional complement logic devices(CCLs), each having data inputs coupled to corresponding outputs of the data outputs of said PASCB, zero and non-zero control inputs coupled to corresponding outputs of said DZD, take r's complement control input coupled to borrow one output of said PASCB, pass unchanged control input coupled to a logical function equivalent to the ORing of borrow zero, carry zero and carry one outputs of said PASCB, and data outputs for delivering a TPC represented digit of r-bits comprising together with remaining outputs of said CCLs data outputs for said PCU; and (b) wherein: said PCU having its control input coupled to a logical function equivalent to the exclusive-ORing(XORing) of three bits represent a subtract/add instruction and two signs of said sign magnitude TPC represented operands for performing either add or subtract-compare-Boolean operation at a time upon said operands, and having outputs less than and greater than of its compare outputs together with said three bits connected to combinational logic having output means for delivering a two-valued signal comprising together with said data outputs of said PCU sign and magnitude outputs for said SCU;

(III) said PCU for exponents first addition-subtraction; said SCU for exponents second addition-subtraction; said SCU for mantissas addition-subtraction; a TPC device TD, having data inputs and data outputs for converting a TPC represented operand into shift amount; a TPC device CRS, having data and control inputs and data outputs for shifting a TPC represented operand combinationally to the right variable number of positions; a TPC device CBS, having data and control inputs and data outputs for shifting a TPC represented operand combinationally right and left variable number of positions; a TPC device CLZD, having data and carry inputs and data outputs for determining if there is a carry and if not how many leading zeros are there in a TPC represented operand; a TPC device QSC, having data inputs and data outputs for converting a TPC represented amount of said CLZD outputs type into a sign magnitude TPC representation; and a TPC device ER, having data inputs and data outputs for converting a TPC represented amount of the magnitude type of said sign magnitude TPC representation into a TPC represented operand of a given radix r; and (IV) wherein: said registers of two exponents and two mantissas of said first and second operands having their outputs together with borrower outputs of said PCU connected to an arrangement of combinational logic for determining and passing to said delay register the greater of said two exponents and for determining which one of said two mantissas needs to be shifted to the right for aligning mantissas; said PCU having its control input coupled to a logical function equivalent to the exclusive-NORing of the signs of said two exponents, its operand inputs coupled to the registers of said two exponents, and its data outputs connected to said TD; said CRS having its data inputs coupled to shift to right indicate outputs of said arrangement of combinational logic, and its control inputs coupled to said TD; said SCU of mantissas addition-subtraction having its inputs of one of its two operands coupled to pass mantissa direct indicate outputs of said arrangement of combinational logic and its other operand inputs coupled to said CRS; said CLZD having its carry and data inputs coupled to outputs carry one and zero bits of the outputs of said SCU of mantissas addition-subtraction; said CBS having its data inputs coupled to said SCU of mantissas addition-subtraction, its control inputs coupled to said CLZD, and its outputs connected to said mantissa output register; said QSC having its inputs coupled to said CLZD and its data outputs connected to said ER; and said SCU of exponents second addition-subtraction having its inputs of one of its two operands coupled to said delay register, its other operand inputs coupled to said ER, its control input coupled to a logical function equivalent to the exclusive-ORing of the sign outputs of said delay register and said TPC device QSC, and its outputs connected to said exponent output register.

15. A TPC floating-point multiplier-divider(FMD) for performing multiply and divide operations upon floating-point TPC represented operands, said FMD comprising:

(I) first operand exponent and mantissa registers, second operand exponent and mantissa registers, exponent and mantissa output registers, and a delay register for holding intermediate result;

(II) a TPC sign magnitude combinational unit(SCU) for performing addition, subtraction, comparison, and Boolean operations upon sign magnitude TPC represented operands, said SCU comprising:

(a) a TPC positive integers combinational unit(PCU) for performing addition, subtraction, comparison, and Boolean operations upon positive TPC represented operands, said PCU comprising:

(i) a TPC parallel adder-subtractor/comparator-Booleaner PASCB for performing addition, straight subtraction, comparison, and Boolean operations upon positive TPC represented operands, said PASCB comprising a combination of:

(1) a TPC parallel adder PA for performing the add operation upon two TPC represented operands of n-digit each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of said HAs and carry outputs for delivering TPC carry look-ahead signals to other devices; and $n-1$ TPC full adder logic devices FALs, each having data inputs coupled to sum outputs of a HA of said HAs, carry inputs coupled to corresponding outputs of said CLA, and data outputs for delivering a TPC represented r-bit digit comprising together with remaining outputs of said FALs data outputs for said PA;

(2) a TPC parallel subtractor PS for performing the straight subtract operation upon two TPC represented operands of n-digit each, said PS comprising: n TPC half subtractors HSs, each having minuend and subtrahend operand inputs for receiving two TPC represented digits of r-bits each and output means for delivering TPC represented difference of r-bits, borrower and non-zero outputs to other devices; said CLA having its carry and non-nine inputs coupled to corresponding borrower and non-zero outputs of said HSs and its carry outputs for delivering TPC borrower outputs to other devices; and $n-1$ TPC full subtractor logic devices FSLs, each having difference inputs coupled to corresponding outputs of a HS of said HSs, borrower inputs coupled to corresponding carry outputs of said CLA, and data outputs for delivering a TPC represented r-bit digit comprising together with remaining outputs of said FSLs data outputs for said PS;

(3) a TPC parallel comparator PC for performing the compare operation upon two TPC represented operands of n-digit each, said PC comprising: n TPC two-digit comparator devices TCs, each having data inputs for receiving two TPC represented digits of r-bits each and output means for delivering output signals representing the result of the compare operation performed upon said two TPC represented digits to other devices; and a PC oriented CLA device($C_{CLA}$), having input means coupled to corresponding outputs of said TCs and output means for delivering output signals representing the result of the compare operation performed upon said two TPC represented operands;

(4) a TPC parallel Booleaner PB for performing the six Boolean operations AND, NAND, OR, NOR, XOR and XNOR or equivalence in parallel upon two TPC represented operands of n-digit each, said PB comprising: n TPC two-digit Booleaner devices TBs, each having data inputs for receiving two TPC represented digits of r-bits each and output means for delivering three signals representing the outputs of the three Boolean operations OR, NAND and XOR performed upon said two TPC represented digits to other devices; and a PB oriented CLA device($B_{CLA}$), having input means coupled to corresponding outputs of said TBs and output means for delivering output signals representing the outputs of said six Boolean operations performed upon said two TPC represented operands; and (5) wherein: the HAs of said PA, the HSs of said PS, the TCs of said PC and the TBs of said PB are combined into n TPC half adder-subtractor devices HASs, each having data inputs for receiving two TPC represented digits of r-bits each, control input for performing either add or subtract-compare-Boolean operation at a time and output means for delivering TPC represented sum and difference of r-bits each, Boolean, carry/borrower and non-nine/none-zero outputs to other devices; the CLA of said PA, the $C_{CLA}$ of said PC and the $B_{CLA}$ of said PB are combined into a PASCB oriented CLA device($AB_{CLA}$), having Boolean, carry/borrower and non-nine/non-zero inputs coupled to corresponding outputs of said HASs and output means for delivering carry/borrower look-ahead, compare, Boolean, carry zero, carry one, borrow zero and borrow one outputs to other devices; and the FALs of said PA and the FSLs of said PS are combined into $n-1$ TPC full adder-subtractor logic devices FASLs, each having sum and difference inputs coupled to corresponding outputs of a HAS of said HASs, carry/borrower inputs coupled to corresponding carry/borrower look-ahead outputs of said $AB_{CLA}$, and data outputs for delivering a TPC represented r-bit digit comprising together with remaining outputs of said FASLs data outputs for said PASCB; and (ii) a TPC r's conditional complementor device(rCC) for performing r's complement operation upon a TPC represented operand of n-digit if a given condition is met and passing said operand unchanged otherwise, said rCC comprising: a TPC decrement oriented zeros detector device(DZD), having output means for delivering zero and non-zero indicate outputs to other devices; and n TPC r's conditional complement logic devices(CCLs), each having data inputs coupled to corresponding outputs of the outputs of said PASCB, zero and non-zero control inputs coupled to corresponding outputs of said DZD, take r's complement control input coupled to borrow one output of said PASCB, pass unchanged control input coupled to a logical function equivalent to the ORing of borrow zero, carry zero and carry one outputs of said PASCB, and data outputs for delivering a TPC represented digit of r-bits comprising together with remaining outputs of said CCLs data outputs for said PCU; and (b) wherein: said PCU having its control input coupled to a logical function equivalent to the exclusive-ORing of three bits represent a subtract/add instruction and two signs of said sign magnitude TPC represented operands for performing either add or subtract-compare-Boolean operation at a time upon said operands, and having outputs less than and greater than of its compare outputs together with said three bits connected to combinational logic having output means for delivering a two-valued output signal comprising together with said data outputs of said PCU sign and magnitude outputs for said SCU;

(III) a TPC sequential multiplier-divider(SMD) for performing multiply and divide operations upon fixed-point TPC represented operands, said SMD comprising a combination of:

(a) a TPC add-shift multiplier(ASM) for performing the multiply operation upon two TPC represented operands, said ASM comprising:

(i) a multiplicand register, a multiplier right-shift register, a partial product right-shift register, and working registers $R_d$'s for holding the multiples of a TPC represented operand by digit d for d=2 through 9 respectively;

(ii) said PA;

(iii) eight TPC uni-operand devices $PM_d$'s for multiplying a TPC represented n-digit operand by digit d for d=2 through 9 respectively, wherein:

(1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit and said digit d to other devices; and n−1 TPC half adder devices $HA_d$'s, each having data and carry inputs coupled to corresponding product and carry outputs of the outputs of said $HM_d$'s and data outputs for delivering a TPC represented r-bit digit part of data outputs of said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for d=3, 6, 7 and 9 respectively; n−1 TPC half adder devices $HA_d$'s for d=3, 6, 7 and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to to corresponding outputs of of the outputs of said $HA_d$'s; and n−2 FALs of said FALs of said PA, each having its data inputs coupled to sum outputs of a HA $_d$ of said $HA_d$'s, carry inputs coupled to corresponding outputs of the outputs of said CLA, and data outputs for delivering a TPC represented r-bit digit part of data outputs of said $PM_d$ for d=3, 6, 7 and 9 respectively;

(iv) a TPC multiplier multiplexer-like device M-MUX, having operand and control inputs and data outputs for choosing one out of r TPC represented operands; and (v) wherein: said M-MUX having its operand inputs coupled to said multiplicand and working registers and its control inputs coupled to said multiplier register; said PA having its inputs of one of its two operands coupled to said M-MUX, its other operand inputs coupled to said product register, and its outputs connected to said product register; and said $PM_d$'s having their inputs coupled to said multiplicand register and their outputs connected to said working registers;

(b) a TPC deterministic divider (DD) for performing the divide operation upon two TPC represented operands, said DD comprising:

(i) a quotient left-shift register, a dividend left-shift register, said multiplicand register for holding divisor, a working register range(RA) coupled to said dividend register, said product register coupled to said range register for holding remainder, and said working registers $R_d$'s for holding the multiples of the divisor by digit d for d=1 through 9 respectively;

(ii) nine PS s of said PS;

(iii) said $PM_d$'s;

(iv) a TPC quotient multiplexer-like device Q-MUX, having operand and control inputs and data outputs for choosing one out of r TPC represented operands and delivering a TPC represented digit; and (v) wherein: said Q-MUX having its operand inputs coupled to said range register and said PSs, its control inputs coupled to a TPC represented r-bit digit generate combinational logic having inputs coupled to borrower outputs of said PS s, its quotient outputs connected to said quotient register, and its data outputs connected to said range register; said PS s having their minuend operand inputs coupled to said range register and their subtrahend operand inputs coupled to said working registers $R_d$'s; and said $PM_d$'s having their inputs coupled to said divisor register and their outputs connected to said working registers $R_d$'s; and (c) wherein:
  (i) said nine PSs are combined each with said PA into nine TPC parallel adder-subtractors(-PASs) for performing each addition and straight subtraction upon two TPC represented operands, wherein each: the HAs of said PA and the HSs of a PS of said PSs are combined into n TPC half adder-subtractor devices HASs, each having data inputs for receiving two TPC represented digits of r-bits each, subtract/add control input and output means for delivering TPC represented sum and difference of r-bits each, carry/borrower and non-nine/non-zero outputs to other devices; said CLA having its inputs coupled to corresponding outputs of the outputs of said HASs; and the FALs of said PA and the FSLs of said PS are combined into n−1 TPC full adder-subtractor logic devices FASLs, each having sum and difference inputs coupled to corresponding outputs of a HAS of said HASs, carry/borrower inputs coupled to corresponding outputs of said HASs, and data outputs for delivering a TPC represented r-bit digit comprising together with remaining outputs of said FASLs data outputs for a PAS of said PASs;
  (ii) said M-MUX and said Q-MUX are combined into a TPC multiplier/quotient multiplexer-like device MQ-MUX, having operand inputs and quotient and multiplier control inputs and quotient and data outputs for choosing one out of r TPC represented operands and delivering a TPC represented r-bit digit; and
  (iii) said MQ-MUX having its operand inputs coupled to said range register and said PASs, its quotient control inputs coupled to a TPC represented r-bit digit generate combinational logic having inputs coupled to borrower outputs of said PASs, its multiplier control inputs coupled to said multiplier register, its quotient outputs connected to said quotient register, and its data outputs connected to said range register; said PASs having their control input coupled to a divide/multiply binary variable, their minuend operand inputs coupled to said range register, and their subtrahend operand inputs coupled to said working registers; and said $PM_d$'s having their inputs coupled to said multiplicand/divisor register and their outputs connected to said working registers;

(IV) either said PS or said PC for determining if said second operand mantissa is less than said first operand mantissa; a TPC device CLS, having data and control inputs and data outputs for shifting a TPC represented operand combinationally to the left variable number of positions; and a TPC device SIDPZ, having data and control inputs and data outputs for increase, decrease, pass unchanged, and set a TPC represented operand to zero; and (V) wherein: said SCU having its two operand inputs coupled to the exponent registers of said first and second operands, its subtract/add control input coupled to said divide/multiply binary variable, and its outputs connected to said delay register; said PS having its inputs coupled to the mantissa registers of said first and second operands; said SMD having its operand inputs coupled to the mantissa registers of said first and second operands and its control input coupled to said divide/multiply binary variable; said SIDPZ having its outputs connected to said exponent output register, its data inputs coupled to said delay register, and inputs increase, decrease, pass unchanged, and set to zero of its control inputs coupled to combinational logic having inputs coupled to said divide/multiply binary variable, borrower outputs of said PS, most significant bit of the outputs of said SMD, and zero bits of the outputs of the mantissa registers of said first and second operands; and said CLS having its data inputs coupled to said SMD, its control inputs coupled to said combinational logic, and its outputs connected to said mantissa output register.

16. A TPC floating-point squareroot extractor(FSRE) for performing squareroot extract operation upon a floating-point TPC represented operand, said FSRE comprising:
  (a) radicand exponent and mantissa registers;
  (b) a TPC squareroot extractor(SRE) for performing squareroot extract operation upon a fixed-point TPC represented operand, said SRE comprising:
    (i) a working register range and a delay register $PM_1$ for holding intermediate results, a radicand left-shift register connected to said range register, and a partial squareroot left-shift register;
    (ii) nine TPC parallel subtractors PSs for performing each the straight subtract operation upon two TPC represented operands of n-digit each, a PS of said PSs comprising: n TPC half subtractors HSs, each having minuend and subtrahend operand inputs for receiving two TPC represented digits of r-bits each and output means for delivering TPC represented difference of r-bits, borrower and non-zero outputs to other devices; a TPC carry look-ahead CLA, having carry and non-nine inputs coupled to corresponding borrower and non-zero outputs of said HSs and carry outputs for delivering TPC borrower outputs to other devices; and n−1 TPC full subtractor logic devices FSLs, each having difference inputs coupled to corresponding outputs of a HS of said HSs, borrower inputs coupled to corresponding carry outputs of said CLA, and data outputs for delivering a TPC represented r-bit digit comprising together with remaining outputs of said FSLs data outputs for said PS;
    (iii) eight TPC uni-operand devices $PM_d$'s for multiplying a TPC represented n-digit operand by digit d for d=2 through 9 respectively, wherein:
      (1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and n−1 TPC half adder devices $HA_d$'s, each having data and carry inputs coupled to corresponding product and carry outputs of the outputs of said $HM_d$'s and data outputs for delivering a TPC represented r-bit digit comprising together with remaining outputs of said $HA_d$'s data outputs for said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for d=3, 6, 7 and 9 respectively; n−1 TPC half adder devices $HA_d$'s for d=3, 6, 7 and 9 respectivley, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and n−2 TPC full adder logic devices FALs, each having data inputs coupled to sum outputs of a $HA_d$ of said $HA_d$'s, carry inputs coupled to corresponding outputs of the outputs of said CLA, and data outputs for delivering TPC represented r-bit digit part of data outputs of said $PM_d$ for d-32 3, 6, 7 and 9 respectively;

(iv) a TPC quotient multiplexer-like device Q-MUX, having operand and control inputs and quotient and data outputs for choosing one out of r TPC represented operands and delivering a TPC represented digit;

(v) said $PM_2$ for doubling partial squareroot; and (vi) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said squareroot register, and its data outputs connected to said range register; said PSs having their subtrahend operand inputs coupled to said $PM_d$'s including said $PM_1$ and their minuend operand inputs coupled to said range register; said $PM_2$ having its inputs coupled to said squareroot register; and said $PM_d$'s having the least significant digit of their inputs set to digit d for d=1 through 9 respectively and the remaining digits of their inputs coupled to said $PM_2$;

(c) a TPC device CRS, having data and control inputs and data outputs for shifting a TPC represented operand combinationally to the right variable number of positions; a TPC device SIDPZ, having data and control inputs and data outputs for increase, decrease, pass unchanged and set a TPC represented operand to zero; and a TPC device BR, having data inputs and data outputs for performing the halving operation upon a TPC represented operand; and (d) wherein: said radicand exponent register having its r-bit TPC represented output of its least significant digit LSD connected to even/odd signals generate combinational logic having even and odd indicate outputs for determining whether said LSD is even or odd digit, said CRS having its data inputs coupled to said radicand mantissa register and inputs one and zero of its control inputs coupled to odd and even outputs of said even/odd signals generate combinational logic, said SRE having its radicand register coupled to said CRS, said SIDPZ having its data inputs coupled to said radicand exponent register and inputs increase and pass unchanged of its control inputs coupled to odd and even outputs of said even/odd signals generate combinational logic, and said BR having its data inputs coupled to said SIDPZ and its outputs connected to an exponent output register.

17. A TPC fixed-point arithmetic unit (PAU) for performing addition, subtraction, comparison, Boolean, multiplication, division and square root extraction operations upon fixed-point sign magnitude TPC represented operands, said PAU comprising:

(I) a TPC sign magnitude combinational unit(SCU) for performing addition, subtraction, comparison, and Boolean operations upon sign magnitude TPC represented operands, said SCU comprising:

(a) a TPC positive integers combination unit(PCU) for performing addition, subtraction, comparison, and Boolean operations upon positive TPC represented operands, said PCU comprising:

(i) a TPC parallel adder-subtractor/comparator-Booleaner PASCB for performing addition, straight subtraction, comparison, and Boolean operations upon positive TPC represented operands, said PASCB comprising a combination of:

(1) a TPC parallel adder PA for performing the add operation upon two TPC represented operands of n-digit each of radix r each, said PA comprising: n TPC half adders HAs, each having data inputs for receiving two TPC represented digits of r-bits each and output means for delivering TPC represented sum of r-bits, carry and nonnine outputs to other devices; a TPC carry look-ahead CLA, having carry and nonnine inputs coupled to corresponding outputs of the outputs of said HAs and carry outputs for delivering TPC carry look-ahead outputs to other devices; and n−−1 TPC full adder logic devices FALs, each having data inputs coupled to sum outputs of a HA of said HAs, carry inputs coupled to corresponding outputs of the outputs of said CLA, and data outputs for delivering a TPC represented r-bit digit comprising together with remaining outputs of said FALs data outputs for said PA;

(2) a TPC parallel subtractor PS for performing the straight subtraction upon two PTC represented operands of n-digit each, said PS comprising: n PTC half subtractors HSs, each having minuend and subtrahend operand inputs for receiving two TPC represented digits of r-bit each and output means for delivering TPC represented difference of r-bits, borrower and non-zero outputs to other devices; said CLA having its carry and non-nine inputs coupled to corresponding borrower and non-zero outputs of the outputs of said HSs and its carry outputs for delivering TPC borrower look-ahead outputs to other devices; and n−1 TPC full subtractor logic devices FSLs, each having data inputs coupled to difference outputs of a HS of said HSs, borrower inputs coupled to corresponding carry outputs of the outputs of said CLA, and data outputs for delivering a TPC represented r-bit digit comprising together with remaining outputs of said FSLs data outputs for said PS;

(3) a TPC parallel comparator PC for performing the compare operation upon two TPC represented operands of n-digit each, said PC comprising: n TPC two-digit comparator devices TCs, each having data inputs for receiving two TPC represented digits of r-bits each and output means for delivering compare output signals representing the result of the compare operation performed upon said two TPC represented digits to other devices; and a PC oriented CLA device ($C_{CLA}$), having input means coupled to corresponding outputs of said TCs and output means for delivering compare output signals representing the result of the compare operation performed upon said two TPC represented operands of n-digit each;

(4) a TPC parallel Booleaner PB for performing the six Boolean operations AND, NAND, OR, NOR, XOR, and XNOR or equivalence in parallel upon two TPC represented operands of n-digit each, said PB comprising: n TPC two-digit Booleaner devices TBs, each having data inputs for receiving two TPC represented digits of r-bits each and output means for delivering three signals representing the outputs of the three Boolean operation OR, NAND and XOR performed upon said two TPC represented digits to other devices; and a PB oriented CLA device($B_{CLA}$), having input means coupled to corresponding outputs of said TBs and output means for delivering output signals representing the outputs of said six Boolean operations performed upon said two TPC represented operands; and (5) wherein: the HAs of said PA, the HSs of said PS, the TCs of said PC and the TBs of said PB are combined into n TPC half adder-subtractor devices HASs, each having data inputs for receiving two TPC represented digits of r-bits each, subtract/add control input, and output means for delivering TPC represented sum and difference of r-bits each, Boolean, carry/borrower and non-nine/non-zero outputs to other devices; the CLA of said PA, the $C_{CLA}$ of said PC, and the $B_{CLA}$ of said PB re combined into a PASCB oriented CLA device($AB_{CLA}$), having Boolean, carry/borrower and non-nine/non-zero inputs coupled to corresponding outputs of the outputs of said HASs and output means for delivering carry/borrower look-ahead, compare, Boolean, carry zero, carry one, borrow zero and borrow one outputs to other devices; and the FALs of said PA and the FSLs of said PS are combined into n−1 TPC full adder-subtractor logic devices FASLs, each having sum and difference data inputs coupled to corresponding outputs of a HAS of said HASs, carry/borrower inputs coupled to corresponding carry/borrower look-ahead outputs of said $AB_{CLA}$, and data outputs for delivering a TPC represented r-bit digit comprising together with remaining outputs of said FASLs data outputs for said PASCB; and (ii) a TPC r's conditional complementor device(rCC) for performing r's complement operation upon a TPC represented n-digit operand if a given condition is met and passing said operand unchanged otherwise, said rCC comprising: a TPC decrement oriented zeros detector device(DZD), having output means for delivering zero and non-zero indicate outputs to other devices; and n TPC r's conditional complement logic devices(CCLs), each having data inputs of r-bits coupled to corresponding outputs of the outputs of said PASCB, zero and non-zero control inputs coupled to corresponding outputs of the outputs of said DZD, take r's complement control input coupled to borrow one output of said PASCB, pass unchanged control input coupled to a logical function equivalent to the ORing of borrow zero, carry zero and carry one outputs of said PASCB, and data outputs for delivering a TPC represented r-bit digit comprising together with remaining outputs of said CCLs data outputs for said PCU; and (b) wherein: said PCU having its control input coupled to a logical function equivalent to the exclusive-ORing of three bits represent a subtract/add instruction and two signs of said sign magnitude TPC represented operands for performing higher add or subtract-compare-Boolean operation at a time upon said operands, and having outputs less than and greater than of its compare outputs together with said three bits connected to positive/negative signal generate combinational logic having output means for delivering a two-valued signal comprising together with said data outputs of said PCU sign and magnitude outputs for said SCU;

(II) a TPC positive integers sequential unit(PSU) for performing multiply, divide, and extract square-root operations upon TPC represented operands, said PSU comprising a combination of:

(a) a TPC add-shift multiplier(ASM) for performing the multiply operation upon two TPC represented operands, said ASM comprising:

(i) a multiplicand register, a multiplier right-shift register, a partial product right-shift register, and working registers $R_d$'s for holding the multiples of a TPC represented operand by digit d for d=2 through 9 respectively;

(ii) said PA;

(iii) eight TPC uni-operand devices $PM_d$'s for multiplying a TPC represented n-digit operand by digit d for d=2 through 9 respectively, wherein:

(1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and $n-1$ TPC half adder devices $HA_d$'s, each having data and carry inputs coupled to corresponding product and carry outputs of the outputs of said $HM_d$'s and data outputs for delivering a TPC represented r-bit digit comprising together with remaining outputs of said $HA_d$'s data outputs for said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$, and $PM_9$ of said $PM_d$'s comprising each: said $HM_d$'s for d=3, 6, 7 and 9 respectively; $n-1$ TPC half adder devices $HA_d$'s for d=3, 6, 7 and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and $n-2$ FALs of said FALs of said PA, each having its data inputs coupled to sum outputs of a $HA_d$ of said $HA_d$'s, its carry inputs coupled to corresponding outputs of the outputs of said CLA, and its data outputs for delivering a TPC represented r-bit digit part of data outputs of said $PM_d$ for d=3, 6, 7 and 9 respectively;

(iv) a TPC multiplier multiplexer-like device M-MUX, having operand and control inputs and data outputs for choosing one out of r TPC represented operands; and (v) wherein: said M-MUX having its operand inputs coupled to said multiplicand and working registers and its control inputs coupled to said multiplier register; said PA having its inputs of one of its two operands coupled to said M-MUX, its other operand inputs coupled to said product register and its outputs connected to said product register; and said $PM_d$'s having their inputs coupled to said multiplicand register and their outputs connected to said working registers;

(b) a TPC deterministic divider(DD) for performing the divide operation upon two TPC represented operands, said DD comprising:

(i) a dividend left-shift register, a quotient left-shift register, a working register range(RA) coupled to said dividend register, said multiplicand register for holding divisor, said product register coupled to said range register for holding remainder, and said working registers $R_d$'s for holding the multiples of the divisor by digit d for d=1 through 9 respectively;

(ii) nine PSs of said PS;

(iii) said $PM_d$'s;

(iv) a TPC quotient multiplexer-like device Q-MUX, having operand and control inputs and data and quotient outputs for choosing one out of r TPC represented operands and delivering a TPC represented digit of r-bit; and (v) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said quotient register, and its data outputs connected to said range register; said PSs having their minuend operand inputs coupled to said range register and their subtrahend operand inputs coupled to said working registers; and said $PM_d$'s having their inputs coupled to said divisor register and their outputs connected to said working registers;

(c) a TPC squareroot extractor(SRE) for performing squareroot extract operation upon a TPC represented operand, said SRE comprising:

(i) a delay register $PM_1$ for holding intermediate result, and said dividend, quotient and range registers for holding radicand, partial squareroot and intermediate result respectively;

(ii) said nine PSs;

(iii) said $PM_d$'s;

(iv) said Q-MUX;

(v) said $PM_2$ for doubling partial squareroot; and (vi) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said squareroot register, and its data outputs connected to said range register; said $PM_2$ having its inputs coupled to said squareroot register; said PSs having their minuend operand inputs coupled to said range register and their subtrahend operand inputs coupled to said $PM_d$'s including said $PM_1$; and said $PM_d$'s having the least significant digit of their inputs set to digit d for d=1 through 9 respectively, and the remaining digits of their inputs coupled to said $PM_2$;

(d) a TPC divisor/squareroot multiplexer-like device DS-MUX, having two operand inputs and $r-1$ operand outputs for choosing one out of two TPC represented operands; and (e) wherein:

(i) said PA and the first PS of said nine PSs are combined into a TPC parallel adder-subtractor(PAS) for performing addition and straight subtraction upon tow TPC represented operands; and (ii) said Q-MUX having its first operand inputs coupled to said range register, its second operand inputs coupled to said PAS, its remaining operand inputs coupled to remaining eight PSs of said nine PSs, its control inputs coupled to a TPC represented r-bit digit generate combinational logic having inputs coupled to borrower outputs of said PAS and said eight PSs, its quotient outputs connected to said quotient/squareroot register, and its data outputs connected to said range register; said PAS having its minuend operand inputs coupled to said range register and its subtrahend operand inputs coupled to said M-MUX; said eight PSs having their minuend operand inputs coupled to said range register and their subtrahend operand inputs coupled to said working registers and its control inputs coupled to said multiplier register; said $PM_2$ having its inputs coupled to said quotient/squareroot register; said DS-MUX having its inputs of one of its two operands coupled to said $PM_2$ and its other operand inputs coupled to said multiplicand/divisor register; and said $PM_d$'s having their inputs coupled to said DS-MUX and their outputs connected to said working registers; and (III) wherein:
 (a) said PAS of said PSU is combined with said SCU;
 (b) first and second operands of said SCU are held in said dividend/radicand register and in another register connected to first operand inputs of said M-MUX respectively; and
 (c) said SCU having its subtrahend operand inputs coupled to said M-MUX, its minuend operand inputs coupled to said range register, and its outputs connected to second operand inputs of said Q-MUX.

18. A TPC floating-point arithmetic unit(FAU) for performing arithmetic operations upon floating-point sign magnitude TPC represented operands, said FAU comprising a combination of:
 (A) a TPC fixed-point arithmetic unit(PAU) for performing add, subtract, compare, Boolean, multiply, divide, and extract square root operations upon fixed-point sign magnitude TPC represented operands, said PAU comprising:
  (I) a TPC sign magnitude combinational unit(SCU) for performing addition, subtraction, comparison, and Boolean operations upon sign magnitude TPC represented operands said SCU comprising:
   (a) a TPC positive integers combinational unit(PCU) for performing addition, subtraction, comparison, and Boolean operations upon positive TPC represented operands, said PCU comprising:
    (i) a TPC parallel adder-subtractor/comparator-Boolean PASCB for performing addition, straight subtraction, comparison, and Boolean operations upon positive TPC represented operands, said PASCB comprising a combination of:
     (1) a TPC parallel adder PA for performing the add operation upon two TPC represented operands of n-digit each of radix r each, said PA comprising: n TPC half adders HAs, each having data inputs for receiving two TPC represented digits of r-bits each and output means for delivering TPC represented sum of r-bits, carry and non-nine outputs to other devices; a TPC carry look-ahead CLA, having carry and non-nine inputs coupled to corresponding outputs of the outputs of said HAs and carry outputs for delivering TPC carry look-ahead outputs to other devices; and $n-1$ TPC full adder logic devices FALs, each having data inputs coupled to sum outputs of a HA of said HAs, carry inputs coupled to corresponding outputs of the outputs of said CLA, and data outputs for delivering a TPC represented r-bit digit comprising together with remaining outputs of said FALs data outputs for said PA;
     (2) a TPC parallel subtractor PS for performing straight subtraction upon two TPC represented operands of n-digit each, said PS comprising: n TPC half subtractors HSs, each having minuend and subtrahend operand inputs for receiving two TPC represented digits of r-bits each and output means for delivering TPC represented difference of r-bits, borrower and non-zero outputs to other devices; said CLA having its carry and non-nine inputs coupled to corresponding borrower and non-zero outputs of the outputs of said HSs and its carry outputs for delivering TPC borrower look-ahead outputs to other devices; and $n-1$ TPC full subtractor logic devices FSLs, each having data inputs coupled to difference outputs of a HS of said HSs, borrower inputs coupled to corresponding carry outputs of the outputs of said CLA, and data outputs for delivering a TPC represented r-bit digit comprising together with remaining outputs of said FSLs data outputs for said PS;
     (3) a TPC parallel comparator PC for performing the compare operation upon two TPC represented operands of n-digit each, said PC comprising: n TPC two-digit comparator devices TCs, each having data inputs for receiving two TPC represented digits of r-bits each and output means for delivering compare output signals representing the result of the compare operation performed upon said two TPC represented digits to other devices; and a PC oriented CLA device ($C_{CLA}$), having input means coupled to corresponding outputs of the TCs and output means for delivering output signals representing the result of the compare operation performed upon said two TPC represented operands of n-digit each;
     (4) a TPC parallel Booleaner PB for performing the six Boolean operations AND, NAND, OR NOR, XOR and XNOR or equivalence in parallel upon two TPC represented operands of n-digit each, said PB comprising: n TPC two-digit Booleaner devices TBs, each having data inputs for receiving two TPC represented digits of r-bits each and output means for delivering three signal representing the outputs of the three Boolean operations OR, NAND and XOR performed upon said two TPC represented digits to other devices; and a PB oriented CLA device($B_{CLA}$), having input means coupled to corresponding outputs of said TBs and six output means for delivering six output signals representing the outputs of said six Boolean operations performed upon said two TPC represented operands of n-digit each; and
     (5) wherein: the HAs of said PA, the HSs of said PS, the TCs of said PC, and the TBs of said PB are combined into n TPC half adder-subtractor devices HASs, each having data inputs for receiving two TPC represented digits of r-bits each, subtract/add control input and output means for delivering TPC represented sum and difference of r-bits each, Boolean, carry/borrower and non-nine/non-zero outputs to other devices; the CLA of said PA, the $C_{CLA}$ of said PC, and the $B_{CLA}$ of said PB are combined into a PASCB oriented CLA device($AB_{CLA}$), having Boolean, carry/borrower and non-nine/non-zero inputs coupled to corresponding outputs of the outputs of said HASs and output means for delivering carry/borrower look-ahead, compare, Boolean, carry zero, carry one, borrow zero and borrow one outputs to other devices; and the FALs of said PA and the FSLs of said PS are combined into n--1 TPC full adder-subtractor LOGIC devices FASLs, each having sum and difference data inputs coupled to corresponding outputs of a HAS of said HASs, carry/borrower inputs coupled to corresponding carry/borrower look-ahead outputs of said $AB_{CLA}$, and data outputs for delivering a TPC represented r-bit digit comprising together with remaining outputs of said FASLs data outputs for said PASCB; and (ii) a TPC r's conditional complementor device (rCC) for performing the r's complement operation upon a TPC represented n-digit operand if a given condition is met and passing said operand unchanged otherwise, said rCC comprising: a TPC decrement oriented zeros detector device(DZD), having output means for delivering zero and non-zero indicate outputs to other devices; and n TPC r's conditional complement logic devices (CCLs), each having data inputs of r-bits coupled to corresponding outputs of the outputs of said PASCB, zero and non-zero control inputs coupled to corresponding outputs of the outputs of said DZD, take r's complement control input coupled to borrow one output of said PASCB, pass unchanged control input coupled to a logical function equivalent to the ORing of borrow zero, carry zero and carry one outputs of said PASCB, and data outputs for delivering a TPC represented r-bit digit comprising together with remaining outputs of said CCLs data outputs for said PCU; and (b) wherein: said PCU having its control input coupled to a logical function equivalent to the exclusive-ORing of three bits represent a subtract/add instruction and two signs of said sign magnitude TPC represented operands for performing either add or subtract-compare-Boolean operation at a time upon said operans, and having outputs less than and greater than of its compare operation outputs together with said three bits connected to positive/negative signal generate combinational logic having output means for delivering a two-valued signal comprising together with said data outputs of said PCU sign and magnitude outputs for said SCU;

(II) a TPC positive integers sequential unit(PSU) for performing multiply, divide, and extract squareroot operations upon TPC represented operands, said PSU comprising a combination of:

(a) a TPC add-shift multiplier(ASM) for performing the multiply operation upon two TPC represented operands, said ASM comprising:

(i) a multiplicand register, a multiplier right-shift register, a partial product right-shift register, and working registers $R_d$'s for holding the multiples of a TPC represented operand by digit d for d=2 through 9 respectively;

(ii) said PA;

(iii) eight TPC uni-operand devices $PM_d$'s for multiplying a TPC represented n-digit operand by digit d for d=2 through 9 respectively, wherein:

(1) $PM_2$ and $PM_5$ of said $PM_d$'s comprising each for d=2 and 5 respectively: n TPC uni-operand half multiplier devices $HM_d$'s, each having data inputs for receiving a TPC represented r-bit digit and output means for delivering TPC represented product and carry outputs representing the result of multiplying said TPC represented r-bit digit by said digit d to other devices; and n--1 TPC half adder devices $HA_d$'s, each having data and carry inputs coupled to corresponding product and carry outputs of the outputs of said $HM_d$'s and data outputs for delivering a TPC represented r-bit digit part of data outputs of said $PM_d$ for d=2 and 5 respectively;

(2) $PM_4$ and $PM_8$ of said $PM_d$'s comprising two and three cascaded stages of said $PM_2$ respectively; and (3) the remaining $PM_3$, $PM_6$, $PM_7$ and $PM_9$ of said $PM_d$'s comprising each: said $HM_d$'s for d=3, 6, 7 and 9 respectively; n−1 TPC half adder devices $HA_d$'s for d=3, 6, 7 and 9 respectively, each having data and carry inputs coupled to corresponding product and carry outputs of the outputs of said $HM_d$'s and output means for delivering TPC represented sum of r-bits, carry and nine outputs to other devices; said CLA having its inputs coupled to corresponding outputs of the outputs of said $HA_d$'s; and n−2FALs of said FALs of said PA, each having its data inputs coupled to sum outputs of a HA of said $HA_d$'s, its carry inputs coupled to corresponding outputs of the outputs of said CLA, and its data outputs for delivering a TPC represented r-bit digit part of data outputs of said $PM_d$ for d=3, 6, 7 and 9 respectively;

(iv) a TPC multiplier multiplexer-like device M-MUX, having operand and control inputs and data outputs for choosing one out of r TPC represented operands; and (v) wherein: said M-MUX having its operand inputs coupled to said multiplicand and working registers and its control inputs coupled to said multiplier register; said PA having its inputs of one of its two operands coupled to said M-MUX, its other operand inputs coupled to said product register and its outputs connected to said product register; and said PM$_d$'s having their inputs coupled to said multiplicand register and their outputs connected to said working registers;

(b) a TPC deterministic divider(DD) for performing the divide operation upon two TPC represented operands, said DD comprising:
  (i) a dividend left-shift register, a quotient left-shift register, a working register range(RA) coupled to said dividend register, said multiplicand register for holding divisor, said product register coupled to said range register for holding remainder, and said working registers R$_d$'s for holding the multiples of the divisor by digit d for d = 1 through 9 respectively;
  (ii) nine PSs of said PS;
  (iii) said PM$_d$'s;
  (iv) a TPC quotient multiplexer-like device Q-MUX, having operand and control inputs and quotient and data outputs for choosing one out of r TPC represented operands and delivering TPC represented r-bit digit; and
  (v) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to said quotient register, and its data outputs connected to said range register; said PSs having their subtrahend operand inputs coupled to said working registers and their minuend operand inputs coupled t said range register; and said PM$_d$'s having their inputs coupled to said divisor register and their outputs connected to said working registers;

(c) a TPC squareroot extractor(SRE) for extracting squareroot of a TPC represented operand, said SRE comprising:
  (i) a delay register PM$_1$ for holding intermediate result, and said dividend, quotient and range registers for holding radicand, partial squareroot and intermediate result respectively;
  (ii) said nine PSs;
  (iii) said PM$_d$'s;
  (iv) said Q-MUX;
  (v) said PM$_d$ for doubling partial squareroot; and
  (vi) wherein: said Q-MUX having its operand inputs coupled to said range register and said PSs, its control inputs coupled to a TPC represented r-bit digit generate combinational logic having inputs coupled to borrower outputs of said PSs, its quotient outputs connected to squareroot register, and its data outputs connected to said range register; said PM$_2$ having its inputs coupled to said squareroot register; said PM$_d$'s including said PM$_1$ having the least significant digit of their inputs set to digit d for d = 1 through 9 respectively, and the remaining digits of their inputs coupled to said PM$_2$; and said PSs having their subtrahend operand inputs coupled to said PM$_d$'s and their minuend operand inputs coupled to said range register;

(d) a TPC divisor/squareroot multiplexer-like device DS-MUX, having two operand inputs and r − 1 operand outputs for choosing one out of two TPC represented operands; and (e) wherein:
  (i) said nine PSs are combined each with said PA into nine TPC parallel adder-subtractors(PASs) for performing each addition and straight subtraction upon two TPC represented operands, wherein each: the HAs of said PA and the HSs of a PS of said PSs are combined into n TPC half adder-subtractor devices HASs, each having data inputs for receiving two TPC represented digits of r-bits each, subtract/add control input and output means for delivering TPC represented sum and difference of r-bits each, carry/borrower and non-nine/non-zero outputs to other devices; said CLA having its inputs coupled to corresponding outputs of the outputs of said HASs and its carry outputs for delivering TPC carry/borrower look-ahead outputs to other devices; and the FALs of said PA and the FSLs of said PS are combined into n − 1 TPC full adder-subtractor logic devices FASLs, each having sum and difference inputs coupled to corresponding outputs of a HAS of said HASs, carry/borrower inputs coupled to corresponding outputs of the outputs of said CLA, and data outputs for delivering a TPC represented r-bit digit comprising together with remaining outputs of said FASLs data outputs for a PAS of said PASs;
  (ii) said M-MUX and said Q-MUX are combined into a TPC multiplier/quotient multiplexer-like device MQ-MUX, having operand inputs and quotient and multiplier control inputs and quotient and data outputs for choosing one out of r TPC represented operands and delivering a TPC represented r-bit digit; and
  (iii) said MQ-MUX having its operand inputs coupled to said range register and said PASs, its quotient control inputs coupled to a TPC represented r-bit digit generate combinational logic having inputs coupled to borrower outputs of said PASs, its multiplier control inputs coupled to said multiplier register, its quotient outputs connected to said quotient/squareroot register, and its data outputs connected to said range register; said PASs having their minuend operand inputs coupled to said range register and their subtrahend operand inputs coupled to said working registers; said DS-MUX having its inputs of one of its two operands coupled to said PM$_2$ and its other operand inputs coupled to said multiplicand/divisor register; said PM$_2$ having its inputs coupled to said quotient/square root register; and said PM$_d$'s having their inputs coupled to said DS-MUX and their outputs connected to said working registers; and (III) wherein:
  (a) first PAS of the PASs of said PSU is combined with said SCU;
  (b) one of said SCU two operands is held in said dividend/radicand register and the other one is held in another register having outputs ORed with the outputs of first register of said working registers; and (c) said SCU having its subtrahend operand inputs coupled to said ORed outputs, its minuend operand inputs coupled to said range register, and its data outputs connected to second operand inputs of said MQ-MUX;

(B) a TPC floating-point adder-subtractor(FAS) for performing addition and subtraction operations upon two floating-point sign magnitude TPC represented operands, said FAS comprising:

(I) first operand exponent and mantissa registers, second operand exponent and mantissa registers, exponent and mantissa output registers, and a delay register for holding intermediate result;

(II) said PCU for exponents first addition-subtraction; said SCU for mantissas addition-subtraction; said SCU for exponents second addition-subtraction; a TPC device TD, having data inputs and data outputs for converting a TPC represented operand into shift amount; a TPC device CRS, having data and control inputs and data outputs for shifting a TPC represented operand combinationally to the right variable number of positions; a TPC device CBS, having data and control inputs and data outputs for shifting a TPC represented operand combinationally right and left variable number of positions; a TPC device CLZD, having data and carry inputs and data outputs for determining if there is a carry and if not how many leading zeros are therein a TPC represented operand; a TPC device QSC, having data inputs and data outputs for converting a TPC represented amount of said CLZD outputs type into a sign magnitude TPC representation; and a TPC device ER, having data inputs and data outputs for converting a TPC represented amount of the magnitude type of said sign magnitude TPC representation into a TPC represented operand of a given radix R; and (III) wherein: said registers of two exponents and two mantissas of said first and second operands having their outputs together with borrower outputs of said PCU connected to an arrangement of combinational logic for determining and passing to said delay register the greater of said two exponents and for determining which one of said two mantissas needs to e shifted to the right for aligning mantissas; said PCU having its control input coupled to a logical function equivalent to the exclusive-NORing of the signs of said two exponents, its operand inputs coupled to the registers of said two exponents, and its data outputs connected to said TD; said CRS having its data inputs coupled to shift mantissa to right indicate outputs of said arrangement of combinational logic, and its control inputs coupled to said TD; said SCU of mantissas addition-subtraction having its inputs of one of its two operands coupled to pass mantissa direct indicate outputs of said arrangement of combinational logic and its other operand inputs coupled to said CRS; said CLZD having its carry and data inputs coupled to outputs carry one and zero bits of the outputs of said SCU of mantissas addition-subtraction; said CBS having its data inputs coupled to said SCU of mantissas addition-subtraction, its control inputs coupled to said CLZD, and its outputs connected to said mantissa output register; said QSC having its inputs coupled to said CLZD and its data outputs connected to said ER; and said SCU of exponents second addition-subtraction having its inputs of one of its two operands coupled to said delay register, its other operand inputs coupled to said ER, its control input coupled to a logical function equivalent to the exclusive-ORing of the sign outputs of said delay register and said TPC device QSC, and its outputs connected to said exponent output register;

(C) a TPC floating-point multiplier-divider(FMD) for performing multiply and divide operations upon floating-point TPC represented operands, said FMD comprising:

(I) the registers of said FAS for holding exponents and mantissas of first and second operands, intermediate and output results;

(II) either said PS or said PC for determining if said second operand mantissa is less than said first operand mantissa; said SCU for exponents addition-subtraction; a TPC device CLS, having data and control inputs and data outputs for shifting a TPC represented operand combinationally to the left variable number of positions; and a TPC device SIDPZ, having data and control inputs and data outputs for increase, decrease, pass unchanged, and set a TPC represented operand to zero;

(III) a TPC sequential multiplier-divider(SMD) for performing multiply and divide operations upon fixed-point TPC represented operands, said SMD comprising a combination of:

(a) said ASM;
(b) said DD; and
(c) wherein:
  (i) the nine PSs of said DD are combined each with the PA of said ASM into said nine PASs of said PAU for performing each addition and straight subtraction upon TPC represented positive operands;
  (ii) said M-MUX of said ASM and said Q-MUX of said DD are combined into said MQ-MUX of said PAU for choosing one out of r TPC represented operands and delivering a TPC represented r-bit digit; and
  (iii) said MQ-MUX having its operand inputs coupled to said range register and said PASs, its quotient control inputs coupled to a TPC represented r-bit digit generate combinational logic having inputs coupled to borrower outputs of said PASs, its multiplier control inputs coupled to said multiplier register, its quotient outputs connected to said quotient register, and its data outputs connected to said range register; said PASs having their subtrahend operand inputs coupled to said working register, their minuend operand inputs coupled to said range register, and their control input coupled to a divide/multiply binary variable; and said $PM_d$'s having their inputs coupled to said multiplicand/divisor register and their outputs connected to said working registers; and (IV) wherein: said SCU having its two operand inputs coupled to the exponent registers of said first and second operands, its subtract/add control input coupled to said divide/multiply binary variable, and its outputs connected to said delay register; said PS having its inputs coupled to the mantissa registers of said first and second operands; said SMD having its operand inputs coupled to the mantissa registers of said first and second operands and its control input coupled to said divide/multiply binary variable; said SIDPZ having its outputs connected to said exponent output register, its data inputs coupled to said delay register, and inputs increase, decrease, pass unchanged, and set to zero of its control inputs coupled to combinational logic having inputs coupled to said divide/multiply binary variable, borrower outputs of said PS, most significant bit of the outputs of said SMD, and zero bits of the outputs of the mantissa registers of said first and second operands; and said CLS having its data inputs coupled to said SMD, its control inputs coupled to said combinational logic, and its outputs connected to said mantissa output register;

(D) a TPC floating-point squareroot extractor(FSRE) for performing squareroot extract operation upon a floating-point TPC represented operand, said FSRE comprising:

(I) said registers of said first operand of said FAS for holding exponent and mantissa of a radicand;

(II) said SRE for fixed-point squareroot extraction, said CRS for shifting said radicand mantissa either zero or one-digit position to the right, said SIDPZ for increasing said radicand exponent by either zero or one, and a TPC device BR, having data inputs and data outputs for performing the halving operation upon a TPC represented operand; and (III) wherein: said radicand exponent register having its r-bit TPC represented output of its least significant digit LSD connected to even/odd signals generate combinational logic having even and odd indicate outputs for determining whether said LSD is an even or an odd digit; said CRS having its data inputs coupled to said radicand mantissa register, and inputs one and zero of its control inputs coupled to odd and even outputs of said even/odd signals generate combinational logic; said SRE having its radicand register coupled to said CRS; said SIDPZ having its data inputs coupled to said radicand exponent register, and inputs increase and pass unchanged of its control inputs coupled to odd and even outputs of said even/odd signals generate combinational logic; and said BR having its data inputs coupled to said SIDPZ and its outputs connected to an exponent output register; and (E) wherein:

(I) said SCU of mantissas addition-subtraction of said FAS, said SMD of said FMD, and said SRE of said FSRE are combined with said PAU for all mantissas fixed-point operations; said PCU of said FAS is combined with said SCU of said FMD for all exponents first addition-subtractions; said SIDPZ of said FMD is combined with said SCU of exponents second addition-subtraction of said FAS for all exponents second addition-subtractions; said CLS of said FMD is combined with said CBS of said FAS for all post normalize shift operations; said CRS of said FAS and said FSRE is dept for all a pre-fixed-point operation right shift operations; and said PS of said FMD, said SIDPZ and BR of said FSRE, and said TD, CLZD, QSC, and ER of said FAS are kept the same for the same said purposes;

(II) said registers of exponents and mantissas of said first and second operands, said SCU of all exponents first addition-subtractions, said BR, and said PS having their outputs together with three external control variables connected to an arrangement means of combinational logic for: (1) performing either subtract/add, divide/multiply or squareroot operation at a time, (2) passing to said delay register: the greater of the two exponents of said first and second operands in case of a subtract/add operation, the sign magnitude sum of said two exponents in case of a divide/multiply operation, and one half of said radicand exponent in case of a squareroot operation, and (3) determining which one of the mantissas of said radicand and first and second operands needs to be passed directly to said PAU and which one of said mantissas needs to be shifted to the right for aligning mantissas before being passed to said PAU; and (III) said PAU having its inputs of one of its two operands coupled to said CRS and its other operand inputs coupled to pass mantissa direct indicate outputs of said arrangement means of combinational logic; said CRS having its data inputs coupled to shift mantissa to right indicate outputs of said arrangement means of combinational logic and its control inputs coupled to said TD; said SCU of all exponents first addition-subtractions having its minuend and subtrahend operand inputs coupled to exponent registers of said first and second operands respectively, its subtract/add instruction input coupled to a subtract/add indicate output of said arrangement means of combinational logic, and its data outputs connected to said TD; said SCU of all exponents second addition-subtractions having its inputs of one of its two operands coupled to said delay register, its other operand inputs coupled to said ER, its control input coupled to a logical function equivalent to the exclusive-ORing of the sign outputs of said delay register and said TPC device QSC, and its outputs connected to said exponent output register; said PS having its minuend and subtrahend operand inputs coupled to the mantissa registers of said first and second operands respectively; said SIDPZ having its data inputs coupled to said radicand exponent register, inputs increase and pass unchanged of its control inputs coupled to odd and even indicate outputs of said arrangement means of combinational logic, and its data outputs connected to said BR; said CLZD having its carry and data inputs coupled to outputs carry one and zero bits of the outputs of said PAU; said QSC having its inputs coupled to said CLZD and its data outputs connected to said ER; and said CBS having its data inputs coupled to said PAU, its control inputs coupled to said CLZD, and its outputs connected to said mantissa output register.

* * * * *

UNITED STATES PATENT AND TRADEMARK OFFICE
CERTIFICATE OF CORRECTION

Page 1 of 19

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

The title page, should be deleted to be replaced with the attached title page.

United States Patent
Al-Ofi

Patent Number: 5,181,186
Date of Patent: Jan. 19, 1993

[54] TPC COMPUTERS

[76] Inventor: Moatad Salem Al-Ofi, Medina, Saudi Arabia

[21] Appl. No.: 789,410

[22] Filed: Nov. 1, 1991

Related U.S. Application Data

[63] Continuation of Ser. No. 476,301, Feb. 7, 1990, abandoned, which is a continuation-in-part of Ser. No. 181,034, Apr. 13, 1988, abandoned.

[51] Int. Cl.$^5$ .......................... G06F 7/49; G06F 7/50; G06F 7/52
[52] U.S. Cl. .................................... 364/287; 364/716; 364/736; 364/748; 364/752; 364/737; 364/764; 364/759; 364/768; 364/786; 307/465
[58] Field of Search .................. 364/736, 746, 746.2, 364/748, 752, 754, 757, 759, 761, 764, 766, 786, 787, 716, 755, 762, 778, 780; 307/465

[56] References Cited

U.S. PATENT DOCUMENTS

| | | | |
|---|---|---|---|
| 3,155,822 | 11/1964 | Chiang | 364/780 |
| 3,192,369 | 6/1965 | Schmitt | 364/780 |
| 3,513,303 | 5/1970 | Kitz et al. | 364/762 |
| 3,594,561 | 7/1971 | Whitwell | 364/780 |
| 3,906,481 | 9/1975 | Luger | 364/755 |
| 4,901,267 | 2/1990 | Birman et al. | 364/736 |
| 4,916,651 | 4/1990 | Gill et al. | 364/736 |

OTHER PUBLICATIONS

Anderson et al. The IBM System/360 Model 91: Floating-Point Execution Unit, IBM Journal, vol. 11, Jan. 1967, pp. 193-218.

Boole, G., The Laws of Though, Cambridge, 1854, pp. 40-41.

Hwang, K., Computer Arithmetic Principles, Architecture and Design, New York, Wiley, 1979, pp. 84-90.

Al-Kashi, J. M., Miftah Al-Hisab, Eds. Dimirdash & Al-Shaykh, The Arabian Book House for Typing & Pub., Cario, 1969, pp. 56-66.

Mano, M. M., Digital Logic and Computer Design, Englewood Cliffs, N. J., Prentice Hall, 1979, pp. 10-14, 323-334, 416-420.

Mano, M. M., Computer System Architecture, Englewood Cliffs, N. J., Prentice Hall, 1976, pp. 375-380.

Shannon, C. E., A Symbolic Analysis of Relay and Switching Circuits, Trans. of the AIEE, vol. 57, 1938, pp. 713-723.

Primary Examiner—David H. Malzahn

[57] ABSTRACT

A tri-property code has been adopted and accordingly combinational and sequential circuits for implementing some arithmetic and logical operations are designed individually then combined into a unit for such operations. Most of the circuits are drawn for the decimal system with general procedures applicable to the other radices.

18 Claims, 132 Drawing Sheets

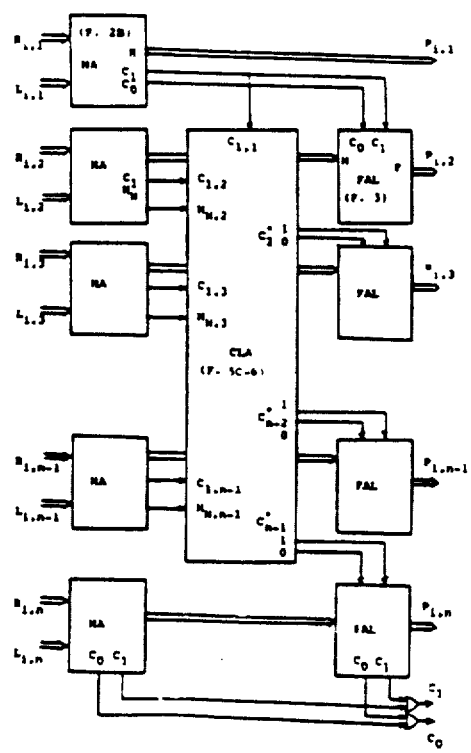

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 76, line 63, "n-2FALs" ought to be —n-2 FALs—.

Column 76, line 68, "digit or r-bits" ought to be

—digit of r-bits—.

Column 79, line 27, "(SCU" ought to be —(SCU)—.

Column 91, line 32, "d-32" ought to be —d =—.

Column 93, line 60, "re" ought to be —are—.

Column 94, line 41, "higher" ought to be —either—.

Column 96, line 48, "r— —1" ought to be —r - 1—.

Column 98, line 20, "n— —1" ought to be —n - 1—.

Column 98, line 38, "OR NOR" ought to be —OR, NOR—.

Column 99, line 19, "n— —1" ought to be —n - 1—.

Column 100, line 51, "n-2FALs" ought to be —n-2 FALs—.

Column 101, line 36, "coupled t said" ought to be

—coupled to said—.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 103, line 32, "therein" ought to be --there in--.

Column 103, line 41, "radix R" ought to be --radix r--.

Column 103, line 49, "needs to e shifted" ought to be --needs to be shifted--.

Column 106, line 3, "dept" ought to be --kept--.

Column 1, line 5, "1970" ought to be --1990--.

Column 1, line 18, "formulea" ought to be --formulae--.

Column 3, line 11, "carrying" ought to be --carry--.

Column 4, line 9, "FIG." ought to be --FIGS.--.

Column 4, line 16, "for TPC" ought to be --for a TPC--.

Column 4, lines 39-40, "multiplexer(PM)" ought to be --multiplier(PM)--.

Column 4, line 62, "is logic" ought to be --is a logic--.

Column 6, line 6, "FIG." ought to be --FIGS.--.

UNITED STATES PATENT AND TRADEMARK OFFICE
CERTIFICATE OF CORRECTION

PATENT NO. : 5,181,186

DATED : January 19, 1993

INVENTOR(S) : Moatad Salem Al-Ofi

It is certified that error appears in the above-indentified patent and that said Letters Patent is hereby corrected as shown below:

Column 6, line 21, "(EAS)" ought to be —(FAS)—.

Column 6, line 23, "multiplexer-divider(EMD)" ought to be —multiplier-divider(FMD)—.

Column 6, line 46, "counter nor described in their" ought to be —counted nor described in this—.

Column 9, line 33, "or ALG 1" ought to be —of ALG 1—.

Column 10, equation(3)-$H_N$, "$(H_g\overline{)}$" ought to be —$(H_g\overline{)}$—.

Column 10, line 17, "by input-output" ought to be —by its input-output—.

Column 10, line 44, "2B us" ought to be —2B is—.

Column 11, line 60, ". ; 9;" ought to be —, 9;—.

Column 12, lines 18, 33 and 59, "$C_{j,k}d$" ought to be —$C^d_{j,k}$—.

Column 12, line 20, "k'LSD" ought to be —k-1 LSD—.

Column 12, line 32, "$L_i$ and Rt" ought to be —$L_i$ and $R_t$—.

Column 12, line 53, "$C_{j,0}d$" ought to be —$C^d_{j,0}$—.

UNITED STATES PATENT AND TRADEMARK OFFICE
CERTIFICATE OF CORRECTION

PATENT NO. : 5,181,186

DATED : January 19, 1993

INVENTOR(S) : Moatad Salem Al-Ofi

It is certified that error appears in the above-indentified patent and that said Letters Patent is hereby corrected as shown below:

Column 13, lines 1, 10 and 46, "$C_{j,k}d$" ought to be $-C^d_{j,k}-$.

Column 13, lines 28 and 67, "$C_{j,n}d$" ought to be $-C^d_{j,n}-$.

Column 13, line 58, "$CFD_k3$ s" ought to be $-CFD_k\text{'s}-$.

Column 14, line 30, "$C_{j,k}d$" ought to be $-C^d_{j,k}-$.

Column 14, line 59, "$C_{j,k}g$ and $G_k g$" ought to be $-C^g_{j,k}$ and $G^q_k-$.

Column 15, line 12, "$C_{j,k}\text{*'s}$" and "$C_{j,k}\text{*,g's}$" ought to be $-C^*_{j,k}\text{'s}-$ and $-C^{*,g}_{j,k}\text{'s}-$, respectively.

Column 16, line 25, "As is clear" ought to be $-$As it clear$-$.

Column 16, line 27, "IN" ought to be $-$In$-$.

Column 16, line 55, "$B_{j,k}d$" ought to be $-B^d_{j,k}-$.

Column 16, line 58, "subtractor." ought to be $-$subtractors.$-$.

Column 17, lines 6 and 54, "$B_{j,k}d\text{'s}$" ought to be $-B^d_{j,k}\text{'s}-$.

Column 17, line 10, "$C_{j,k}\text{*'s}, C_{j,k}d$" ought to be $-C^*_{j,k}, C^d_{j,k}-$.

Column 17, lines 10-11, "$B_{j,k}\text{*}, B_{j,k}d$" ought to be $-B^*_{j,k}, B^d_{j,k}-$.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 17, line 13, "$C_{j,k}*$, $C_{j,k}d$" ought to be $-C^*_{j,k}$, $C^d_{j,k}-$.

Column 17, lines 13-14, "$B_{j,k}*$, $B_{j,k}d$" ought to be $-B^*_{j,k}$, $B^d_{j,k}-$.

Column 17, line 29, "$B_{j,k}*$,s" ought to be $-B^*_{j,k}$'s-.

Column 17, line 32, "$B_{j,k}d$" ought to be $-B^d_{j,k}-$.

Column 17, line 33, "$C_{j,k}d$'s" ought to be $-C^d_{j,k}$'s-.

Column 18, line 5, "$B_{j,n}d$" ought to be $-B^d_{j,n}-$.

Column 21, line 6, "$G_k d$, $L_k d$ and $E_k d$" ought to be $-G^d_k$, $L^d_k$ and $E^d_k-$.

Column 13, lines 29 and 49, "$C_{j,k}*$" ought to be $-C^*_{j,k}-$.

Column 22, line 7, "$H_i T$, $H_i C$" ought to be $-H^T_i$, $H^C_i-$.

Column 22, equation(37)-E, "$E = L_i \quad R_i$" ought to be $-E = L_i \odot R_i-$.

Column 24, line 43, "$H_i m$ and $H_i m$" ought to be $-H^m_i$ and $H^a_i-$.

Column 24, line 45, "$C_{j,k}*$" ought to be $-C^*_{j,k}-$.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 25, line 37, "ALB. 4" ought to be --ALG. 4--.

Column 26, line 47, "$H_id$ and $C_ud$" ought to be --$H_i^d$ and $c_u^d$--.

Column 27, line 64, "$C_ta$" and "$C_0a$" ought to be

--$C_t^a$-- and --$C_0^a$--, respectively.

Column 27, line 65, "$C_0 8$" ought to be --$C_0^*$--.

Column 28, line 63, "$C_2d$" ought to be --$C_2^d$--.

Column 28, line 64, "$C_1d$ and $C_3d$" ought to be --$C_1^d$ and $C_3^d$--.

Column 28, line 66, "$H_id$" ought to be --$H_i^d$--.

Column 29, line 1, "$C_ud$ and $H_id$" ought to be --$C_u^d$ and $H_i^d$--.

Column 29, lines 6 and 17, "$H_id$" ought to be --$H_i^d$--.

Column 29, lines 13 and 15, "$C_id's$" ought to be --$C_i^d$'s--.

Column 29, line 26, "$H_id's$" ought to be --$H_i^d$'s--.

Column 29, line 62, "$H_{i,k}d$ and $C_{u,k}d$" ought to be

--$H_{i,k}^d$ and $C_{u,k}^d$--.

UNITED STATES PATENT AND TRADEMARK OFFICE
CERTIFICATE OF CORRECTION

PATENT NO. : 5,181,186

DATED : January 19, 1993

INVENTOR(S) : Moatad Salem Al-Ofi

It is certified that error appears in the above-indentified patent and that said Letters Patent is hereby corrected as shown below:

Column 30, line 15, "$H_s d$'s and $C_s d$'s are $H_i d$'s" ought to be --$H_s^d$'s and $C_s^d$'s are $H_i^d$'s--.

Column 30, line 16, "$C_u d$'s" & "$H_s a$'s" ought to be --$C_u^d$'s-- & --$H_s^a$'s--, respectively.

Column 30, line 17, "$C_{j,k}$*'s" ought to be --$C_{j,k}^*$'s--.

Column 30, line 35, "$H_{i,k} d$ and $C_{i,n} d$" ought to be --$H_{i,k}^d$ and $C_{i,n}^d$--.

Column 30, lines 35-36, "$H_{i,k} a$ and $C_{j,k} a$" ought to be --$H_{i,k}^a$ and $C_{j,k}^a$--.

Column 30, line 55, "$H_s d$'s and $H_s a$'s" ought to be --$H_s^d$'s and $H_s^a$'s--

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 31, lines 11 and 14, "$P_{i,k}j$'s" ought to be $-P^j_{i,k}$'s-.

Column 32, equation(48), "$q_i G_i L_{i+1}$" ought to be $-q_i = G_i L_{i+1}-$.

Column 32, line 41, "$0 \geq R$" ought to be $-0 \leq R-$.

Column 32, line 42, "$G_0 L_{10} = 1$" ought to be $-G_0 = L_{10} = 1-$.

Column 33, line 18, "FIG. 7" ought to be —FIG. 37—.

Column 33, line 26, "$P_{i,k}j$" ought to be $-P^j_{i,k}-$.

Column 33, line 36, "(range," ought to be —(range),—.

Column 35, line 63, "$0 \geq$ (remainder)" ought to be $-0 \leq$ (remainder)—.

Column 36, line 45, "$S_d = G_d L_{d+1}$           (53)" ought to be $-S_d = G_d L_{d+1}-$.

Column 37, lines 66-67, "$L_{ir}4 \ldots L_{i2}2 L_{i1}1$" ought to be $-L^r_{i_r} \ldots L^2_{i_2} L^1_{i_1}-$.

Column 37, line 67, "$R_{jr}4 \ldots R_{j2}2 R_{j1}1$" ought to be $-R^r_{j_r} \ldots R^2_{j_2} R^1_{j_1}-$.

UNITED STATES PATENT AND TRADEMARK OFFICE
CERTIFICATE OF CORRECTION

PATENT NO. : 5,181,186

DATED : January 19, 1993

INVENTOR(S) : Moatad Salem Al-Ofi

It is certified that error appears in the above-indentified patent and that said Letters Patent is hereby corrected as shown below:

Column 38, line 34, "$A_{b-1}v$" ought to be $-A^v_{b-1}-$.

Column 38, line 35, "$A*v$" ought to be $-A^v_*-$.

Column 38, line 36, "$H_i v$" ought to be $-H^v_i-$.

Column 38, line 50, "$C_{0.k}v$" ought to be $-C^v_{0,k}-$.

Column 38, equation(56b), "$C_{1,k}v = (C_{0,k}v)$" ought to be $$-C^v_{1,k} = (C^v_{0,k})-.$$

Column 38, line 54, "$C_{1,k}v$" ought to be $-C^v_{1,k}-$.

Column 38, equation(56c), "$C_{0,k}v = (C_{1,k}v)$" ought to be $$-C^v_{0,k} = (C^v_{1,k})-.$$

Column 38, lines 58-59, "where $A_{b-1,k+1}^0 = A_{b-1,(n/r)+1}^v = 1$; $A*,_{k+1}^0 = A*,_{(n/r)+1}^v = \emptyset$; $C_{0,1}^d = C_{0,1} + A_{b-1,1}^4$; $r$, $v$, $A_{b-1,k}v$" ought to be $-A^0_{b-1,k+1} = A^v_{b-1,(n/r)+1} = 1$; $A^0_{*,k+1} = A^v_{*,(n/r)+1} = \emptyset$; $C^d_{0,1} = C_{0,1} + A^r_{b-1,1}$; $r$, $v$, $A^v_{b-1,k}-$.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi Page 12 of 19

It is certified that error appears in the above-indentified patent and that said Letters Patent is hereby corrected as shown below:

Column 39, line 10, "$H_{i,k}v's$" and "$C_{i,k}v's$" ought to be $-H_{i,k}^{v}\text{'s}-$ and $-C_{i,k}^{v}\text{'s}-$, respectively.

Column 39, line 32, "$L_{j1}1, L_{j2}2, \ldots, L_{jn}n$" ought to be $-L_{j_1}^{1}, L_{j_2}^{2}, \ldots, L_{j_n}^{n}-$.

Column 39, lines 39-40, "$L_{j1}1 \times L_{j2}2 \times \ldots \times L_{jn}n$" ought to be $-L_{j_1}^{1} \times L_{j_2}^{2} \times \ldots \times L_{j_n}^{n}-$.

Column 39, lines 43-44, "$L_{j1}1$ and $L_{j2}2$" ought to be $-L_{j_1}^{1}$ and $L_{j_2}^{2}-$.

Column 39, line 47, "$L_{j4}4, L_{j5}5, \ldots,$ and $L_{jn}n$" ought to be $-L_{j_4}^{4}, L_{j_5}^{5}, \ldots,$ and $L_{j_n}^{n}-$.

Column 40, line 36, "$H_i n's$ and $C_i n's$" ought to be $-H_i^{n}\text{'s}$ and $C_i^{n}\text{'s}-$.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 40, line 37, "$C_{j,k}*$" ought to be --$C^*_{j,k}$--.

Column 46, line 33, "$T_{j,k}d$, $T_k$ and t as" ought to be --$T^d_{j,k}$, $T_k$ and t are as--.

Column 46, line 57, "$C_{j,n}d$" ought to be --$C^d_{j,n}$--.

Column 46, line 58, "$B_{j,k}d$" ought to be --$B^d_{j,k}$--.

Column 46, line 62, "$C_{j,k}d$" ought to be --$C^d_{j,k}$--.

Column 46, line 63, "$B_{j,k}d$" ought to be --$B^d_{j,k}$--.

Column 46, line 65, "$T_{j,k}d$" ought to be --$T^d_{j,k}$--.

Column 47, line 21, "GASL" ought to be --FASL--.

Column 47, line 43, "$C_{j,k}d$ and $B_{j,k}d$" ought to be --$C^d_{j,k}$ and $B^d_{j,k}$--.

Column 47, line 47, "GASC" ought to be --FASC--.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 47, line 52, "of FIG. 63" ought to be —of FIG. 53—.

Column 47, line 64, "$C_{j,n}d$ and $B_{j,n}d$" ought to be —$C^d_{j,n}$ and $B^d_{j,n}$—.

Column 47, line 65, "e,acu/t/" ought to be —$\bar{t}$—.

Column 48, line 14, "$Z_{k,k}$" ought to be —$Z_{j,k}$—.

Column 48, line 15, "$B^*_0 + C_0 + C_1$" ought to be —$B^*_0 = B_0 + C_0 + C_1$—.

Column 49, line 20, "$RM_d$'s" ought to be —$PM_d$'s—.

Column 49, line 46, "$P_{i,k}{}^j$" ought to be —$P^j_{i,k}$—.

Column 49, line 57, "2. s=1" ought to be —2. If s = 1—.

Column 50, line 7, "$RM_d$'s" ought to be —$PM_d$'s—.

Column 50, line 32, "$L_{i,k}{}^j$" ought to be —$L^j_{i,k}$—.

Column 51, line 28, "RØn" ought to be —R ← n—.

Column 51, line 43, "$P_9$ ← R" ought to be —$P_0$ ← R—.

UNITED STATES PATENT AND TRADEMARK OFFICE
CERTIFICATE OF CORRECTION

PATENT NO. : 5,181,186  
DATED : January 19, 1993  
INVENTOR(S) : Moatad Salem Al-Ofi Page 15 of 19

It is certified that error appears in the above-indentified patent and that said Letters Patent is hereby corrected as shown below:

Column 53, equation(82)-$G_s$, "$E\bar{S}_r S_1$" ought to be $-ES_r \bar{S}_1-$.

Column 53, equation(82)-$E_s$, "$E(S_1 \quad S_r)$" ought to be $$-E(S_1 \odot S_r)-.$$

Column 53, line 31, "and and" ought to be —and—.

Column 54, line 4, insert ALG 2 and the conventional

Column 54, ALG 19-step 1., "1. Add the two magnitudes $M_L$ and MR of the minuend $L_{i,k}$ are identical and A = 0 or if $S_1$ and $S_r$ are different and A = 1, where A, $S_1$, and $S_r$ are as defined for relations(82)" ought to be —1. Add the two magnitudes $M_L$ and $M_R$ of the minuend $L_{i,k}$ and the subtrahend $R_{i,k}$, respectively, if either $S_1$ and $S_r$ are identical and A = 0 or if $S_1$ and $S_r$ are different and A = 1, where A, $S_1$, and $S_r$ are as defined for relations(82)—.

Column 55, line 53, "j1, 2, ..., n" ought to be $$-j = 1, 2, ..., n-.$$

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 55, line 68, "$k_1 = 0, 1, \ldots, r1^{n_1} - 1$" ought to be

--$k_1 = 0, 1, \ldots, r_1^{n_1} - 1$ \hspace{2cm} (88)--.

Column 57, line 10, "FIG. 301 according tot" ought to be

--FIG. 3-1 according to--.

Column 57, line 35, "FIGS. 80A-1 and 80A-2 and IDL's" ought to be --FIGS. 80A-1 and 80A-2 are IDL's--.

Column 58, line 37, "where $R_1 =$" ought to be --where $T_1 =$--.

Column 58, line 38, "$T_2 + PL_i$" ought to be --$T_2 = PL_i$--.

Column 58, line 63, "FGI" ought to be --FIG--.

Column 60, line 12, "$R_9$ and $R_{r-1}$" ought to be --$R_0$ and $R_{r-1}$--.

Column 61, equation(106), "$P_{i,k}{}^B = P_{i,k}{}^L + P_{i,k}{}^R$" ought to be --$P^B_{i,k} = P^L_{i,k} + P^R_{i,k}$--.

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 61, line 64, "sum and$_2$(SD$_2$)" ought to be --summand$_2$(SD$_2$)--.

Column 62, line 18, "e,ovs/r/ s = 0" ought to be --$\bar{r}$s = 0--.

Column 62, line 67, "$\bar{r}$s+0" ought to be --$\bar{r}$s = 0--.

Column 62, line 68, "+u$\bar{s}$+0" ought to be --+u$\bar{s}$ = 0--.

Column 63, line 9, "$P_{i,k} \overline{\leftarrow} P_{i,k+1}$ in P" ought to be --$P_{i,k} \leftarrow P_{i,k+1}$ in P--.

Column 65, lines 19-20, "$B\hat{Z}(SB_1 + \bar{S}\bar{C})$" ought to be --$\bar{B}\bar{Z}(SB_1 + \bar{S}\bar{C})$--.

Column 65, lines 19-20, "$d_1 \leftarrow (C\bar{B}\bar{Z}S)$" ought to be --$d_1 \leftarrow (C\bar{B}\bar{Z}S)$--.

Column 65, line 19-20, D$\bar{B}\bar{Z}$S ought to be C$\bar{B}\bar{Z}$S

UNITED STATES PATENT AND TRADEMARK OFFICE
CERTIFICATE OF CORRECTION

PATENT NO. : 5,181,186
DATED : January 19, 1993
INVENTOR(S) : Moatad Salem Al-Ofi It is certified that error appears in the above-indentified patent and that said Letters Patent is hereby corrected as shown below:

Column 65, lines 44-45, "$O \leftarrow E_{1,1} + E_{3,1} + E_{6,1} + E_{7,1} + E_{9,1}$" ought to be $-O \leftarrow E_{1,1} + E_{3,1} + E_{5,1} + E_{7,1} + E_{9,1}-$.

Column 66, line 16, "*)/" ought to be —*)— .

Column 66, line 25, "$d_0 \leftarrow rs$" ought to be $-d_0 \leftarrow \overline{\overline{rs}}-$.

Column 66, line 26, "$E_x \leftarrow rs(P)$" ought to be $-E_x \leftarrow \overline{\overline{rs}}(P)-$.

Column 66, line 27, "$L \leftarrow rs(M_B)$" ought to be $-L \leftarrow \overline{\overline{rs}}(M_B)-$.

Column 66, line 28, "$R_3 \leftarrow (rsv)Z\overline{B}$" ought to be $-R_3 \leftarrow (\overline{\overline{rs}}v)Z\overline{B}-$.

Column 66, lines 28-29, "$R_4 \leftarrow (rsv)ZB(S_A \oplus S_B)$" ought to be $-R_4 \leftarrow (\overline{\overline{rs}}v)\overline{Z}B(S_A \oplus S_B)-$.

UNITED STATES PATENT AND TRADEMARK OFFICE
CERTIFICATE OF CORRECTION

PATENT NO. : 5,181,186

DATED : January 19, 1993

INVENTOR(S) : Moatad Salem Al-Ofi

It is certified that error appears in the above-indentified patent and that said Letters Patent is hereby corrected as shown below:

Column 66, line 35, "where $r_1 + (r\bar{v}\bar{s})\bar{S}_A$" ought to be --where $r_1 = (r\bar{v}\bar{s})\bar{S}_A$--.

Signed and Sealed this

Nineteenth Day of October, 1993

Attest:

BRUCE LEHMAN

*Attesting Officer*     *Commissioner of Patents and Trademarks*